United States Patent [19]
Gil et al.

[11] Patent Number: 5,586,037
[45] Date of Patent: Dec. 17, 1996

[54] AUTOMATED SELF-SERVICE MAIL PROCESSING AND STORING SYSTEMS

[75] Inventors: Asher Gil; John B. Daron; Celestine Vettical, all of Houston, Tex.

[73] Assignee: Pi Electronics, Inc., Houston, Tex.

[21] Appl. No.: 284,910

[22] Filed: Aug. 2, 1994

Related U.S. Application Data

[63] Continuation-in-part of Ser. No. 994,182, Dec. 21, 1992, abandoned, which is a continuation of Ser. No. 678,863, Apr. 1, 1991, abandoned.

[51] Int. Cl.[6] .................................................. G07B 17/02
[52] U.S. Cl. ............................ 364/464.03; 364/478.01
[58] Field of Search ...................... 235/375; 364/464.02, 364/464.03, 478

[56] References Cited

U.S. PATENT DOCUMENTS

| | | | |
|---|---|---|---|
| 4,024,380 | 5/1977 | Gunn | 364/467 |
| 4,253,158 | 2/1981 | McFiggans | 380/23 |
| 4,268,817 | 5/1981 | Simjian | 235/375 X |
| 4,390,952 | 6/1983 | Dlugos | 364/464.03 |
| 4,393,454 | 7/1983 | Soderberg | 364/464.02 X |
| 4,415,048 | 11/1983 | Teraoka | 177/5 |
| 4,511,793 | 4/1985 | Racanelli | 235/375 |
| 4,516,209 | 5/1985 | Scribner | 364/464.03 |
| 4,629,871 | 12/1986 | Scribner et al. | 235/375 |
| 4,787,046 | 11/1988 | Feinland et al. | 364/464.03 |
| 4,796,193 | 1/1989 | Pitchenik | 364/464.02 |
| 4,800,506 | 1/1989 | Axelrod et al. | 364/478 |
| 4,802,218 | 1/1989 | Wright et al. | 380/23 |
| 4,814,995 | 3/1989 | Daniels, Jr. | 364/464.02 |
| 4,825,053 | 4/1989 | Caille | 235/380 |
| 4,836,352 | 6/1989 | Tateno et al. | 194/215 |
| 4,837,701 | 6/1989 | Sansone et al. | 364/464.03 |
| 4,837,714 | 6/1989 | Brookner et al. | 364/550 |
| 4,862,386 | 8/1989 | Axelrod et al. | 364/478 X |
| 4,868,757 | 9/1989 | Gil | 364/464.03 |
| 4,872,119 | 10/1989 | Kajimoto | 364/464.03 |
| 4,900,905 | 2/1990 | Pusic | 235/381 |
| 4,901,241 | 2/1990 | Schneck | 364/464.02 |
| 4,923,022 | 5/1990 | Hsieh | 177/4 |
| 4,940,887 | 7/1990 | Sheng-Jung | 235/381 |
| 4,956,782 | 9/1990 | Freeman et al. | 364/464.03 |
| 4,980,542 | 12/1990 | Jackson et al. | 235/375 |
| 5,025,386 | 6/1991 | Pusic | 364/478 |
| 5,065,000 | 11/1991 | Pusic | 235/381 |

(List continued on next page.)

OTHER PUBLICATIONS

"Futuristic mailing system set for Expo," The Houston Post C-5, Apr. 29, 1991.
U.S. Postal Service brochure for "Autopost" (approx. 1989).
U.S. Postal Service brochure for "Infpost" (approx. 1989).
Strategic Financial Planning Systems brochure (approx. 1989) 2 pages.
U.S. Postal Service bid solicitation document (Sep. 11, 1986).

*Primary Examiner*—Edward Cosimano
*Attorney, Agent, or Firm*—Laura G. Barrow

[57] ABSTRACT

An automated self-service mail processing and storing system is disclosed which is capable of receiving input from and providing instructions to a user via a touch-sensitive screen or a digitized voice system. The system is capable of weighing the mail item, receiving user identification information from a credit/debit card, for example, for payment, calculating the charge for shipment and deducting that amount from the user's charge account, and securely storing the item for subsequent pickup. The system contains a novel weighing means capable of detecting minute vibrations for purposes of obtaining an accurate weight amount. The system may also contain a tracking bar code generation means and a tracking bar code verification system. Optionally, a dual floppy disk system allows the user to send electronic mail, and a built-in facsimile apparatus allows the user to send "FAX" information through the telephone line. Also disclosed is a two-way communication means coupled between the mail processing and storing system computer and a remote computer station for providing such functions as credit authorization and charge reporting, transaction and tracking information transfers, error reporting, etc.

28 Claims, 41 Drawing Sheets

U.S. PATENT DOCUMENTS

| | | | |
|---|---|---|---|
| 5,173,862 | 12/1992 | Fedirchuk et al. | 364/464.02 |
| 5,174,398 | 12/1992 | Ng | 177/1 |
| 5,191,533 | 3/1993 | Haug | 364/464.03 |
| 5,197,042 | 3/1993 | Brookner et al. | 235/375 X |
| 5,202,834 | 4/1993 | Gilham | 364/464.02 |
| 5,233,532 | 8/1993 | Ramsden | 364/464.03 |
| 5,272,648 | 12/1993 | Wu | 364/464.03 X |
| 5,326,181 | 7/1994 | Eisner et al. | 235/432 X |
| 5,340,948 | 8/1994 | Ramsden | 364/464.03 X |
| 5,365,044 | 11/1994 | Hesshaus | 235/375 |
| 5,369,221 | 11/1994 | Ramsden | 364/464.03 X |
| 5,373,450 | 12/1994 | Gallagher et al. | 364/478 |
| 5,421,778 | 6/1995 | Kouramanis | 462/2 |
| 5,444,630 | 8/1995 | Dlugos | 364/464.02 |
| 5,481,464 | 1/1996 | Ramsden | 364/464.03 |

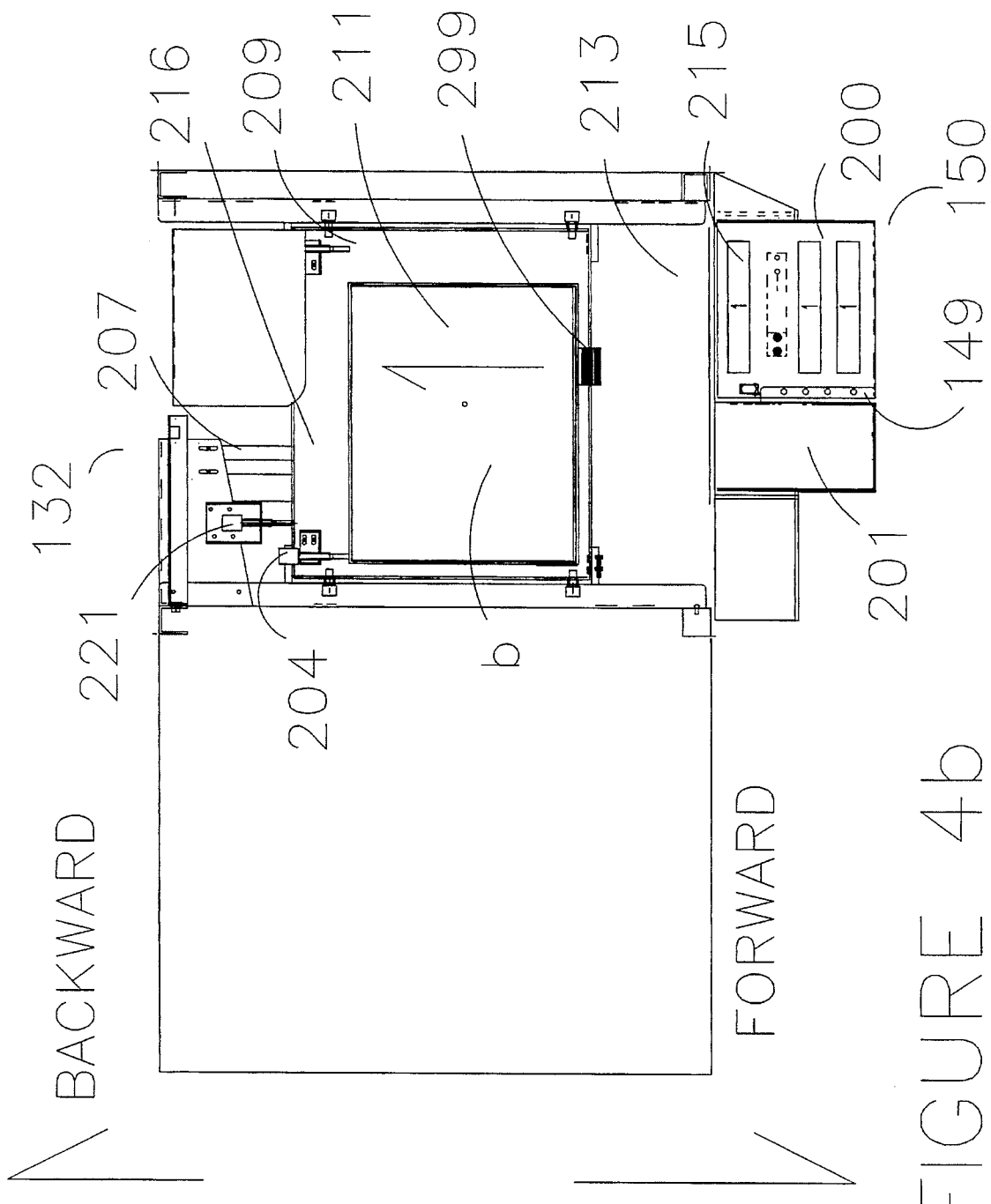

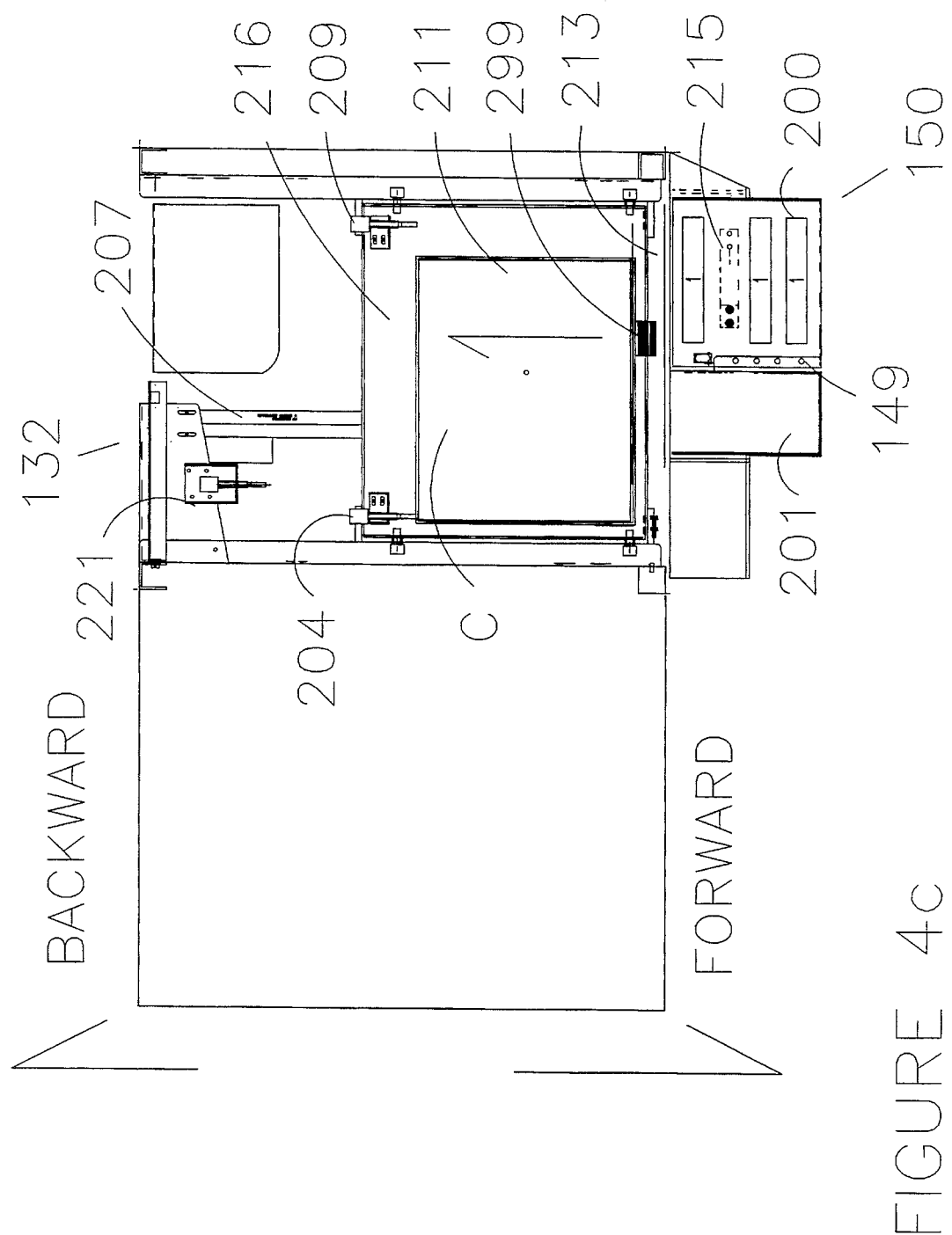

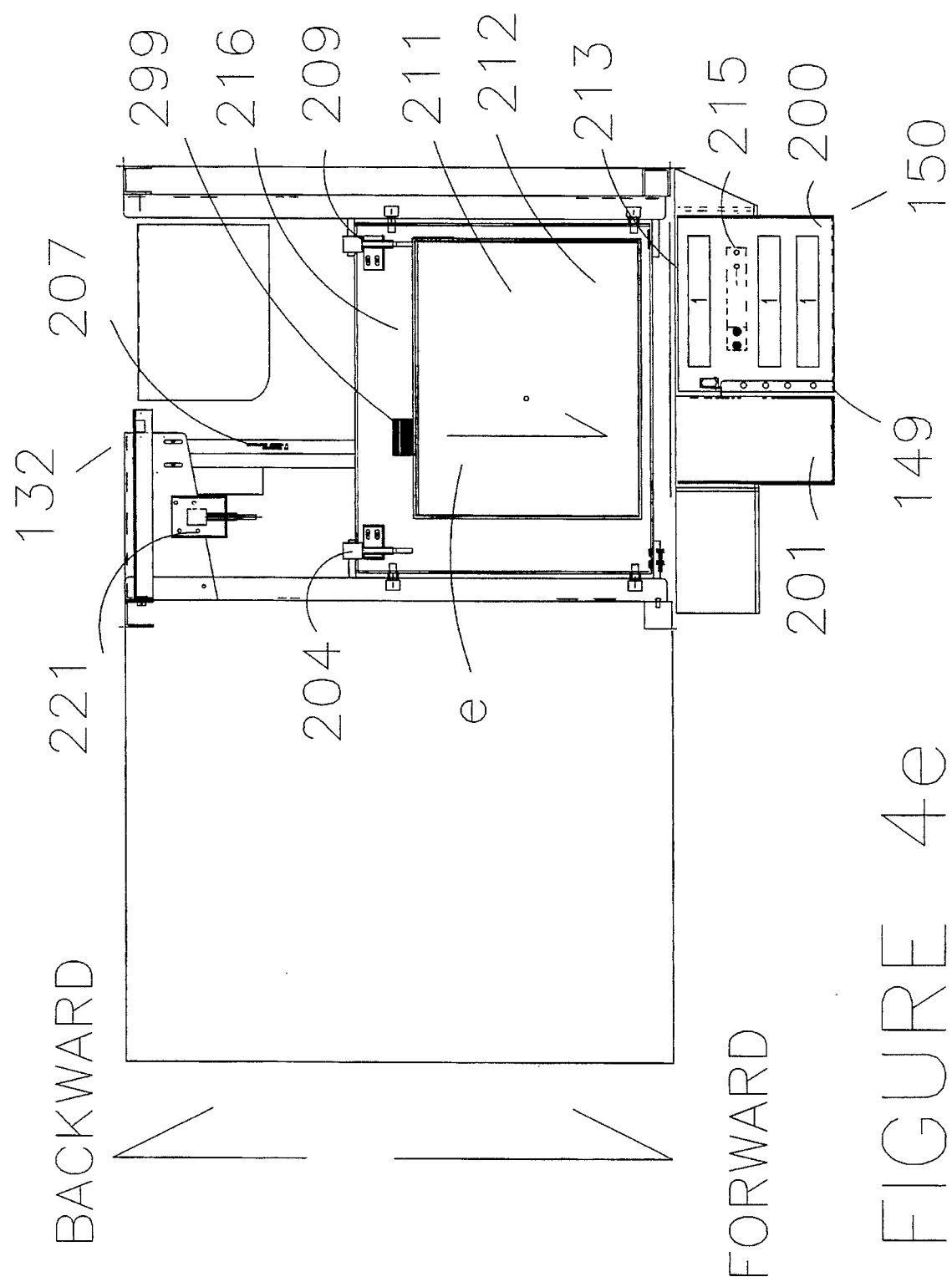

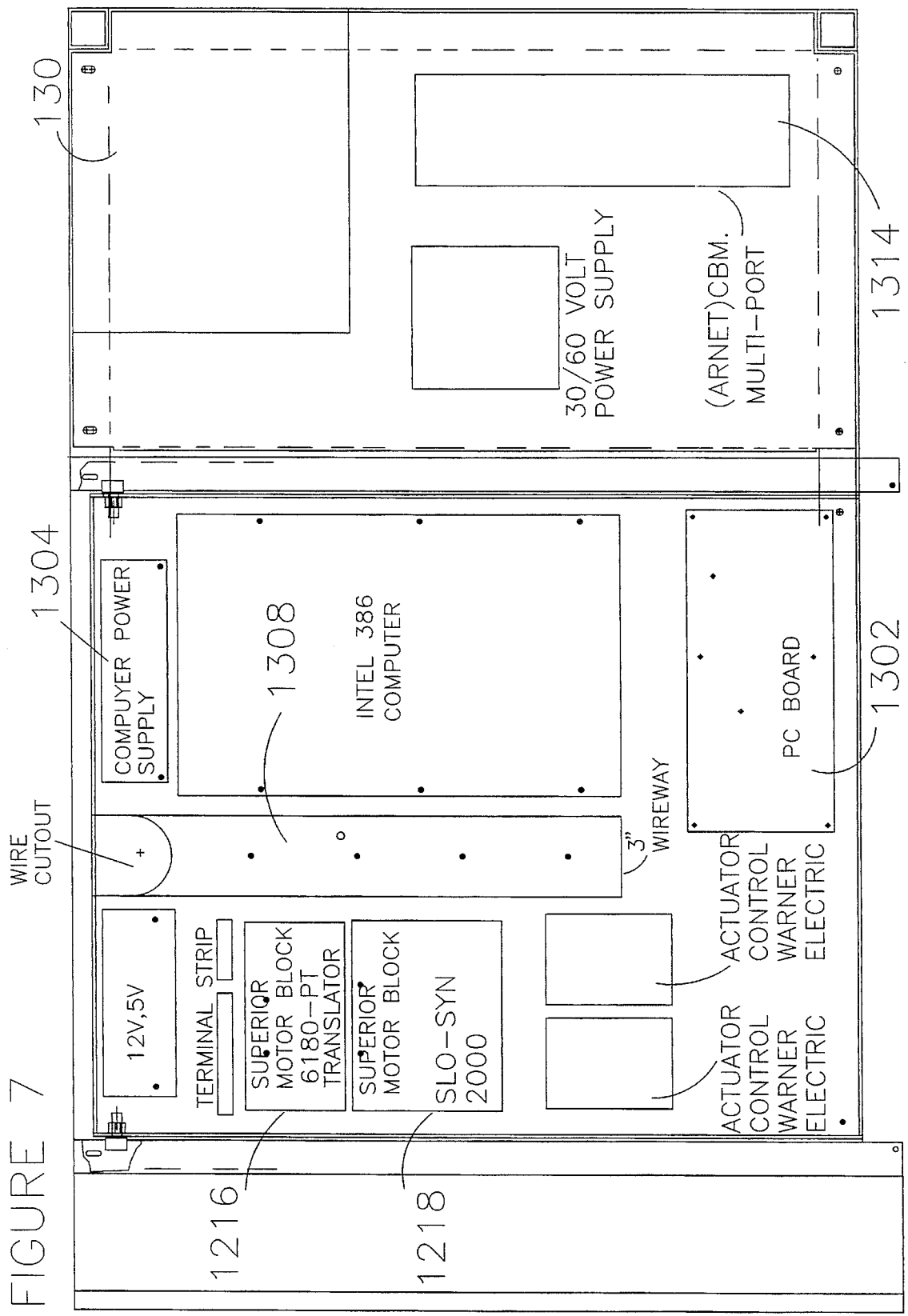

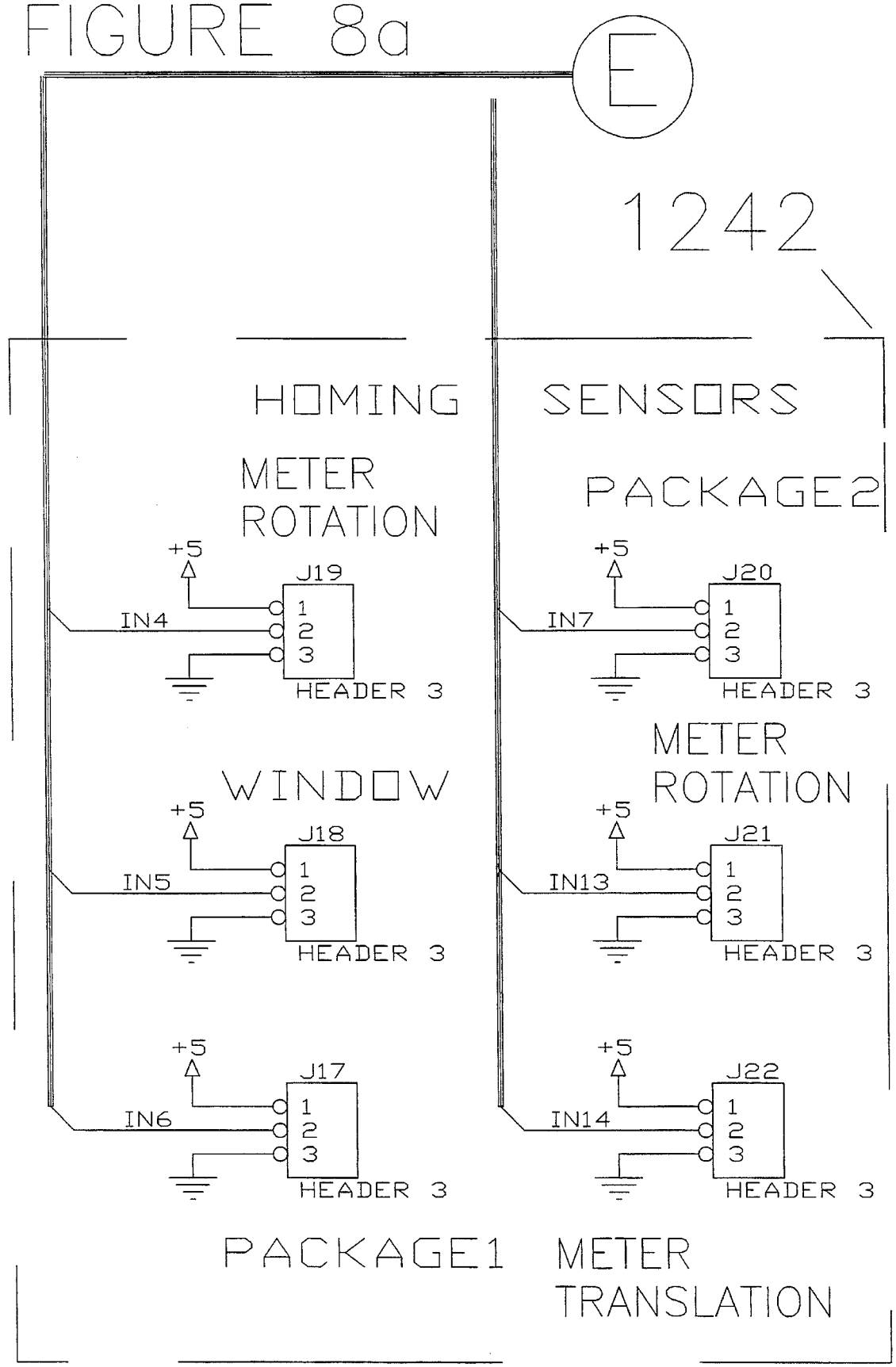

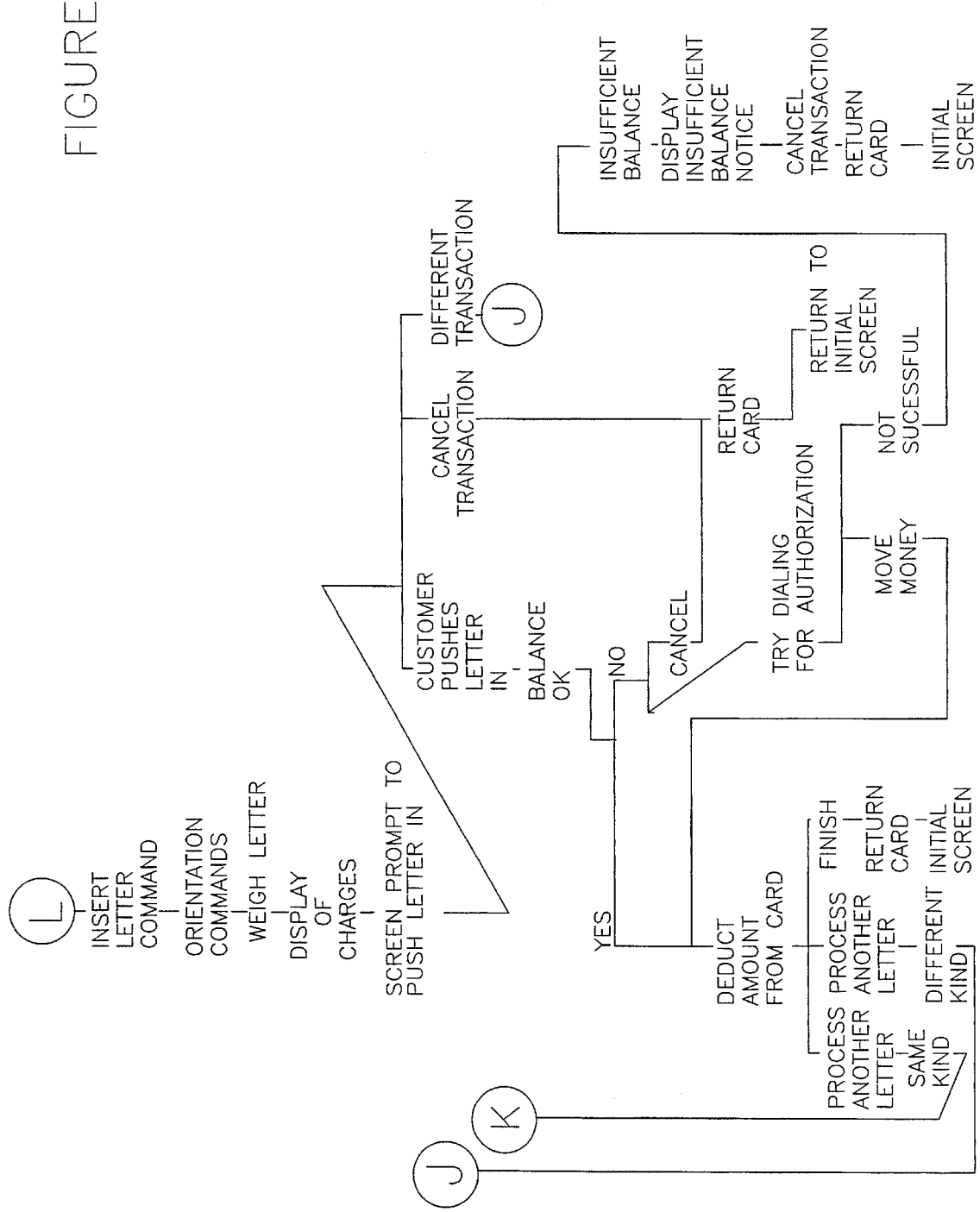

5,586,037

AUTOMATED SELF-SERVICE MAIL PROCESSING AND STORING SYSTEMS

This is a continuation-in-part of application Ser. No. 07/994,182, filed Dec. 21, 1992 and abandoned Aug. 5, 1994, which is a file wrapper continuation of application Ser. No. 07/678,863, filed Apr. 1, 1991 and abandoned on Dec. 21, 1992.

BACKGROUND OF INVENTION

1. Field of Invention

The present invention is related to automated self-service systems for processing and storing items such as letters and packages for subsequent shipment by a commercial carrier.

The attached Appendices A and B set forth copyrighted subject matter. No objection is made to reproduction of the Appendices solely in connection with reproducing any patent that may issue from this application, but all other rights under copyright law are reserved.

2. Description of the Related Art

Presently, many commercial carriers such as the United States Postal Office and Federal Express, for example, provide drop boxes whereby individuals may ship their letters or packages without having to travel to the carrier's particular shipping station. A disadvantage of this system is that such boxes cannot be used where the item must be weighed prior to shipping in order to calculate the cost. Another disadvantage is that often the user must have a pre-assigned charge account, or he or she must use a specialized mailing envelope. In addition, the types of mail services from which a user may wish to use are very limited.

While perhaps not widely used commercially, there are several types of automated self-service mailing machines for processing mail for shipment described in various U.S. patents. U.S. Pat. No. 5,233,532 to Ramsden, for example, is directed to a mailing system which allows a user to process and store mail items for subsequent pick-up by a commercial carrier. In particular, the user is able to enter identification information into the system for purposes of payment, enter destination information for shipment, weigh the item, obtain a charge for shipping the item, and deposit the item into a locked storage area. The system contains an intermediate deposit area ("secured deposit means") which is separated by two inner doors from the storage area. The system contains an electronic scale separate from the intermediate deposit area. After the item is weighed, it is placed into the intermediate deposit area. Once the user closes an outer door to the intermediate area, the item is moved through the inner doors by a series of rollers into a storage area. While this reference suggests the re-weighing of the item to obtain an accurate weight, there is no mechanism to prevent the user from weighing a lighter object to obtain a low cost, and then placing into the intermediate deposit area the heavier item to be shipped.

U.S. Pat. Nos. 5,065,000 ("'000"), 4,923,022 ("'022"), and 5,025,386 ("'386") to Pusic are also directed to automated mail systems designed to process and store items, in particular letters. The systems described in these references contain internal weighing means and means for printing machine-readable information (i.e. bar codes) onto the item to be mailed. These references do not appear to teach or suggest a single, rotatable postage meter for generating and dispensing postage meter stamps or strips, nor do they teach a weighing scale capable of detecting minute vibrations that will not operate until such vibrations are absent. Moreover, the references do not teach a tracking bar code verification system to verify that a letter has a tracking bar code or a readable tracking bar code on it.

Thus, it is desirable to have an automatic self-service mail processing and shipping system that allows a user to weigh the mail item securely and accurately to prevent tampering, select from several different mail services (e.g. package or letter, First Class or International), calculate and pay the charge for shipping, obtain a receipt, securely store the item for subsequent pick-up by a commercial carrier, and that is fully capable of processing and storing packages as well as letters. It is also desireable to have a system that includes a single postage meter that is capable of printing a stamp directly onto a letter as well as dispense a postage meter strip for subsequent affixation onto a package or letter.

Certain carriers, such as the United Parcel Service and Federal Express, for example, require that tracking bar codes be placed onto the letters or packages. It is therefore also desirable to have a system that is capable of not only generating a tracking bar code for affixation onto a shipping item, but also have a means for verifying that the item contains the required tracking bar code or contains a tracking bar code that can be read or detected by a bar code scanner.

SUMMARY OF THE INVENTION

The present invention is directed to automated self-service mailing systems which will process and securely store packages and letters of various sizes for subsequent pick-up by a commercial carrier. In certain embodiments, the inventive system allows the user to select from a number of different type of mailing service transactions. Specifically, the inventive system includes:

(a) an outer housing;

(b) a computer;

(c) a communication means contained on the outside of said outer housing and coupled to said computer for communicating instructions to said user on how to operate said system to process an item for mailing;

(d) a user input receiving means positioned on the outside of said outer housing and coupled to said computer and said communicating means for receiving input from said user to operate said system;

(e) a payment means coupled to the computer for accepting and verifying payment for processing, storing, and shipping the item for mailing;

(f) a mail service selection data entry means coupled to said computer for receiving data from a user relating to a type of mail service desired by said user;

(g) a shipping designation data entry means coupled to said computer for receiving data from a user relating to the shipping designation of the item;

(h) a postage stamp printing and dispensing means coupled to said computer for printing a postage meter stamp directly onto said item wherein said item is a letter, and for printing and dispensing a postage meter stamp for subsequent affixation onto said item;

(i) a storage area contained within said outer housing for storing processed items for subsequent pick-up;

(j) a secured item acceptance area contained within said outer housing and further comprising an outer door positioned on said front side of said outer housing and coupled to said computer, a platform for holding said item, an inner back door movably attached to said platform, a weighing means mounted below said platform, and a depositing means for depositing said item into said storage area; and (k) a determining means including said computer for determining the required postage for shipping said item, said determining means being coupled to said shipping designation data entry means, said mailing service selection data entry means, and said weighing means.

In certain embodiments, the inventive system is designed to process and store letters separately from packages, and specifically include:

(a) an outer housing;

(b) a computer;

(c) a communication means contained on the outside of said outer housing and coupled to said computer for communicating instructions to said user on how to operate said system to process a letter for mailing;

(d) a user input receiving means positioned on the outside of said outer housing and coupled to said computer and said communicating means for receiving input from said user to operate said system to process said letter for mailing;

(e) a payment means coupled to the computer for accepting and verifying payment for processing, storing, and shipping the item for mailing;

(f) a mail service selection data entry means coupled to said computer for receiving data from a user relating to a type of mail service desired by said user;

(g) a shipping designation data entry means coupled to said computer for receiving data from a user relating to the shipping designation of the letter;

(h) a postage printing means contained within said outer housing and coupled to said computer for printing a postage meter stamp directly onto said letter;

(i) a transport means, preferably an automatic feed mechanism, contained within said outer housing and coupled to said computer for transporting a letter to said postage printing means;

(j) a weighing means contained within said automatic transport means and coupled to said computer for weighing a letter prior to transport to said postage printing means;

(k) a determining means including said computer for determining the required postage for shipping said letter, said determining means being coupled to said shipping designation data entry means, said mailing service selection data entry means, and said weighing means; and (l) a storage means for storing said letter after processing.

In the most preferred embodiments of the present invention, the inventive system comprises a area for processing and storing letters separate from another area for processing and storing packages. Preferably in these embodiments, the system includes a rotatable postage meter which is capable of printing a postage meter stamp directly onto a letter and of printing and dispensing a postage meter strip directly to the user through the outer housing for affixation onto a letter or package. Preferably, the inventive system comprises a communication means coupling the computer to the postage meter to activate an automatic meter imprint date change mechanism.

The inventive system also has a novel weighing means for both packages and letters which can detect minute vibrations, such as those caused by a human hand, and thus will not weigh the device until such vibrations are no longer detected.

In other embodiments, the present invention comprises a tracking bar code generation device and a tracking bar code verification system for verifying that a tracking bar code is present on the item to be shipped.

The present invention is also directed to a two-way communication system, in particular a communication means coupled to the inventive mail processing and storing system's computer, for communicating between the inventive system and an external computer located at a remote station or location. Preferably, the two-way communication system operates to provide the following functions:

(1) Credit authorization and charge reporting;

(2) Transaction and tracking information transfer;

(3) Error reporting and machine-full notification to a remote monitoring station;

(4) Automatic money transfer to the postage meter; and (5) Electronic mail and EDI (electronic data interchange) facilities for users.

BRIEF DESCRIPTION OF THE FIGURES

The objects, advantages, and features of the invention will become more apparent by reference to the drawings which are appended hereto, wherein like numerals indicate like parts and wherein an illustrated embodiment of the invention is shown, in which:

FIG. 4b is a top view of the inventive system's rotatable postage meter at elevation +40.00" showing the rotatable postage meter in the retracted, home position for printing a postage meter stamp onto a letter.

FIG. 4c is a top view of the inventive system's rotatable postage meter at elevation +40.00" showing the rotatable postage meter in the forward position and ready for printing a postage meter stamp onto a letter.

FIG. 4e is a top view of the inventive system's rotatable postage meter at elevation +40.00" showing the rotatable postage meter is the forward position and ready for printing and dispensing a postage meter strip.

FIG. 7 is a layout of the electronic hardware at the upper computer tray.

FIGS. 8a–8c are electrical schematic diagrams.

FIGS. 11a–11b and 12a–12b are flow charts illustrating the processing of a regular first class letter.

DETAILED DESCRIPTION OF THE PREFERRED EMBODIMENTS

The present invention is related to automated self-service package and letter mailing systems which will process and securely store letters and packages of various sizes for subsequent pick-up by a carrier, such as the United States Postal Service (U.S.P.S.), United Parcel Service (U.P.S.), and Federal Express, for example. The mailing system (100) shown in FIG. 1a has been specifically configured to the requirements and specifications of the U.S.P.S.; however, obvious modifications will be readily appreciated by those of skill in the art having the benefit of the teachings and suggestions of the present invention, in particular such modifications as are required by a particular shipping carrier, and thus are contemplated to be within the scope of the present invention.

Figure 1A:
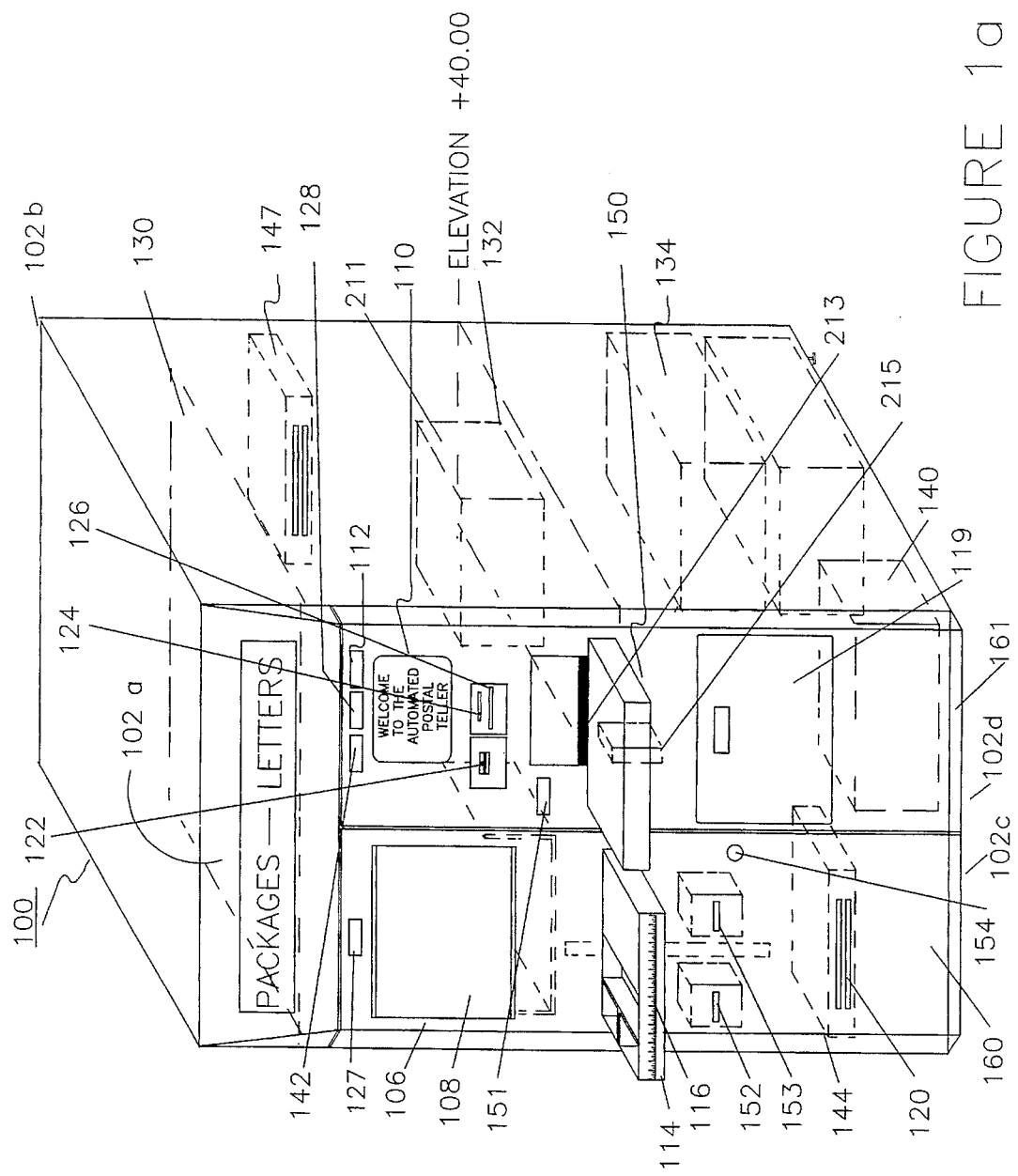
FIG. 1a is a perspective view of one embodiment of the inventive mail system for processing and storing items comprising a weighing means and storage area for weighing and storing items, especially packages, on one side of the system, and a separate weighing means and storage area on the other side of the system for weighing and storing letters.
Figure 1B:
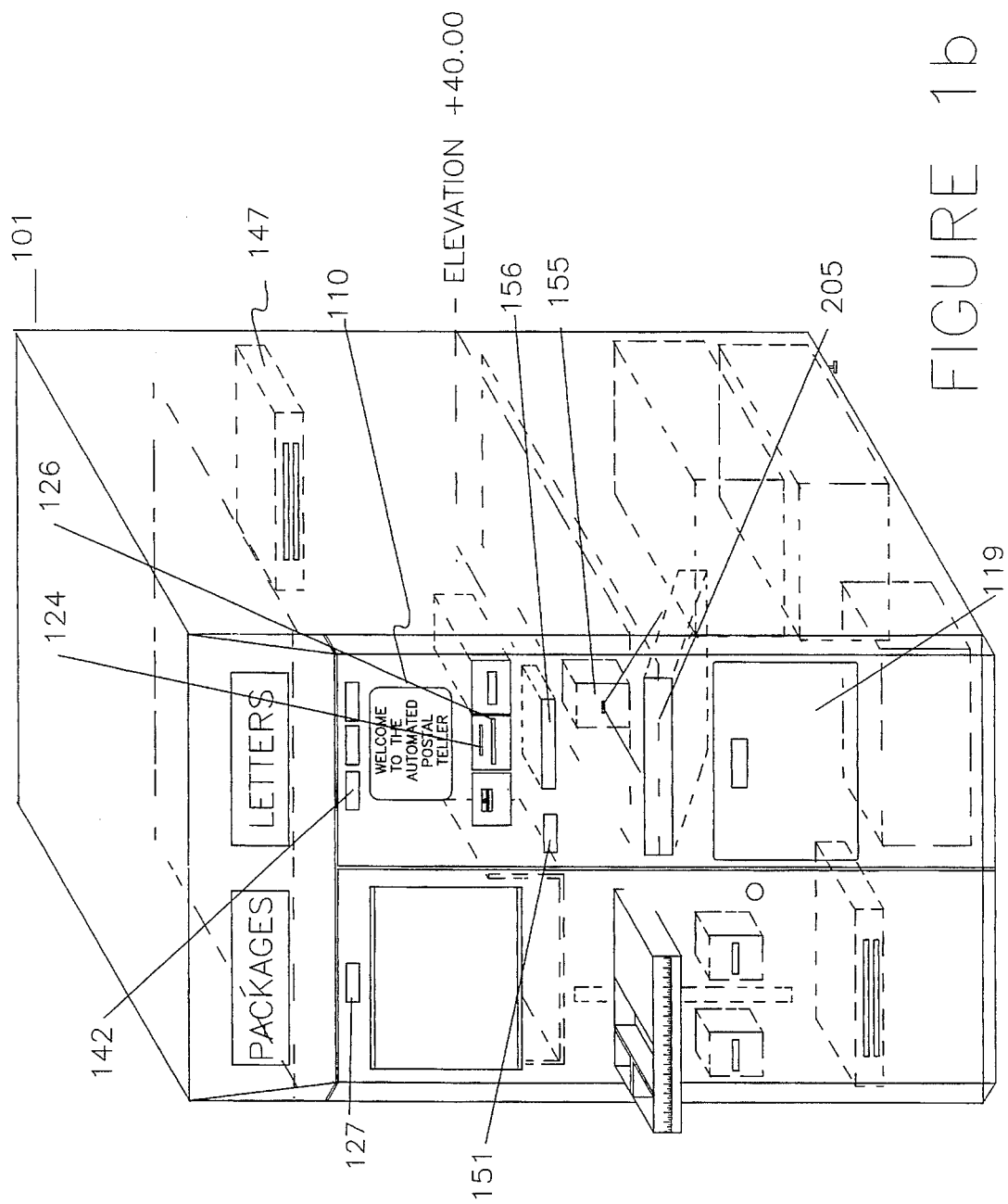
FIG. 1b is a perspective view of an alternate embodiment of the inventive mail system for processing and storing items comprising an internal tracking bar code verification system designed specifically for letters as well as an external tracking bar code verification system for mail items (i.e. letters and packages).

The inventive "mailing system" as described herein refers to the inventive automated self-service package and letter processing and storing system as depicted in the figures and more fully described and claimed below. There are two basic embodiments of the present invention, as illustrated in FIGS. 1a and 1b. FIG. 1a illustrates a preferred system (100) that is configured to meet the specifications of the United States Postal Service and comprises a means for weighing and depositing a letter and a separate means for weighing and depositing a package. As discussed below, the system (100) in FIG. 1a could be modified, for example, to include a single means for weighing and depositing both packages and letters. The system (100) in FIG. 1a may also include an external tracking bar code scanner (151). FIG. 1b illustrates an alternative system (101) comprising an internal tracking bar code verification system for letters. System (101) in FIG. 1b could also be modified, for example, to include a separate weighing means for a letter. Similarly, system (100) in FIG. 1a could be modified to include an internal tracking bar code verification system, as well. Consequently, the following description of the aspects of the inventive system applies to both inventive mailing systems (100, 101) as illustrated in FIGS. 1a and 1b.

The mailing system of the present invention is completely controlled via a computer (1308), as shown in FIG. 7, and a user-friendly, software program as illustrated in the flow charts (FIGS. 11a–11b, 12a–12b, 13a–13b, 14a–14b, 15, 16a–16b, 17a–17b, and 18) and data flow diagrams (FIGS. 19–23). Preferably, an I.B.M. compatible computer using an Intel 386 for the CPU, having a minimum 33 HZ clock speed, is employed. The inventive software is further defined by its source code, which is provided in the attached Appendix A.

Figure 19:
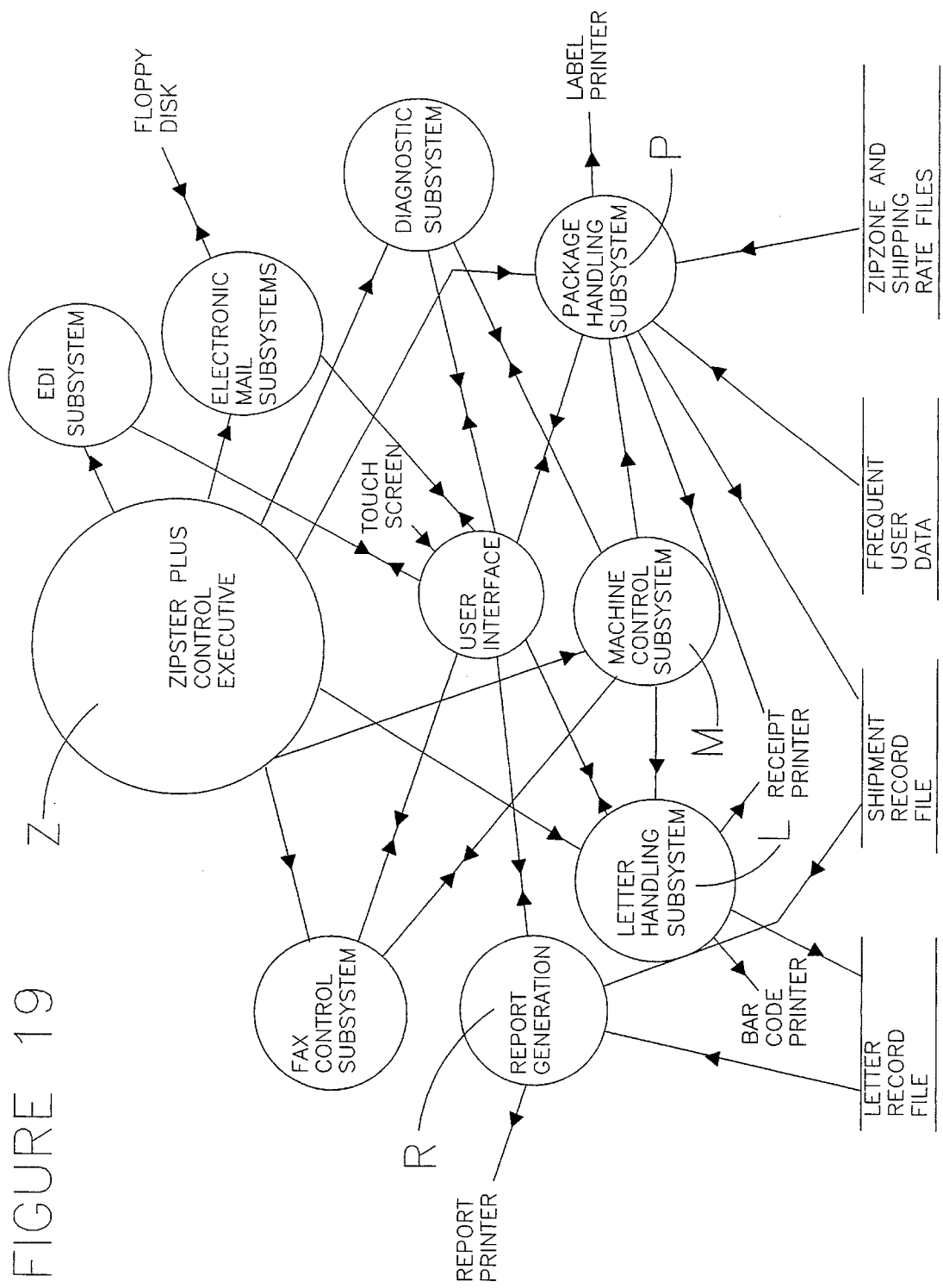
FIGS. 19–23 are data flow diagrams showing the interaction between the inventive system and the software as disclosed in the present invention.
Figure 20:
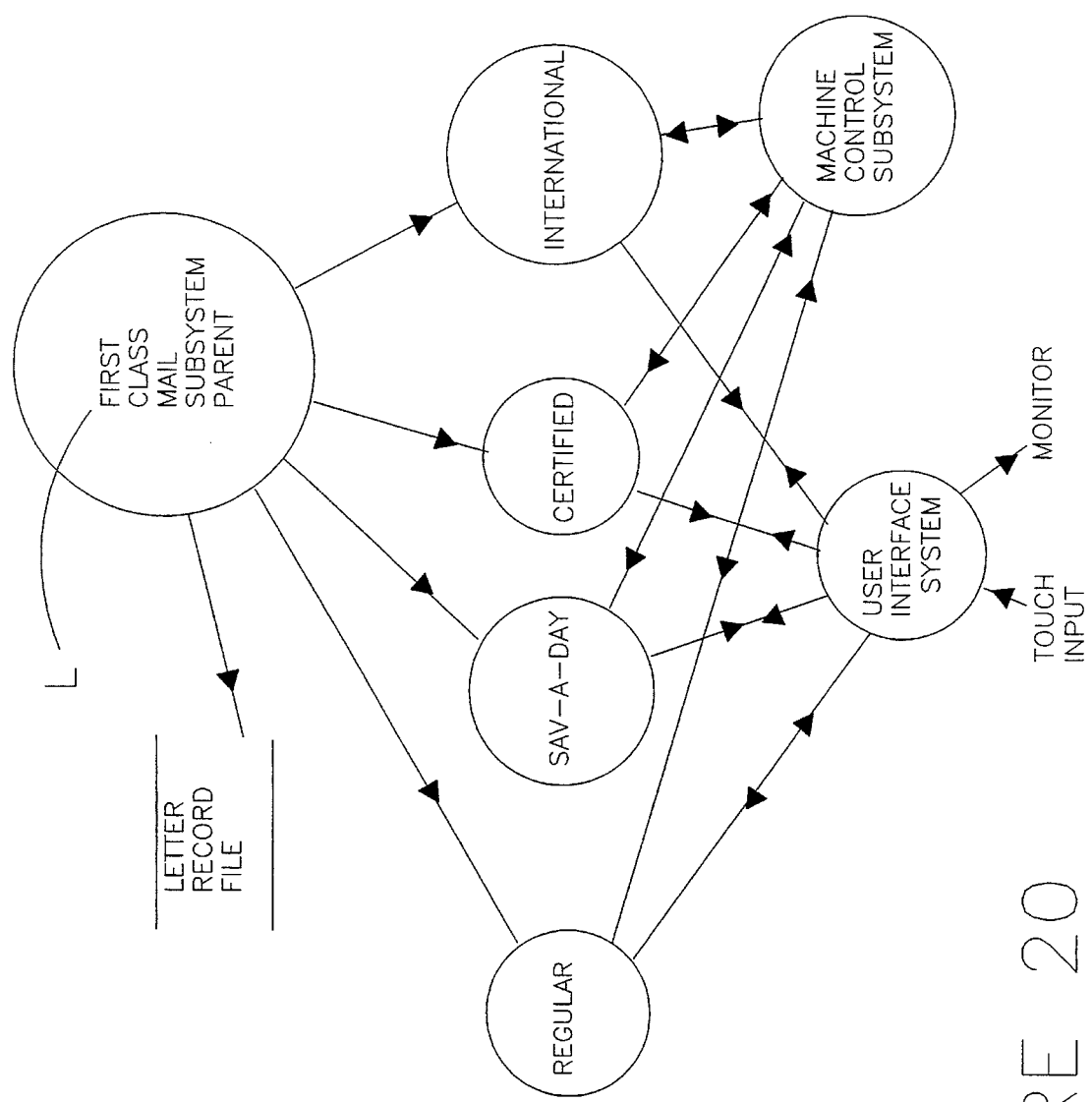
Figure 21:
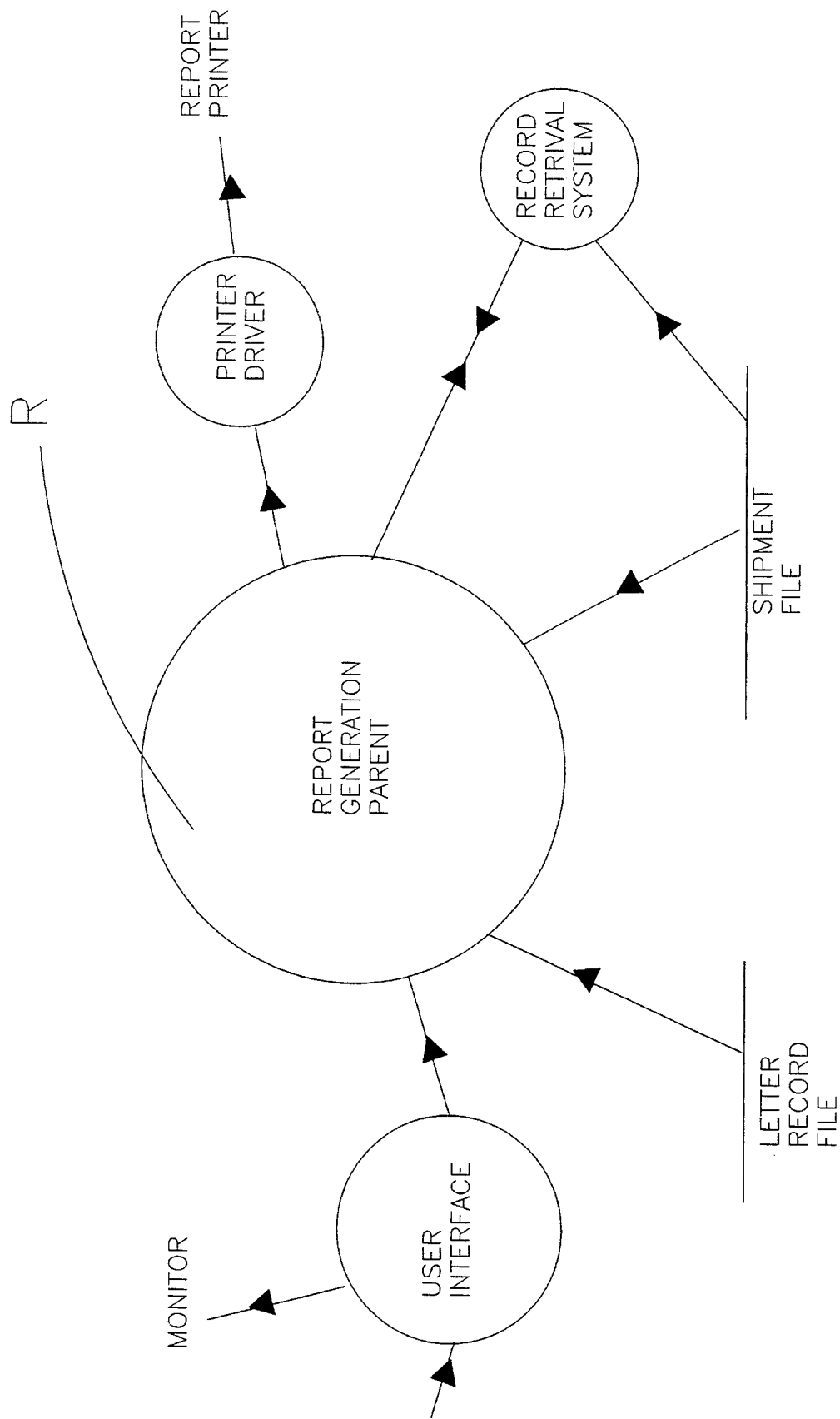
Figure 22:
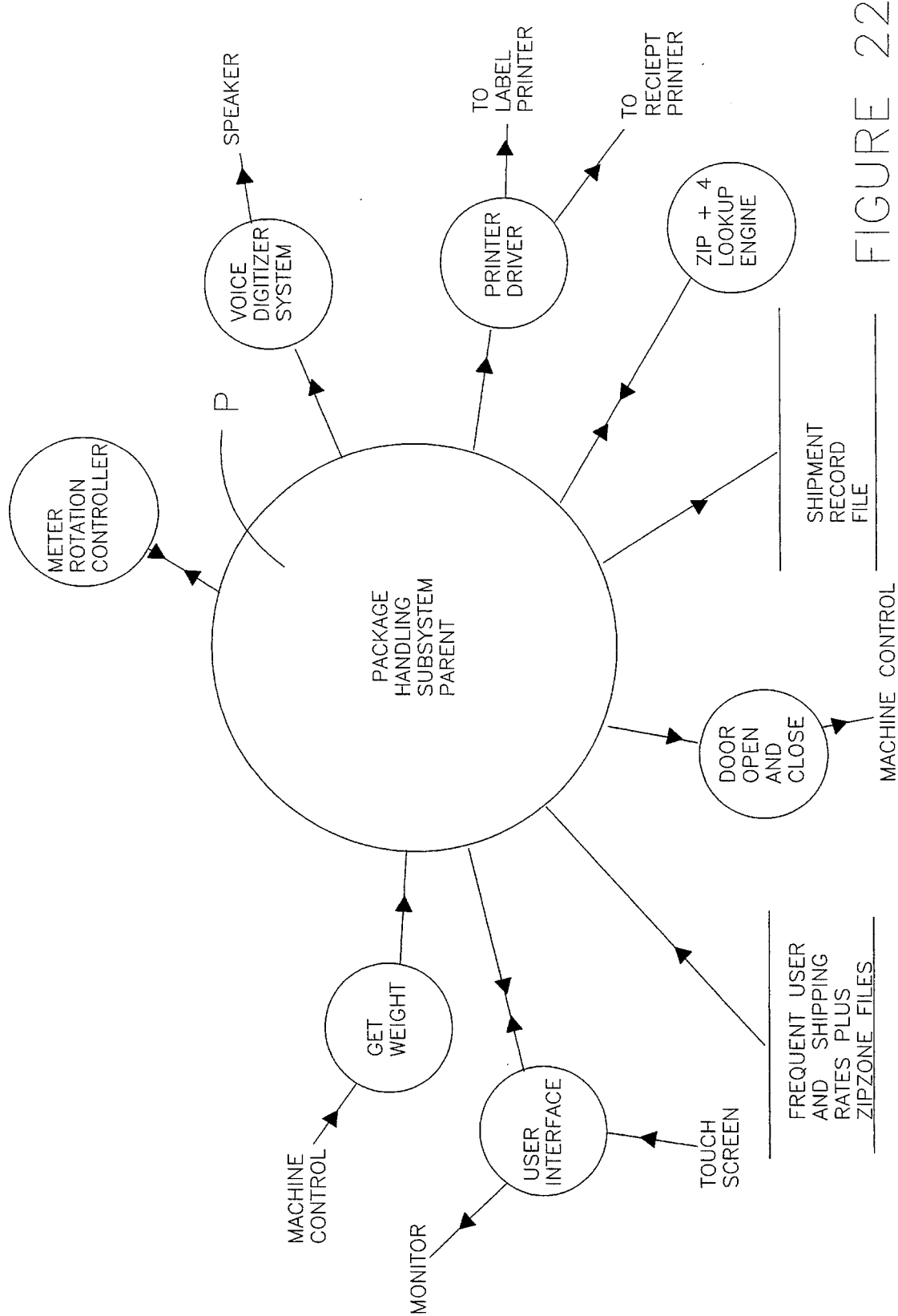
Figure 23:
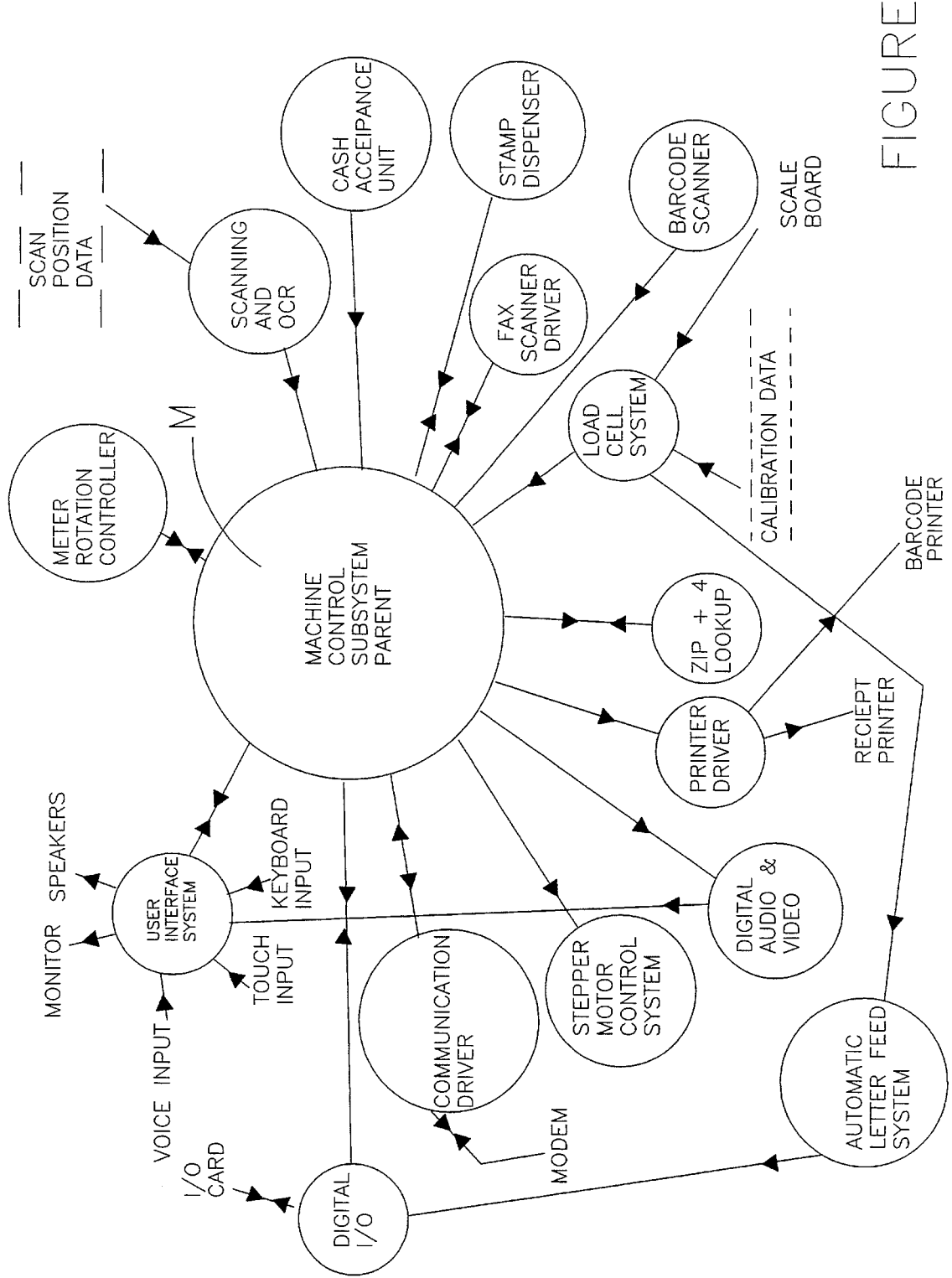

The data flow diagram illustrated in FIG. 19 depicts the overall flow of data among various software subsystems and the control executive (Z) present in the inventive mailing system. Specifically, FIGS. 20, 21, 22, and 23 further illustrate the flow of data to and from the letter handling subsystem (L), report generation subsystem (R), package handling system (P), and the machine control subsystem (M), respectively, within the system.

Figure 4:
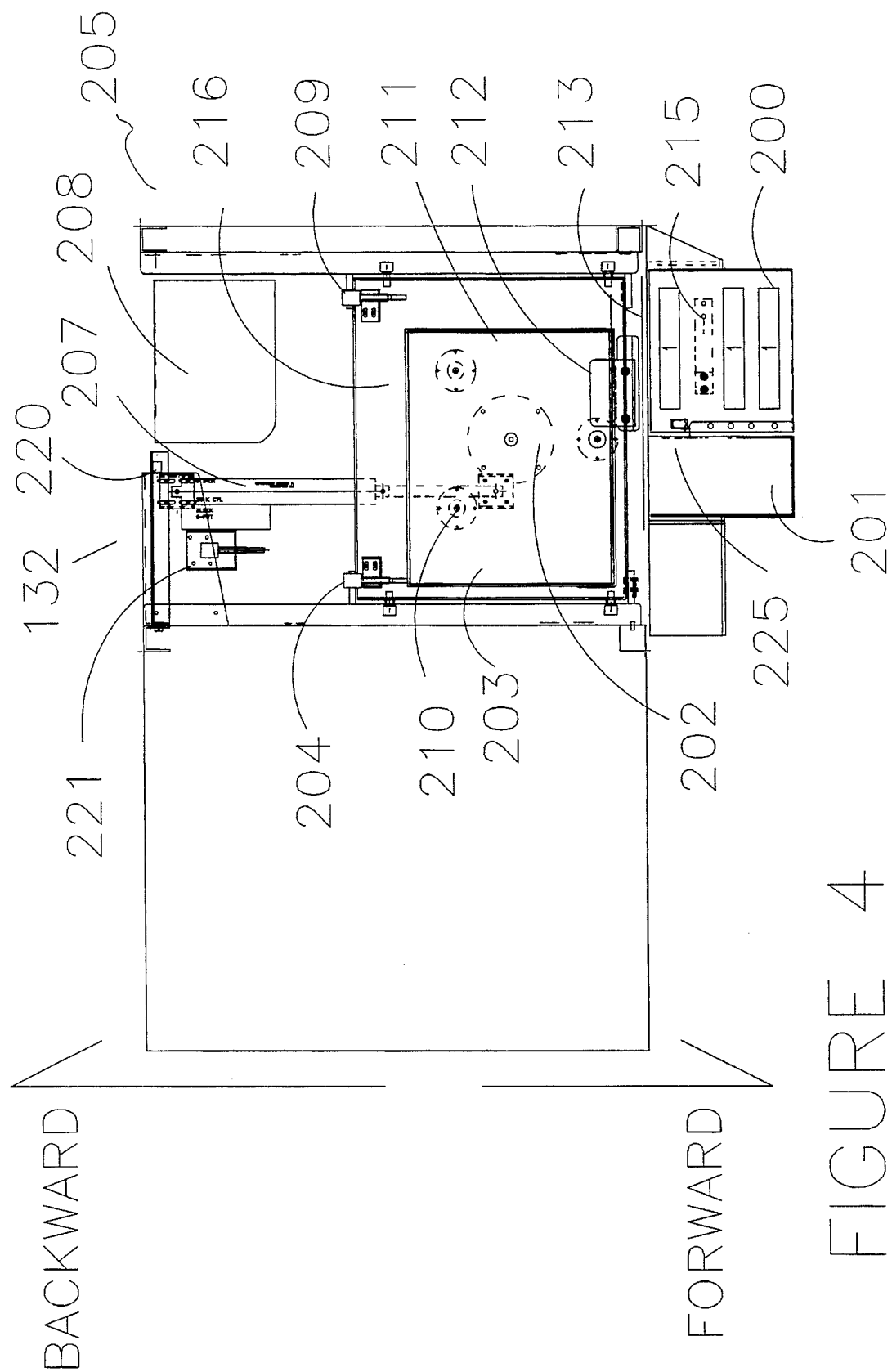
FIG. 4 is a top view of the inventive system's rotatable postage meter at elevation +40.00".

Referring now to FIGS. 1a and 1b, the mailing system (100, 101) comprises an outer housing having a front side (102a), a back side (102b), a left side (102c) and a right side (102d), wherein preferably the right side of the housing (102d), for example, is set up for processing and storing letters and the left side (102c), for example, is configured to process and store packages. Alternatively, the system (100, 101) could be configured to have only the features of the left side (102d) where both letters and packages could be processed and stored together, as discussed in more detail below. Some preferred basic features of the inventive mailing system (100) as shown in FIG. 1a include a display means, more preferably a touch-screen activated monitor (110), a magnetic user identification card reader (122), a transaction receipt printer (128) and a package label printer (142), an internal letter handling mechanism (132), a letter platform (150) comprising, as shown in FIG. 4, a postage meter strip plate (201) and a letter weighing scale comprising a weigh plate (200) and a load cell (215) contained within the platform, an outer letter security door (213), a secured item acceptance area (106) comprising an outer security door (108), and preferably a left-hand outer system door (160) and a right-hand outer system door (161) for allowing access into the system by authorized personnel, including a lock mechanism (154) for preventing access into the mailing system by unauthorized individuals.

Figure 10:
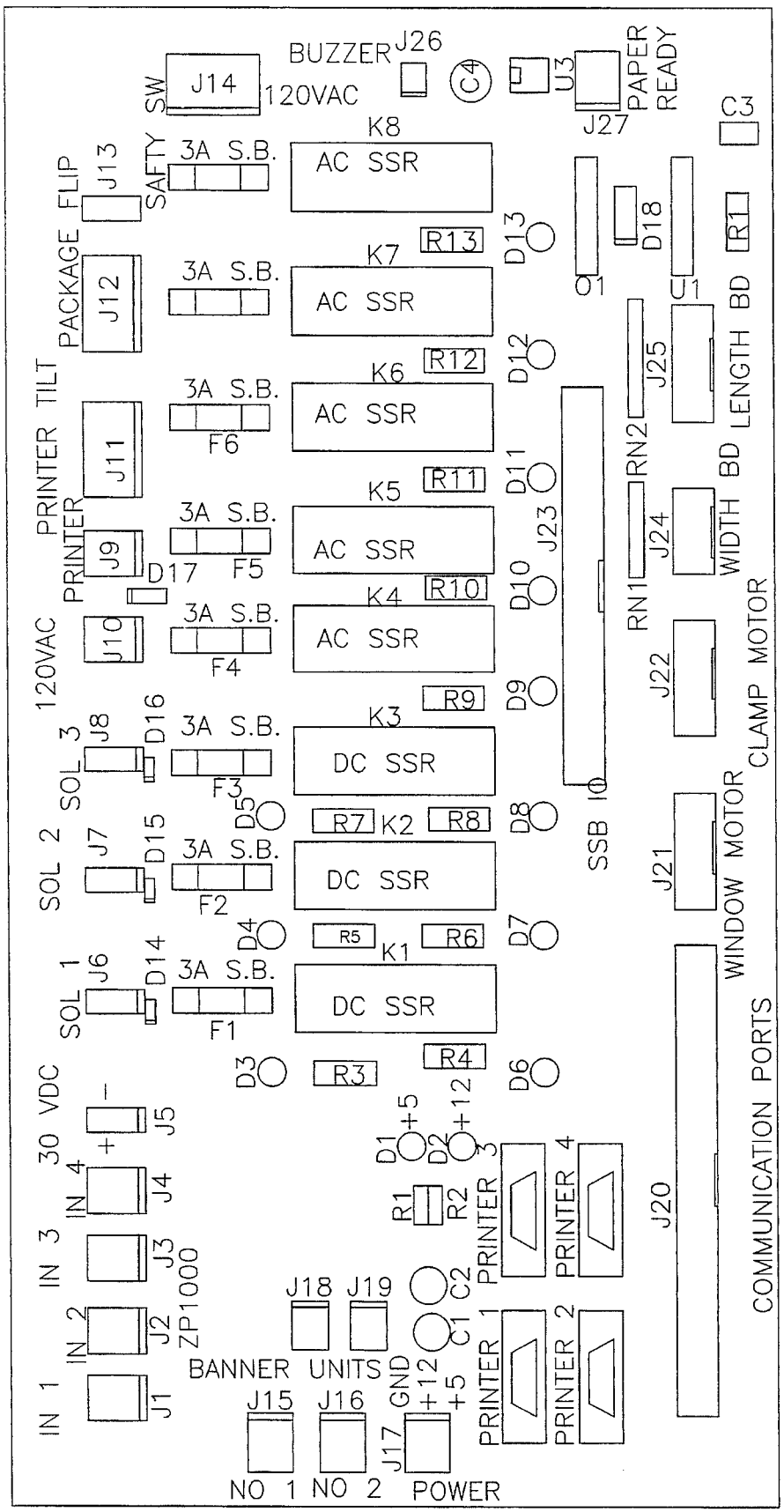
FIG. 10 is a layout of the distribution PC board.
Figure 11A:
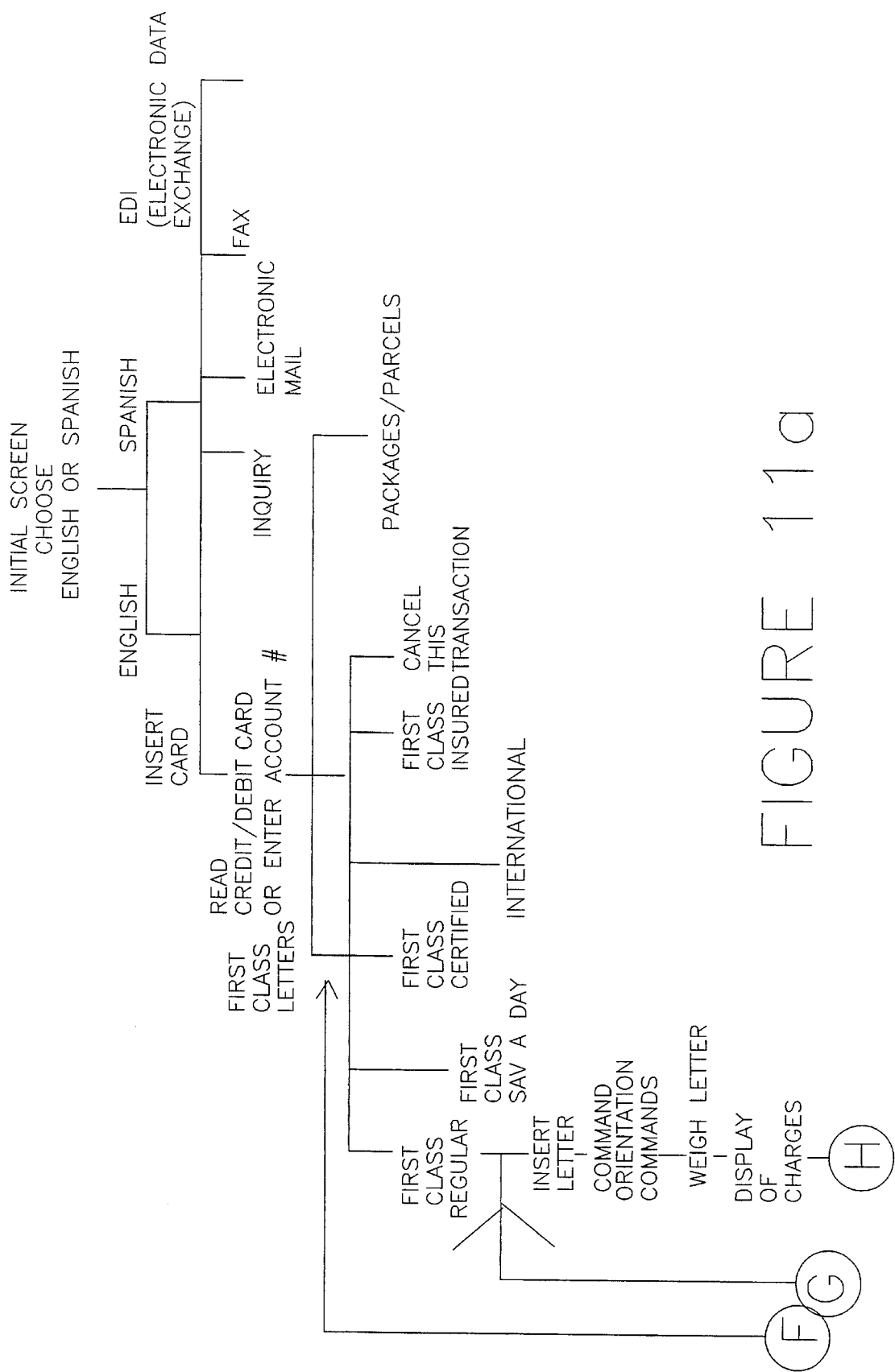
Figure 11B:
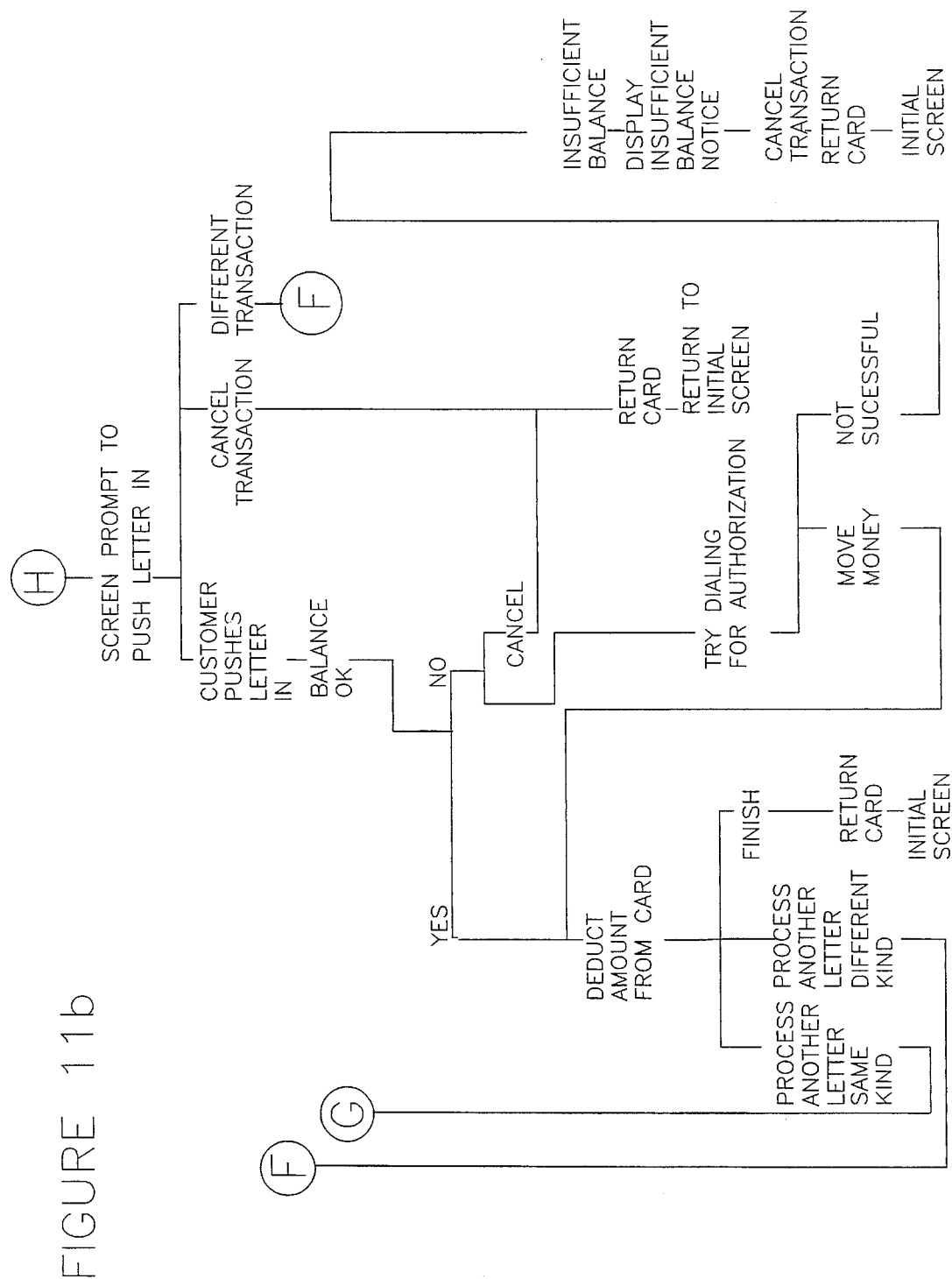
Figure 12A:
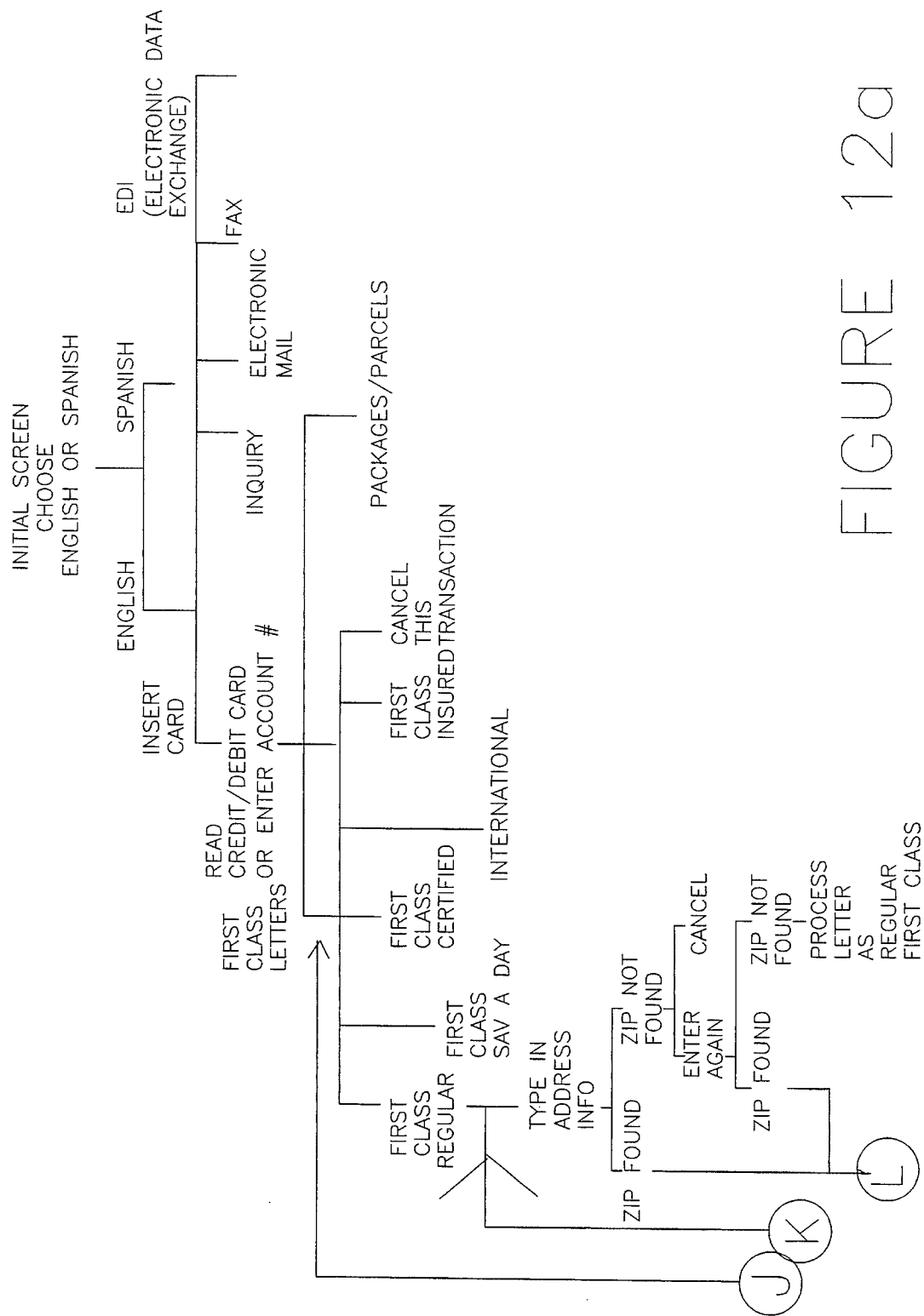
Figure 13A:
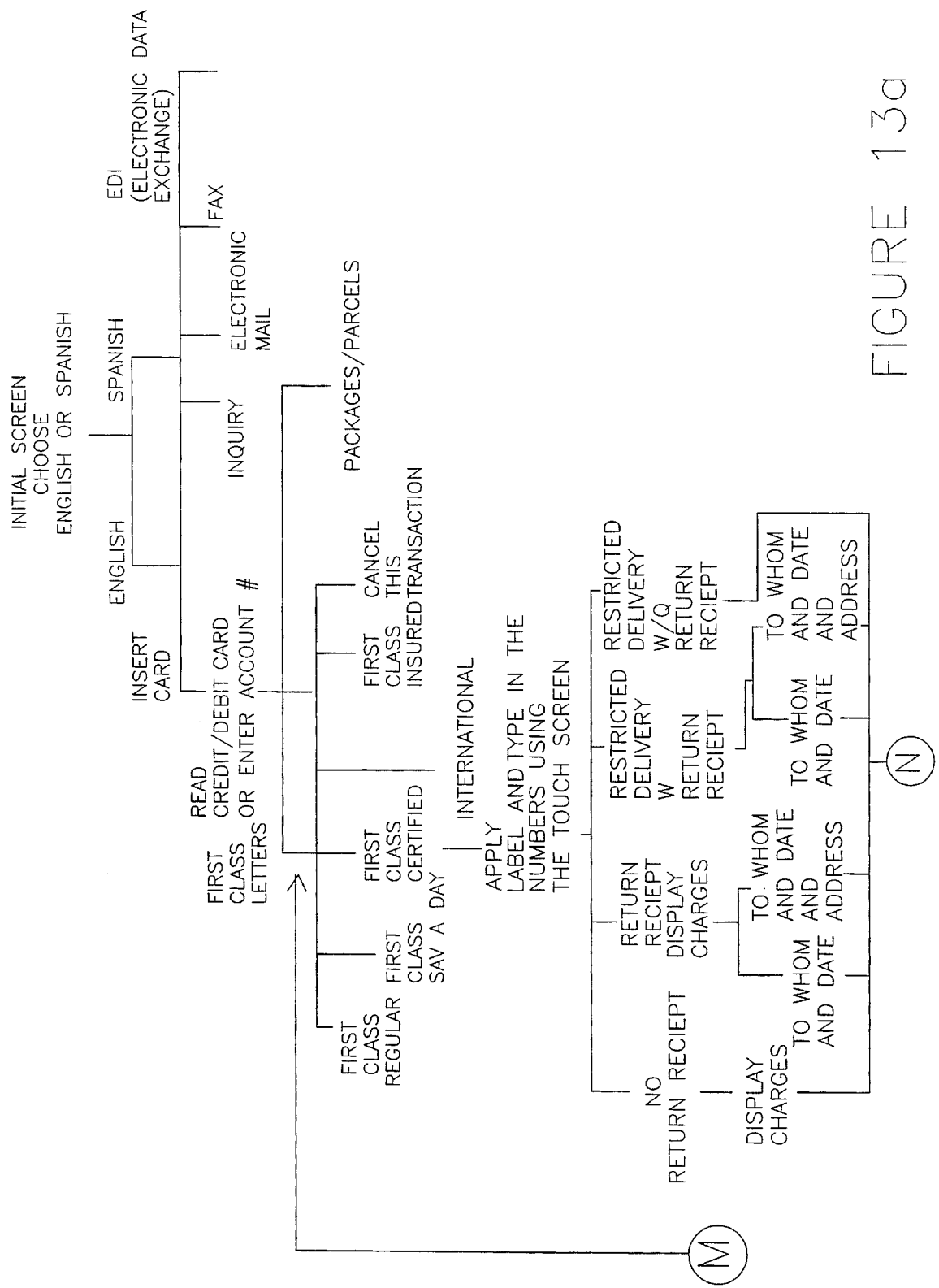
FIGS. 13a–13b are flow charts illustrating the processing of a first class certified letter.
Figure 13B:
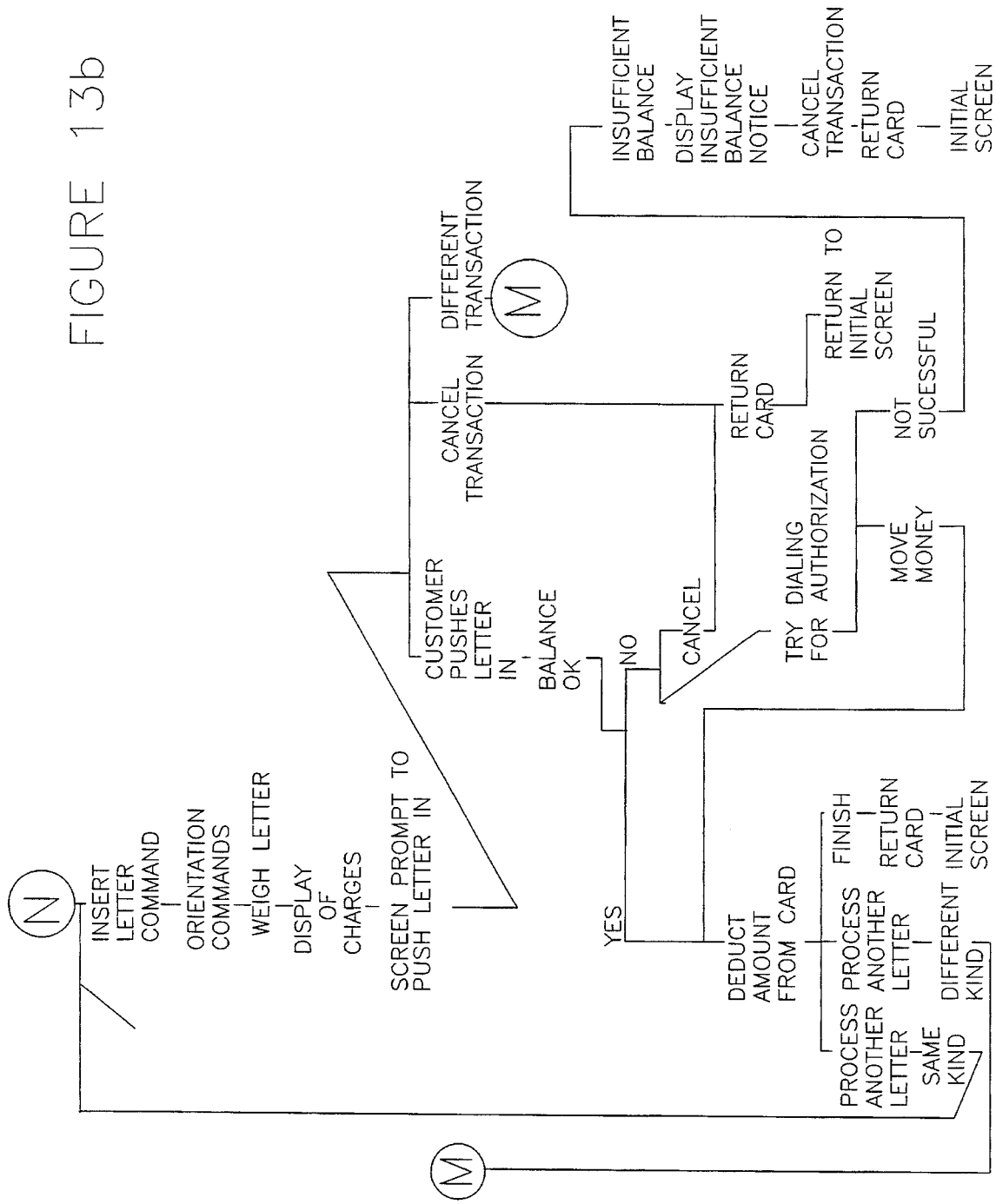
Figure 14A:
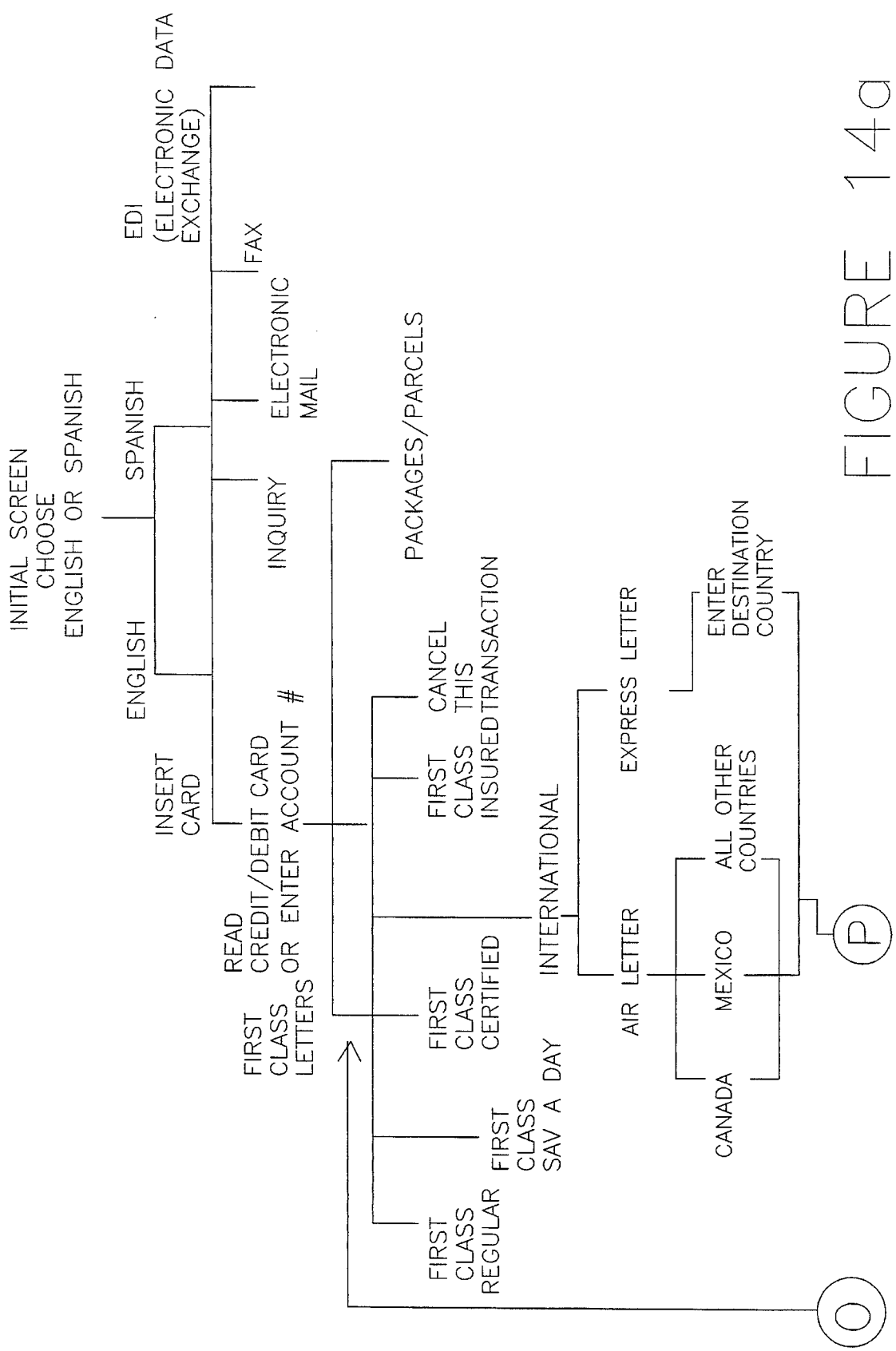
FIGS. 14a–14b are flow charts illustrating the processing of a first class international letter.
Figure 14B:
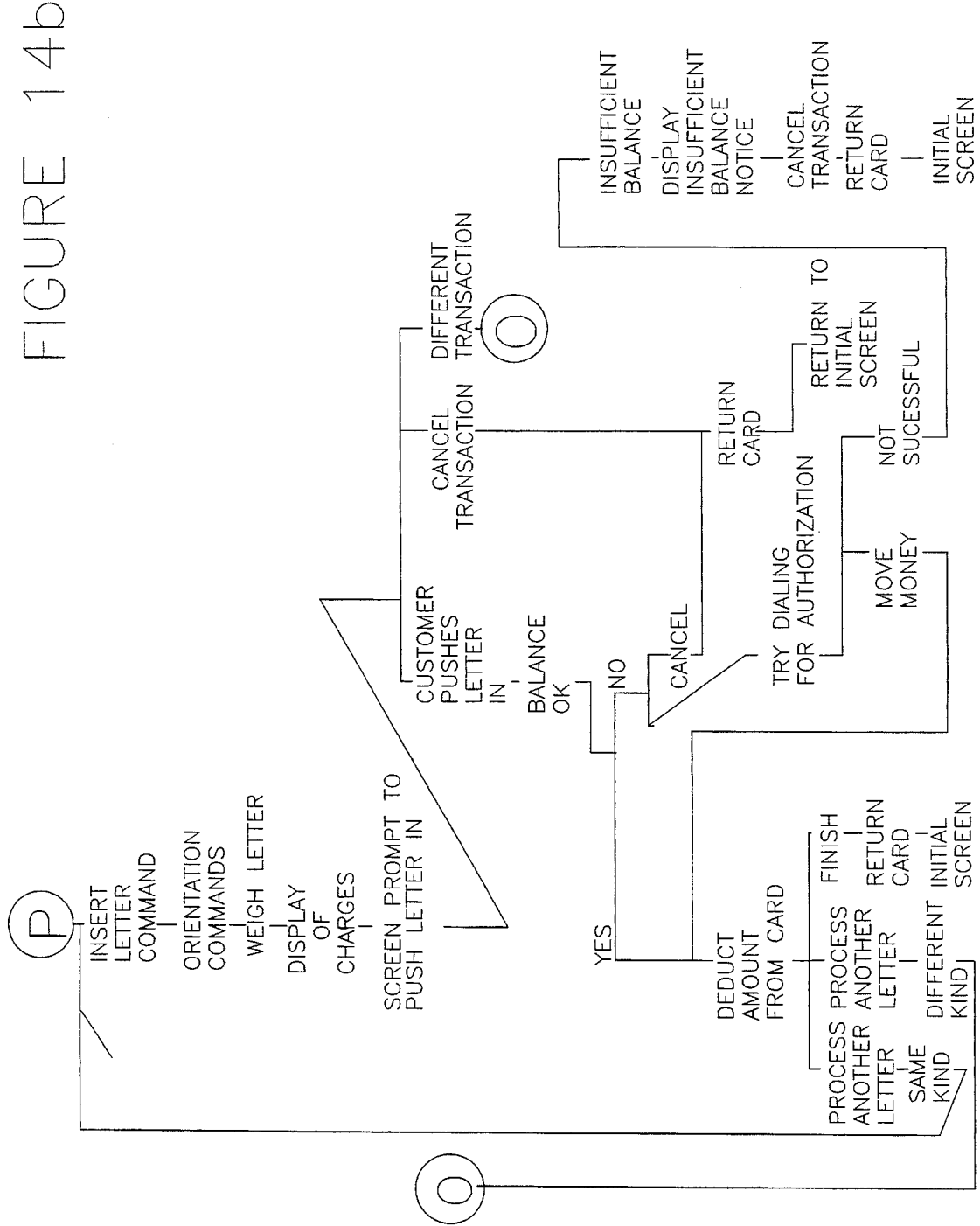
Figure 15:
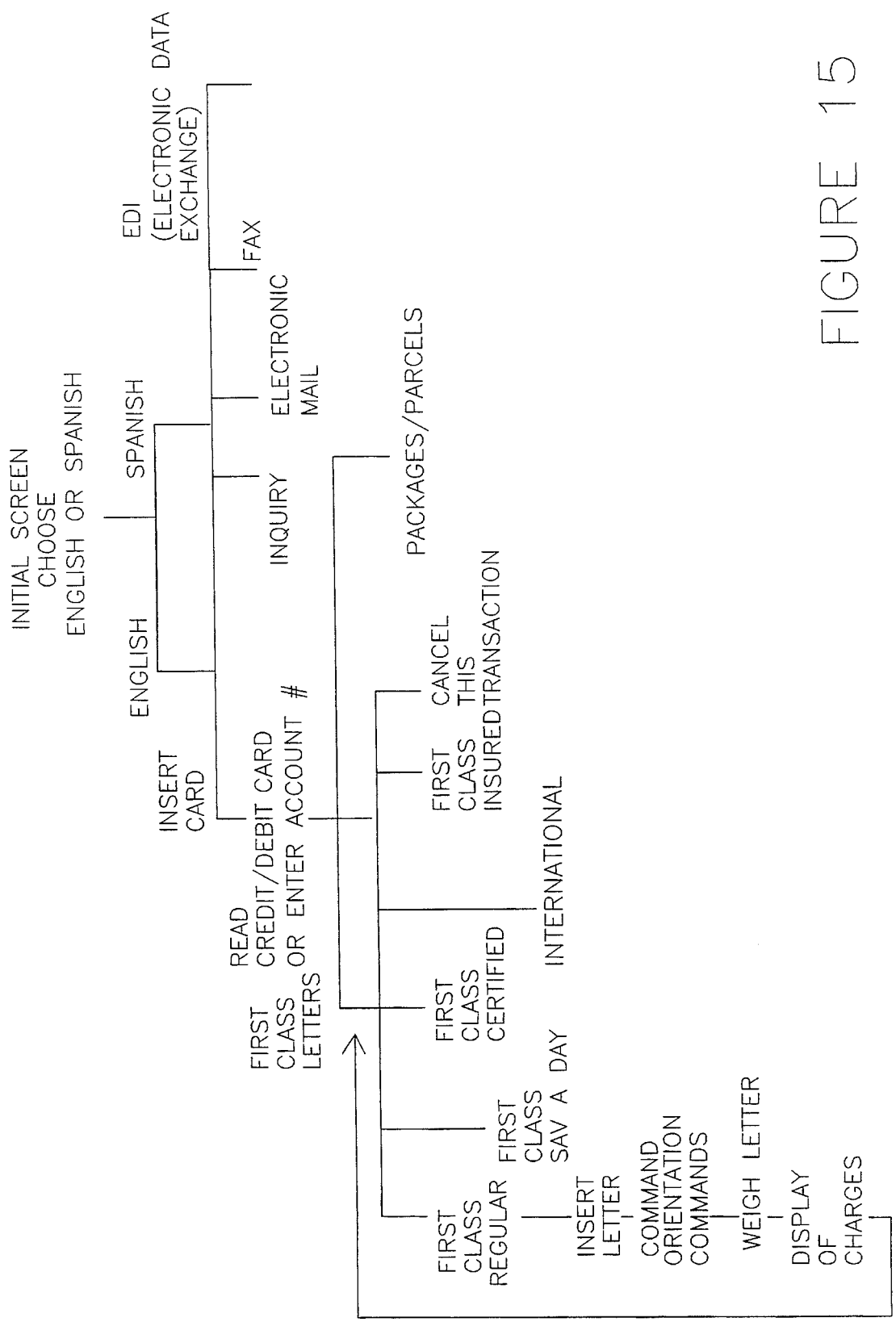
FIG. 15 is a flow chart illustrating the customer inquiry process for a letter.

The system also comprises an electronic sliding tray (130) containing the computer (1308) and other electronic features of the system, including for example, the computer power supply (1304), the serial multi-port expansion strip (1314), stepping motor power supplies (1216, 1218), and the PC distribution board (1302) as shown in FIG. 7. FIG. 10 illustrates the PC distribution board (1302) shown in FIG. 7. FIGS. 8a, 8b, 8c, and 9 illustrate the electrical schematics of the distribution board (1302), including the operation of different homing sensor devices (1242) (FIG. 8*a*) which inform the computer that the different devices in the machine are at their home position (e.g. postage meter rotation, discussed below); different pin connections (FIG. 8*b*) on the motor controller card/IO card that further input to the computer information from the banner units (148, 150); relays which operate the postage meter travel (1254), safety switch (1226), and package dump (1250) devices shown in FIG. 8*c*; and the RS232C controller card that controls various printers shown in FIG. 9. Other features of the inventive mailing system, both internal and external, as well as alternative embodiments of the present invention will be discussed in more detail below in the description of the operation of the inventive mailing system.

The inventive mailing system is designed to process and store letters and packages for subsequent shipment and operates by electronically interacting with a user via an inventive, user-friendly, software program. Referring again to FIGS. 1*a* and 1*b*, the mailing system (100,101) preferably includes a computer monitor (110) which displays a continuous video demonstration on how to operate the mailing system. The video demonstration is preferably stored on a CD Rom video unit (147) which is connected to the computer (1308) via an analog to digital video card. Other suitable video devices, such as a computer-controlled VHS video cassette system as well as other computer-controlled video systems may be employed.

To perform a mailing transaction, the user will interact with a communication means which is mounted on the outer housing. A more preferred communication means is a display means, most preferably a computer monitor (110) equipped with a touch-sensitive screen with which the user interacts to input requested information for processing a mail item. The screen may be a conventional touch-screen activated by infraray, sonic waves, or resistance screen. While the operation of the present inventive mailing system will be described with reference to the touch-screen activated computer monitor (110), which is the most preferred type, other types of communication means are contemplated within the scope of the present invention, and thus may be employed. For example, a conventional computer monitor may be employed that is coupled with an alphanumeric key pad or keyboard. In this latter embodiment, the user inputs information into the mailing system via the key pad or keyboard. Alternatively, the communication means may be a voice-activated system, such as a digitized voice recognition system for receiving user input, such as that manufactured by Dragon Systems, for example, whereby the mailing system, via the software and computer (1308), operates in response to the user's spoken commands. In this third embodiment, the communication means may utilize a display means such as a computer monitor for providing instructional information visually to a user, or it may provide such information to a user by an audio means such as a digitized voice system, for example.

To initiate a mailing transaction, the user approaches the mailing system (100, 101) and touches the screen to cause the screen, or a digitized voice recognition system through microphone (112), and/or video instruction on touch-screen (110) to be activated which will in turn instruct the user to perform the next step in the operation. Following the flow diagrams illustrated in FIGS. 11*a*–11*b*, 12*a*–12*b*, 13*a*–13*b*, 14*a*–14*b*, 15, 16*a*–16*b*, 17*a*–17*b*, and 18, the user selects a language for conducting the transaction, such as English or Spanish, for example. The user is then requested to enter a means for payment, most preferably user identification information for the purpose of payment, preferably by swiping or inserting a user identification data entry means such as a magnetic credit/debit card, through or into a magnetic card reader (122). Alternatively, the user could be instructed to input a user identification code, such as a personal identification number (PIN) and/or an account number, for example, via the touch-screen or a key pad/keyboard mechanism, for example. It is contemplated that the inventive system could be modified by one of skill in the art, having the benefit of the invention's teachings and suggestions, to accept payment in the form of cash (i.e. coins and/or bills) after the total charge has been determined. Once the computer (1308) identifies the correct information from the credit/debit card, for example, it will transmit this information via a modem (1262) and telephone line (1264) (FIG. 6*c*) to an external credit/debit authorization center. Once the authorization is obtained, the software program will automatically activate the next screen which will request the user to make a selection between various services offered through the commercial carrier. The software flow diagrams illustrated in FIG. FIGS. 11*a*–11*b*, 12*a*–12*b*, 13*a*–13*b*, 14*a*–14*b*, 15, 16*a*–16*b*, 17*a*–17*b*, and 18 depict services offered by the U.S.P.S.; however, the computer system may be programmed with additional and/or different mailing services unique to other commercial carriers (e.g. Federal Express Two-Day and Overnight). The remaining descriptions of the operation of the inventive mailing system, including the figures contained herein, will be for a mailing system designed for shipping by the United States Postal Service (FIG. 1*a*, for example) or the United Parcel Service (FIG. 1*b*, for example).

Preferably, the inventive mailing system (100), such as that configured per U.S.P.S. specifications and requirements, will allow a user to process a letter for a particular type of first class delivery. The process for mailing packages is discussed later. Referring now to the figures, in particular FIGS. 1*a*, 4, 4*a*–4*e*, 6*a*–6*c* and 11*a*–11*b*, 12*a*–12*b*, 13*a*–13*b*, 14*a*–14*b*, 15, 16*a*–16*b*, 17*a*–17*b*, and 18, the user is requested to make a mail service selection. To process and mail a letter first class, for example, the user selects one of the First Class services (e.g. First Class Regular). The following figures illustrate the flow diagrams for processing a letter First Class: FIGS. 11*a*–11*b*, 12*a*–12*b*, 13*a*–13*b*, 14*a*–14*b*, 15, 16*a*–16*b*, 17*a*–17*b*, and 18 (Regular), FIGS. 12*a*–12*b* ("Sav A Day"), FIGS. 13*a*–13*b* (Certified), and FIGS. 14*a*–14*b* (International) and FIG. 15 (Customer Inquiry, First Class Letter)

Next, a postage meter (211) is orientated into the correct position for generating a postage meter stamp or strip. For letters, the postage meter (211) is designed to print the postage meter stamp directly onto the letter. For items such as packages or letters that are not fed through the postage meter, the postage meter is preferably capable of printing and dispensing a postage meter strip for subsequent affixation onto the item by the user. Preferably, a rotatable postage meter is used which will dispense the stamp in the form of a postage meter strip directly to the user through the outer housing. This postage meter rotation system (205) is completely controlled via the computer (1308) and digital I/O port B (See FIG. 6*a*). The computer (1308) will utilize a software control program which rotates the meter according to pre-determined conditions. If the postage meter (211) is in the home or retracted position (b) as shown in FIG. 4*b*, for example, the software program via the computer (1308) will cause the postage meter (211) to move forward toward the front side of the outer housing (position c) utilizing a horizontal linear actuator (207) and a translation table (216), as shown in FIG. 4c, for example. This movement will bring the postage meter (211) to a position for receiving a letter and for printing a postage meter stamp directly onto the letter.

Figure 4A:
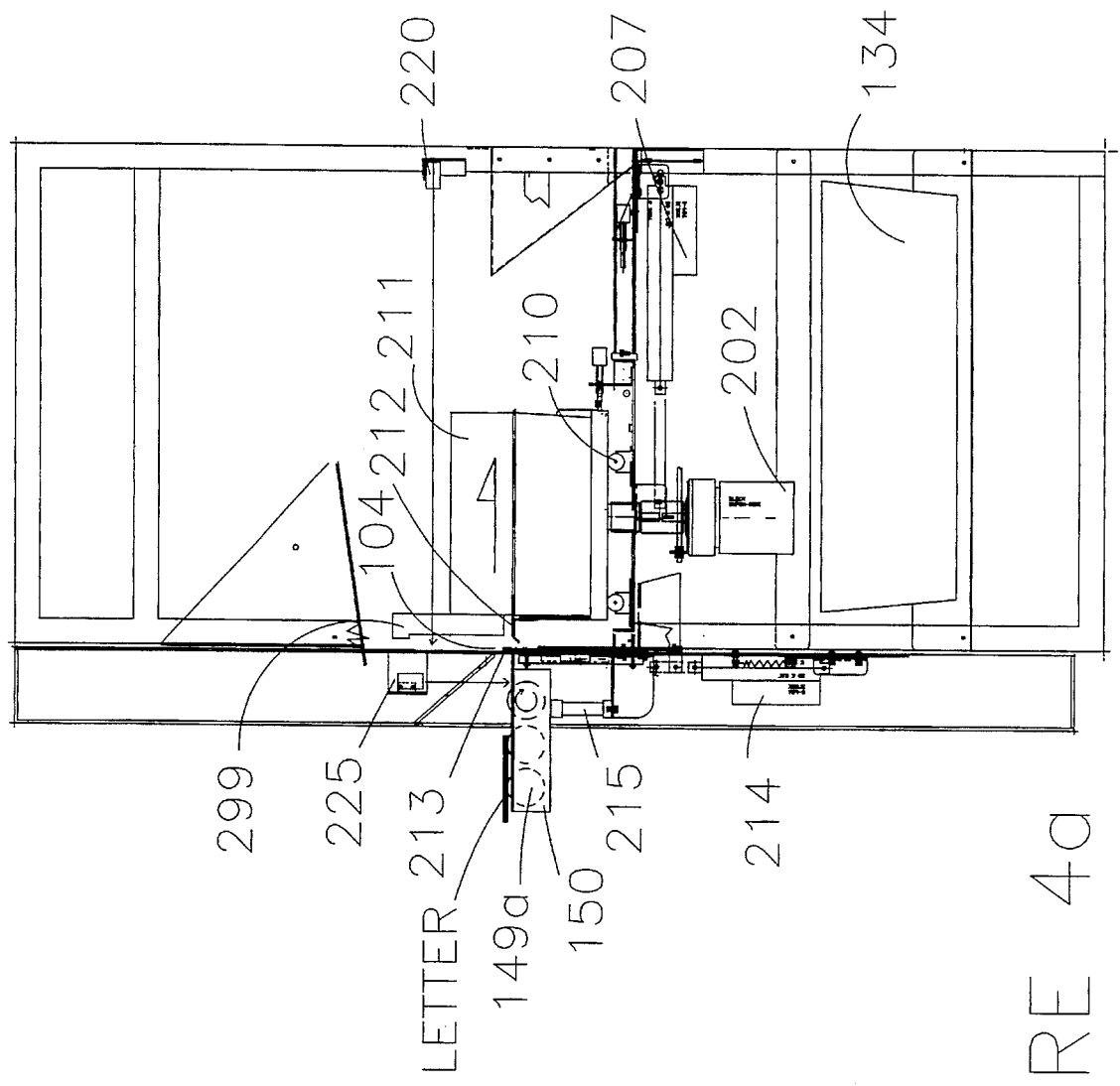
FIG. 4a is a side view of the letter handling mechanism comprising a postage meter and automatic feed means.
Figure 4D:
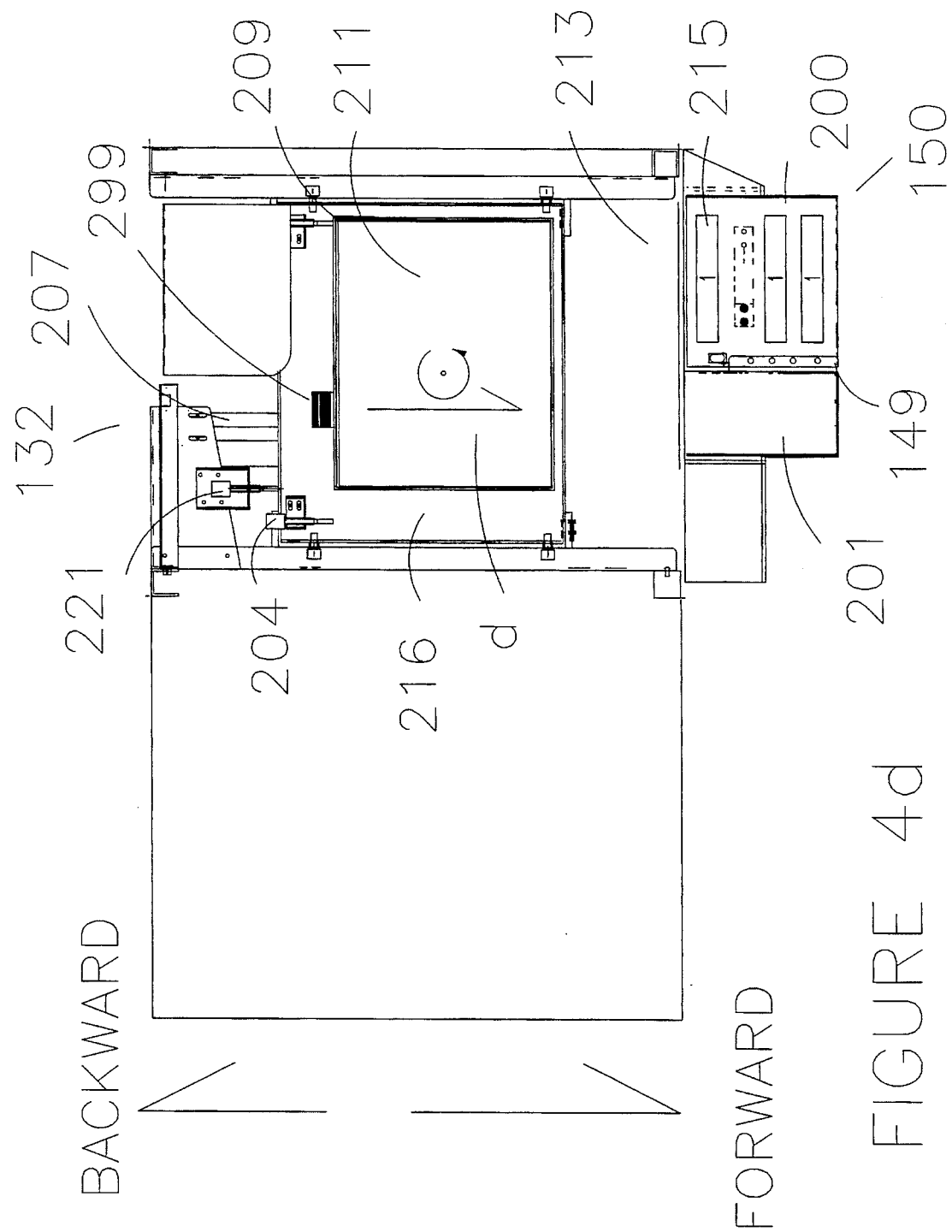
FIG. 4d is a top view of the inventive system's rotatable postage meter at elevation +40.00" showing the rotatable postage meter rotated and in the retracted, home position for printing and dispensing a postage meter strip.
Figure 6A:
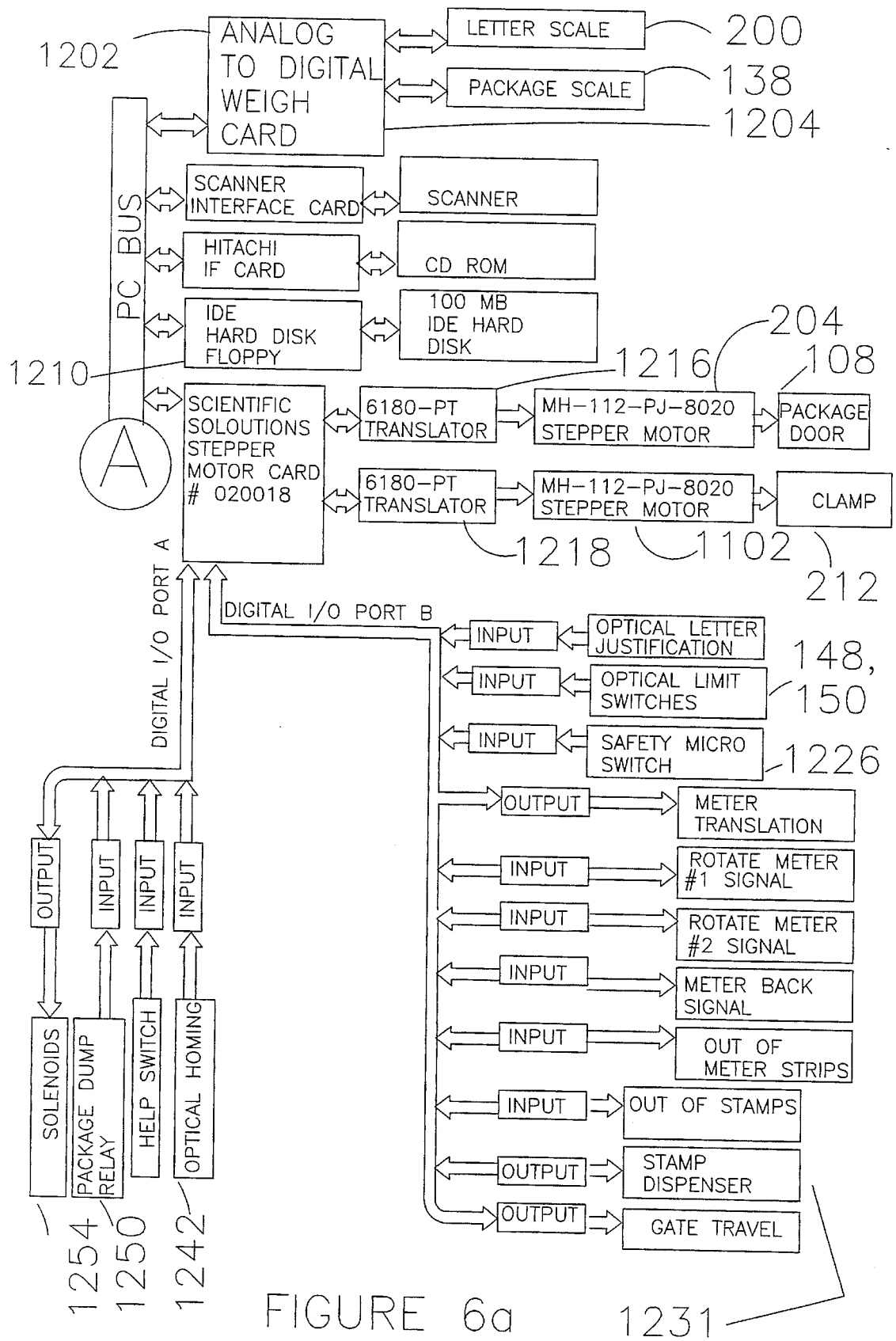
FIGS. 6a–6c illustrates the electronic circuitry for the inventive system, in particular the computer interaction with the various peripherals, input/output cards, control cards, and I/F cards.
Figure 6B:
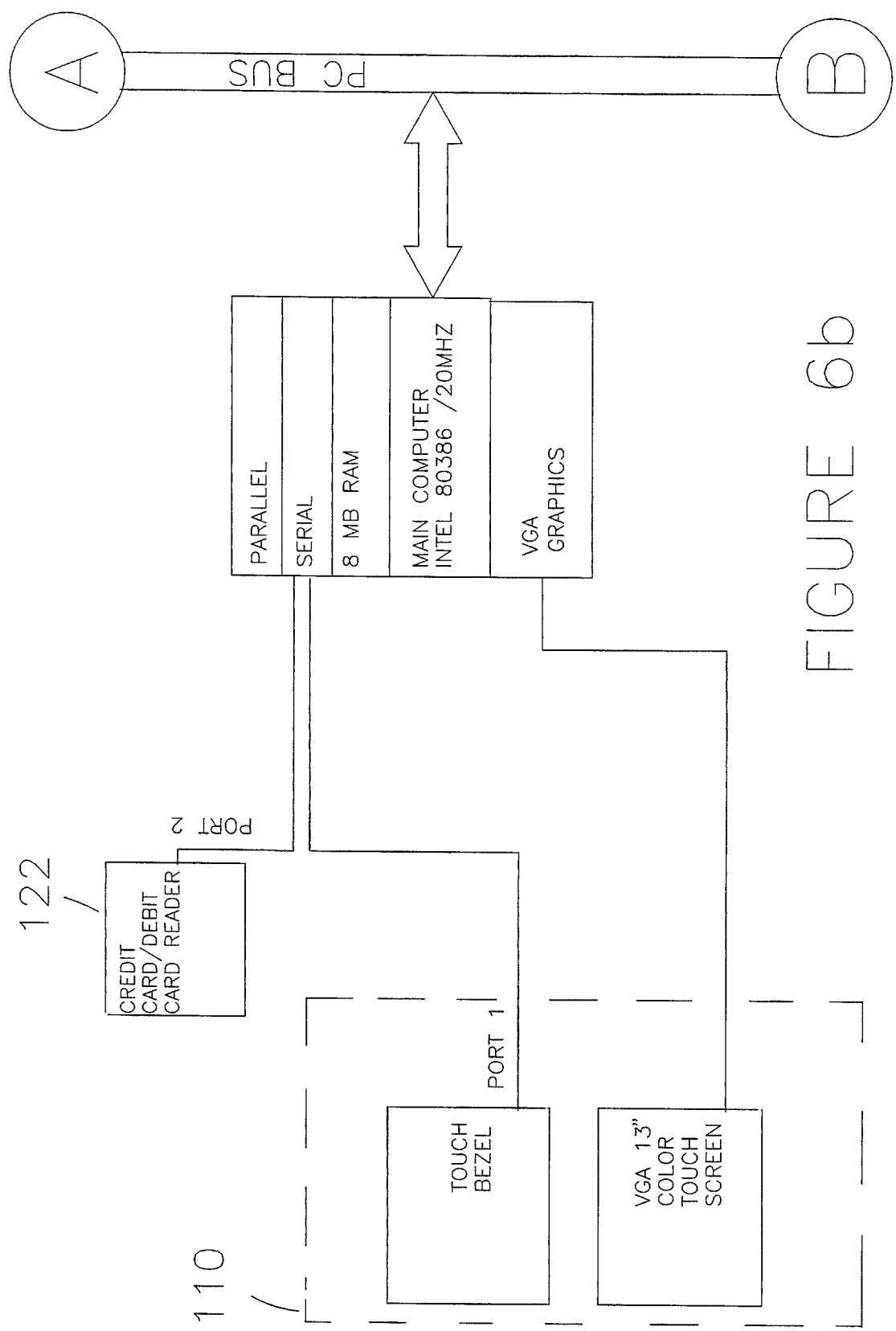
Figure 6C:
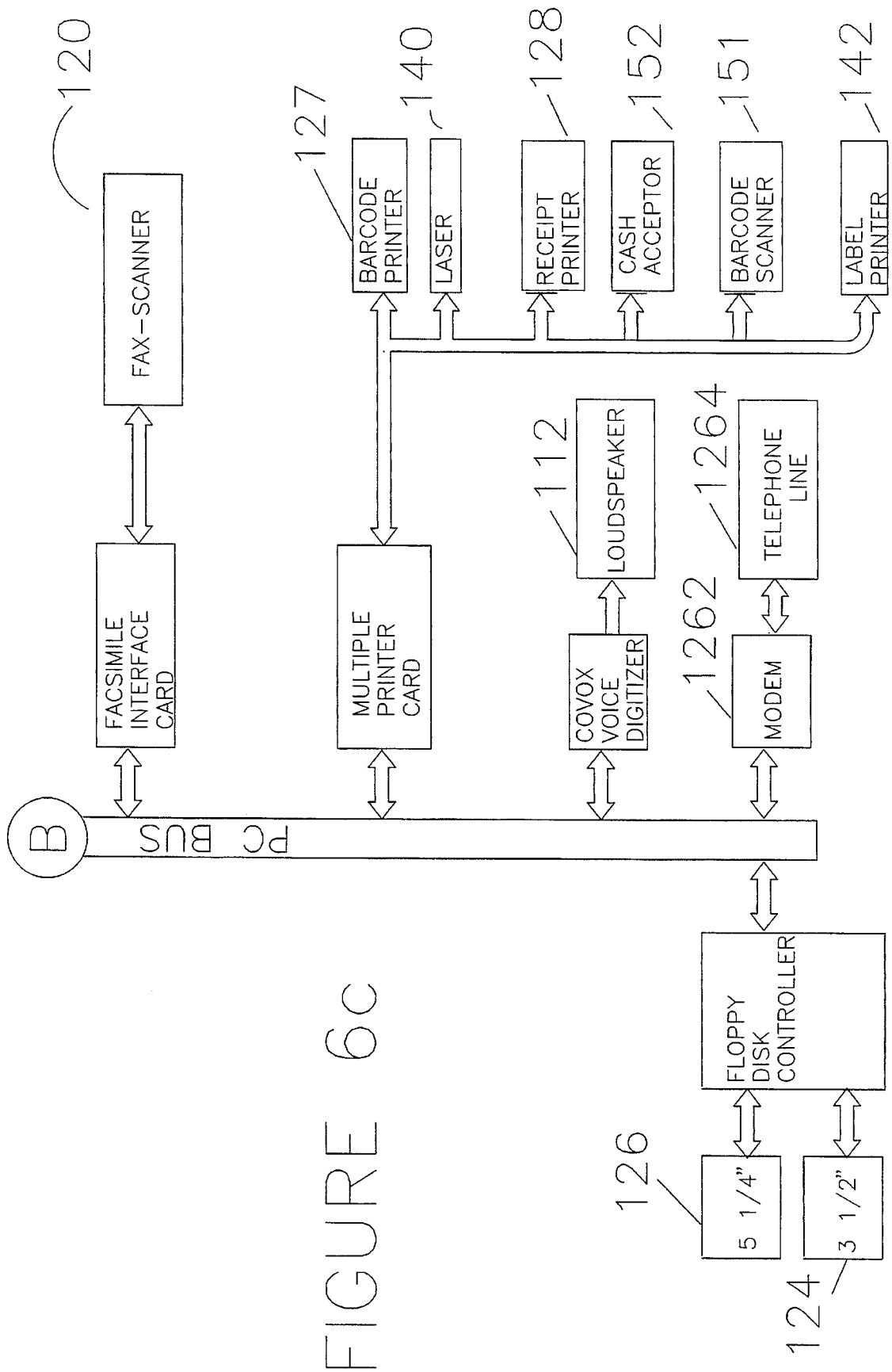
Figure 8B:
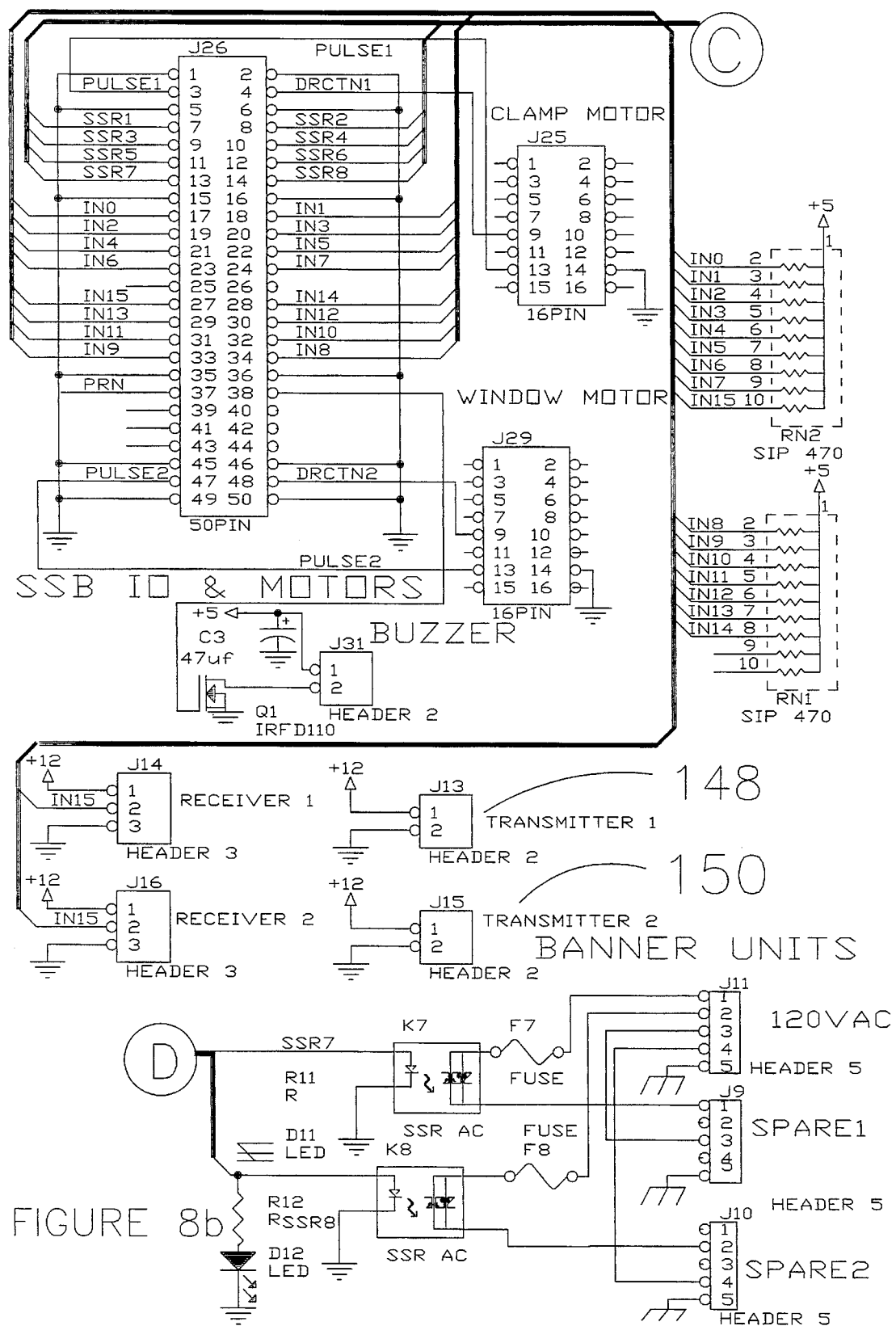
Figure 8C:
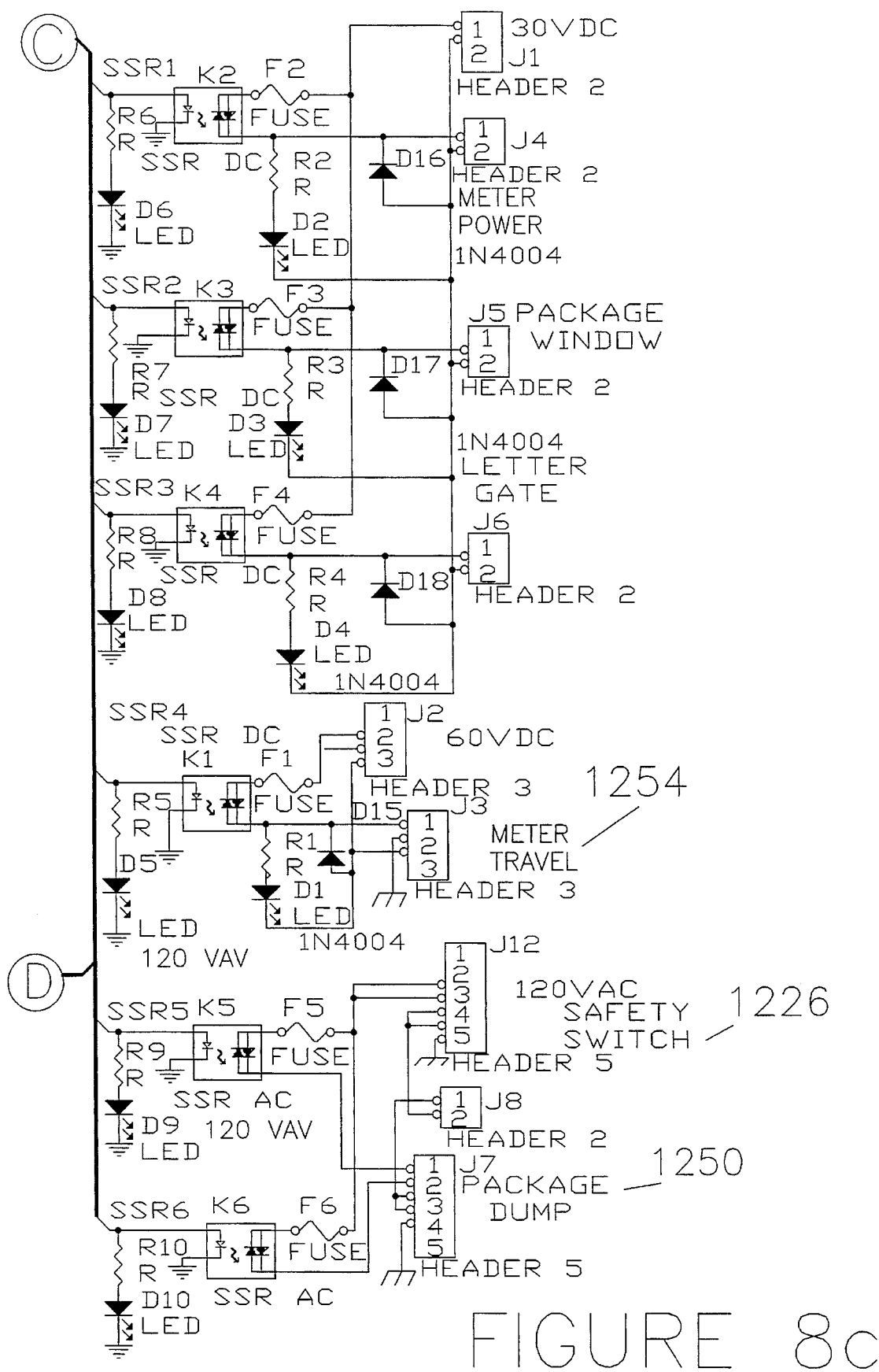
Figure 9:
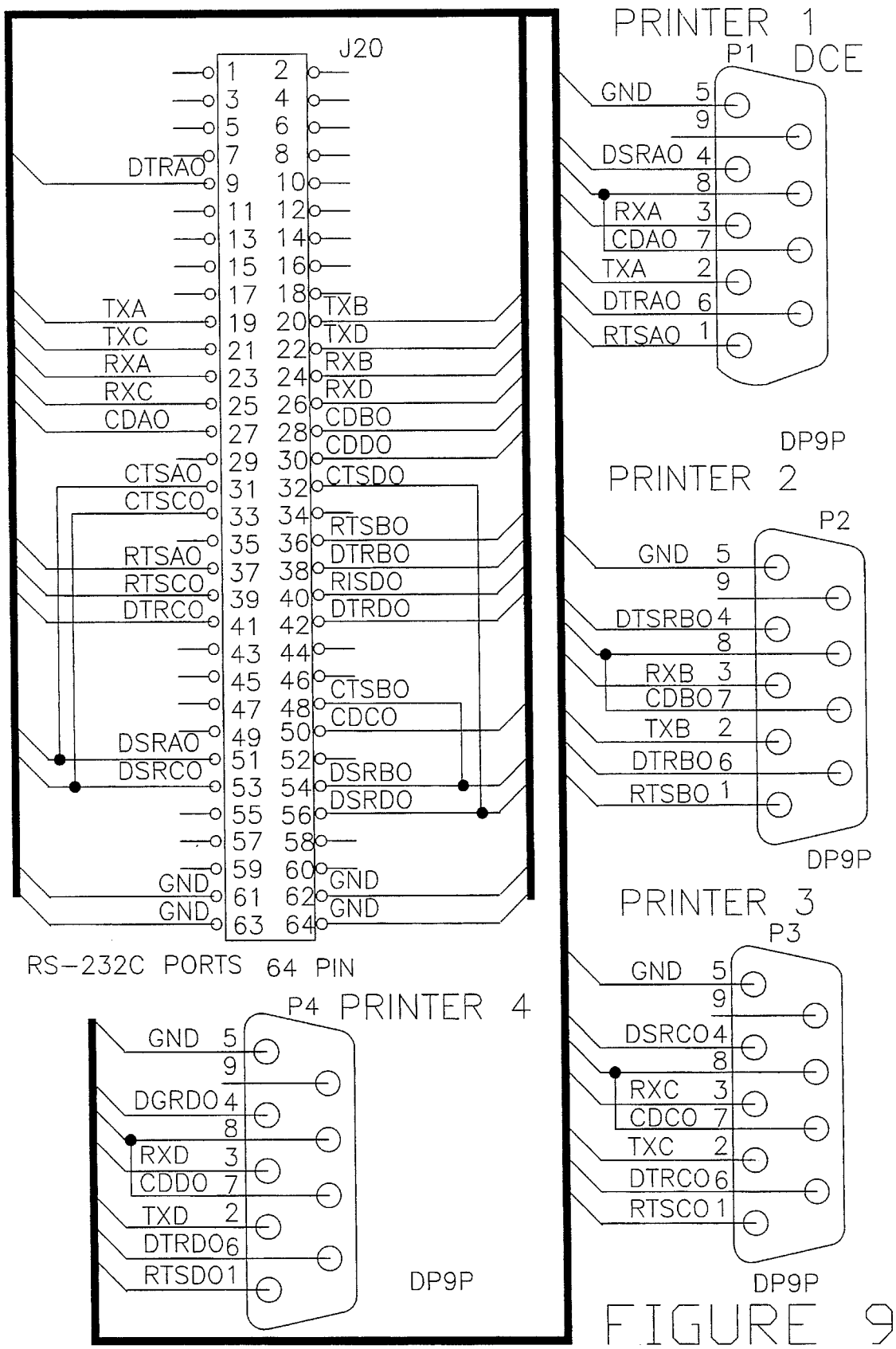
FIG. 9 is a schematic diagram of the multiport card.

The inventive system (100) most preferably comprises an automatic feed transport system (149) which is capable of automatically feeding the letter directly into the postage meter (211). As shown in FIG. 4a–4e, in particular FIG. 4a, the automatic transport system (149) preferably comprises a series of rollers (149a) contained within a letter platform (150). Integral with the platform (150) is a meter strip plate (201) and an electronic letter weighing scale comprising a weigh plate (200) and a load cell (215). To weigh the letter, the user places the letter onto the weigh plate (200). The presence of the letter is then detected by an optical sensor (225). The load cell (215), which is connected to the computer (1308) via Analog to Digital weigh card (1202) and the software program, as shown in FIGS. 6a–6c, will weigh the letter. However, the load cell will not weigh the letter until such time as the user has removed his or her hand. This is done by utilizing a software algorithm, which will detect minute vibrations which are always present when a human being is touching a scale. The special weighing algorithm is also illustrated in its entirety in the attached appendices, specifically in Appendix B. While the letter (L) is being weighed, the computer (1308) simultaneously checks to see if the postage meter (211) is in the correct position to accept the letter through the automatic feed system (149). The computer determines the postage meter position by particularly looking into the inputs of limit switch (209) and limit switch (204). If limit switch (204) is in the ON position, then the postage meter is in the correct position to accept the letter. In this case, the computer will activate linear actuator (207) which will move the translation table (216) to the forward position (c) (FIG. 4c). However, if the computer detects that limit switch (209) is in the ON position and limit switch (221) is in the OFF position, it will cause the linear actuator (207) to retract until such time as limit switch (221) will be in the ON position. This operation is particularly important as the postage meter (211) cannot be rotated in any other position but the backward position. All rotation of the postage meter (211) to the letter position (c) or the postage meter strip dispensing position (e), as shown in FIGS. 4c and 4e, respectively, must take place in the backward position in which linear actuator (207) is retracted (positions b and d as shown in FIGS. 4b and 4d, respectively). Once this position is achieved, the computer will activate the rotation motor (202) to rotate the postage meter rotation table (203) which is supported on at least one rotation bearing (210).

Once the postage meter is in a forward position (in either letter position or meter strip position), the outer letter security door (213) will be opened utilizing linear actuator (214). This will allow the letter to be picked up by the postage meter (211) through an opening above the letter guide (212), as discussed further below, or will allow a postage meter strip to be dispensed from the meter strip holder (299) onto into the meter strip plate (201).

Once the letter is weighed, the computer will receive the weight measurement via the A/D weigh card (1202), and utilizing the rate tables stored on the computer hard disc (1210) and the software program, the computer (1308) will calculate the cost for sending the letter. After the system displays the charge amount to the user, the user is requested to touch the touch-screen (110) which will display an Approval Touch Button for purposes of continuing the transaction. Where an autofeed mechanism is not used, the user is asked to insert the letter into the letter acceptance slot (104), located behind the outer letter security door (213), to continue the mailing transaction. Alternatively, the user may select other options in lieu of continuing the transaction, in particular to cancel the transaction or perform a different transaction. Once the user touches this button, the computer will activate the postage meter (211) through relay (1231) (FIG. 6a), lower the outer letter security door (213), and then activate the automatic transport means (149) (if present). This will send the letter, guided by a letter guide (212), into the postage meter (211). Once the letter passes through the postage meter and is imprinted with the postage meter stamp, the letter will hit the letter deflector (208) which will direct the letter into a secured storage area, such a letter tray (134), preferably located below the postage meter as shown in FIGS. 1a and 4a. Once the letter passes through the postage meter (211), the outer letter security door (213) will close and will not open again until another letter is detected by the optical sensor (225) (FIG. 4).

At the end of any particular transaction, the inventive system requests whether the user wants a receipt. If the user chooses a receipt, a receipt printer (128) (FIGS. 1a and 6c) will print a detailed receipt which will include all the information about the user's particular transaction, including, for example, time, date, location, machine number, type and amount of transaction, and number of transactions.

Figure 16A:
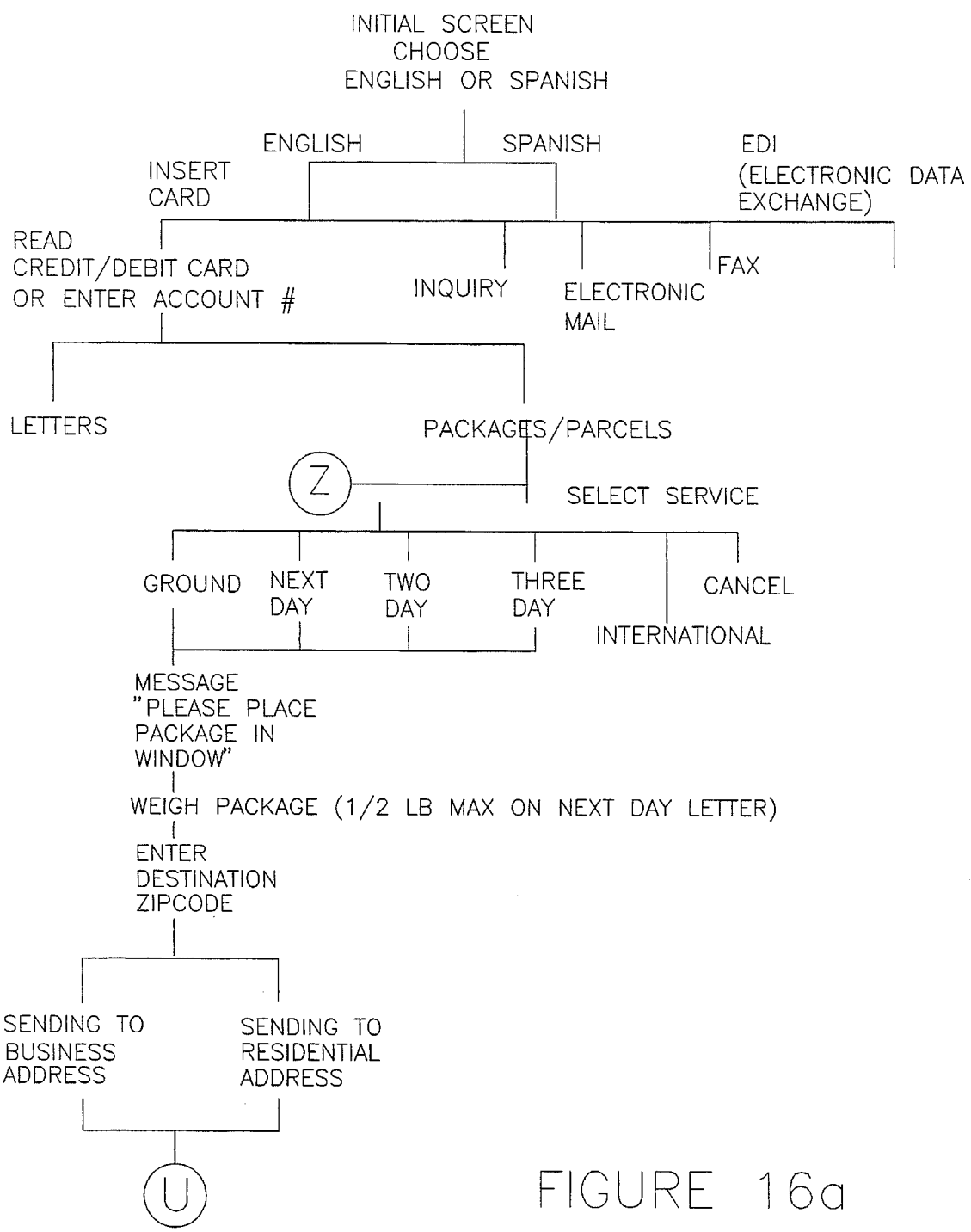
FIGS. 16a–16b are flow charts illustrating the processing of a package.
Figure 16B:
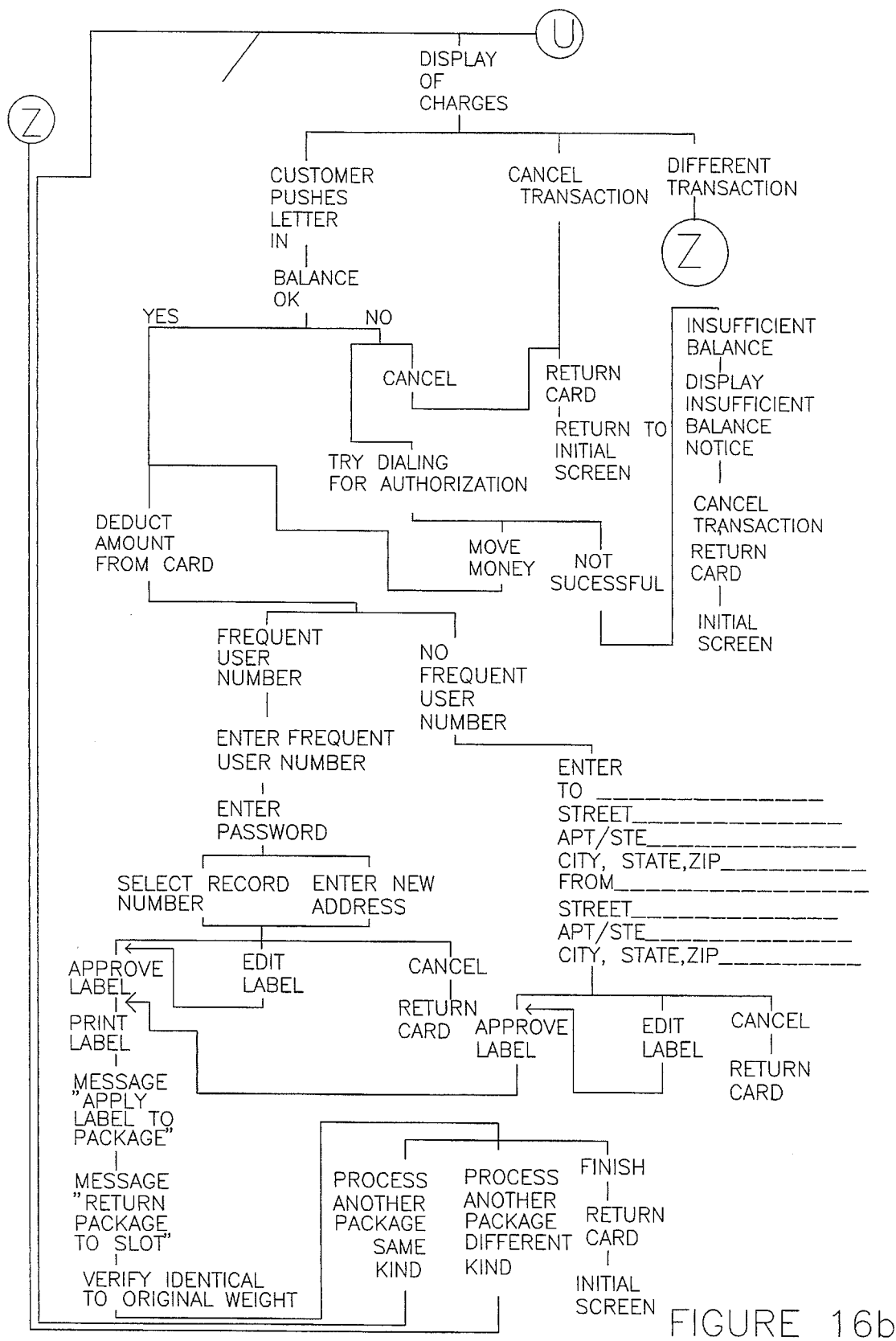

To process and store a package for mailing, the user preferably follows the flow diagrams illustrated in FIGS. 16a–6b. Similarly, the following description for processing and storing a package could be applied to a letter. Once the user has entered payment, most preferably his or her user identification information, and has selected to mail a package, the computer will activate a mechanism, including a software controlled system, to position the postage meter (211) into the correct orientation for printing and dispensing a postage meter strip directly to the user. As discussed above, the postage meter (211) is preferably also capable of directly printing a postage meter stamp onto a letter. Thus, in order to dispense a postage meter strip directly to the user for affixation onto a package, for example, a preferred aspect of the present invention is that the postage meter (211) be capable of rotating, as previously discussed in greater detail, so that the postage meter can dispense the postage meter stamp directly to the user through the front side of the outer housing (102a). For dispensing a postage meter stamp, if the postage meter is not in the home or retracted position (d), as shown in FIG. 4d, the software controlled system will properly orientate the postage meter by first retracting the postage meter from forward position (c) to the home position (b) by utilizing a linear actuator (207) if the limit switch (221) is not activated. Once the limit switch (221) is activated, the software control program will operate the rotation motor (202) which will rotate the postage meter about 180 degrees to a new position (d), as illustrated in FIG. 4d, which will be detected by limit switch (209). Once this rotation is completed, the postage meter will move forward to position (e), as shown in FIG. 4e, utilizing linear actuator (207), which will stop automatically by utilizing an internal switching mechanism.

Another aspect of the postage meter (211) is that it preferably contains an optical sensor (220) to sense the presence of postage meter strips in the special built-in meter strip holder (299). If the optical sensor (220) senses no meter strips in the holder (299), it will send a signal utilizing digital I/O port B. The computer (1308) in turn will display a video message on a display screen (110), or communicate via an audio means that the holder (299) is empty and inhibit the package mailing operation until such time as more meter strips are added to the postage meter (211).

The user will also be requested to input shipping designation information for the package, including the ZIP code, preferably via the touch-screen activated monitor (110). This information is processed through the computer (1308), and in conjunction with the weight information obtained later for the package, is used to calculate the shipping charge.

Once the computer (1308) identifies the correct information from the user information card, for example (i.e. if payment is made by this means), it will transmit this information via modem (1262) and telephone line (1264) (FIGS. 6b–6c) to an external credit/debit authorization center. Once the authorization is obtained, the software program will automatically activate the next screen which will request the user to make a selection between various services offered through the particular commercial carrier. By using a communication means, preferably either digitized voice instructions or video instructions, the user will be instructed to put his or her package into a secured item acceptance area (106). An outer security door (108) will automatically open, as discussed in more detail below, and the user will be able to place his package on an item-holding platform or bin (408) capable of tilting towards the back side of the outer housing (102b) to deposit the item into a secured storage area (410) at the appropriate time. The tilting mechanism used to deposit the item into a secured storage area (410) is discussed in more detail below.

Figure 3:
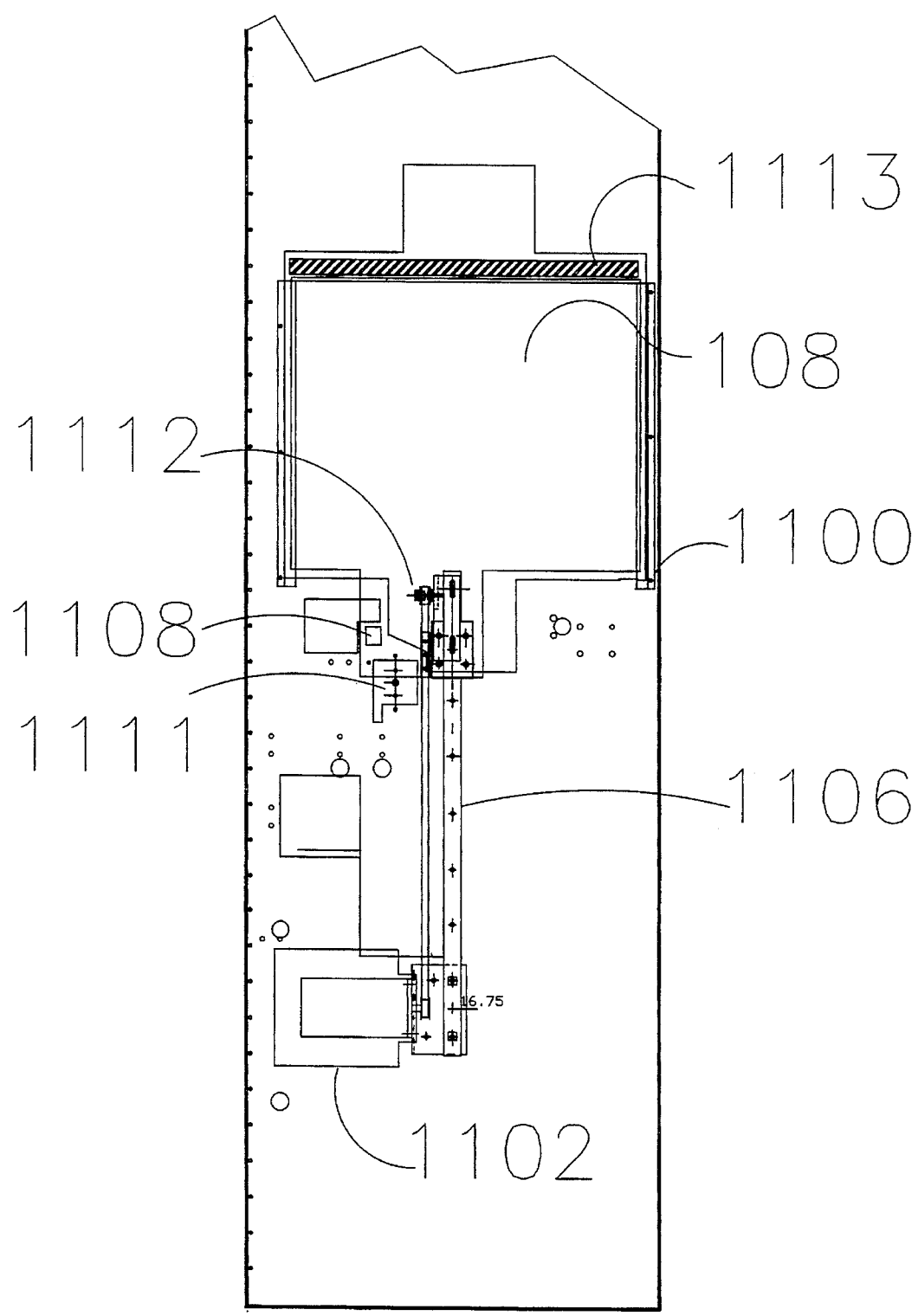
FIG. 3 is a front elevation view of the outer door mechanism of the secured item acceptance area.

Referring now to FIG. 3, the outer door (108) operating mechanism includes the outer door (108), guides (1100), pulley (1112), stepper motor (1102), optical sensor (1108), locking solenoid (1111), and flexible curtain (1113). Once the user selects to send a package, the computer (1308), utilizing a software control program, will unlock locking solenoid (1111) and activate stepper motor (1102) which will lower the outer door (108) to a pre-determined position. Once the user has completed his transaction and placed the package back onto the item-holding platform (408), the computer (1308) will activate stepper motor (1102) and raise the door to a level in which the optical detector (1108) will be blocked. The computer (1308) will release the locking solenoid (1111), which is spring-loaded in the locking position. This is done in order to keep the outer security door (108) locked at all times, including during a loss of electrical power. At this point, the weighing scale will verify that the package weight did not change, as discussed in more detail below. When the outer security door (108) closes, an intentional gap is left open which is covered or closed by a flexible curtain (1113) in case some user should leave his hand on the door while the door is being raised. By leaving this intentional gap, the outer security door (108) will never close to the point of squeezing the user's hand.

Figure 2A:
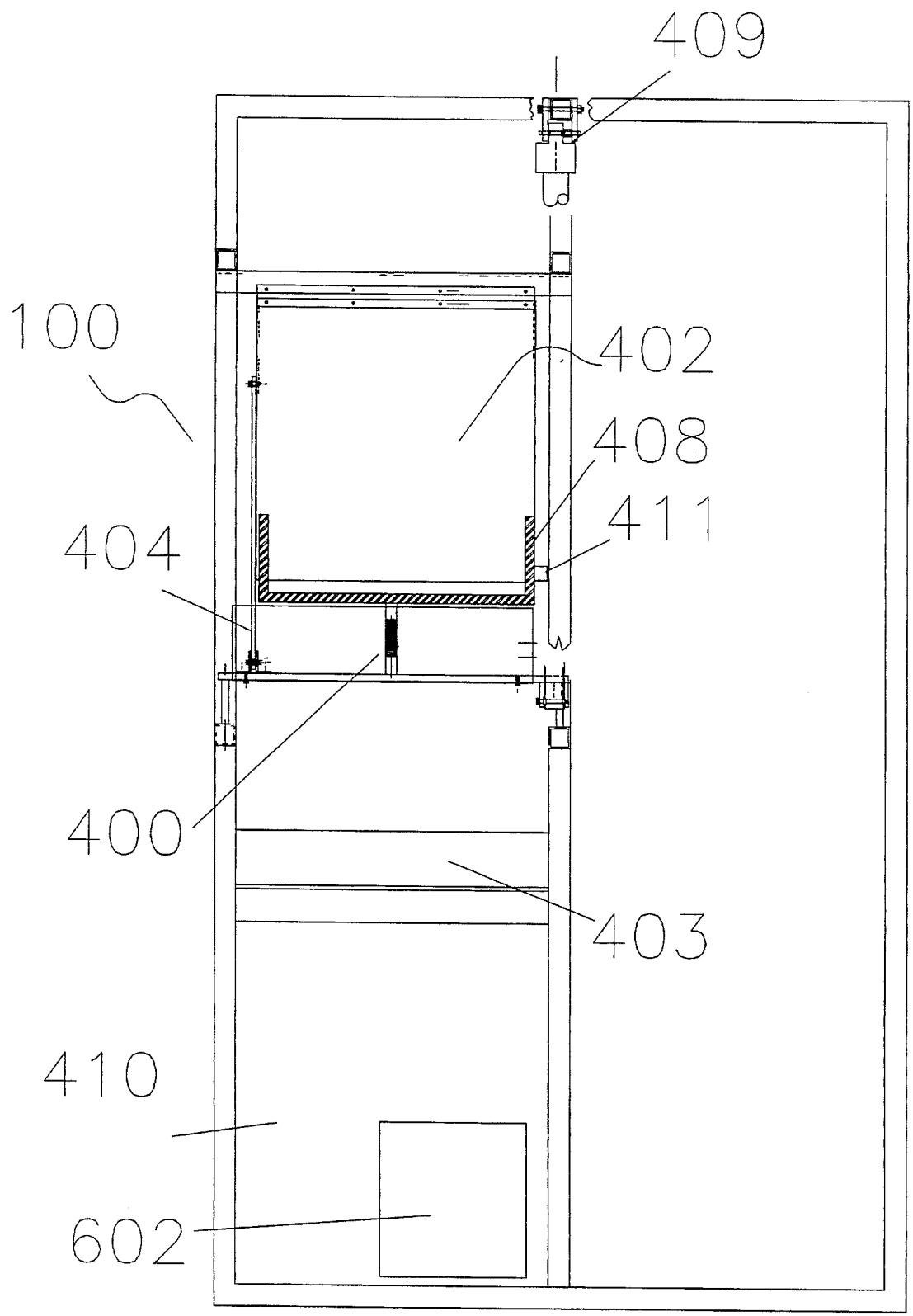
FIG. 2a is a front elevation view of the inventive mail system illustrated in FIG. 1a showing the package processing mechanism.
Figure 2B:
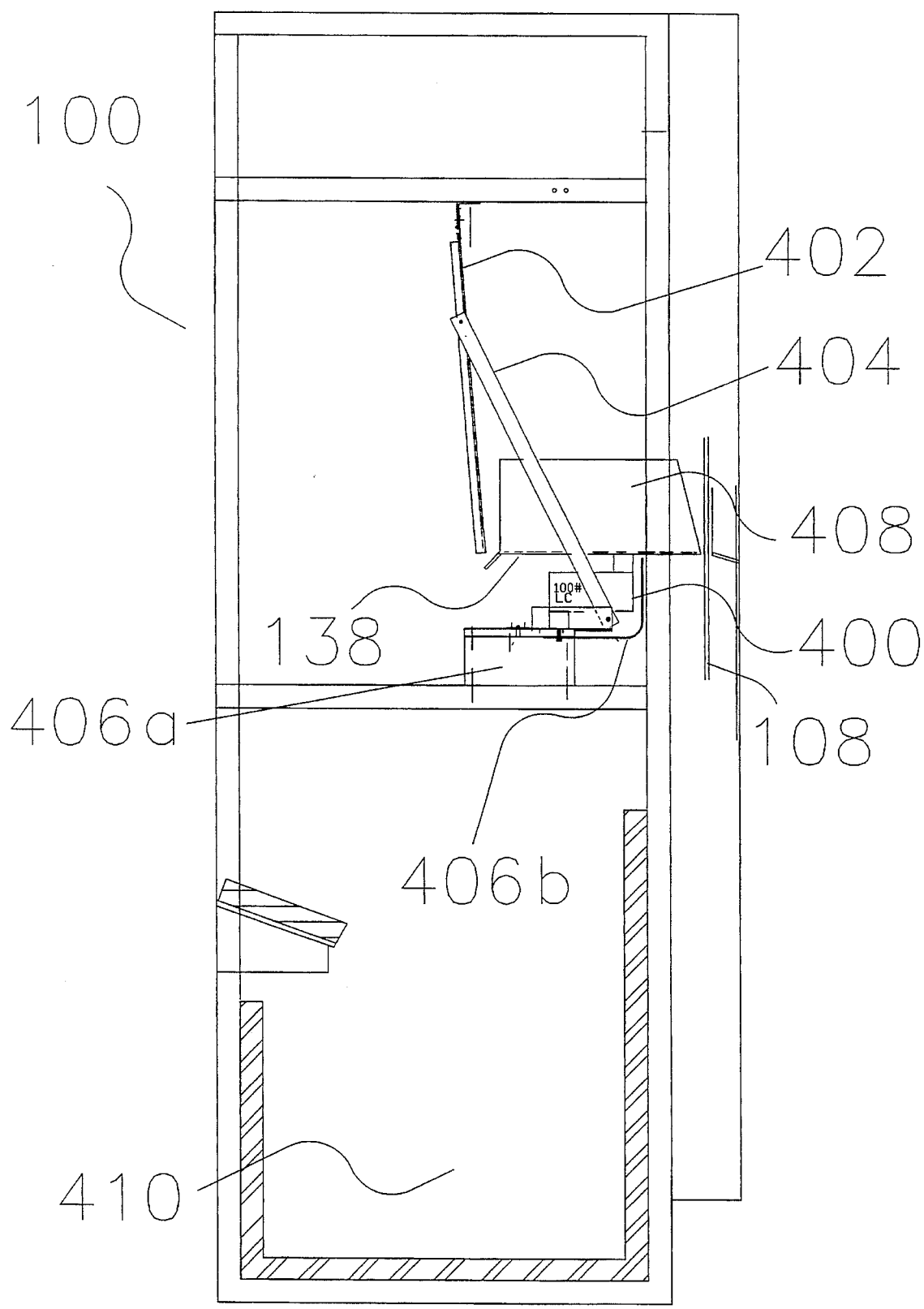
FIG. 2b is a side view of the inventive mail system illustrated in FIG. 1a and 4a showing the package processing mechanism.
Figure 2C:
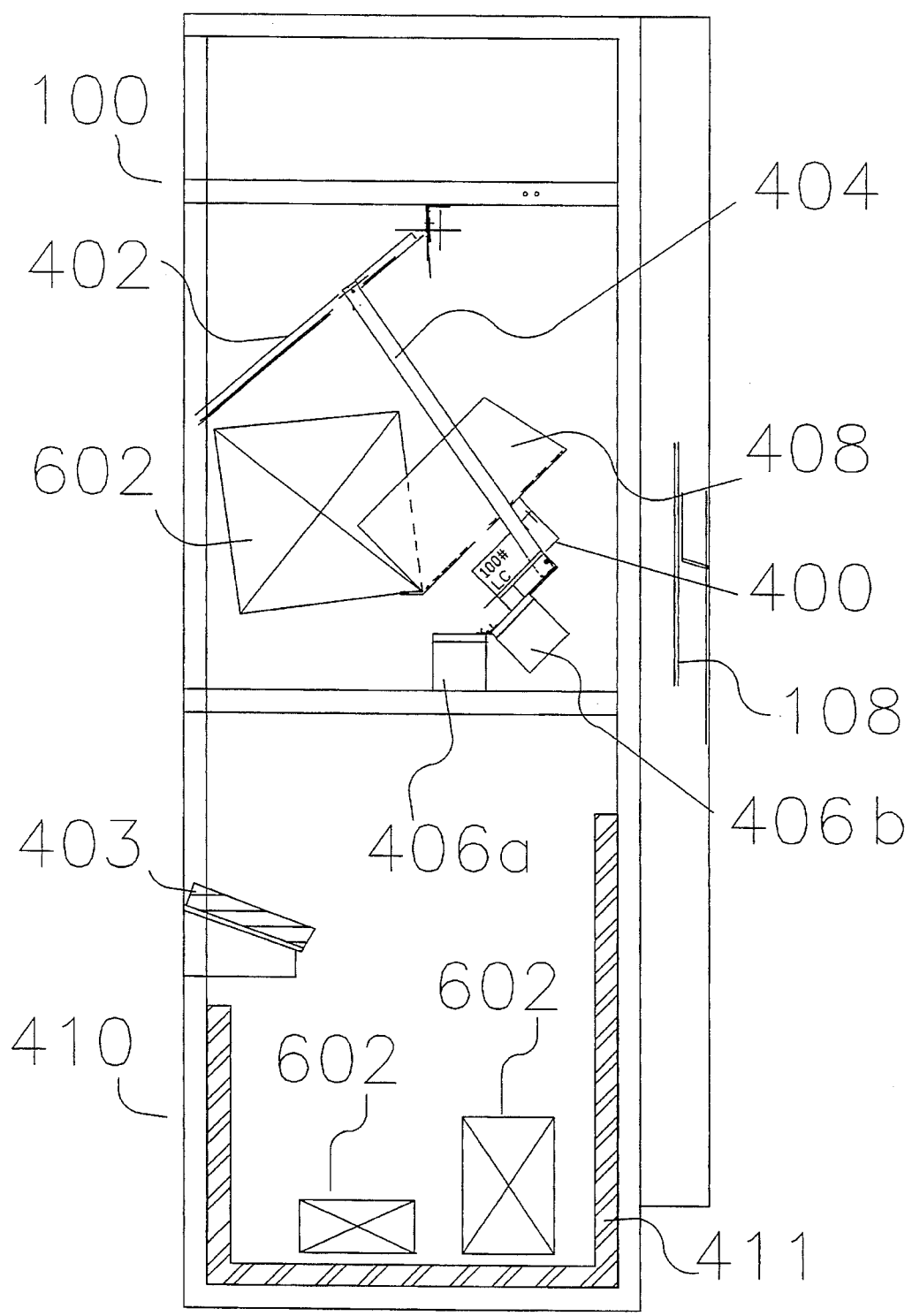
FIG. 2c is a side view of the inventive mail system illustrated in FIG. 1a and 4b showing the tilting mechanism for depositing a package from the secured item acceptance area into a secured storage area.

Referring now to FIGS. 2a–2c, a weighing device (138) comprising a load cell (400) integral with a rotating block (406b) is mounted below the platform (408) which in turn is integral with at least one mechanical arm (404) used to move the inner door (402). The rotating block (406b) is movably secured to a fixed block (406a). The user is instructed to place the item onto the platform (408), which will activate the weighing device to weigh the item via the load cell (400). The load cell (400), which is connected to the computer (1308) via Analog to Digital weighing card (1202) (FIG. 6a) and the software program, will not weigh the package (602) until such time as the user has removed his or her hand. This is done by utilizing a software algorithm which will detect minute vibrations which are always present when a human being is touching a scale, as discussed above. Once the item is weighed, the computer will receive the weight measurement via the A/D weighing card (1202) and utilizing the rate tables stored on the computer hard disc (1210) and the software program, as well as the shipping designation data entered, will calculate the cost of sending this package. The user will be asked to touch the screen (110) which displays an Approval Touch Button for continuing the transaction. Alternatively, the user may select other options in lieu of continuing the transaction, in particular to cancel the transaction or perform a different transaction. Once the user touches this button, the computer will activate the postage meter (211) through relay (1231), which will lower the outer letter security door (213), and the postage meter (211) will dispense a postage meter strip onto the meter strip plate (201). The user will then be instructed to paste the meter strip onto the package (602).

If the user desires to print his own shipping label, he will be able to do so by touching a print label touch button which will activate either a touch-screen alphanumeric keyboard (110) or a hidden-keyboard (156), which will come out for the user to use, such as that illustrated in FIG. 1b, for example. Once the user has completed typing in the label, he will again touch the Print Label Button, at which time the hidden keyboard (156) will retract, and a label will be printed utilizing package label printer (142) (FIGS. 1a, 1b, and 6c). A user may also select to print a bar code label which can be utilized as a Zip+4 label or a tracking label. This label will be printed automatically using the address information entered by the user and utilizing bar code printer (127) (FIGS. 1a, 1b, and 6c).

Once the user has completed pasting on the postage meter strip, the address label, and optionally the bar code label on his package, he will return the package to the secured item acceptance area (106), specifically onto the item-holding platform or bin (408). At this time, the outer security door (108) will automatically close to prevent the user from having access to the package. Once the outer security door (108) is closed, the computer (1308) will perform a second weighing in order to verify that the package weight has not been changed. If the second weight amount does not differ from the first weight amount, the mechanism for depositing the item into the secured storage area is activated by means of a linear actuator (409). The linear actuator (409) causes the platform (408) to tilt via using at least one mechanical arm (404), which in turn will open the inner door (402), and the package (602) will preferably drop onto padded step (403) which dampens the fall of the package (602) as it is deposited into the storage area (410). Once this area is full to the point that the next item is unable to slide off the tilting platform (408), a built-in optical sensor (411) on the platform (408) will prohibit the movement of the linear actuator (409) and will cause a message to appear on the system that the internal storage area (410) is full. It will also send a message to this effect, utilizing Modem (1262), to an external monitoring station which will inform the carrier to provide an unscheduled pick-up.

If the second weight amount is different from the first weight amount, the outer security door (108) will automatically open, and the system will instruct the user to remove the package, thus cancelling the transaction.

The user will be able to repeatedly process other packages, one at a time, utilizing the same steps, but without requiring the use of his or her user identification information card again. Once the user has completed all of his or her transactions, the user may request a printed receipt which will be printed utilizing receipt printer (128).

If the user decides to buy a book(s) of stamps, which are the standard type provided by the U.S.P.S., he will be able to do so by either paying with his credit/debit card or utilizing cash (dollar bills) via a cash acceptor (152). To utilize his credit/debit card, the user will follow a similar path as described previously, however he will select Book of Stamps. He then will be required to indicate, by touching the touch-screen, how many books he desires. Once he touches the desired number, the computer will operate the stamp dispenser relay (1231) and the books will be dispensed via the stamp dispenser (153). If the user selects cash, he will be instructed on the screen to place his money into the cash acceptor (152). Once the correct amount of cash is received by the system, which is transmitted to the computer via a communication port 2 (FIG. 6b), the computer (1308) will activate relay (1231), which in turn will dispense the correct number of books through stamp dispenser (153). The inventive system (100, 101) may also include a user pre-processing area comprising, for example, a work tray (114) and a ruler (116) to assist the user in preparing his or her letters or packages for processing and storing in the system.

If the user desires to send his letter via Electronic Mail (E-Mail) or to utilize the built in FAX machine (120), he can do so by swiping or inserting his credit/debit card through or into the magnetic card reader (122). However, the user will be requested through the instructions provided by a communications means, such as a digitized voice system or a touch-sensitive screen (110), to either insert his floppy disc into the floppy disc drive [(124) 3.5" discs or (126) 5.25" discs] or insert his letter into the FAX machine (120) top slot. The computer (1308), which has a software program to accept this kind of information, will automatically FAX the letter utilizing Modem (1262) to its destination or will transmit the file read off the floppy discs (124, 126) to the appropriate telephone number requested by the user utilizing Modem (1262).

The U.S.P.S. or other carriers will provide scheduled pick-up service on the system. The postal worker will open the two front doors of the system utilizing lock (154). By opening the two doors, the worker will be able to collect the letters from the letter tray (134) and the items, preferably packages, from the lower storage area (410). The user will also be able to print a shipping and mailing manifest which will give a summary of the different letters and packages accumulated since the previous pick-up. FIG. 1a shows a preferred placement of the shipping and mail manifest printer (144) and a full-size (i.e. 8 ½"×11 ") auxiliary manifest printer (140).

Certain commercial carriers, such as the United Parcel Service (U.P.S.), for example, require the affixation of a tracking bar code onto the package or letter. U.P.S., for example, provides labels or forms pre-printed with a tracking bar code for affixation onto an envelope. Thus, as discussed above, another preferred alternative embodiment of the present inventive system (101) is an automated mail processing and storing system comprising a tracking bar code system which can (1) detect whether the tracking bar code is present on the item and (2) generate and/or allow the entry of a tracking bar code for a mail item.

A system comprising such a tracking bar code system is illustrated in FIG. 1b. As discussed above, however, it is contemplated that additional features, such as a letter weighing scale or postage meter, for example, could be included, as well.

Figure 5:
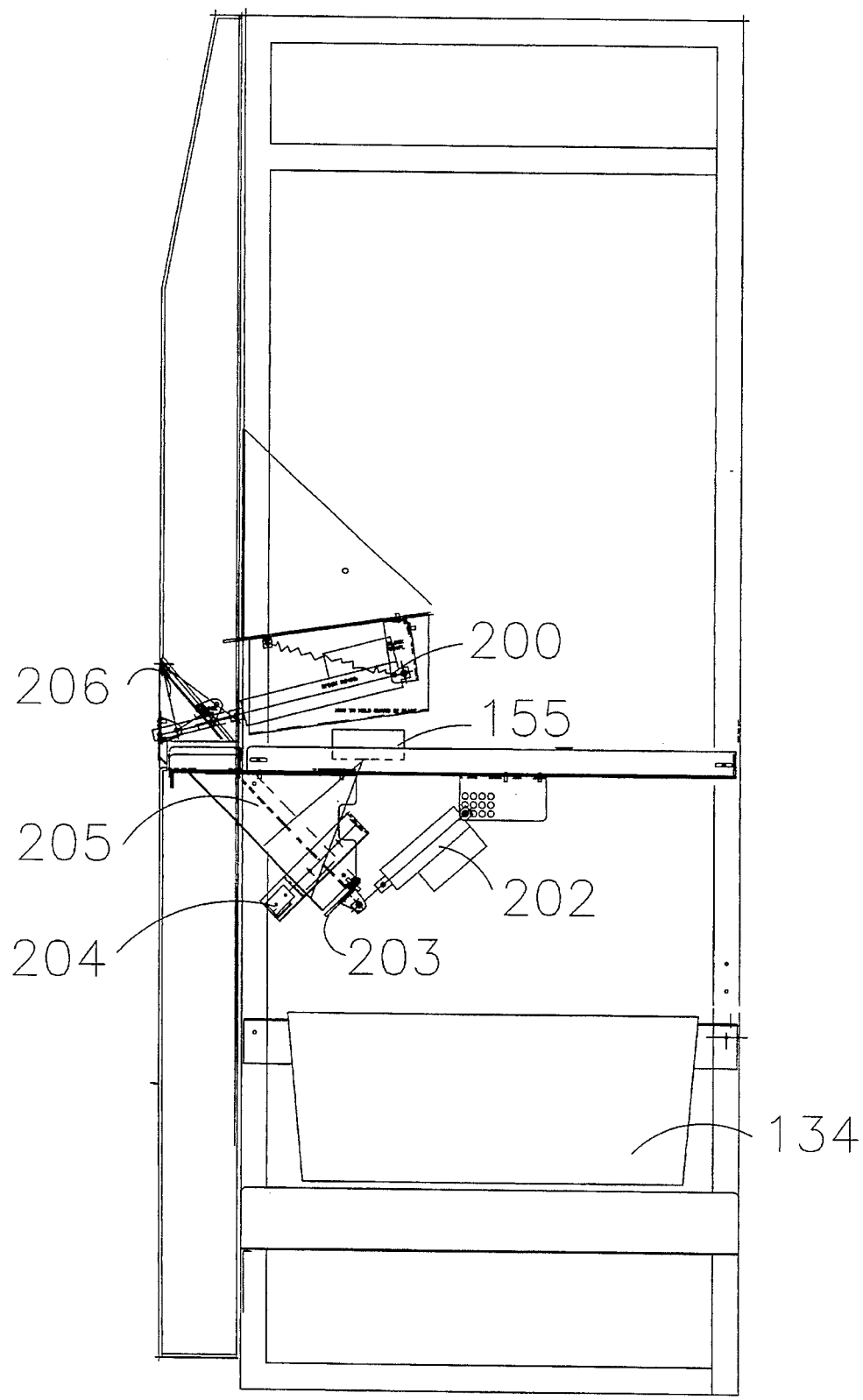
FIG. 5 is a side view of the alternate embodiment of the inventive system showing the internal tracking bar code verification system.

Referring now to FIGS. 1b and 5, the mailing system (101) preferably contains an area for processing letters and an area for processing packages. For processing letters and packages, the user begins the operation of the system (101) the same way as for the system (100) described above and illustrated in FIG. 1a. However, for processing letters for U.P.S., for example, the use of special labels or forms containing the tracking bar code for subsequent affixation onto an envelope does not necessitate the use of a weighing scale or postage meter. Similarly, while U.P.S. as well as perhaps some other carriers do base their charges for shipping a package in part on weight, no postage stamp is required, thus rendering a postage meter unnecessary. However, such a system could include a postage meter, if desired.

As discussed above, to perform a mailing transaction, the user will interact with a communication means which is mounted on the outer housing. A more preferred communication means is a display means, most preferably a computer monitor (110) equipped with a touch-sensitive screen with which the user interacts to input requested information for processing a mail item. The screen may be a conventional touch-screen activated by infra-ray, sonic waves, or resistance screen. While the operation of the present inventive mailing system will be described with reference to the touch-screen activated computer monitor, which is the most preferred type, other types of communication means are contemplated within the scope of the present invention may be employed. For example, a conventional computer monitor may be employed that is coupled with an alphanumeric key pad or keyboard. In this latter embodiment, the user inputs information into the mailing system via the key pad or key board. Alternatively, the communication means may be a voice-activated system, such as a digitized voice recognition system for receiving user input, such as that manufactured by Dragon Systems, for example, whereby the mailing system, via the software and computer (1308), operates in response to a user's spoken commands. In this third embodiment, the communication means may utilize a display means such as computer monitor for providing instructional information visually to a user or it may provide such information to a user by an audio means, such as a digitized voice system, for example.

To initiate a mailing transaction, the user approaches the mailing system and touches the screen to cause the screen, a digitized voice recognition system through microphone (112), and/or video instruction on a touch-screen (110), to be activated which will in turn instruct the user to perform the next step in the operation. Following the flow diagrams illustrated in FIGS. 11a–11b, 12a–12b, 13a–13b, 14a–14b, 15, 16a–16b, 17a–17b, and 18 the user selects a language for conducting the transaction, such as English or Spanish, for example. The user is then requested to enter a means for payment, most preferably user identification information for the purpose of payment, preferably by swiping or inserting a user identification data entry means such as a magnetic credit/debit card, through or into a magnetic card reader (122). Alternatively, the user could be instructed to input a user identification code, such as a personal identification number (PIN) and/or an account number, for example, via the touch-screen or a key pad/keyboard mechanism, for example. As discussed above, it is also contemplated that the inventive system could be modified by one skilled in the art, having the benefit of the invention's teachings and suggestions, to accept payment in the form of cash (i.e. coins and/or bills) after the charge has been determined. Once the computer (1308) identifies the correct information from the credit/debit card, for example, it will transmit this information via a modem (1262) and telephone line (1264) (FIG. 6c) to an external credit/debit authorization center. Once the authorization is obtained, the software program will automatically activate the next screen which will request the user to make a selection between various services offered through the commercial carrier.

For processing letters requiring a tracking bar code, this alternative embodiment of the inventive system (101) will ensure that no envelope is accepted into the letter tray (134) without first checking that the tracking bar code has been pasted or printed on the envelope, or has been allocated by the computer or scanned manually by the user using the external bar code scanner (151). For U.P.S. and perhaps some other carriers, the user must use designated envelopes and labels or forms for affixation onto the envelope supplied by the carrier, wherein the labels or forms contain the individual tracking bar code. The carrier will charge the user a fixed fee as long as the user uses the designated labels and envelopes for sending his or her documents. These labels and envelopes may be stored in a tilt-out supply cabinet (119), such as the one shown in FIG. 1b, for example. The user will then follow the digitized voice instructions or the visual instructions on the touch-screen 15 (110) to continue the transaction. Once the user has entered all the information requested by the carrier so that the computer can calculate the shipping charge, this shipping charge will be displayed on screen (110), and an Approval Touch Button will be displayed for purposes of continuing the transaction. Once the user has touched this button, the outer letter security door (206) will open to reveal a letter chute (205). Once the user places the envelope into the letter chute (205), the optical sensor (204) will activate the internal bar code scanner (155). Once the bar code scanner (155) reads the tracking bar code on the envelope, linear actuator (202) will open the inner letter door (203), and the envelope will drop into the letter tray (134) below. If the bar code scanner (155) is unable to read the bar code on the envelope, it will request the user to either turn the envelope over or to enter the tracking bar code number utilizing a touch-screen (110) keypad or the external bar code scanner (151), for example. Once this is completed, the linear actuator (202) will open the internal letter door (203), and the envelope will drop into the letter tray (134) below. However, if the user has selected to print his own shipping label using printer (142), for example, which automatically prints a tracking bar code, or has used the external bar code scanner (151) to scan the bar code before placing the envelope into letter chute (205), the computer will immediately activate linear actuator (202) which will open the inner letter door (203), and the envelope will drop into the letter tray (134).

For processing and storing a package for shipment by carriers such as U.P.S., for example, which require a tracking bar code, the same system components and method as discussed above for processing packages via U.S.P.S., or example, and illustrated in the figures are employed. Typically, however, the system does not require a postage meter, since the charge for shipping a package via U.P.S., for example, is not required to be placed on the package. However, the system can include a postage meter, if desired. In addition, the charge could be printed on the same label containing the tracking bar code if desired or required by another carrier.

Once the computer (1308) identifies the correct information from the user information card, or example (i.e. if this means for payment is used), it will transmit this information via modem (1262) and telephone line (1264) (FIGS. 6b–6c) to an external credit/debit authorization center. Once the authorization is obtained, the software program will automatically activate the next screen which will request the user to make a selection between various services offered through the particular carrier. By using a communication means, preferably either digitized voice instructions or video instructions, the user will be instructed to place his package into a secured item acceptance area (106). An outer door (108) will automatically open as discussed above, and the user will be able to place his package on an item-holding platform or bin (408) capable of tilting towards the back side of the outer housing (102b) to deposit the item into a secured storage area (410) at the appropriate time. The same outer door mechanism as discussed above for the inventive mailing system (100) and further illustrated in FIG. 3 is applicable to this embodiment of the inventive mailing system (101). Further, the same tilting mechanism used to deposit the item into a secured storage area (410) as already discussed above for the inventive mailing system (100) is used.

The user will also be requested to input shipping designation information for the package, including the ZIP code, preferably via the touch-screen activated monitor (110). This information is processed through the computer (1308), and in conjunction with the weight information obtained later for the package, is used to calculate the shipping charge. Referring again to FIGS. 2a–2c, a weighing device (138) comprising a load cell (400) integral with a rotating block (406b) is mounted below the item-holding platform (408) which is integral with at least one mechanical arm (404) used to move the inner door (402). The rotation block (406b) is movably secured to a fixed block (406a). The user is instructed to place the package (602) onto the platform (408), which will activate the weighing device to weigh the item via the load cell (400). The load cell (400), which is connected to the computer (1308) via Analog to Digital weighing card (1202) and the software program, will not weigh the package until such time as the user has removed his or her hand. This is done by utilizing a software algorithm which will detect minute vibrations which are always present when a human being is touching a scale, as discussed above. Once the package (602) is weighed, the computer (1308) will receive the weight measurement via the A/D weighing card (1202) (FIG. 6a) and utilizing the rate tables stored on the computer hard disc (1210) and the software program, as well as the shipping designation data entered, will calculate the cost of sending this package. The user will be asked to touch the screen (110) which displays an Approval Touch Button for continuing the transaction. Once the user touches this button, he will be instructed to return the package to the secured item acceptance area (106) after he has pasted onto his package a tracking label provided by the carrier. Alternatively, if the user wishes to print his own shipping label, he will be able to do so by touching a print label touch button which will activate either a touch-sensitive screen keyboard or a hidden-keyboard (156), which will come out for the user to use. Once the user has completed typing in the label, he will touch again the Print Label Button, and a label will be printed utilizing package label printer (142). This label will be printed automatically using the shipping address information entered by the user. The printed label will include a tracking bar code which is utilized by the commercial carriers to track the movement of the package. Once the user has completed pasting the address label, which includes the tracking bar code, on his package, he will first scan this tracking label using external bar code scanner (151) and then place the package back onto the item-holding platform or bin (408) in the secured item acceptance area (106). At this time, the outer security door (108) will automatically close to prevent the user from having access to the package. Once the outer security door (108) is closed, the computer will perform a second weighing in order to verify that the package weight has not been changed. If the second weight amount does not differ from the first weight amount, the mechanism for depositing the item into the secured storage area via the tilting motor (138) will be activated by means of a linear actuator (409). The linear actuator (409) causes the platform (408) to tilt via at least one mechanical arm (404), which in turn will open the inner door (402), and the package (602) will preferably drop onto padded step (403)

which dampens the fall of the package as it is deposited into the storage area (410) below. The area below the secured item acceptance area (106) is used as an internal storage area (410) for packages or letters. Once this area is full to the point that the next item is unable to slide off the tilting platform (408), a built-in optical sensor (411) on the platform (408) will prohibit the movement of the linear actuator (409) and will display a message on the system that the internal storage area (410) is full. It will also send a message to this effect, utilizing Modem (1262), to an external monitoring station which will inform the carrier to provide an unscheduled pickup.

The user will be able to repeatedly send other packages, one at a time, utilizing the same steps, but without requiring him to use his user identification information card or commercial account number again. Once the user has completed all his transactions, he may request a printed receipt which will be printed utilizing receipt printer (128).

If the user desires to send his letter via Electronic Mail (E-Mail) or to utilize the built-in FAX machine (120), the same system and method as discussed above for mailing system (100) and shown in the figures, such as FIGS. 1a, for example, can be employed. Similarly, an E-Mail system, and F system, a postage stamp service area, and/or a user preprocessing area (as discussed above) may be included in this alternative embodiment of the inventive mailing system (101).

Once the user has completed all of the desired operations, he will be able to request a detailed receipt which will include the bar code tracking numbers. This receipt will be printed utilizing receipt printer (128) (FIG. 1b). This tracking information is particularly important to users who will be able to check the delivery information by utilizing touch-screen (110) and following the instructions on the screen. This tracking information will be received directly from the carrier main frame computer utilizing Modem (1262) and computer (1308).

Figure 18:
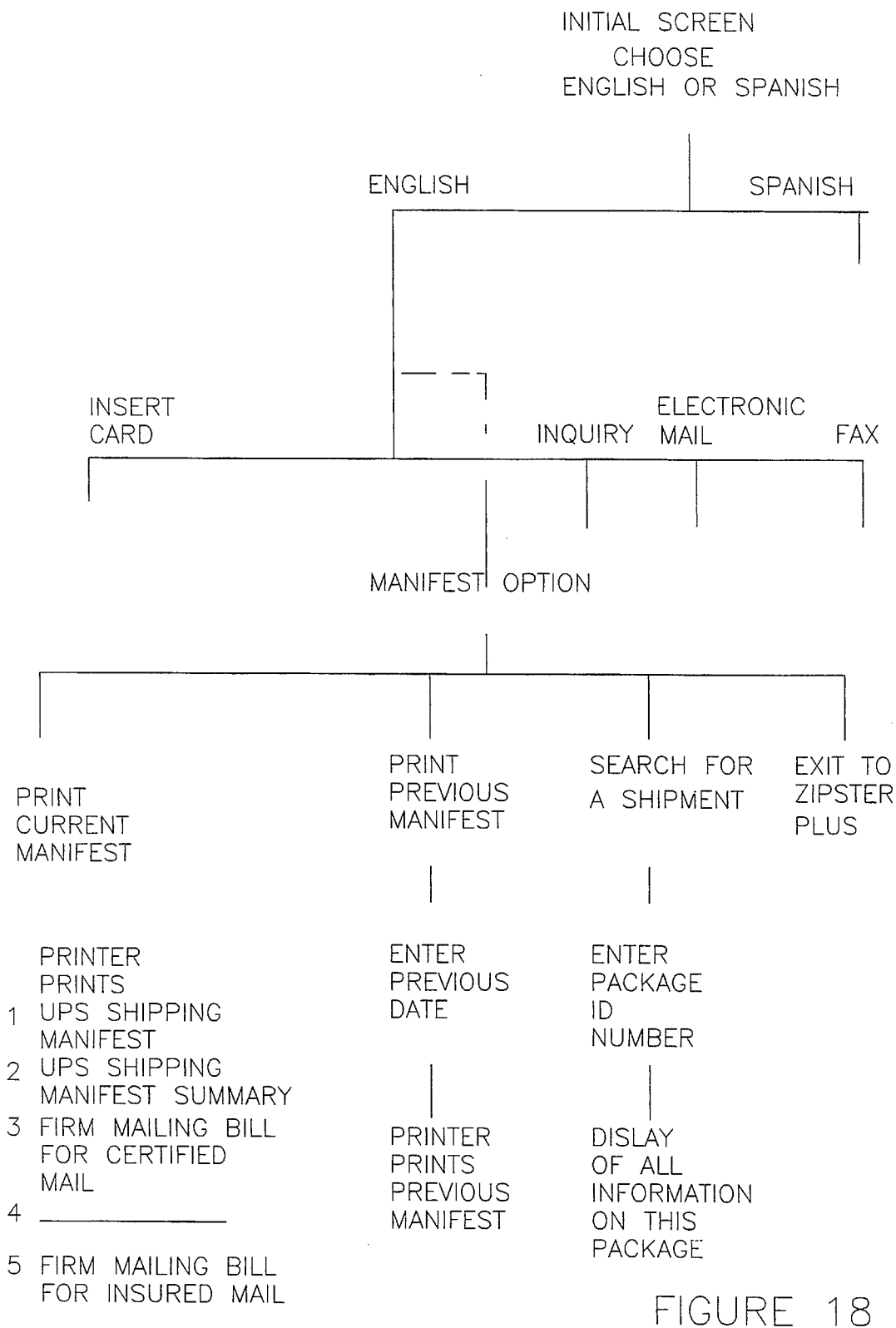
FIG. 18 is a flow chart illustrating the package and letter manifest process.

The inventive systems (100, 101) may also comprise a package and letter manifest option, as illustrated in the flow diagram in FIG. 18. By entering the appropriate code, authorized personnel can obtain hardcopy manifest reports of items received by the machine. The manifest copy is generated by a either a shipping and manifest printer (144) or a larger manifest printer (140) capable of printing larger (i.e. 8 ½"×11") copies and are both contained within the outer housing of the system.

Figure 17A:
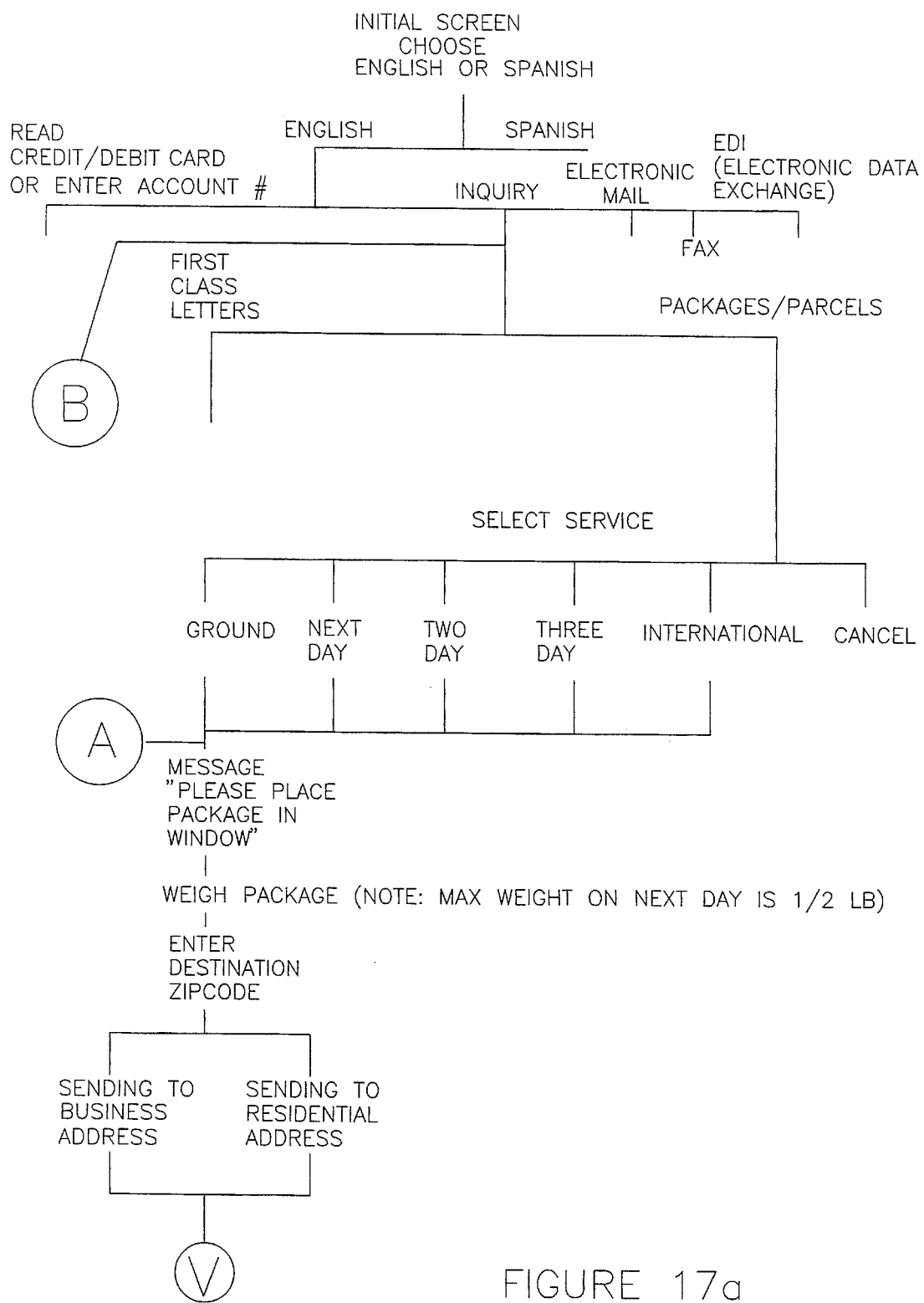
FIGS. 17a–17b are flow charts illustrating the customer inquiry process for a package.
Figure 17B:
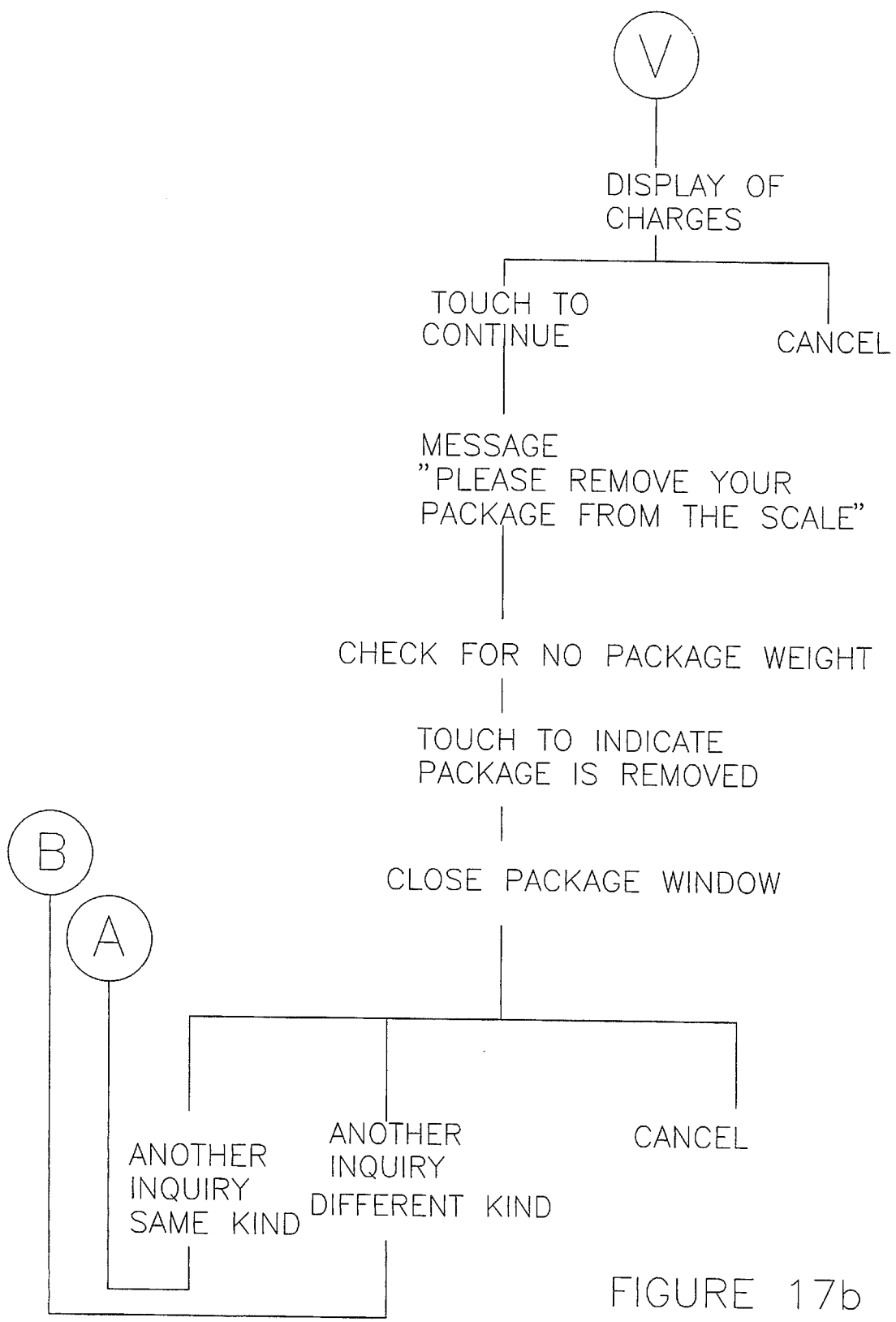

In addition to serving as a mail processing and storing system, the inventive system can also be operated by a user in an "Inquiry" mode, as illustrated in FIGS. 17a–17b. For example, a user may use the system simply to look up the nine-digit ZIP code for a particular address. This feature of the system may be provided free of charge as courtesy.

The present invention is also directed to a two-way communication system, in particular a communication means coupled to the inventive mail system's computer (1308), for communicating between the inventive system and an external computer located at a remote station or location. Both inventive systems (100, 101) may include, and preferably do include, this two-way communication system.

Preferably, the two-way communication system operates to provide the following functions:

(1) Credit authorization and charge reporting;

(2) Transaction and tracking information transfer;

(3) Error reporting and machine-full notification to a remote monitoring station;

(4) Automatic money transfer to the postage meter; and (5) Electronic mail and EDI (electronic data interchange) facilities for users. These functions are discussed in more detail below as well as in the source code provided in the attached Appendix A.

When the user inserts his or her user identification information, preferably by swiping or inserting a magnetic credit/debit card through or into a magnetic card reader, the machine dials out to the credit card authorization network and receives pre-approval for a designated amount of credit. At the end of the transaction, the inventive mail system stores the actual transaction amount in the computer (1308) for batch transfer, and the end of the day, the computer will be capable of providing a detailed summary of credit card usages for that day. If the user needs to spend more money than the pre-approved amount, the inventive mail system automatically acquires additional credit authorization.

The inventive system is preferably capable of storing detailed information on every transaction as well as tracking bar code information. At the end of the day, the inventive system transfers this information to a central accounting station.

The two-way communication system may also allow the service department of the particular carrier, for example, to be promptly notified electronically of fatal errors which would prohibit further use of the inventive system, and thus need immediate attention. Preventive maintenance messages and non-fatal errors which do not affect the usage of the machine will be sent periodically to a remote monitoring station.

The inventive mail system always maintains a minimum balance in the postage meter. When the balance reduces to a pre-determined minimum amount, the system will automatically dial out to a bank, for example, which will deposit a pre-designated amount of credit in the postage meter, preferably through a TMS (telephone money service) mechanism, for example. The inventive mail system and meter identification numbers are transferred automatically to the bank for accountability.

The inventive mail system provides a user interface for electronic mail (E-mail) and electronic data interchange (EDI). A user can log into any remote system via the inventive mail system and use his or her personal credit card, for example, to charge for system usage time. A floppy disk device having an opening (124, 126) and coupled to the computer (1308) is available on the outside of the outer housing for data interchange.

The inventive system may also include a communication means coupling the computer with the postage meter to provide an automatic meter imprint date change mechanism. The postage meter automatically changes the imprint date at midnight. However, the inventive mail system can send commands through the communication means to the postage meter to activate and advance the date mechanism at a designated article pickup time to reflect and print a new date after the designated pickup for that day. The same date change mechanism is used for holidays and weekends when there is no scheduled article pickup.

The foregoing disclosure and description of the invention are illustrative and explanatory thereof, and changes in the size, shape, and materials, as well as in the details of the illustrated construction may be made without departing from the spirit of the invention.

*Appendix A*

---
SCRIPT OF MAIN TOOL BOOK PROGRAM
---

```
to handle goback
 send back
end to handle enterPage
  system LONG_PERIOD
  get SetTimer(SysWindowHandle, 10110, 7000, 0)
  get SetTimer(SysWindowHandle, 10111, 60000, 0)
  put 0 into LONG_PERIOD
-- get EatClicks()
end to handle leavePage
 system DVICAP,VIDEO_READY,REPEAT_VIDEO,VIDEO_PRIME,VIDEO_SHOW
 if DVICAP is true then
  set sysSuspend to false
  get tbkMCI("close AVSFile","")
  hide rectangle "dvi"
  set sysSuspend to true
 end if
 get KillTimer(SysWindowHandle, 10110
 get KillTimer(SysWindowHandle, 10111
 put "paused" into VIDEO_READY
 put false into REPEAT_VIDEO
 put false into VIDEO_PRIME
 put false into VIDEO_SHOW
end to get EatClicks
        local wFlags,dwBytes,cnt,hMsg,lpMsg set wFlags to 0        -- GlobalAlloc flags
        set dwBytes to 32      -- size of MSG structure, with room to spare
        set hMsg to GlobalAlloc(wFlags,dwBytes)
        if hMsg = 0 or hMsg = null
              return -1
        end
        set lpMsg to GlobalLock(hMsg)
        if lpMsg = 0
              get GlobalFree(hMsg)
              return -1
        end -- Call Windows PeekMessage function to remove the
        -- messages we don't want
        set cnt to 0
        -- Mouse clicks
        while PeekMessage(lpMsg,sysWindowHandle,512,521,1) <> 0
              increment cnt
        end
        -- Keyboard clicks
        while PeekMessage(lpMsg,sysWindowHandle,256,264,1) <> 0
              increment cnt
```

```
            end
         -- Menu Accelerators
         while PeekMessage(lpMsg,sysWindowHandle,111,112,1) <> 0
                  increment cnt
         end
         get GlobalUnlock(hMsg)
         get GlobalFree(hMsg)
         return cnt
end --
--       Function to generate timers needed in the system
--
to handle WM_TIMER hwnd, winMsg, wp, lplc, lphi
  conditions
    when wp=10110 -- short timeout
      get KillTimer(sysWindowHandle, 10110)
      send shortTimeOut to this page
    when wp = 10111 -- long timeout
      get KillTimer(sysWindowHandle, 10111)
      send longTimeOut to this page
    when wp = 10112 -- Repeating message timeout
      get KillTimer(sysWindowHandle, 10112)
      send RepeatingVideoTimeout to this page
    when wp = 10113 -- timeout for timeout page
      get KillTimer(sysWindowHandle, 10113)
      send TimeoutPageTimeout to this page
  end -- conditions
end to handle longTimeOut
  if sysLevel is reader then
    system LONG_PERIOD
    if LONG_PERIOD > 2
      go to page "long timeout message"
    else
      get SetTimer(SysWindowHandle, 10111, 60000, 0)
      increment LONG_PERIOD
    end if
  end if
end to handle shortTimeOut end to handle STOP
  fxwipe left normal to page "stop message"
end to handle keyChar key
 system MYSTATE
 if the key is keyescape then
  if MYSTATE is null then
   send lockIt
   put "locked" into MYSTATE
```

```
    else
      send unLockIt
      clear MYSTATE
    end if
  end if
end to handle tbkMMNotify p1,p2,p3 system REPEAT_VIDEO, VIDEO_PRIME, VIDEO_SHOW if p1 is "Successful"
    conditions
      when p2 is "play"
        if REPEAT_VIDEO is true
          if VIDEO_PRIME is true
            if VIDEO_SHOW is true
              send DisplayVideoWindow
            else
              get bringWindowToTop(sysWindowHandle)
            end
            get tbkmci("seek avsfile to start","")
          else
            get bringWindowToTop(sysWindowHandle)
            get tbkmci("close AVSFile","")
          end
          send finishTranslation to this page
          send StartVideoTimer to this page
        else
          get tbkmci("close AVSFile","")
        end
    end
  end
end --
--        Function to play back a video file
--
to handle showDvi fileName, startFrame, stopFrame
  if (argCount = 1) then
    put 1 into startFrame
    put 0 into stopFrame
  end if
  if (argCount = 2) then
    put 0 into stopFrame
  end if
  system stylevalue,DVICAP,VIDEO_READY, VIDEO_PRIME, VIDEO_SHOW
  if DVICAP is not true then
    beep 1
    put "playing" into VIDEO_READY
    break
  end if
  set sysSuspend to false if stylevalue is null
    set stylevalue to 4096 -- popup
```

```
     end if

--open a new avs4 file
     set sysCursor to 4
     get tbkMCI("close avsFile","")

get EnableHardwareInput(0)
     hide group "help" of this page
     get tbkMCIchk("open" && filename && "alias AVSFile wait","",1,1)
     show group "help" of this page
     set hDVIWnd to findWindow("DigitalVideo Default",0)
--   if hDVIWnd is 0 or hDVIWnd is null
--       request "Couldn't find DVI window. Breaking handler."
--       get tbkMCI("close AVSFile","")
--       break to system
--   end if set style to getWindowLong(hDVIWnd,-16)
     set hiword to (style div 65536) - 1219 - 4096
         -- 1219 is the default style of the DVI window  4096 is "visible"
     set loWord to style mod 65536 -- probably zero  but ...
     set style to ((hiword+stylevalue)*65536) + loword
     get setWindowLong(hDVIWnd,-16,style)

put bounds of rectangle "dvi" into the_rect put item 1 of the_rect into tb_left
     put item 2 of the_rect into tb_top
     put item 3 of the_rect into tb_right
     put item 4 of the_rect into tb_bottom get xPixelsFromUnits (sysMagnification, tb_left)
     put it into win_left
     get xPixelsFromUnits (sysMagnification, tb_right)
     put it into win_right
     get yPixelsFromUnits (sysMagnification, tb_top)
     put it into win_top
     get yPixelsFromUnits (sysMagnification, tb_bottom)
     put it into win_bottom set nWidth to win_right - win_left
     set nHeight to win_bottom - win_top get moveWindow(hDVIWnd,win_left+8,win_top+40,nWidth,nHeight,1)
     get tbkMCIchk("seek AVSFile to" && startFrame,"",1)

get tbkMCIchk("window AVSFile state show","",1,1)

get EnableHardwareInput(1)

set syscursor to 1
     if stopFrame = 0 then
        get tbkMCIchk("play AVSFile",self,1,1)
```

```
       else
           get tbkMClchk("play AVSFile to" && stopFrame,self,1,1)
       end if
       get yieldApp()
       set sysSuspend to true
  end to handle primeDvi fileName
       system stylevalue,DVICAP,VIDEO_READY, VIDEO_SHOW if DVICAP is not true then
           beep 1
           put "playing" into VIDEO_READY
           break
       end if
       set sysSuspend to false if stylevalue is null
           set stylevalue to 4096 -- popup
       end if --open a new avs4 file
       set sysCursor to 4
       get tbkMCI("close avsFile","")

get tbkMClchk("open" && filename && "alias AVSFile","",1,1)
       set hDVIWnd to findWindow("Digital Video Default",0)
       if hDVIWnd is 0 or hDVIWnd is null
           request "Couldn't find DVI window.. Breaking handler."
           get tbkMCI("close AVSFile","")
           break to system
       end if set style to getWindowLong(hDVIWnd,-16)
       set hiword to (style div 65536) - 1219 - 4096
       -- 1219 is the default style of the DVI window, 4096 is "visible"
       set loWord to style mod 65536 -- probably zero, but ...
       set style to ((hiword+stylevalue)*65536) + loword
       get setWindowLong(hDVIWnd,-16,style)

put bounds of rectangle "dvi" into the_rect put item 1 of the_rect into tb_left
       put item 2 of the_rect into tb_top
       put item 3 of the_rect into tb_right
       put item 4 of the_rect into tb_bottom get xPixelsFromUnits (sysMagnification, tb_left)
       put it into win_left
       get xPixelsFromUnits (sysMagnification, tb_right)
       put it into win_right
       get yPixelsFromUnits (sysMagnification, tb_top)
       put it into win_top
       get yPixelsFromUnits (sysMagnification, tb_bottom)
       put it into win_bottom
```

```
    set nWidth to win_right - win_left
    set nHeight to win_bottom - win_top get moveWindow(hDVIWnd,win_left+8,win_top+40,nWidth,nHeight,1)

if VIDEO_SHOW is true
        get tbkMClchk("seek AVSFile to start","",1)
        get tbkMClchk("window AVSFile state show","",1,1)
        send DisplayVideoWindow
    else
        get bringWindowToTop(sysWindowHandle)
    end set syscursor to 1 set sysSuspend to true end to handle playPrimedVideo
    set hDVIWnd to findWindow("DigitalVideo Default",)
    get bringWindowToTop(hDVIWnd)

get tbkMClchk("play avsfile",self,1,1)
    get yieldApp()
end to handle DisplayVideoWindow
    set hDVIWnd to findWindow("Digital Video Default",0)
    get bringWindowToTop(hDVIWnd)
end to handle SetStyle pValue
    set style to getWindowLong(sysWindowHandle,-16)
    set hiWord to style div 65536 -- replaced "/" operator with "div" - DRL 4/6/92
        set loWord to style mod 65536
        increment hiWord by pValue
    set style to (hiword * 65536) + (loWord)
    get setWindowLong(sysWindowHandle,-16,style)
    hide mainwindow
    set bounds of mainwindow to bounds of mainwindow
    send sizeToPage
    show mainwindow
    set style to getWindowLong(sysWindowHandle,-16)
end to handle lockIt
 send setStyle -64-4
 hide menuBar
 set the size of this book to (6.65*1440),(4.98*1440)
 send sizeToPage
 set the position of mainWindow to 0,0
 set sysCursor to none
 get showCursor(0)
end
```

```
to handle unLockIt
 send setStyle 64+4
 show menuBar
 set the size of this book to (6.5*1440),(4.5*1440)
 send sizeToPage
 set the position of mainWindow to 0,0
 set sysCursor to 1
 get showCursor(1)
end
```

---

Function to initialize system variables and resources

---

```
to handle enterbook
  system DVICAP,VIDEO_READY,REPEAT_VIDEO,DOOR_OPENED,COM_NUMBER
  system
CARD_INSIDE,COMERCIAL,COMPORT,METER_DATE_CHANGED,FILES_TRANSFERED,\
INVOICE_TRANSFERED,TRANSFER_IN_PROGRESS,CREDIT_TRANS_LIMIT,PACKAGE_P
OS_METER,\
      PACKAGE_SIDE_FULL
  put 1 into COMERCIAL
  put false into CARD_INSIDE
  put 1 into COMPORT
  put 1 into COM_NUMBER
  set sysLockScreen to true
       set sysSuspend to false
       put true into DOOR_OPENED
       put true into PACKAGE_POS_METER
  put false into PACKAGE_SIDE_FULL
  put false into METER_DATE_CHANGED
  put true into FILES_TRANSFERED
  put true into INVOICE_TRANSFERED
  put false into TRANSFER_IN_PROGRESS
  put "35.00" into CREDIT_TRANS_LIMIT
       clear sysError
       linkDLL "zipfunct.dll"
              int write_output( byte, byte, byte )
              int read_input(BYTE)
              int check_letter()
              int move_sm(int, WORD, int, int, int, int, byte)
              int reset_motor(INT)
              int init_scale()
              BYTE zero_scale(BYTE,BYTE)
              DOUBLE find_weight(BYTE, STRING, BYTE)
              int prt_ready()
              BYTE check_sum(STRING)
   LONG exp_net(LONG, INT)
       end linkDLL "credcard.dll"
              int MCRInit(INT)
   int MCRClear()
              int MCRDataReady()
              int MCRGetData(STRING, STRING)
```

```
                int CCInit(INT, INT, INT, STRING,STRING,STRING)
                int CCParseTrack1( STRING, STRING, STRING, STRING, STRING)
        int CCVerify(STRING)
                int CCApprove(STRING, STRING, STRING, STRING, STRING)
                int CCSave(STRING, STRING, STRING, STRING, STRING)
                int CCCapture()
    int CCSendFile(STRING, STRING)
        end linkDLL "meterdrv.dll"
                int stamp_strip_print(STRING)
                int stamp_on_letter(STRING)
                int set_meter_date(STRING)
                int ReadAscendingRegister(STRING)
                int ReadDescendingRegister(STRING)
                int AddMoneyToMeter(STRING, STRING)
                INT InitMeterComm(INT)
        end linkDLL "billdrv.dll"
        INT BAStateChanged()
                INT BAAcceptEnable(POINTER)
                INT BAStackBill(POINTER)
                INT BAAcceptDisable(POINTER)
                INT BACheckState(BYTE)
                INT BACheckStacker(BYTE)
                INT BACheckBillValue(BYTE)
        end --      linkDLL "rcptdrv.dll"
--              int printReceiptLine(STRING)
--      end --      linkDLL "z4ctoolb.dll"
--          int z4toolbook(STRING, STRING, STRING, STRING,STRING, STRING, STRING,
STRING)
--      end
    linkdll "user"
                word findWindow(string,dword)
                word setActiveWindow(word)
            INT moveWindow(WORD, INT, INT, INT, INT, WORD)
            word getWindowWord(word,int)
            dword getWindowlong(word,int)       -- (hwnd,nIndex)
                dword setWindowlong(word,int,dword)   -- (hwnd,nIndex,wNewWord)
                int getWindowRect(word,pointer)
                word createWindow(string,string,dword,int,int,int,int,word,word,word,pointer)
--      word createWindow(string,string,dword,word,word,word,word,word,word,word,pointer)
                int showWindow(word,int)
                INT DestroyWindow(WORD)
    INT KillTimer(INT, INT)
    INT SetTimer(INT, INT, WORD, DWORD)
    int bringWindowToTop(WORD)
    int showCursor(int)
                INT PeekMessage(POINTER,WORD,WORD,WORD,WORD)
                INT exitWindows(DWORD,WORD)
        end linkdll
```

```
linkDll "tbkfile.dll"
  INT fileExists(STRING)
  INT copyFile(STRING, STRING)
end linkDLL "tbkwin.dll"
         STRING screenFromPage (WORD, STRING, INT, STRING)
         STRING clientFromPage (STRING, INT, STRING)
            int yieldapp()
            INT xPixelsFromUnits(INT,INT)
            INT xUnitsFromPixels(INT,INT)
            INT yPixelsFromUnits(INT,INT)
            INT yUnitsFromPixels(INT,INT)
      end
--    if sysError is not null then
--       put false into DVICAP
--    else
         put TRUE into DVICAP
--    end if linkdll "kernel"
         word globalAlloc(word,dword)
         pointer globalLock(word)
         word globalUnlock(word)
         word globalFree(word)
      end linkdll
      linkdll "tbkdlg.dll"
         string dialog(string,string)
         string opendlg(string,string,string,string)
         string setValue(string, string, string)
         string getValue(string, string)
      end linkdll linkdll "TBKDB3.DLL"
      INT closeAllDBFiles()
      INT createDBIndexFile(STRING, STRING, WORD, WORD)
      INT deleteDBFile(STRING)
      INT findDBKey(STRING)
      INT firstDBKey()
      INT firstDBRecord()
      STRING getDBDateFormat()
      STRING getDBErrorString(INT)
      STRING getDBFieldValue(STRING)
      INT getDBKeyType()
      STRING getDBKeyValue()
      INT getDBNavigateToDeleted()
      LONG getDBRecordCount()
      INT getDBRecordDeleted()
      LONG getDBRecordNumber()
      INT gotoDBRecord(DWORD)
      INT lastDBKey()
      INT lastDBRecord()
      INT nextDBKey()
      INT nextDBRecord()
      INT openDBFile(STRING)
      INT openDBIndexFile(STRING)
```

```
            INT packDBFile()
            INT previousDBKey()
            INT previousDBRecord()
            INT reindexDBFile(STRING)
            INT removeDBRecords(DWORD, DWORD)
            INT selectDBIndexFile(STRING)
            INT setDBFieldValue(STRING, STRING)
        INT setDBNavigateToDeleted(INT)
            INT setDBRecordDeleted(WORD)
            INT writeDBRecord(DWORD)
        end linkdll translateWindowMessage
    after 275 send WM_TIMER
end put "paused" into VIDEO_READY
put false into REPEAT_VIDEO get tbkmci("open c:\pielect\backgrnd.avs alias bille", "")

set sysSuspend to true
        send lockIt
        put "locked" into MYSTATE
    send getLocationParameters
        set sysTimeFormat to "seconds"
        set sysLockScreen to false
    send creditCardInitialize
    send modemInitialize
    send getMeterBalance
    put sysWindowHandle into mainWinHandle
    get InitMeterComm(mainWinHandle)
end
```

---
--                  Function to initiate shutdown
--
---

```
to handle leavebook
        set suspend to syssuspend
        set syssuspend to false
        get tbkmci("close AVSFile","")
        unlinkDLL "tbkwin.dll"
        unlinkDLL "kernel.dll"
        unlinkDLL "tbkdlg.dll"
        unlinkDLL "zipfunct.dll"
        unlinkDLL "credcard.dll"
        unlinkDLL "zipcard.dll"
        unlinkDLL "meterdrv.dll"
        unlinkDLL "billdrv.dll"
        unlinkDLL "user"
--   unlinkDLL "rptdrv.dll"
        set syssuspend to suspend
        show menubar
        restore system
end
```

```
to handle buttonDown
  if "button" is in target or "field" is in target then
    put the fillcolor of the target into temp
    set the fillcolor of the target to magenta
    pause 20 ticks
    set the fillcolor of the target to temp
    beep 1
  end if
end to handle StartVideoTimer end
to handle finisTranslation
end to handle RepeatingVideoTimeout end
```

-- 
--         Function to get location parameters and system settings
--

```
to handle getLocationParameters
  system
MACHINE_NUMBER,LOCATION_NAME,LOC_STREET_ADDRESS,LOC_CITY,LOC_STATE
  system LOC_ZIPCODE,PAYMENT_TYPE,FIRSTCLASS_MARKUP,CERTIFIED_MARKUP
  system
INTERNATIONAL_MARKUP,EXPRESS_MARKUP,PRIORITY_MARKUP,PARCEL_MARKUP
  system
PICKUP_TIME,FIRST_PHONE,SECOND_PHONE,MERCHANT_ID,FILE_TRANSFER_TIME
  system DAY_OF_FILE_TRANSFER,HOST_MODEM_NUMBER,CARD_PROCESSING_FEE,\
       STAMP_BOOK_PRICE,STAMP_BOOK_CHARGE,MIN_METER_BALANCE,\
       TMS_METER_AMOUNT,CRED_SEND_DATE get openDBFile("c:\pielect\uspsfile.dbf")
  get firstDBRecord()
  put getDbFieldValue("SERIALNUM") into MACHINE_NUMBER
  put getDbFieldValue("COMPNAME") into LOCATION_NAME
  put getDbFieldValue("STREET1") into LOC_STREET_ADDRESS
  put getDbFieldValue("CITYNAME") into LOC_CITY
  put getDbFieldValue("STATE") into LOC_STATE
  put getDbFieldValue("PARMZIP") into LOC_ZIPCODE
  put getDbFieldValue("PMT_TYPE") into PAYMENT_TYPE
  put getDbFieldValue("LTR_MU") into FIRSTCLASS_MARKUP
  put getDbFieldValue("CERT_MU") into CERTIFIED_MARKUP
  put getDbFieldValue("INTNL_MU") into INTERNATIONAL_MARKUP
  put getDbFieldValue("USPSEXP_MU") into EXPRESS_MARKUP
  put getDbFieldValue("USPSPRI_MU") into PRIORITY_MARKUP
  put getDbFieldValue("USPS4TH_MU") into PARCEL_MARKUP
  put getDbFieldValue("LASTTIME") into PICKUP_TIME
  put getDbFieldValue("FST_PHONE") into FIRST_PHONE
  put getDbFieldValue("SND_PHONE") into SECOND_PHONE
  put getDbFieldValue("MERCH_ID") into MERCHANT_ID
  put getDbFieldValue("TRANS_TIME") into FILE_TRANSFER_TIME
  put getDbFieldValue("TRANS_DAY") into DAY_OF_FILE_TRANSFER
```

```
        put getDbFieldValue("HOSTPHONE") into HOST_MODEM_NUMBER
        put getDbFieldValue("STAMPPRICE") into STAMP_BOOK_PRICE
        put getDbFieldValue("STAMPCHRG") into STAMP_BOOK_CHARGE
        put getDbFieldValue("MIN_METER") into MIN_METER_BALANCE
        put getDbFieldValue("TMS_METER") into TMS_METER_AMOUNT
        put getDbFieldValue("CRED_DATE") into CRED_SEND_DATE
            get closeAllDBFiles()
            put 0.0 into CARD_PROCESSING_FEE
end to get IsLeapYear y
    if (y mod 4 = 0 and y mod 100 <> 0) or (y mod 400 = 0)
        return TRUE
    end
    return FALSE
end to get DayOfTheWeek d, m, y  -- SUN to SAT -> 1 to 7
    local mFactor if IsLeapYear(y)
        set mFactor to "034025036146"
    else
        set mFactor to "144025036146"
    end if
    clear chars 1 to 2 of y
    get (y + (y div 4) + character m of mFactor + d) mod  
    if it is 0
        return 7
    end
    return it
end to get next_pick_up_date
    set sysDateFormat to "m,d,y"
    put sysDate into nextPickupDate
    do
      format date nextPickupDate as "seconds" from "m,d,y"
      increment nextPickupDate by 86400
      format date nextPickupDate as "m,d,y" from "seconds"
      put is_holiday(nextPickupDate) into holiday
      put is_sunday(nextPickupDate) into sunday
    until ( (holiday = 0) and (sunday <> 1) )
    return nextPickupDate   -- as "m,d,y"
end to get is_holiday theDay
   get openDBFile("c:\pielect\holiday.dbf")
   get openDBIndexFile("c:\pielect\holiday.ndx")
   format date theDay as "m/d/yy" from "m,d,y"
        put findDBKey(theDay) into keyFound
   get closeAllDBFiles()
        if (keyFound = 1)
            return 1  -- a holiday
        else
            return 0  -- not a holiday
```

```
        end if
end to get is_sunday theDay
    set currM to item 1 of theDay
    set currD to item 2 of theDay
    set currY to item 3 of theDay
    put DayOfTheWeek(currD, currM, currY) into daynumber
    return daynumber  -- 1 -> sunday
end to get strWeekDayName n
        return item n of "Sun,Mon,Tue,Wed,Thu,Fri,Sat"
end to handle creditCardInitialize
    system COMPORT
    if (MCRInit(COMPORT) <> 0) then
        send post_error "1","Unable to Initialize Credit Card Reader"
    end if
end --_____
--       Function to close package door after verifying the weight and machine full condition
--_____
to get TakePackage
  system DOOR_OPENED
  if DOOR_OPENED = true then
        if sysLevel is reader then
           put false into DOOR_OPENED
           get reset_motor(2)  -- close package door
        end if
  end if
  -- Drop the package by tilting the package dump
  get write_output(5, 0, 0)
  get write_output(6, 1, 0)
  pause 5 seconds
  get read_input(16)
  if it is 1 then  -- machine full
    system PACKAGE_SIDE_FULL
    put true into PACKAGE_SIDE_FULL
    return 0
  end if
  get write_output(6, 0, 0)
  get write_output(5, 1, 0)
  return 0
end --_____
--       Function to check the stationary in the machine
--_____
to get check_stationery
    get openDBFile("c:\pielect\counters.dbf")
    put getDbFieldValue("METERSTRIP") into num_strips
    put getDbFieldValue("RCT_COUNT") into num_receipts
    put getDbFieldValue("LBL_COUNT") into num_labels
```

```
        get closeAllDBFiles()
        if (num_strips = 0) then
            return 1
        end if
        if (num_receipts = 0) then
            return 2
        end if
        if (num_labels = 0) then
            return 3
        end if
        return 0
end to handle updateReceiptCounter pagesPrinted
    get openDBFile("c:\pielect\counters.dbf")
    put getDbFieldValue("RCT_COUNT") into num_receipts
    get setDbFieldValue("RCT_COUNT",(num_receipts-pagesPrinted))
    get writeDBrecord(1)
    get closeAllDBFiles()
end to handle updateMeterStrips
    get openDBFile("c:\pielect\counters.dbf")
    put getDbFieldValue("METERSTRIP") into num_strips
    get setDbFieldValue("METERSTRIP",(num_strips-1))
    get writeDBrecord(1)
    get closeAllDBFiles()
end
```

---
-- Function to find the meter balance
---

```
to handle getMeterBalance
    system METER_BALANCE
    put "      " into descend_register
    put ReadDescendingRegister(descend_register) into meter_status
    if (meter_status >0) then
        put 0 into METER_BALANCE
        send post_error "1","Postage Meter Failed To Initialize"
    else
        put descend_register into METER_BALANCE
    end if
end to handle post_error pageBackFromError,error_message
    system variable BACK_FROM_ERROR
    set sysHistoryRecord to false
    put pageBackFromError into BACK_FROM_ERROR
    set sysHistoryRecord to false
    pause 30
    go to page "error message"
    put error_message into the text of field "error message"
end
```

---
-- Function to do automated TMS money transfer
---

```
to get maintain_meter_account backFromErrorMessage
   system METER_BALANCE,TMS_METER_AMOUNT
   put "     " into descend_register
   put "     " into TmsAmount
   put TMS_METER_AMOUNT into TmsAmount
   show field "Adding More Money"
   put AddMoneyToMeter(TmsAmount, descend_register) into money_status
   hide field "Adding More Money"
   if (money_status >0) then
      put "Postage Meter Malfunction During Money Transfer" &\
         CRLF & "Error #:" & money_status into errorMsg
      send post_error backFromErrorMessage,errorMsg
      return 0
   else
      put descend_register into METER_BALANCE
      return 1
   end if
end --
--         Function to initialize modem for information transfer
--
to handle modemInitialize
   system FIRST_PHONE,SECOND_PHONE,MERCHANT_ID if (CCInit(3, 1200, 1, FIRST_PHONE, SECOND_PHONE, MERCHANT_ID) <> 0) then
      send post_error "1","Unable to Initialize Modem For Credit Card Use"
   end if
end --
--         Function to credit card usage summery batch transfer
--
to get updateCaptureFile
   system
CREDCARD_BALANCE,TRACK2DATA,BACK_FROM_ERROR,APROVAL_CODE,CC_ERROR
,\

CC_MESSAGE,CREDIT_TRANS_LIMIT,CARD_PROCESSING_FEE,CARD_AMOUNT_USED
   put (CARD_AMOUNT_USED + CREDIT_TRANS_LIMIT + CARD_PROCESSING_FEE -
CREDCARD_BALANCE) into amount put sysnumberformat into originalFormat
   set sysnumberformat to "##0.00"
   format amount as sysnumberformat
   set sysnumberformat to originalFormat if (CCSave( TRACK2DATA, amount, APROVAL_CODE, CC_ERROR, CC_MESSAGE ) <> 0)
then
      return 0   -- failure
   else
      return 1   -- success
   end if
end
```

```
to handle writeZipcardBalance
  system ZIPCARD_BALANCE
  put sysnumberformat into originalFormat
  put ZIPCARD_BALANCE*1000 into balance
  set sysnumberformat to "000000"
  format balance as sysnumberformat
  set sysnumberformat to originalFormat
  if ( write_balance (balance) = 0)
    if ( write_balance (balance) = 0)
--     get eject_card()
--     send post_error "1","Unable to write balance on Zipster Card"
--     break giveCard
    end if
  end if
end --
--         Function to rotate the postage meter from leter to package position
--
to get meterToPackagePosition
  system PACKAGE_POS_METER
  put true into PACKAGE_POS_METER
  get read_input(10)  -- check package position micro switch
  if i. is 1 then -- not n package position
    get write_output(8, 0, 0) -- move the meter assembly back
    put 0 into loopCount
    while (read_input(11) <> 0) -- wait until translation micro switch is hit
      get yieldApp()
      increment loopCount
      if loopCount = 5500
        return 1
      end if
    end while
    get reset_motor(3) -- move meter to package position
    put 0 into loopCount
    while (read_input(10) <> 0) -- wait until package position reached
      get yieldApp()
      increment loopCount
      if loopCount = 5500
        return 2
      end if
    end while
    if read_input(14) is 1 then -- no meter strips available
      return 2
    end if
    get write_output(8, 1, 0) -- move the meter assembly to the front
  end if
  if read_input(14) is 1 then -- no meter strips available
    return 2
  else
    return 0
  end if
end
```

```
--           to rotate meter from package to letter position
--
to get meterToLetterPosition
  system PACKAGE_POS_METER
  if PACKAGE_POS_METER is true
    put false into PACKAGE_POS_METER
    get read_input(9) -- check letter position micro switch
    if it is 1 then -- not in letter position
      get write_output(8, 0, 0) -- move the meter assembly back
      put 0 into loopCount
      while (read_input(11) <> 0) -- wait until translation micro switch is hit
        get yieldApp()
        increment loopCount
        if loopCount = 5500
          return 1
        end if
      end while
      get reset_motor(1) -- move meter o letter position
--    get move_sm(1, 10200, 1, 60, 10 1, 0) -- move meter to letter position
      put 0 into loopCount
      while (read_input(9) <> 0) -- wait until letter position reached
        get yieldApp()
        increment loopCount
        if loopCount = 5500
          return 2
        end if
      end while
--    get write_output(8, 1, 0) -- move the meter assembly to the front
    end if
  else
    get write_output(8, 0, 0) -- move the meter assembly back
  end if
  return 0
end --
--              Function to drop stamp books
--
to get dispenseStamp numBooks
  step i from 1 to numBooks
    if (read_input(13) = 0) -- out of stamps
      system STAMP_HOLDER_EMPTY
      put true into STAMP_HOLDER_EMPTY
    end if
    get write_output(7, 1, 0) -- drop stamp hold gate
    pause 50 ticks
    put 0 into loopCount
    while (read_input(12) <> 0) -- wait until stamp is dispensed
--    get yieldApp()
      increment loopCount
      if loopCount = 5500
        get write_output(7, 0, 0) -- raise stamp hold gate
        return 1
      end if
    end while
    get write_output(7, 0, 0) -- raise stamp hold gate
```

```
    pause 2 seconds
    end step
    return 0
end
```

---
--         Script of front welcome page
---

```
to handle enterPage
system REPEAT_VIDEO, DOOR_OPENED,CARD_INSIDE,MULTIPLE_PACKAGES
put the uniqueName of this page into sysHistory
set sysHistoryRecord to true
put true into REPEAT_VIDEO
put false into MULTIPLE_PACKAGES
if DOOR_OPENED = true then
        if sysLevel is reader then
            put false into DOOR_OPENED
            get reset_Tmotor(2)  -- close package door
        end if
end if
if meterToLette:Position() <> 0
   send post_error "1","The machine is temporarily out of order (meter rotation failed)."
end if
send checkMachineFull
send checkStampEmpty
send StartVideoTimer
end to handle leavePage
system FIRST_LETTER,FIRST_PACKAGE
put true into FIRST_LETTER
put true into FIRST_PACKAGE
get KillTimer(sysWindowHandle, 10112)
show group "go back" of this background
show group "stop" of this background
forward
end
```

---
--         function to play different help videos and commercials during the idle time
---

```
to handle RepeatingVideoTimeout
  system COMERCIAL,METER_BALANCE,MIN_METER_BALANCE
  --MIN_METER_BALANCE = 200000  -> $200
  get meter_date_change()
  get InformationTransfer()
  if (METER_BALANCE > MIN_METER_BALANCE) then -- meter balance greater than
MIN_METER_BALANCE
        system vidFileToPlay
    conditions
      when COMERCIAL = 1
        put 2 into COMERCIAL
        put "d:\pielect\firstcls.avs" into vidFileToPlay
      when COMERCIAL = 2
        put 3 into COMERCIAL
        put "d:\pielect\package.avs" into vidFileToPlay
```

```
    when COMERCIAL = 3
      put 1 into COMERCIAL
      put "d:\pietect\stamcash.avs" into vidFileToPlay
  end conditions
  send buttonUp to rectangle "dvi"  -- play the corresponding video file
  else
    get maintain_meter_account("1")
  end if
end to handle StartVideoTimer
  get KillTimeout(sysWindowHandle,10111)
  get SetTimer(sysWindowHandle, 10112, 3000, 0)
end to handle shortTimeOut
  get KillTimeout(sysWindowHandle,10111)
end to handle idle
  get killTimeout(sysWindowHandle,10 11)
  forward
end
```

--
--           Function t i change meter rate after pickup time
--

```
to get meter_date_change
  system METER_DATE_CHANGED,PICKUP_TIME

-- checking for pick-up time
  set sysTimeFormat to "hh24min"
  put sysTime into currentTime
  if( (currentTime > 0001) and (currentTime < PICKUP_TIME) )then
    put false into METER_DATE_CHANGED
  end if
  if( (currentTime > PICKUP_TIME) and (METER_DATE_CHANGED = false) )then
    put next_pick_up_date() into nextDate
    format date nextdate as "yymmdd" from "m,d,y"
    put set_meter_date(nextdate) into date_status
    if (date_status >0) then
      return 0
--     send post_error "1","Postage Meter Malfunction during date change"
    else
      put true into METER_DATE_CHANGED
      return 1
    end if
  end if
  return 1
end to handle check_supplies
  if (check_stationery() > 0) then
    send post_error "1","Paper supplies need to be restocked."
  end if
```

```
end

--
--        Function to transfer transaction information every week
--
to get InformationTransfer
  system FILE_TRANSFER_TIME,FILES_TRANSFERED,DAY_OF_FILE_TRANSFER,INVOICE_TRANSFERED set sysTimeFormat to "hh24min"
  put sysTime into currentTime
  if (currentTime > 2000) then
    put false into FILES_TRANSFERED
    put false into INVOICE_TRANSFERED
  end if
  if( (currentTime > FILE_TRANSFER_TIME) and\
      (currentTime < 2000) and (FILES_TRANSFERED = false) )then
    show field "Transfering Credit Files"
    step i from 1 to 5
      if (CreditInformationTransfer() = 0) then
        break step
      end if
    end step
    hide field "Transfering Credit Files"
    put true into FILES_TRANSFERED
  end if
    -- invoice transfer to host
  set sysDateFormat to "m,d,y"
  put sysDate into toDay
  set currM to item 1 of toDay
  set currD to item 2 of toDay
  set currY to item 3 of toDay
  put DayOfTheWeek(currD, currM, currY) into daynumber
  if (daynumber = DAY_OF_FILE_TRANSFER) then
    if( (currentTime > FILE_TRANSFER_TIME) and\
        (currentTime < 2000) and (INVOICE_TRANSFERED = false) )then
      show field "Transfering Data Files"
      step i from 1 to 5
        if (InvoiceInformationTransfer() = 0) then
          break step
        end if
      end step
      hide field "Transfering Data Files"
      put true into INVOICE_TRANSFERED
    end if
  end if
  return 0
end --
--        Function to transfer credit card usage summery batch file
--
to get CreditInformationTransfer
  system FILES_TRANSFERED,CRED_SEND_DATE
```

```
    if (CCCapture() <> 0) then
      return 1
--     send post_error "1","Failed to send Credit Card Information for Yesterday."
    else
      put true into FILES_TRANSFERED
            -- Update credit send date field
      set sysDateFormat to "m,d,y"
      put sysDate into today
      set CRED_SEND_DATE to item 2 of toDay
            get openDBFile("c:\pielect\uspsfile.dbf")
      get firstDBRecord()
      get setDbFieldValue("CRED_DATE",CRED_SEND_DATE)
      get writeDBrecord(1)
      get closeAllDBFiles()
    end if
    return 0
end
```

---
--        Function for invoice information transfer
--
---

```
to get InvoiceInformationTransfer
  system HOST_MODEM_NUMBER,MACHINE_NUMBER,INVOICE_TRANSFERED put "c:\pielect\po_" & chars 3 to 6 of MACHINE_NUMBER & ".dbf" into dataToHost
  get copyFile("sendmail.dbf", dataToHost)
  if (CCSendFile(dataToHost, HOST_MODEM_NUMBER) <> 0) then
    return 1
--     send post_error "1","Failed to send Invoice Information for last week."
  else
    get copyFile("sendmail.sav", "sendmail.dbf")
    put true into INVOICE_TRANSFERED
  end if
  return 0
end
```

---
--        Function to check machine full condition
--
---

```
to handle checkMachineFull
  if (read_input(16) = 0) then    -- package side not full
    system PACKAGE_SIDE_FULL
    if PACKAGE_SIDE_FULL is true
      put false into PACKAGE_SIDE_FULL
      get write_output(6, 0, 0)
      get write_output(5, 1, 0)
    end if
  end if
end to handle checkStampEmpty
  system STAMP_HOLDER_EMPTY
  if (read_input(13) = 0)  -- out of stamps
    put true into STAMP_HOLDER_EMPTY
  else
    put false into STAMP_HOLDER_EMPTY
```

```
end if
end

--dismiss the video window after it is played
to handle finishTranslation
        system s_vidHandle set sysCursor to 4
        untranslateAllwindowMessages for s_vidHandle
        get tbkMCI("close vidFile","")
        clear s_vidHandle
    hide rectangle "dvi"
    send StartVideoTimer
        set sysCursor to 1
end
```

---

--        Script of credit card swipe screen
---

```
to handle enterPage
  forward
  system NUM_TIMEOUTS
  put 0 into NUM_TIMEOUTS
  get MCRClear()
end --to handle shortTimeOut
-- send showDvi "c:\pielect\cr_dcard.avs"
--end to handle idle
  forward
  put MCRDataReady() into cardStatus
  if(cardStatus = 0) then
     hide field "Swiped Wrong"
     send takeCardTrackData
     break idle
  end if
  if (cardStatus = -2) then
     show field "Swiped Wrong"
  end if
  forward
  pause 40
end
```

---

-- Function to check the credit card number and if good to initiate authorization process
---

```
to handle takeCardTrackData
   system TRACK1DATA,TRACK2DATA
   put "                              "into TRACK1DATA
   put "                              "into TRACK2DATA
   if (MCRGetData(TRACK1DATA, TRACK2DATA) <> 0) then
      send post_error "1","Unable to Read Credit Card Data"
   else
      if (CCVerify(TRACK2DATA) <> 0) then
```

```
        send post_error "1","The Card is expired. Please try another card"
      else
        system CREDCARD_SWIPED,FIRST_CRED_TRANS
        put true into CREDCARD_SWIPED
        put true into FIRST_CRED_TRANS
        send getCreditCardApproval to the page "Credit card read"
      end if
    end if
end --
--           Function to get credit card approval
--
to handle getCreditCardApproval
  system
CREDCARD_BALANCE,TRACK2DATA,BACK_FROM_ERROR,APROVAL_CODE,CC_ERROR
,CC_MESSAGE
  system
CREDCARD_APPROVED,CREDIT_TRANS_LIMIT,CARD_AMOUNT_USED,MERCHANT_ID
  put CREDIT_TRANS_LIMIT into CREDCARD_BALANCE
  put 0 into CARD_AMOUNT_USED
  put "    " into APROVAL_CODE
  put "   " into CC_ERROR
  put "          " into CC_MESSAGE
  put 32000 into CREDCARD_APPROVED
  show field "Getting Approval"
  put CCApprove(TRACK2DATA,CREDCARD_BALANCE,APROVAL_CODE, CC_ERROR,
CC_MESSAGE ) into CREDCARD_APPROVED
  if char 1 of MERCHANT_ID is "D"
    put 0 into CREDCARD_APPROVED
  else
    if (CREDCARD_APPROVED <> 0) then -- second trial
      put CCApprove(TRACK2DATA,CREDCARD_BALANCE,APROVAL_CODE, CC_ERROR,
CC_MESSAGE ) into CREDCARD_APPROVED
      if (CREDCARD_APPROVED <> 0) then -- third trial
        put CCApprove(TRACK2DATA,CREDCARD_BALANCE,APROVAL_CODE, CC_ERROR,
CC_MESSAGE ) into CREDCARD_APPROVED
      end if
    end if
  end if
  hide field "Getting Approval"
  if (CREDCARD_APPROVED <> 0) then -- failed third trial
    send post_error "1","Credit card authorization line is busy. Please try again"
  else
    send doSelectionAction
  end if
end to handle doSelectionAction
  go to page "service selection"
end to handle longTimeout
  system NUM_TIMEOUTS
  if NUM_TIMEOUTS < 2 then
    increment NUM_TIMEOUTS
```

```
    get SetTimer(SysWindowHandle, 10111, 60000, 0)
  else
    forward
  end if
end
--
--              Script of transaction type selection screen
--
to handle enterPage
forward
hide group "go back" of this background system
ARTICLE_TYPE,CARD_TRANSACTION,RATE_CATEGORY,LETTER_READY_TO_GO,\
    CERTIFIED_FEE,RETURN_RECEIPT_CHARGE,DEST_ZIPCODE,CERTIFIED_NUMBER,\
    NO_PICK_UP,PICKUP_TIME,PAYMENT_METHOD,ZIPCARD_BALANCE,LABEL_INDEX,\
    CERTIFIED_NUMBER,INSURANCE_AMOUNT,PACKAGE_SIDE_FULL,INQUIRY_ONLY,\
    STAMP_HOLDER_EMPTY"
put "FIRSTCLASS" into RATE_CATEGORY
put "    " into DEST_ZIPCODE
put "         " into CERTIFIED_NUMBER
put 0.00 into INSURANCE_AMOUNT
put 0.0 into CERTIFIED_FEE
put 0.0 into RETURN_RECEIPT_CHARGE
put "Letters" into ARTICLE_TYPE
put 0 into LABEL_INDEX
put "         " into CERTIFIED_NUMBER
put false into LETTER_READY_TO_GO if PACKAGE_SIDE_FULL is true
  show field "package side full"
end if
if STAMP_HOLDER_EMPTY is true
  show field "Stamp Holder Empty"
end if if (PAYMENT_METHOD <> 2) then
  hide group "Card Balance"
else
  show group "Card Balance"
  put sysnumberformat into originalFormat
  set sysnumberformat to "##0.00"
  put ZIPCARD_BALANCE into the text of field "Zipster Card Balance"
  format the text of field "Zipster Card Balance" as sysnumberformat
  set sysnumberformat to originalFormat
end if
-- checking for holiday or Sunday
set sysDateFormat to "m,d,y"
put sysDate into today
put is_holiday(today) into today_holiday
put is_sunday(today) into today_sunday -- checking for pick-up time
set sysTimeFormat to "hh24min"
if ( (sysTime > PICKUP_TIME) or\
    (today_holiday = 1) or (today_sunday = 1) )then
```

```
    put true into NO_PICK_UP
  else
    put false into NO_PICK_UP
  end if if sysLevel is reader then
    get init_scale()
  end if
end to handle leavePage
  forward
  hide field "package side full"
  hide field "Stamp Holder Empty"
  show group "go back" of this background
end to handle moveMeterToFront
  if meterToLetterPosition() <> 0
    send post_error "1","The machine is temporarily out of order (meter rotation failed)."
  else
    get write_output(8, 1, 0) -- move the meter assembly to the front
  end if
end to handle credCardNotSwiped
  go to page "Credit card read"
end
```

--
--           Script of package selection button
--

```
to handle ButtonDown
  forward
  system
ARTICLE_TYPE,FIRST_PACKAGE,DOOR_OPENED,NEXT_PLACE_TO_GO,NO_PICK_UP,\
INQUIRY_ONLY,CREDCARD_SWIPED,SCREEN_AFTER_VIDEO_HELP,TRANSACTION_TY
PE
  put "Packages" into ARTICLE_TYPE
  put "Express" into TRANSACTION_TYPE
  put false into DOOR_OPENED
  if INQUIRY_ONLY is false
    put meterToPackagePosition() into rotateStatus
    if rotateStatus = 1
      send post_error "service selection","The package side of the machine is temporarily out of order."
      break ButtonDown
    end if
    if rotateStatus = 2
      send post_error "service selection","The machine is temporarily out of meter strip to use on a package."
      break ButtonDown
    end if
  else
    put "Package Weighing" into SCREEN_AFTER_VIDEO_HELP
  end if
```

```
if FIRST_PACKAGE is true
  put "Package Weighing" into NEXT_PLACE_TO_GO
  if NO_PICK_UP is true then
    put "Next Pick-up Notice" into SCREEN_AFTER_VIDEO_HELP
  else
    put "Package Weighing" into SCREEN_AFTER_VIDEO_HELP
  end if
  go to page "Video Help Screen"
else
  put "Package Weighing" into SCREEN_AFTER_VIDEO_HELP
  go to page "Package Weighing"
end if
end
```

---
Script of letter selection button
---

```
to handle ButtonDown
forward
system TRANSACTION_TYPE,NEXT_PLACE_TO_GO,NO_PICK_UP,FIRST_FIRSTCLASS,\
    INQUIRY_ONLY,CREDCARD_SWIPED,SCREEN_AFTER_VIDEO_HELP put "Regular First Class" into TRANSACTION_TYPE
if INQUIRY_ONLY is false
  send moveMeterToFront
else
  put "Letter insertion" into SCREEN_AFTER_VIDEO_HELP
end if
if FIRST_FIRSTCLASS is true then
  put false into FIRST_FIRSTCLASS
  put "Letter insertion" into NEXT_PLACE_TO_GO
  if NO_PICK_UP is true then
    put "Next Pick-up Notice" into SCREEN_AFTER_VIDEO_HELP
  else
    put "Letter insertion" into SCREEN_AFTER_VIDEO_HELP
  end if
  go to page "Video Help Screen"
else
  put "Letter insertion" into SCREEN_AFTER_VIDEO_HELP
  go to page "Letter insertion"
end if
end
```

---
Script of international destination country selection screen
---

```
to handle enterPage
forward
system DEST_COUNTRY
put DEST_COUNTRY into the text of field "Destination Country"
put null into the text of field "Country List"
put "Country :" into the text of field "Entry Item"
get openDBFile("nations.dbf")
get openDBIndexFile("nations.ndx")
end
```

```
to handle ltrBtn
  put (name of target) after the text of field "Destination Country"
  if( matching_Country (the text of field "Destination Country",1) = 0)
    get matching_Country (the text of field "Destination Country",1)
  end if
end to handle eraseLtr
  if the text of field "Destination Country" is not null then
    clear the last character of the text of field "Destination Country"
  else
    put null into the text of field "Country List"
  end if
  if the text of field "Destination Country" is not null then
    get matching_Country (the text of field "Destination Country",-1)
  else
    put null into the text of field "Country List"
  end if
end to handle leavePage
  system DEST_COUNTRY,DEST_CITY
  get closeAllDBFiles()
  put null into the text of field "Destination Country"
end to get matching_country country,ErraseOrType
  put 0 into lineCount
  if country is not null then
    put null into the text of field "Country List"
    put charCount(country) into numCountryChars
        put findDBKey(country) into keyFound
        if (keyFound = 1) or (keyFound = 2) then -- a match
      put getDbFieldValue("COUNTRY") into tempCountry
      while (1 = 1)
        increment lineCount
        put tempCountry into textLine lineCount of the text of field "Country List"
        if (nextDBRecord() < 0)
          break while
        end if
        put getDbFieldValue("COUNTRY") into tempCountry
        if (chars 1 to numCountryChars of tempCountry <> country as text) then
          break while
        end if
      end while
    else
      clear the last character of the text of field "Destination Country"
    end if
    if (lineCount = 1)
      if (ErraseOrType = 1) Then
        system DEST_COUNTRY
        put textLine 1 of the text of field "Country List" into DEST_COUNTRY
        put DEST_COUNTRY into the text of field "Destination Country"
      end if
    end if
end if
```

```
return lineCount
end to handle takeDestinationCountry
  system DEST_COUNTRY,NATIONS_CODE,USPS_PKG_CHARGE,CUSTOMS_FORM_NEED
  if( matching_Country (the text of field "Destination Country", 1) = 1)
    put null into the text of field "Country List"
    put null into the text of field "Destination Country"
    get previousDBRecord()
    put getDbFieldValue("CITY_FILE") into NATIONS_CODE
    put getDbFieldValue("DOCUMENTS") into CUSTOMS_FORM_NEED
    put getDbFieldValue("RATE") into USPS_PKG_CHARGE
    if (NATIONS_CODE <> 0) then
      go to page "Destination City Selection"
    else
      go to page "International Pre-Processing"
    end if
  end if
end --
--        Script of international destination city selection screen
-- to handle enterPage
  forward
  system NATIONS_CODE,DEST_COUNTRY,DESTINATION_CODE,MAX_DESTINATION_LINES,CURRENT_DESTINATION_LINE
  put "Country:" & DEST_COUNTRY into the text of field "Country Name"
  send displayCityList
end to handle leavePage
  get closeAllDBFiles()
end to handle displayCityList
  system NATIONS_CODE
  put null into the text of field "Destination List"
  get openDBFile("cityfile.dbf")
  get openDBIndexFile("cityfile.ndx")
  put findDBKey(NATIONS_CODE) into keyFound
  if keyFound < 1 then -- not a match
    break
  else
    while true -- get all cities serviced
      put getDBFieldValue("CITY") after the text of field "Destination List"
      if( nextDBRecord() = -10) -- last record reached
        break while
      end if
      if getDBFieldValue("NATIONCODE") <> NATIONS_CODE
        break while
      end if
      put ", " after the text of field "Destination List"
    end while
  end if
```

```
end
--
--          Script of stamp book droping screen
--
to handle enterPage
  forward
  system FIRST_STAMP
  if FIRST_STAMP is true then
    put false into FIRST_STAMP
  end if
  hide group "go back" of this background
  system
CASH_SELECTED,STAMP_BOOK_PRICE,STAMP_BOOK_CHARGE,NUM_STAMP_BOOKS,\
     TOTAL_BILL_VALUE,SERVICE_CHARGE put "$ " & (STAMP_BOOK_PRICE*NUM_STAMP_BOOKS) into the text of field "subtotal"
  if CASH_SELECTED is true
    put "$ " & TOTAL_BILL_VALUE into the text of field "total"
    put (TOTAL_BILL_VALUE - (STAMP_BOOK_PRICE*NUM_STAMP_BOOKS)) into
SERVICE_CHARGE
  else
    system
CREDCARD_USED,CREDCARD_BALANCE,CREDCARD_APPROVED,CREDIT_TRANS_LIMI
T,\
     TRACK2DATA,APROVAL_CODE,CC_ERROR,CC_MESSAGE,CARD_AMOUNT_USED
    put "$ " & (STAMP_BOOK_CHARGE*NUM_STAMP_BOOKS) into the text of field "total"
    put ((STAMP_BOOK_CHARGE - STAMP_BOOK_PRICE)*NUM_STAMP_BOOKS) into
SERVICE_CHARGE
    put (STAMP_BOOK_CHARGE*NUM_STAMP_BOOKS) into total
    while (CREDCARD_APPROVED = 32000)
      show field "Getting Approval"
      pause 40
    end while
    hide field "Getting Approval"

if (CREDCARD_APPROVED <> 0) then  -- approval denied
      send post_error "Printing Receipt","Credit Card Approval Denied"
      break to system
    else  -- approved
      if CREDCARD_BALANCE < total then
        show field "Getting Approval"
        increment CARD_AMOUNT_USED by (CREDIT_TRANS_LIMIT -
CREDCARD_BALANCE)
        put CREDIT_TRANS_LIMIT into CREDCARD_BALANCE
        put CCApprove(TRACK2DATA,CREDCARD_BALANCE,APROVAL_CODE, CC_ERROR,\
             CC_MESSAGE ) into AproveStatus
        if (AproveStatus <> 0) then  -- second trial
          put CCApprove(TRACK2DATA,CREDCARD_BALANCE,APROVAL_CODE,
CC_ERROR, CC_MESSAGE ) into AproveStatus
        end if
        hide field "Getting Approval"
        if (AproveStatus <> 0) then
          send post_error "Printing Receipt","Credit card authorization line is busy. Please try
again"
          break to system
        end if
```

```
      end if
    end if
    put true into CREDCARD_USED
    put CREDCARD_BALANCE - total into CREDCARD_BALANCE
  end if if sysLevel is reader then
    if ( dispenseStamp(NUM_STAMP_BOOKS) = 0)
      send updateReceipt to page "Receipt"
    else
      send post_error "Printing Receipt","The machine is temporarily out of stamp books"
      break enterPage
    end if
    if CASH_SELECTED is true
      go to page "Want Receipt"
    else
      go to page "More Transactions"
    end if
  end if
end to handle leavePage
  forward
  show group "go back" of this background
end
```

---
Script of dollar bill acceptance screen
---

```
to handle enterPage
  forward
  hide group "go back" of this background
  system TOTAL_BILL_VALUE
  put TOTAL_BILL_VALUE into the text of field "total"
  format the text of field "Total" as "$##0.00"
  set gmem to globalAlloc(0,136)
  system statusString
  if gmem = 0
    request "Not enough global memory"
    break to system
  end if
  set statusString to globalLock(gmem)
  step i from 1 to 4
    if (BAAcceptEnable(statusString) = 1) -- good message received
      set Byte2 to pointerByte(1,statusString)
      if (BACheckStacker(Byte2) = 4)
        get GlobalUnlock(gmem)
        get GlobalFree(gmem)
        break enterPage
      end if
    end if
  end step get GlobalUnlock(gmem)
  get GlobalFree(gmem)
  send post_error "Printing Receipt","The bill acceptor is temporarily out of order"
end
```

```
to handle idle
  system statusString,TOTAL_BILL_VALUE,STAMP_BOOK_CHARGE,NUM_STAMP_BOOKS set gmem to globalAlloc(0,136)
  if gmem = 0
    request "Not enough global memory"
    break to system
  end if
  set statusString to globalLock(gmem)
  put BAStateChanged() into statusRet
  if statusRet = 2
    get BAStackBill(statusString)
    set Byte1 to pointerByte(0,statusString)
    set Byte2 to pointerByte(1,statusString)
    set Byte3 to pointerByte(2,statusString)
    if (BACheckState(Byte1) = 4) -- bill stacked
      put BACheckStacker(Byte2) into retValue
      if (retValue = 4) -- lockable cassette present and not full
        put BACheckBillValue(Byte3) into currentBillValue
        if (currentBillValue > 0) and (currentBillValue<=20)
          increment TOTAL_BILL_VALUE by currentBillValue
          put TOTAL_BILL_VALUE into the text of field "total"
          format the text of field "Total" as "$##0.00"
          if (TOTAL_BILL_VALUE >= (STAMP_BOOK_CHARGE*NUM_STAMP_BOOKS))
            go to page "Droping Stamp Books"
            break to system
          end if
        end if
      end if
    end if
  end if
  get GlobalUnlock(gmem)
  get GlobalFree(gmem)
end to handle leavePage
  forward
  show group "go back" of this background
  set gmem to globalAlloc(0,136)
  system statusString
  if gmem = 0
    request "Not enough global memory"
    break to system
  end if
  set statusString to globalLock(gmem)

step i from 1 to 4
    if (BAAcceptDisable(statusString) = 1) -- good message received
--    set Byte2 to pointerByte(1,statusString)
--    if (BACheckStacker(Byte2) = 4)
      get GlobalUnlock(gmem)
      get GlobalFree(gmem)
      break leavePage
--    end if
```

```
    end if
  end step get GlobalUnlock(gmem)
  get GlobalFree(gmem)
  send post_error "Printing Receipt","The bill acceptor is temporarily out of order"
end
```

---
--        Script of holiday warning screen
---

```
to handle enterPage
  system PICKUP_TIME
  forward
  -- checking for holiday or Sunday
  set sysDateFormat to "m,d,y"
  put sysDate in o today
  put is_holiday(today) nto today_holiday
  put is_sunday(today) nto today_sunday put PICKUP_TIME into nextPickupTime
  format time nextPickupTime as "h:min AMPM" from "hh24min"
  put nextPickupTime into the text of field "pick-up time"
  put next_pick_up_date() into nextDate
  put is_sunday(nextDate) into daynum
  format date nextdate as "m/d/y" from "m,d,y"
  put strWeekDayName(daynum) & " " & nextdate into the text of field "pick-up date"
  if (today_holiday = 1) then
    show field "pick-up holiday"
    hide field "pick-up done"
  end if
  if (today_sunday = 1) then
    show field "pick-up sunday"
    hide field "pick-up done"
  end if
end to handle leavePage
  hide field "pick-up sunday"
  hide field "pick-up holiday"
  show field "pick-up done"
end
```

---
--        Script of certified number entry screen
---

```
to handle enterPage
  forward
  system ARTICLE_TYPE
  if ARTICLE_TYPE = "Letters" then
    hide group "go back" of this background
  end if
  system CERTIFIED_NUMBER,CERTIFIED_FEE
  put 1.00 into CERTIFIED_FEE
  if char 1 of CERTIFIED_NUMBER = "P" then
    clear chars 1 to 2 of CERTIFIED_NUMBER
  end if
```

```
    put CERTIFIED_NUMBER into the text of field "Certified Number"
end to handle leavePage
  forward
  show group "Cerified Letter"
  show group "go back" of this background
end
to handle ltrBtn
  system LABEL_INDEX,CERTIFIED_NUMBER
  if LABEL_INDEX > 10 then
    beep 1
    break to system
  end if
  increment LABEL_INDEX
  if LABEL_INDEX is in "4,8" then
   increment LABEL_INDEX
  end if
  put (name of target) into character LABEL_INDEX of CERTIFIED_NUMBER
  put CERTIFIED_NUMBER into the text of field "Certified Number"
end to handle eraseButton
  system LABEL_INDEX, CERTIFIED_NUMBER
  if LABEL_INDEX = 0 then
    beep 1
    break to system
  end if
  put " " into character LABEL_INDEX of CERTIFIED_NUMBER
  put CERTIFIED_NUMBER into the text of field "Certified Number"
  if LABEL_INDEX is in "5,9" then
   decrement LABEL_INDEX
  end if
  decrement LABEL_INDEX
end to handle EnterButton
  system LABEL_INDEX, CERTIFIED_NUMBER
  if LABEL_INDEX = 11 then
    put "P " before CERTIFIED_NUMBER
    go to page "Return Receipt Selection"
  end if
end to handle clearCertifiedNumber
  system LABEL_INDEX,CERTIFIED_NUMBER
  put 0 into LABEL_INDEX
  put "          " into CERTIFIED_NUMBER
end
--
--        Script of letter insertion screen
--
to handle enterPage
  forward
  system REPEAT_VIDEO,LETTER_STATE,FIRST_LETTER
  -- put true into REPEAT_VIDEO
```

```
put 3 into LETTER_STATE
if FIRST_LETTER is true then
  put false into FIRST_LETTER
  send zeroLetterScale
end if
end to handle zeroLetterScale
 local zeroCounter
 put 0 into zeroCounter
 if sysLevel is reader then
   show group "scale zeroing"
   while (1 = 1)
     increment zeroCounter
     if (zeroCounter > 15) then
       put zero_scale(1,1) into zero_status
     else
       put zero_scale(1,0) into zero_status
     end if
     if (zero_status = 0) then
       break while
     end if
     if (zero_status = 1) then
       hide group "scale zeroing"
       send post_error "1","The Scale is Temporarily out of order"
     end if
     if (zero_status = 2) then
       if (zeroCounter = 4 ) then
--       send showDvi "c:\project\clear_sl.avs" -- say clear the letter scale
       end if
     end if
   end while
   hide group "scale zeroing"
 end if
end to handle idle
  forward
  system LETTER_STATE
  put check_letter() into LETTER_STATE
  if LETTER_STATE = 0
    go to page "weighing"
    break idle
  end if
  pause 10 ticks
-- put sysTime into startTime
-- while sysTime - startTime < 50
--      set dummyVar to yieldApp()
-- end while
end to handle RepeatingVideoTimeout
  system LETTER_STATE
  conditions
    when LETTER_STATE = 0
     go to page "weighing"
```

```
    when LETTER_STATE = 1
--    send move_to_left
    when LETTER_STATE = 2
--    send move_to_front
    when LETTER_STATE = 3
--    send insert_letter
  end
end to handle move_to_left
  send showDvi "c:\pielect\to_left.avs"
end to handle move_to_front
  send showDvi "c:\pielect\to_front.avs"
end to handle insert_letter
  send showDvi "c:\pielect\ltr_ins.avs"
end to handle shortTimeout
-- send showDv. "c:\pielect\ltr_ins.avs"
end --
--        Script of letter charges display and approval screen
--
to handle enterPage
  forward
  system
TRANSACTION_TYPE,RATE_CATEGORY,ARTICLE_WEIGHT,FIRSTCLASS_MARKUP,\
  CERTIFIED_MARKUP,INTERNATIONAL_MARKUP,PAYMENT_METHOD,\
  INQUIRY_ONLY,STAMPING_ON_LETTER,SERVICE_CHARGE put false into STAMPING_ON_LETTER
  if TRANSACTION_TYPE <> "Certified Mail" then
    hide group "go back" of this background
  end if
  system CERTIFIED_FEE,RETURN_RECEIPT_CHARGE,WEIGHT_STRING
  put WEIGHT_STRING into the text of field "Weight Display"

put letterCharge(ARTICLE_WEIGHT,RATE_CATEGORY) into USPSpostage
  put sysnumberformat into originalFormat
  set sysnumberformat to "$##0.00"
  put (USPSpostage + CERTIFIED_FEE + RETURN_RECEIPT_CHARGE) into subtotal
  put subtotal into the text of field "Subtotal"
  format the text of field "Subtotal" as sysnumberformat
  conditions
    when TRANSACTION_TYPE = "Regular First Class"
      put (subtotal*FIRSTCLASS_MARKUP) into piMarkup
    when TRANSACTION_TYPE = "Certified Mail"
      put (subtotal*CERTIFIED_MARKUP) into piMarkup
    when TRANSACTION_TYPE = "International"
      put (subtotal*INTERNATIONAL_MARKUP) into piMarkup
    else
      put 0.0 into piMarkup
```

```
end conditions
if piMarkup > 5.0 then
   put 5.0 into piMarkup
end if format piMarkup as "0.00"
put piMarkup into SERVICE_CHARGE put (Subtotal + piMarkup) into the text of field "Total"
format the text of field "Total" as sysnumberformat
set sysnumberformat to originalFormat system REPEAT_VIDEO,LETTER_STATE
put true into REPEAT_VIDEO
put 3 into LETTER_STATE system
INQUIRY_ONLY,ZIPCARD_BALANCE PAYMENT_METHOD,CREDCARD_APPROVED
system CREDCARD_BALANCE,TRACK2DATA,BACK_FROM_ERROR,APROVAL_CODE,\
    CC_ERROR,CC_MESSAGE,CREDCARD_APPROVED,CREDCARD_USED,\
    CREDIT_TRANS_LIMIT,CARD_AMOUNT_USED if INQUIRY_ONLY = true then
   show button "Proceed"
else
   hide button "Proceed"
   put the text of field "Total" into total
   clear char 1 of total
   if PAYMENT_METHOD = 2 then -- Zipster Card
     if ZIPCARD_BALANCE < total then
        send post_error "Printing Receipt","Insufficient Balance On Your ZIPSTER Card"
        break to system
     end if
   end if
   if PAYMENT_METHOD = 3 then -- Credit Card
     while (CREDCARD_APPROVED = 32000)
        show field "Getting Approval"
        pause 40
     end while
     hide field "Getting Approval"

if (CREDCARD_APPROVED <> 0) then -- approval denied
        send post_error "Printing Receipt","Credit card authorization line is busy. Please try again"
        break to system
     else -- approved
       if CREDCARD_BALANCE < total then
         show field "Getting Approval"
         increment CARD_AMOUNT_USED by (CREDIT_TRANS_LIMIT -
CREDCARD_BALANCE)
--        get updateCaptureFile()
         put CREDIT_TRANS_LIMIT into CREDCARD_BALANCE
         put CCApprove(TRACK2DATA,CREDCARD_BALANCE,APROVAL_CODE, CC_ERROR,\
             CC_MESSAGE ) into AproveStatus
         if (AproveStatus <> 0) then -- second trial
```

```
        put CCApprove(TRACK2DATA,CREDCARD_BALANCE,APROVAL_CODE,
CC_ERROR, CC_MESSAGE ) into AproveStatus
      end if
      hide field "Getting Approval"
      if (AproveStatus <> 0) then
        send post_error "Printing Receipt","Credit Card Approval Denied"
        break to system
      end if
    end if
   end if
  end if
 end if
end to get letterCharge wght,dest
  get openDBFile("c:\pielect\ltr_rate.dbf")
  get firstDBRecord()
  while 1=1
    if (wght <= getDbFieldValue("OUNCES")) ther
      return getDbFieldValue(dest)
    else
      get nextDBRecord()
    end if
  end while
end to handle leavePage
  forward
  get closeAllDBFiles()
  show group help
  show group "go back" of this background
  show group "stop" of this background
end to handle idle
  system LETTER_STATE,STAMPING_ON_LETTER,INQUIRY_ONLY
  if INQUIRY_ONLY = false then
    if STAMPING_ON_LETTER is false
      put check_letter() into LETTER_STATE
      if LETTER_STATE = 0
        send stampLetterWithPostage
      end
    end if
  end if
  forward
end to handle RepeatingVideoTimeout
  system LETTER_STATE,STAMPING_ON_LETTER
  if STAMPING_ON_LETTER is false
    conditions
      when LETTER_STATE = 0
        send stampLetterWithPostage
      when LETTER_STATE = 1
        send move_tr_left
      when LETTER_STATE = 2
```

```
        send move_to_front
      when LETTER_STATE = 3
        send insert_letter
    end
  end if
end to handle move_to_left
-- send showDvi "c:\pielect\to_left.avs"
end to handle move_to_front
-- send showDvi "c:\pielect\to_front.avs"
end to handle insert_letter
- send showDvi "c:\pielect\lr_ins.avs"
end to handle StartVideoTimer
  get SetTimer(sysWindowHandle, 10112, 10000, 0)
end to handle shortTimeout
  send RepeatingVideoTimeout
end to handle stampLetterWithPostage
   system
METER_BALANCE,PAYMENT_METHOD,Z PCARD_BALANCE,CREDCARD_BALANCE,\
      STAMPING_ON_LETTER,TRANSACTION_TYPE
   put true into STAMPING_ON_LETTER
        put the text of field "Subtotal" into subtotal
        clear char 1 of subtotal
        put the text of field "total" into total
        clear char 1 of total
        put (subtotal * 100) into subtotal
   if METER_BALANCE < (subtotal*2)
    if (maintain_meter_account("Printing Receipt") = 0)
      break to system
    end if
   end if
        put sysnumberformat into originalFormat
   set sysnumberformat to "00000"
   format subtotal as sysnumberformat
   set sysnumberformat to originalFormat
   hide group help
   hide group "stop" of this background
   hide group "go back" of this background
        get stamp_on_letter(subtotal)
        put it into meter_status
--      get write_output(1, 0, 0) -- turn off postage meter
    conditions
      when meter_status = 0
        put METER_BALANCE - subtotal into METER_BALANCE
        if PAYMENT_METHOD = 3 then -- Credit Card
```

```
        put true into CREDCARD_USED
        put CREDCARD_BALANCE - total into CREDCARD_BALANCE
      end if
      send updateReceipt to page "Receipt"
      if TRANSACTION_TYPE = "Certified Mail"
        go to page "service selection"
      else
        go to page "Letter insertion"
      end if
    when meter_status = 3
      send post_error "Printing Receipt","Postage Meter Timed Out"
      break to system
    else
      send post_error "Printing Receipt","Postage Meter Malfunction"
      break to system
  end conditions
end
```

---

--        Script of package weighing screen
--

```
to handle idle
 forward
 if sysLevel is reader then
 -- send detectPackage
   send calculateWeight to page "weighing"
 end if
end to handle detectPackage
  put find_weight(2, wgt_string, 1. into pound_weight
  if pound_weight > 0.05 then  -- package is detected
    go to page "Weighing"
  end if
end to handle enterPage
 forward
 system DOOR_OPENED,FIRST_PACKAGE,LOOP_COUNT,INQUIRY_ONLY
 put 0 into LOOP_COUNT
 hide group "go back" of this background
 if FIRST_PACKAGE is true
   send zeroPackageScale
 end if if DOOR_OPENED is false then
   if (INQUIRY_ONLY is true) and (FIRST_PACKAGE is false)then
     put true into DOOR_OPENED
   else
     if sysLevel is reader then
       put true into DOOR_OPENED
         get write_output(2, 1, 0)  -- close door solinoid
         pause 30
       get move_sm(2, 755, 1, 5, 10, 1, 0)  -- open package door
     end if
   end if
 end if
```

```
if FIRST_PACKAGE is true
    put false into FIRST_PACKAGE
  end if
end to handle zeroPackageScale
  if sysLevel is reader then
    show group "scale zeroing"
    while (1 = 1)
      put zero_scale(2,0) into zero_status
      if (zero_status = 0) then
        break while
      end if
      if (zero_status = 1) then
        hide group "scale zeroing"
        send post_error "Printing Receipt","The Scale is Temporarily out of order"
      end if
    end while
    hide group "scale zeroing"
  end if
end to handle leavePage
  forward
  get write_output(2, 0, 0)  -- open door solinoid
end to handle shortTimeOut
-- send showDvi "c:\pielect\pkg_ins.avs"
end
```

---

Script of destination zipcode entry screen
---

```
to handle enterPage
  forward
  system ZIP_INDEX,DEST_ZIPCODE
  put 0 into ZIP_INDEX
  put "    " into DEST_ZIPCODE
  put DEST_ZIPCODE into the text of field "Destination Zipcode"
  get openDBFile("c:\pielect\zipfile.dbf")
  get openDBIndexFile("c:\pielect\zipfile.ndx")
end to handle ltrBtn
  system ZIP_INDEX,DEST_ZIPCODE
  if ZIP_INDEX = 0 then
    hide field "Invalid zipcode entered"
  end if
  if ZIP_INDEX = 5 then
    beep 1
    break to system
  end if
  increment ZIP_INDEX
  put (name of target) into character ZIP_INDEX of DEST_ZIPCODE
  put DEST_ZIPCODE into the text of field "Destination Zipcode"
end
```

```
to handle EraseButton
  system ZIP_INDEX, DEST_ZIPCODE
  if ZIP_INDEX = 0 then
    beep 1
    break to system
  end if
  put " " into character ZIP_INDEX of DEST_ZIPCODE
  put DEST_ZIPCODE into the text of field "Destination Zipcode"
  decrement ZIP_INDEX
end to handle EnterButton
  system ZIP_INDEX, DEST_ZIPCODE,ZIPCODE_ZONE
  if ZIP_INDEX = 5 then
        get zipCodeZone (DEST_ZIPCODE)
        if it = -1 then
      show field "Invalid zipcode entered"
          put 0 into ZIP_INDEX
      put "     " into DEST_ZIPCODE
          put DEST_ZIPCODE into the text of field "Destination Zipcode"
      else
          put it into ZIPCODE_ZONE
      go to page "Package Rate Shopping"
    end if
  end if
end to handle leavePage
 get closeAllDBFiles()
 show group "go back" of this background
end to get zipCodeZone zip
        put zip / 100 into zipCode
        put truncate(zipcode) into zipCode
        put sysnumberformat into originalFormat
        set sysnumberformat to "000"
        format zipCode as sysnumberformat
        set sysnumberformat to originalFormat
        put findDBKey(zipCode) into keyFound
        if keyFound <> 1 then -- not an exact match
            return -1
        else
            return getDBFieldValue("UPSZONE")
        end if
end
--
--          Script of package charges display screen
--
to handle enterPage
  forward
  system ZIPCODE_ZONE,WEIGHT_STRING,ARTICLE_WEIGHT,DEST_ZIPCODE,\
      DEST_ZIPCODE,PICKUP_TIME,TRANSACTION_TYPE,EXPRESS_MARKUP,\
      PRIORITY_MARKUP,PARCEL_MARKUP
  put WEIGHT_STRING into the text of field "Weight Display"
```

```
put ceiling(ARTICLE_WEIGHT) into pounds put sysnumberformat into originalFormat
set sysnumberformat to "$##0.00"

-- ******** Express Charge  *********
if ARTICLE_WEIGHT <= 0.5 then
    put 9.95 into uspsCharge
else -- normal express charges
    put findPostage(pounds,"EXPRESS") into uspsCharge
end if
put (uspsCharge*EXPRESS_MARKUP) into piMarkup
if piMarkup > 5.0 then
    put 5.0 into piMarkup
end if
put "$" && uspsCharge into the text of field "Express Charge"
put (uspsCharge + piMarkup) into the text of field "Full Express Charge"
format the text of field "Full Express Charge" as sysnumberformat -- ****** Priority Charge  ********
if ZIPCODE_ZONE < 3 then
    put "PRIORITY3" into priorityCategory
else
    put "PRIORITY" & ZIPCODE_ZONE into priorityCategory
end if
put findPostage(pounds,priorityCategory) into uspsCharge
put (uspsCharge*PRIORITY_MARKUP) into piMarkup
if piMarkup > 5.0 then
    put 5.0 into piMarkup
end if put "$" && uspsCharge into the text of field "Priority Charge"
put (uspsCharge + piMarkup) into the text of field "Full Priority Charge"
format the text of field "Full Priority Charge" as sysnumberformat -- ******** Parcel/Third Class Charge  ******
if ARTICLE_WEIGHT < 1.0 then  -- third class
    put ceiling(ARTICLE_WEIGHT*16) into ounces
    put findPostage(ounces, "THIRDCLASS") into thirdClassCharge
    put 100.0 into parcelCharge
else
    if ZIPCODE_ZONE < 2 then
        put "ZONE2" into parcelCategory
    else
        put "ZONE" & ZIPCODE_ZONE into parcelCategory
    end if
    put findPostage(pounds,parcelCategory) into parcelCharge
    put 100.0 into thirdClassCharge
end if
if (isLocalzip(DEST_ZIPCODE) = 1) then -- local zipcode
    put findPostage(pounds, "LOCAL") into parcelCharge
end if
if (isIntraBMC(DEST_ZIPCODE) = 1) then -- within intra BMC zone
    decrement parcelCharge by 0.27
end if
if thirdClassCharge < parcelCharge then
```

```
    set caption of button PARCEL to "THIRD CLASS"
    put (thirdClassCharge*PARCEL_MARKUP) into piMarkup
    if piMarkup > 5.0 then
        put 5.0 into piMarkup
    end if
    put "$" && thirdClassCharge into the text of field "Parcel Charge"
    put (thirdClassCharge+piMarkup) into the text of field "Full Parcel Charge"
    put "Third Class" into TRANSACTION_TYPE
  else
    set caption of button PARCEL to "PARCEL POST"
    put (parcelCharge*PARCEL_MARKUP) into piMarkup
    if piMarkup > 5.0 then
        put 5.0 into piMarkup
    end if
    put "$" && parcelCharge into the text of field "Parcel Charge"
    put (parcelCharge+piMarkup) into the text of field "Full Parcel Charge"
    put "Parcel Post" into TRANSACTION_TYPE
  end if
  format the text of field "Full Parcel Charge" as sysnumberformat
  set sysnumberformat to originalFormat
end to get findPostage weight,category
    get openDBFile("c:\pielect\ps_price.dbf")
        get goToDbRecord(weight)
        return getDbFieldValue(category)
end to get isLocalzip zipCode put sysnumberformat into originalFormat
        set sysnumberformat to "0 000"
        format zipCode as sysnumberformat
        set sysnumberformat to originalFormat
    get openDBFile("c:\pielect\ziplocal.dbf")
    get openDBIndexFile("c:\pielect\ziplocal.ndx")
        return findDBKey(zipCode)
end to get isIntraBMC zip
        put zip / 100 into zipCode
        put truncate(zipcode) into zipCode
        put sysnumberformat into originalFormat
        set sysnumberformat to "000"
        format zipCode as sysnumberformat
        set sysnumberformat to originalFormat
    get openDBFile("c:\pielect\intraBMC.dbf")
    get openDBIndexFile("c:\pielect\intraBMC.ndx")
        return findDBKey(zipCode)
end to handle leavePage
  get closeAllDBFiles()
end
```

```
--      Script of package charges approval screen
--
to handle enterPage
  forward
  system
INSURANCE_AMOUNT,TRANSACTION_TYPE,WEIGHT_STRING,USPS_PKG_CHARGE,\
  CERTIFIED_MARKUP,EXPRESS_MARKUP,PRIORITY_MARKUP,PARCEL_MARKUP,\
  CERTIFIED_FEE,RETURN_RECEIPT_CHARGE,PAYMENT_METHOD,\
  INQUIRY_ONLY,SERVICE_CHARGE if INQUIRY_ONLY = true then
      set caption of button "Proceed" to "CONTINUE"
      put "TOUCH CONTINUE AFTER VIEWING CHARGES" into the text of field "Flash
Instruction"
  else
      set caption of button "Proceed" to "APPROVE TOTAL CHARGES"
      put "TOUCH APPROVE IF YOU WISH TO CONTINUE " into the text of field "Flash
instruction"
  end if if TRANSACTION_TYPE = "Express" then
    put 0.00 into INSURANCE_AMOUNT
  end if
  put WEIGHT_STRING into the text of field "Weight Display"
  put sysnumberformat into originalFormat
  set sysnumberformat to "$##0.00"

put (USPS_PKG_CHARGE + CERTIFIED_FEE + RETURN_RECEIPT_CHARGE) into subtotal
  put subtotal into the text of field "Subtotal"
  format the text of field "Subtotal" as sysnumberformat conditions
    when TRANSACTION_TYPE = "Express"
      put (subtotal*EXPRESS_MARKUP) into piMarkup
    when TRANSACTION_TYPE = "Priority"
      put (subtotal*PRIORITY_MARKUP) into piMarkup
    else -- parcel post or thirdclass
      put (subtotal*PARCEL_MARKUP) into piMarkup
  end conditions
  if piMarkup > 5.0 then
    put 5.0 into piMarkup
  end if put piMarkup into SERVICE_CHARGE put (Subtotal + piMarkup + INSURANCE_AMOUNT) into the text of field "Total"
  format the text of field "Total" as sysnumberformat
  set sysnumberformat to originalFormat
end
```

```
--     Script of package charges approval button
--
to handle ButtonDown
  system
INQUIRY_ONLY,ZIPCARD_BALANCE,PAYMENT_METHOD,CREDCARD_APPROVED
  system CREDCARD_BALANCE,TRACK2DATA,BACK_FROM_ERROR,APROVAL_CODE,\
```

```
CC_ERROR,CC_MESSAGE,CREDCARD_APPROVED,CREDCARD_USED,\
CREDIT_TRANS_LIMIT,CARD_AMOUNT_USED forward
if INQUIRY_ONLY = true then
  go to page "More Transactions"
else
  put the text of field "Total" into total
  clear char 1 of total
-- if (check_stationery() > 0) then
--    put "Postage Meter Strips need to be restocked."\
--       & "Contact manager." into outOfStrips
--    send post_error "Printing Receipt",outOfStrips
--    break to system
-- end if
  if PAYMENT_METHOD = 2 then -- Zipster Card
    if ZIPCARD_BALANCE < total then
      send post_error "Printing Receipt","Insufficient Balance On Your ZIPSTER Card"
      break to system
    end if
  end if
  if PAYMENT_METHOD = 3 then -- Credit Card
    while (CREDCARD_APPROVED = 32000)
      show field "Getting Approval"
      pause 40
    end while
    hide field "Getting Approval"

if (CREDCARD_APPROVED <> 0) then -- approval denied
      send post_error "Printing Receipt","Credit Card Approval Denied"
      break to system
    else -- approved
      if CREDCARD_BALANCE < total then
        show field "Getting Approval"
        increment CARD_AMOUNT_USED by (CREDIT_TRANS_LIMIT - CREDCARD_BALANCE)
--      get updateCaptureFile()
        put CREDIT_TRANS_LIMIT into CREDCARD_BALANCE
        put CCApprove(TRACK2DATA,CREDCARD_BALANCE,APROVAL_CODE, CC_ERROR,\
             CC_MESSAGE ) into AproveStatus
        if (AproveStatus <> 0) then -- second trial
          put CCApprove(TRACK2DATA,CREDCARD_BALANCE,APROVAL_CODE,
CC_ERROR, CC_MESSAGE ) into AproveStatus
        end if
        hide field "Getting Approval"
        if (AproveStatus <> 0) then
          send post_error "Printing Receipt","Credit card authorization line is busy. Please try again"
          break to system
        end if
      end if
    end if
  end if get postageStamp()
  if it = 0 then -- successful
```

```
      if PAYMENT_METHOD = 2 then -- Zipster Card
        put ZIPCARD_BALANCE - total into ZIPCARD_BALANCE
        send writeZipcardBalance
      end if
      if PAYMENT_METHOD = 3 then -- Credit Card
        put true into CREDCARD_USED
        put CREDCARD_BALANCE - total into CREDCARD_BALANCE
      end if
      send updateReceipt to page "Receipt"
      go to page "Apply Meter Strip on Package"
    else
      send post_error "Printing Receipt","Postage Meter Malfunction"
      break to system
    end if
  end if
end to get postageStamp
   system METER_BALANCE
         put the text of field "Subtotal" into subtotal
         clear char 1 of subtotal
         put (subtotal * 100) into subtotal
   if METER_BALANCE < (subtotal*2)
     if (maintain_meter_account("Printing Receipt") = 0)
       break to system
     end if
   end if
         put sysnumberformat into originalFormat
    set sysnumberformat to "00000"
    format subtotal as sysnumberformat
    set sysnumberformat to originalFormat
         get write_output(1, 1, 0)  -- turn on postage meter
    get write_output(3, 1, 0) -- drop the gate
         pause 1 seconds
         get stamp_strip_print(subtotal)
         put it into meter_status
         get write_output(1, 0, 0) -- turn off postage meter
    get write_output(3, 0, 0) -- raise the gate
         if meter_status = 0 then
      put METER_BALANCE - subtotal into METER_BALANCE
         return(0)
    else
     return(1)
         end if
end
```

```
--
--          Script of weighing screen
--
to handle idle
 forward
 if sysLevel is reader then
  send calculateWeight
 end if
end to handle calculateWeight
```

```
system ARTICLE_TYPE,TRANSACTION_TYPE,LOOP_COUNT,WEIGHT_STRING,\
    ARTICLE_WEIGHT,INQUIRY_ONLY if ARTICLE_TYPE = "Letters" then
  put 1 into scale_number
else
  put 2 into scale_number
end if
get find_weight(scale_number, weightAsString, 0)
if it >= 0 then
  put find_weight(scale_number, weightAsString, 1) into ARTICLE_WEIGHT
  if ARTICLE_WEIGHT >= 0 then -- two successive stable reading
    put weightAsString into WEIGHT_STRING
    if ARTICLE_TYPE = "Letters" then
      if (TRANSACTION_TYPE = "International") and (ARTICLE_WEIGHT > 6.0) then
        send tooHeavy
        break to system
      end if
      if ARTICLE_WEIGHT > 11.0 then
        send tooHeavy
        break to system
      end if
      conditions
        when TRANSACTION_TYPE = "Certified Mail"
          if INQUIRY_ONLY is true then
            go to page "Return Receipt Selection"
          else
            go to page "Certified Label"
          end if
        when TRANSACTION_TYPE = "International"
          go to page "Country selection"
        else
          go to page "Letter Charges Approval"
      end conditions
    end if
    if ARTICLE_TYPE = "Packages" then
      if ARTICLE_WEIGHT > 15.0 then
        send tooHeavy to page "weighing"
        break to system
      end if
      if (TRANSACTION_TYPE = "ExpressMail Intl") and (ARTICLE_WEIGH > 0.5 then
        send tooHeavy
        break to system
      end if
      if ARTICLE_WEIGHT > 0.05 then
        if (TRANSACTION_TYPE = "ExpressMail Intl") then
          go to page "Destination Country Entry"
        else
          go to page "Destination Zipcode Entry"
        end if
      end if
    end if
  end if
else
  increment LOOP_COUNT
  if LOOP_COUNT = 60 then
```

```
        put 0 into LOOP_COUNT
--      send showDvi "c:\pielect\stamppkg.avs" -- say remove your hand
    end if
  end if
end to handle enterPage
  system LOOP_COUNT
  put 0 into LOOP_COUNT
end to handle tooHeavy
  send post_error "service selection","The Article Is Too Heavy For This Transaction"
end
```

---
--       Script of printing receipt screen
--
---

```
to handle enterPage
  forward
  system CARD_INSIDE,ZIPCARD_BALANCE,INQUIRY_ONLY,CREDCARD_SWIPED
  if INQUIRY_ONLY is false then
    if CREDCARD_SWIPED is true then
      get updateCaptureFile()
    end if
    send giveReceipt to page "Receipt"
  end if
end to handle leavePage
  forward
  hide group "Printing Message'
end to handle shortTimeout
-- send showDvi "c:\pielect\reci ipt.avs"
end to handle longTimeOut
  if sysLevel is reader ther
    get TakePackage()
    hide field "Remove Package"
    go to page 1
  end if
end to handle idle
  if sysLevel is reader ther
    system ARTICLE_TYPE
    if (INQUIRY_ONLY is false) and (ARTICLE_TYPE = "Letters") then
      hide field "Remove Package"
      go to page 1
      break to system
    else
      system PACKAGE_SIDE_FULL
      if PACKAGE_SIDE_FULL is false
        put "          " into wgt_string
```

```
    put find_weight(2, wgt_string, 1) into pound_weight
    if pound_weight >= 0 then -- stable
      if pound_weight > 0.05 then -- package is detected
        hide group "Printing Message"
        show field "Remove Package"
      else
        hide field "Remove Package"
        go to page 1
        break to system
      end if
    end if
  else
    go to page 1
    break to system
  end if
 end if
 end if
end
```

---

--         Script of letter or package processing screen
--

```
to handle enterPage
 forward
 system ARTICLE_TYPE
 if sysLevel is reader then
   if ARTICLE_TYPE = "Letters" then
     send TakeLetter
   end if
 end if
end to handle TakeLetter
   -- take the letter inside and drop it in the letter container
   -- get write_out,out(4, 1, 0) -- close the clamp
   -- pause 1 seconds
   -- get move_sm(1, 1387, 2, 10, 10, 1, 0) -- move clamp to drop position
   -- pause 1 seconds
   -- get write_out,out(3, 0, 0) -- raise the gate
   -- pause 2 seconds
   -- get write_out,out(4, 0, 0) -- open the clamp
   -- get rest_motor(1) -- bring clamp back to home
   go to page "Letter insertion"
end to handle idle
  system ARTICLE_TYPE,ARTICLE_WEIGHT if sysLevel is reader then
    if ARTICLE_TYPE = "Packages" then
      put find_weight(2, wgt_string, 1) into cur_weight
      if cur_weight > 0 then
        if abs(cur_weight - ARTICLE_WEIGHT) < 0.075 then -- same package is detected
          hide field "REPLACE PACKAGE"
          get TakePackage()
          go to page "More Transactions"
        else
```

```
      show field "REPLACE PACKAGE"
    end if
   end if
  end if
 end if
end to handle longTimeOut
 if sysLevel is reader then
  hide field "REPLACE PACKAGE"
  get TakePackage()
  go to page "long timeout message"
 end if
end
```

---
--          Script of receipt creation screen
--
---

```
to handle zeroOut
 system NUM_CERTIFIED_MAIL
 put 0 into NUM_CERTIFIED_MAIL
 put "Regular First Class,International,Certified Mail,Priority,Parcel Post,Third
Class,Express,ExpressMail Intl,Stamp,Total" into transType
 put "Number,Service,Amount" into transAction
 step i from 1 to 10
  step j from 1 to 3
   put 0 into the text of field ((item i of transType) && (item j of transAction)) of page "Receipt"
  end step
 end step
 put 0 into the text of field "Priority Insurance" of page "Receipt"
 put 0 into the text of field "Parcel Post Insurance" of page "Receipt"
 put 0 into the text of field "Third Class Insurance" of page "Receipt"
 put 0 into the text of field "Total Insurance" of page "Receipt"
 put 0 into the text of field "Starting Balance" of page "Receipt"
 put 0 into the text of field "Ending Balance" of page "Receipt"
 clear the text of field  Certified Numbers" of page "Receipt"
end to handle updateReceipt
 system TRANSACTION_TYPE,CERTIFIED_NUMBER,PAYMENT_METHOD,\
    PAYMENT_METHOD,DEST_ZIPCODE,CERTIFIED_FEE,RETURN_RECEIPT_CHARGE,\
 INSURANCE_AMOUNT,NUM_CERTIFIED_MAIL,SERVICE_CHARGE,NUM_STAMP_BOOKS,\
    FIRST_CRED_TRANS,CRED_SEND_DATE put sysnumberformat into originalFormat
 set sysnumberformat to "$##0.00"
 if TRANSACTION_TYPE = "Stamp"
  increment the text of field (TRANSACTION_TYPE && "Number") of page "Receipt" by NUM_STAMP_BOOKS
  increment the text of field ("Total Number") of page "Receipt" by NUM_STAMP_BOOKS
 else
  increment the text of field (TRANSACTION_TYPE && "Number") of page "Receipt" by 1
  increment the text of field ("Total Number") of page "Receipt" by 1
 end if
 increment the text of field (TRANSACTION_TYPE && "Amount") of page "Receipt" by the text of field "Total"
```

```
format the text of field (TRANSACTION_TYPE && "Amount") of page "Receipt" as
sysnumberformat
  increment the text of field ("Total Amount") of page "Receipt" by the text of field "Total"

conditions
        when TRANSACTION_TYPE = "Regular First Class"
            put 1 into trans_num
        when TRANSACTION_TYPE = "Certified Mail"
            put 2 into trans_num
        when TRANSACTION_TYPE = "International"
            put 3 into trans_num
        when TRANSACTION_TYPE = "Express"
            put 4 into trans_num
        when TRANSACTION_TYPE = "Priority"
            put 5 into trans_num
        when TRANSACTION_TYPE = "Parcel Post"
            put 6 into trans_num
        when TRANSACTION_TYPE = "Third Class"
            put 7 into trans_num
        when TRANSACTION_TYPE = "Stamp"
            put 8 into trans_num
        when TRANSACTION_TYPE = "ExpressMail Intl"
            put 9 into trans_num
        else
    put 0 into trans_num
end conditions get openDBFile("c:\pielect\mailfile.dbf")
get openDBIndexFile("c:\pielect\mailfile.ndx")
get setDbFieldValue("TRANS_TYPE",trans_num)
get setDbFieldValue("PMT_TYPE",PAYMENT_METHOD)
set sysDateFormat to "yy/mm/dd"
get setDbFieldValue("MAILDATE",sysDate)
set sysTimeFormat to "hh24:min"
get setDbFieldValue("MAILTIME",sysTime)
put the text of field "Total" into postage
clear chars 1 to 2 of postage
get setDbFieldValue("POSTAGE",postage)
get setDbFieldValue("HANDLE_CHG",SERVICE_CHARGE)
if FIRST_CRED_TRANS is true
   get setDbFieldValue("TRANSMIT",0)
else
   get setDbFieldValue("TRANSMIT",1)
end if
if TRANSACTION_TYPE is in "Parcel Post,Priority,Third Class" then
   increment the text of field (TRANSACTION_TYPE && "Insurance") of page "Receipt" by
INSURANCE_AMOUNT
   format the text of field (TRANSACTION_TYPE && "Insurance") of page "Receipt" as
sysnumberformat
   increment the text of field ("Total Insurance") of page "Receipt" by INSURANCE_AMOUNT
end if
get setDbFieldValue("INSUREFEE",INSURANCE_AMOUNT)
set sysnumberformat to originalFormat if char 1 of CERTIFIED_NUMBER = "P" then
```

```
    put CERTIFIED_NUMBER & CRLF after the text of field "Certified Numbers" of page
"Receipt"
    get setDbFieldValue("CERTIFYNUM",CERTIFIED_NUMBER & CRLF)
    get setDbFieldValue("CERTIFYFEE",CERTIFIED_FEE)
    get setDbFieldValue("RTN_RCTFEE",RETURN_RECEIPT_CHARGE)
    increment NUM_CERTIFIED_MAIL
  else
    get setDbFieldValue("CERTIFYNUM",null)
    get setDbFieldValue("CERTIFYFEE",null)
    get setDbFieldValue("RTN_RCTFEE",null)
  end if get setDbFieldValue("CRED_DATE",CRED_SEND_DATE)
  get writeDBrecord(getDBRecordCount()+1)
  get closeAllDBFiles()

get openDBFile("c:\pielect\sendmail.dbf")
  get setDbFieldValue("TRANS_TYPE",trans_num)
  get setDbFieldValue("PMT_TYPE",PAYMENT_METHOD)
  set sysDateFormat to "yy/mm/dd"
  get setDbFieldValue("MAILDATE",sysDate)
  set sysTimeFormat to "hh24:min"
  get setDbFieldValue("MAILTIME",sysTime)
  get setDbFieldValue("POSTAGE",postage)
  get setDbFieldValue("HANDLE_CHG",SERVICE_CHARGE)
  get setDbFieldValue("INSUREFEE",INSURANCE_AMOUNT)
  if char 1 of CERTIFIED_NUMBER = "P" then
    get setDbFieldValue("CERTIFYNUM",CERTIFIED_NUMBER & CRLF)
    get setDbFieldValue("CERTIFYFEE",CERTIFIED_FEE)
    get setDbFieldValue("RTN_RCTFEE",RETURN_RECEIPT_CHARGE)
    send clearCertifiedNumber to page "Certified Label"
  else
    get setDbFieldValue("CERTIFYNUM",null)
    get setDbFieldValue("CERTIFYFEE",null)
    get setDbFieldValue("RTN_RCTFEE",null)
  end if
  if FIRST_CRED_TRANS is true
    put false into FIRST_CRED_TRANS
    get setDbFieldValue("TRANSMIT",0)
  else
    get setDbFieldValue("TRANSMIT",1)
  end if
  get setDbFieldValue("CRED_DATE",CRED_SEND_DATE)
  get writeDBrecord(getDBRecordCount()+1)
  get closeAllDBFiles()
end to get receiptPrint
  system
MACHINE_NUMBER,LOCATION_NAME,LOC_STREET_ADDRESS,LOC_CITY,LOC_STATE,\
LOC_ZIPCODE,NUM_CERTIFIED_MAIL,PAYMENT_METHOD,ZIPCARD_BALANCE,CARD_P
ROCESSING_FEE system WANT_RECEIPT
```

```
if WANT_RECEIPT is false
    return -3
end if if text of field "Regular First Class Number" of page "Receipt" is 0 and\
        text of field "International Number" of page "Receipt" is 0 and\
        text of field "Certified Mail Number" of page "Receipt" is 0 and\
        text of field "Priority Number" of page "Receipt" is 0 and\
        text of field "Parcel Post Number" of page "Receipt" is 0 and\
        text of field "Third Class Number" of page "Receipt" is 0 and\
        text of field "Stamp Number" of page "Receipt" is 0 and\
        text of field "ExpressMail Intl Number" of page "Receipt" is 0 and\
        text of field "Express Number" of page "Receipt" is 0
        return -1
    end get prt_ready()
if it = 0 then -- not ready
    return -2
end if
show group "Printing Message" of page "Printing Receipt"

put (ansitochar(27) & "A33" & ansitochar(13) & "EASY MAIL & SHIP" & CRLF\
        & ansitochar(27)& "A22") into sendString
    send printReceiptString sendString
    step i from 1 to 25
        put (ansitochar(176)) into sendString
        send printReceiptString sendString
    end step
    put (CRLF & CRLF & ansitochar(27) & "A11") into sendString
    send printReceiptString sendString  -- back to normal letter size
set sysDateForm at to "MMM dd, y  hh:min:sec AMPM"
    put (CRLF & "          " & sysDate) into sendString
    send printReceiptString sendString
    put (CRLF & CRLF & "LOC. #: " & MACHINE_NUMBER & CRLF & "       " &
LOCATION_NAME & CRLF & "       " &\
        LOC_STREET_ADDRESS & CRLF & "       " & LOC_CITY & ", " & LOC_STATE & "
 " &\
    LOC_ZIPCODE) into sendString
    send printReceiptString sendString put (CRLF & CRLF & "        MAILING RECEIPT" & CRLF) into sendString
    send printReceiptString sendString put (CRLF & "-------------------------------------") it to sendString
    send printReceiptString sendString put (CRLF & "Transaction    # Of   Insur.    Amount") into sendString
    send printReceiptString sendString put (CRLF & "  Type       Trans        ") into sendString
    send printReceiptString sendString put (CRLF & "-------------------------------------") into sendString
    send printReceiptString sendString
```

```
--        if text of field "Regular First Class Number" of page "Receipt" is not 0
              put ("First Class                    ") into thisString
              send printData "Regular First Class", thisString
--        end --        if text of field "International Number" of page "Receipt" is not 0
              put ("International                  ") into thisString
              send printData "International", thisString
--        end --        if text of field "Certified Mail Number" of page "Receipt" is not 0
              put ("Certified Mail                 ") into thisString
              send printData "Certified Mail", thisString
--            put text of field "Certified Mail Number" of page "Receipt" into cmcount
--            step i from 1 to cmcount
          step i from 1 to NUM_CERTIFIED_MAIL
                  put (CRLF & "   " & textline i of the text of field "Certified Numbers" of page "Receipt") into sendString
                  send printReceiptString sendString
              end step
--        end --        if text of field "Priority Number" of page "Receipt" is not 0
              put ("Priority Mail                  ") into thisString
              send printInsuredData "Priority", thisString
--        end --        if text of field "Parcel Post Number" of page "Receipt" is not 0
              put ("Parcel Post                    ") into thisString
              send printInsuredData "Parcel Post", thisString
--        end --        if text of field "Third Class Number" of page "Receipt" is not 0
              put ("Third Class                    ") into thisString
              send printInsuredData "Third Class", thisString
--        end --        if text of field "Express Number" of page "Receipt" is not 0
              put ("Express                        ") into thisString
              send printData "Express", thisString
--        end put ("Express Int'l                   ") into thisString
          send printData "ExpressMail Int'l", thisString --        if text of field "Stamp Number" of page "Receipt" is not 0
              put ("Stamp Books                    ") into thisString
              send printData "Stamp", thisString
--        end put (CRLF & "--------------------------------------") into sendString
          send printReceiptString sendString if PAYMENT_METHOD = 3 -- credit card
          put (CRLF & "Credit Card Processing Fee :           ") into sendString
```

```
put CARD_PROCESSING_FEE into card_proc_fee
format card_proc_fee as "##0.00"
    put chars 1 to 6 of card_proc_fee into chars 42 to 47 of sendString
send printReceiptString sendString
increment the text of field "Total Amount" of page "Receipt" by CARD_PROCESSING_FEE
put (CRLF & "---------------------------------------") into sendString
    send printReceiptString sendString
end if put ("    Total:                           ") into thisString
    send printInsuredData "Total", thisString put (CRLF & "---------------------------------------") into sendString
    send printReceiptString sendString -- conditions
--   when PAYMENT_METHOD = 1 -- cash
--     put (CRLF & "*****  Please pay at the cash register  *****") into sendString
--     send printReceiptString sendString
--   when PAYMENT_METHOD = 2 -- zipcard
--     put (CRLF & "Starting Bal.           Ending Bal.    ") into thisString
--     put the text of field "Starting Balance" of page "Receipt" into thisnumber
--        format thisnumber as "##0.00"
--     put chars 1 to 7 of thisnumber into chars 17 to 23 of thisString
--     put the text of field "Ending Balance" of page "Receipt" into thisnumber
--        format thisnumber as "##0.00"
--     put chars 1 to 7 of thisnumber into chars 43 to 49 of thisString
--     put (CRLF & thisString) into sendString
--     send printReceiptString sendString
--   when PAYMENT_METHOD = 3 -- credit card
--     put (CRLF & "*****  Payment made by credit card   *****") into sendString
--     send printReceiptString sendString
-- end conditions --    put (CRLF & "--------------------------------------- ") into sendString
--    send printReceiptString sendString put (CRLF & "** Thank you for using EASY MAIL & SHIP **" & CRLF & CRLF) into sendString
    send printReceiptString sendString step i from 1 to 47 -- draw a dark line
      put (ansitochar(223)) into sendString
      send printReceiptString sendString
    end step
    put (CRLF & ansitochar(221)&\
    "EASY MAIL & SHIP is owned and operated and   "& ansitochar(222)) into sendString
    send printReceiptString sendString
    put (CRLF & ansitochar(221)&\
    "the sole responsibility of International     "& ansitochar(222)) into sendString
    send printReceiptString sendString
    put (CRLF & ansitochar(221)&\
    "Kiosk. Any questions should be directed to   "& ansitochar(222)) into sendString
    send printReceiptString sendString
    put (CRLF & ansitochar(221)&\
```

```
          "International Kiosk at 6040 Telephone Rd.   "& ansitochar(222)) into sendString
    send printReceiptString sendString
    put (CRLF & ansitochar(221)&\
          "Houston, TX 77087. Tel: 713-644-6887        "& ansitochar(222)) into sendString
    send printReceiptString sendString
    put CRLF into sendString
    send printReceiptString sendString
    step i from 1 to 47  -- draw a dark line
        put (ansitochar(220)) into sendString
        send printReceiptString sendString
    end step put (CRLF & CRLF & CRLF & CRLF & CRLF & CRLF & CRLF & CRLF & \
         ansitochar(27) & "o") into sendString
    send printReceiptString sendString  -- cut the receipt
    return 0
end to handle printReceiptString ReceiptString
        put "@REMPRT1" into thisFile put 1 into i
        openfile thisFile
        put chars i to charcount(ReceiptString) of ReceiptString & ansitochar(0) into thisstring
        writeFile thisstring to thisFile
        closeFile thisFile
end to handle printData thisdata, thisString
        put (thisdata &" Number") into thisfield
        put the text of field thisfield  of page "Receipt" into thisnumber
        format thisnumber as "##0"
        put chars 1 to 3 of thisnumber into chars 17 to 19 of thisString put (thisdata &" Amount") into thisfield
        put the text of field thisfield  of page "Receipt" into amtnumber
        format amtnumber as "##0.00"
        put chars 1 to 6 of amtnumber into chars 40 to 45 of thisString put (CRLF & thisString) into sendString
    send printReceiptString sendString
end to handle printInsuredData thisdata, thisString put (thisdata &" Number") into thisfield
        put the text of field thisfield  of page "Receipt" into thisnumber
        format thisnumber as "##0"
        put chars 1 to 3 of thisnumber into chars 17 to 19 of thisString put (thisdata &" Insurance") into thisfield
        put the text of field thisfield  of page "Receipt" into insAmount
        format insAmount as "##0.00"
        put chars 1 to 6 of insAmount into chars 25 to 30 of thisString
```

```
    put (thisdata &" Amount") into thisfield
    put the text of field thisfield of page "Receipt" into amtnumber
    format amtnumber as "##0.00"
    put chars 1 to 6 of amtnumber into chars 40 to 45 of thisString put (CRLF & thisString) into sendString
  send printReceiptString sendString
end to handle giveReceipt
  if sysLevel is reader then
    get receiptPrint()
    if it = -2 then
      send post_error "1","Receipt Printer Is Not Ready"
    end if
    if it = 0 then
      send zeroOut
    end if
  end if
end
```

---
Script of transaction and activity report printing screen
---

```
to handle leavePage
  forward
  show group "stop" of this background
end to handle enterPage
  forward
  hide group "stop" of this background
end to handle printActivityReport startDate, startTime,endDate,endTime
  system
MACHINE_NUMBER,LOCATION_NAME,LOC_STREET_ADDRESS,LOC_CITY,LOC_STATE,\
  LOC_ZIPCODE
  show field "Wait warning message"
  put "                                    " into thisLine
  put 0 into reg_cnt
  put 0 into reg_post
  put 0 into reg_hndl
  put 0 into stp_cnt
  put 0 into stp_post
  put 0 into stp_hndl
  put 0 into crt_cnt
  put 0 into crt_post
  put 0 into crt_hndl
  put 0 into crt_fee
  put 0 into crt_rtnrct
  put 0 into int_cnt
  put 0 into int_post
  put 0 into int_hndl
  put 0 into exp_cnt
  put 0 into exp_post
  put 0 into exp_hndl
```

```
put 0 into pri_cnt
put 0 into pri_post
put 0 into pri_hndl
put 0 into pri_fee
put 0 into pri_ins
put 0 into pri_rtnrct
put 0 into par_cnt
put 0 into par_post
put 0 into par_hndl
put 0 into par_fee
put 0 into par_ins
put 0 into par_rtnrct
put 0 into thd_cnt
put 0 into thd_post
put 0 into thd_hndl
put 0 into thd_fee
put 0 into thd_ins
put 0 into thd_rtnrct
put 0 into cash
put 0 into zipcard
put 0 into creditcard
put 0 into reg_gross
put 0 into crt_gross
put 0 into int_gross
put 0 into pri_gross
put 0 into exp_gross
put 0 into par_gross
put 0 into thd_gross
put 0 into stp_gross get openDBFile("c:\pielect\mailfile.dbf")
get openDBIndexFile("c:\pielect\mailfile.ndx")
put findDBKey(startDate&startTime) into keyFound
if (keyFound = 3) or (keyFound = 1) then -- next highest match
   while true
      if (getDBFieldValue("MAILDATE")&getDBFieldValue("MAILTIME") > \
         endDate&endTime as text) then
         break while
      end if
      put getDBFieldValue("TRANS_TYPE") into transactionType
      put getDBFieldValue("PMT_TYPE") into paymentType
      put getDBFieldValue("POSTAGE") into postage
      put getDBFieldValue("CERTIFYFEE") into certifiedfee
      put getDBFieldValue("RTN_RCTFEE") into returnReceiptFee
      put getDBFieldValue("HANDLE_CHG") into handlingFee
      put getDBFieldValue("INSUREFEE") into insurancefee conditions
         when transactionType = 1 -- reg first class
                     increment reg_cnt by 1
                     increment reg_post by postage
                     increment reg_hndl by handlingFee
         when transactionType = 2 -- certified letter
                     increment crt_cnt by 1
                     increment crt_post by postage
```

```
                    increment crt_hndl by handlingFee
        when transactionType = 3 -- international
                    increment int_cnt by 1
                    increment int_post by postage
                    increment int_hndl by handlingFee
        when transactionType = 4 -- express
                    increment exp_cnt by 1
                    increment exp_post by postage
                    increment exp_hndl by handlingFee
        when transactionType = 5 -- priority
                    increment pri_cnt by 1
                    increment pri_post by postage
                    increment pri_hndl by handlingFee
                    increment pri_ins by insurancefee
        when transactionType = 6 -- parcel post
                    increment par_cnt by 1
                    increment par_post by postage
                    increment par_hndl by handlingFee
                    increment par_ins by insurancefee
        when transactionType = 7 -- third class
                    increment thd_cnt by 1
                    increment thd_post by postage
                    increment thd_hndl by handlingFee
                    increment thd_ins by insurancefee
        when transactionType = 8 -- stamp transaction
                    increment stp_cnt by 1
                    increment stp_post by postage
                    increment stp_hndl by handlingFee
      end conditions
      conditions
        when paymentType = 4 -- cash
           increment cash by postage
        when paymentType = 2 -- zip card
           increment zipcard by postage
        when paymentType = 3 -- credit card
           increment creditcard by postage
      end conditions
            -- read next
            get nextDBRecord()
            if it <= 0 then
        break while
      end if
    end while
  end if
  get closeAllDBFiles()
  -- calculate gross
  put (reg_post - reg_hndl) into reg_gross
  put (crt_post - crt_hndl) into crt_gross
  put (int_post - int_hndl) into int_gross
  put (exp_post - exp_hndl) into exp_gross
  put (pri_post - pri_hndl) into pri_gross
  put (par_post - par_hndl) into par_gross
  put (thd_post - thd_hndl) into thd_gross
  put (stp_post - stp_hndl) into stp_gross
  put (reg_gross + crt_gross + int_gross + exp_gross + pri_gross + par_gross\
    + thd_gross + stp_gross) into tot_gross
```

```
put (reg_cnt + crt_cnt + int_cnt + exp_cnt + pri_cnt + par_cnt\
   + thd_cnt + stp_cnt) into tot_cnt
put (pri_ins + par_ins + thd_ins) into tot_ins
put (reg_post + crt_post + int_post + exp_post + pri_post + par_post\
   + thd_post + stp_post) into tot_post
put (reg_hndl + crt_hndl + int_hndl + exp_hndl + pri_hndl + par_hndl\
   + thd_hndl + stp_hndl) into tot_hndl put sysnumberformat into originalFormat
set sysnumberformat to "###0"
format reg_cnt as sysnumberformat
format crt_cnt as sysnumberformat
format int_cnt as sysnumberformat
format exp_cnt as sysnumberformat
format pri_cnt as sysnumberformat
format par_cnt as sysnumberformat
format thd_cnt as sysnumberformat
format stp_cnt as sysnumberformat
format tot_cnt as sysnumberformat set sysnumberformat to "###0.00"
format reg_gross as sysnumberformat
format crt_gross as sysnumberformat
format int_gross as sysnumberformat
format exp_gross as sysnumberformat
format pri_gross as sysnumberformat
format par_gross as sysnumberformat
format thd_gross as sysnumberformat
format stp_gross as sysnumberformat
format tot_gross as sysnumberformat format pri_ins as sysnumberformat
format par_ins as sysnumberformat
format thd_ins as sysnumberformat
format tot_ins as sysnumberformat format reg_post as sysnumberformat
format crt_post as sysnumberformat
format int_post as sysnumberformat
format exp_post as sysnumberformat
format pri_post as sysnumberformat
format par_post as sysnumberformat
format thd_post as sysnumberformat
format stp_post as sysnumberformat
format tot_post as sysnumberformat format reg_hndl as sysnumberformat
format crt_hndl as sysnumberformat
format int_hndl as sysnumberformat
format exp_hndl as sysnumberformat
format pri_hndl as sysnumberformat
format par_hndl as sysnumberformat
format thd_hndl as sysnumberformat
format stp_hndl as sysnumberformat
format tot_hndl as sysnumberformat
```

```
format cash as sysnumberformat
format zipcard as sysnumberformat
format creditcard as sysnumberformat set sysnumberformat to originalFormat -- ******** Printing Activity Report ********
put (ansitochar(27) & "A33" & ansitochar(13) & " ZIPSTER PLUS" & CRLF\
        & ansitochar(27)& "A22") into thisLine
send printReceiptLine thisLine step i from 1 to 25
   put (ansitochar(176)) into thisLine
   send printReceiptLine thisLine
end step
put (CRLF & CRLF & ansitochar(27) & "A22" & "      ACTIVITY REPORT" &\
       CRLF) into thisLine
send printReceiptLine thisLine
put (ansitochar(27) & "A11" & CRLF) into thisLine
send printReceiptLine thisLine put ("LOC. # : " & MACHINE_NUMBER & CRLF & "      " & LOCATION_NAME & CRLF & "
" &\
          LOC_STREET_ADDRESS & CRLF & "      " & LOC_CITY & ", " & LOC_STATE & "
" &\
      LOC_ZIPCODE & CRLF) into thisLine
send printReceiptLine thisLine put (CRLF & "BEGINNING:              ENDING:") into thisLine
send printReceiptLine thisLine
format date startDate as "mm/dd/yy" from "yy/mm/dd"
format date endDate as "mm/dd/yy" from "yy/mm/dd"
put (CRLF & " DATE: " & startDate & "          " & "DATE: " &\
          endDate) into thisLine
send printReceiptLine thisLine
put (CRLF & " TIME: " & startTime & "          " & "TIME: " &\
          endTime & CRLF) into thisLine
send printReceiptLine thisLine step i from 1 to 50
   put (ansitochar(220)) into thisLine
   send printReceiptLine thisLine
end step
put (CRLF & "SERVICE            P.I.P. GROSS   SVC") into thisLine
send printReceiptLine thisLine
put (CRLF & " TYPE    QTY POSTAGE  INS. CHG    FEE" & CRLF) into thisLine
send printReceiptLine thisLine step i from 1 to 50
   put (ansitochar(220)) into thisLine
   send printReceiptLine thisLine
end step put (CRLF & "First Class  " & reg_cnt & " " & reg_gross & "   -"&\
     "  " & reg_post & " " & reg_hndl) into thisLine
send printReceiptLine thisLine
```

```
put (CRLF & "Certified   " & crt_cnt & " " & crt_gross & "    -"&\
    "   " & crt_post & " " & crt_hndl) into thisLine
send printReceiptLine thisLine
put (CRLF & "Int't Mail  " & int_cnt & " " & int_gross & "    -"&\
    "   " & int_post & " " & int_hndl) into thisLine
send printReceiptLine thisLine
put (CRLF & "EXP. Mail   " & exp_cnt & " " & exp_gross & "    -"&\
    "   " & exp_post & " " & exp_hndl) into thisLine
send printReceiptLine thisLine
put (CRLF & "PRI. Mail   " & pri_cnt & " " & pri_gross & " " &\
    pri_ins & " " & pri_post & " " & pri_hndl) into thisLine
send printReceiptLine thisLine
put (CRLF & "Parcel Post " & par_cnt & " " & par_gross & " " &\
    par_ins & " " & par_post & " " & par_hndl) into thisLine
send printReceiptLine thisLine
put (CRLF & "Third Class " & thd_cnt & " " & thd_gross & " " &\
    thd_ins & " " & thd_post & " " & thd_hndl) into thisLine
send printReceiptLine thisLine
put (CRLF & "Stamp Books " & stp_cnt & " " & stp_gross & "    -"&\
    "   " & stp_post & " " & stp_hndl & CRLF) into thisLine
send printReceiptLine thisLine step i from 1 to 50
  put (ansitochar(196)) into thisLine
  send printReceiptLine thisLine
end step put (CRLF & "  Total:    " & tot_cnt & " " & tot_gross & " " &\
    tot_ins & " " & tot_post & " " & tot_hndl) into thisLine
send printReceiptLine thisLine
put (CRLF & CRLF & "CASH =$" & cash & "    CREDIT CARD =$" & creditcard) into thisLine
send printReceiptLine thisLine put (CRLF& CRLF & ansitochar(27) & "A22" & ansitochar(13)) into thisLine
send printReceiptLine thisLine step i from 1 to 25
  put (ansitochar(176)) into thisLine
  send printReceiptLine thisLine
end step
put (CRLF & CRLF & CRLF & CRLF & CRLF & CRLF & CRLF & \
    ansitochar(27) & "c") into thisLine
send printReceiptLine thisLine  -- cut the receipt
-- send updateReceiptCounter 1
hide field "Wait warning message"
end

--
=====================================================================
== to handle printTransactionReport startDate,startTime,endDate,endTime
system
MACHINE_NUMBER,LOCATION_NAME,LOC_STREET_ADDRESS,LOC_CITY,LOC_STATE,\
    LOC_ZIPCODE
  put 0 into tot_gross
```

```
put 0 into num_transactions
put "00/00/00" into holdDate
show field "Wait warning message"
-- ********** Printing Transaction Report **********
put (ansitochar(27) & "A33" & ansitochar(13) & "   ZIPSTER PLUS" & CRLF\
        & ansitochar(27)& "A22") into thisLine
send printReceiptLine thisLine step i from 1 to 25
   put (ansitochar(176)) into thisLine
   send printReceiptLine thisLine
end step
put (CRLF & CRLF & ansitochar(27) & "A22" & "   TRANSACTION REPORT" &\
        CRLF) into thisLine
send printReceiptLine thisLine
put (ansitochar(27) & "A11" & CRLF) into thisLine
send printReceiptLine thisLine put ("LOC. # : " & MACHINE_NUMBER & CRLF & "       " & LOCATION_NAME & CRLF & "
" &\
           LOC_STREET_ADDRESS & CRLF & "       " & LOC_CITY & ", " & LOC_STATE & "
" &\
     LOC_ZIPCODE & CRLF) into thisLine
send printReceiptLine thisLine put (CRLF & "BEGINNING:              ENDING:") into thisLine
send printReceiptLine thisLine
format date startDate as "mm/dd/yy" from "yy/mm/dd"
format date endDate as "mm/dd/yy" from "yy/mm/dd"

put (CRLF & "  DATE: " & startDate & "        " & "DATE:  " &\
           endDate) into thisLine
send printReceiptLine thisLine
put (CRLF & "  TIME: " & startTime & "        " & "TIME:  " &\
           endTime & CRLF) into thisLine
send printReceiptLine thisLine step i from 1 to 50
   put (ansitochar(220)) into thisLine
   send printReceiptLine thisLine
end step put (CRLF & "DATE    TIME   PMT.     TYPE       GROSS" & CRLF) into thisLine
send printReceiptLine thisLine step i from 1 to 50
   put (ansitochar(220)) into thisLine
   send printReceiptLine thisLine
end step put sysnumberformat into originalFormat
set sysnumberformat to "###0.00"
format date startDate as "yy/mm/dd" from "mm/dd/yy"
format date endDate as "yy/mm/dd" from "mm/dd/yy"

get openDBFile("c:\pielect\mailfile.dbf")
```

```
get openDBIndexFile("c:\pielect\mailfile.ndx")
put findDBKey(startDate&startTime) into keyFound
if (keyFound = 3) or (keyFound = 1) then -- next highest match
  while true
    if (getDBFieldValue("MAILDATE")&getDBFieldValue("MAILTIME") >\
        endDate&endTime as text) then
      break while
    end if put getDBFieldValue("MAILDATE") into mailDate
    put getDBFieldValue("MAILTIME") into mailTime
    put getDBFieldValue("TRANS_TYPE") into transactionType
    put getDBFieldValue("PMT_TYPE") into paymentType
    put (getDBFieldValue("POSTAGE")) into gross
    conditions
      when paymentType = 4
        put "CASH   " into paymentString
      when paymentType = 2
        put "ZIPCARD" into paymentString
      when paymentType = 3
        put "CREDIT " into paymentString
    end conditions
    conditions
      when transactionType = 1
        put "1ST CLASS MAIL" into transactionString
      when transactionType = 2
        put "CERTIFIED MAIL" into transactionString
      when transactionType = 3
        put "INT'L MAIL    " into transactionString
      when transactionType = 4
        put "EXPRESS MAIL  " into transactionString
      when transactionType = 5
        put "PRIORITY MAIL " into transactionString
      when transactionType = 6
        put "PARCEL POST   " into transactionString
      when transactionType = 7
        put "3RD CLASS MAIL" into transactionString
      when transactionType = 8
        put "STAMP BOOKS   " into transactionString
    end conditions
    increment tot_gross by gross
    increment num_transactions by 1
    -- print entry
    if (holdDate <> mailDate as text) then
      if (holdDate <> "00/00/00") then
        put mailDate into holdDate
        put (CRLF & "-------------------------------------------") into thisLine
        send printReceiptLine thisLine
      end if
      put mailDate into holdDate
      format date mailDate as "mm/dd/yy" from "yy/mm/dd"
    else
      put "        " into mailDate
    end if format gross as sysnumberformat
```

```
        put (CRLF & mailDate &" " & mailTime & " " & paymentString &\
            "  " & transactionString & " "& gross) into thisLine
        send printReceiptLine thisLine get nextDBRecord()
            if it <= 0 then
          break while
        end if
            end while
        put (CRLF & "------------------------------------------") into thisLine
        send printReceiptLine thisLine format tot_gross as sysnumberformat
        set sysnumberformat to "###0"
        format num_transactions as sysnumberformat
        set sysnumberformat to originalFormat -- print total
        put (CRLF & CRLF& "  Number of transactions: " & num_transactions &\
        "     Total: " & tot_gross & CRLF) into thisLine
        send printReceiptLine thisLine
    end if
    get closeAllDBFiles()
    set sysnumberformat to originalFormat
    put (CRLF & CRLF & CRLF & CRLF & CRLF & CRLF & CRLF & CRLF & \
            ansitochar(27) & "c") into thisLine
    send printReceiptLine thisLine -- cut the receipt
    put round((num_transactions - 25)/45) + 1 into numReceipts
-- send updateReceiptCounter numReceipts
    hide field "Wait warning message"
end to handle printReceiptLine ReceiptString
        put "@REMPRT1" into thisFile
        openfile thisFile
        put chars 1 to charcount(ReceiptString) of ReceiptString & ansitochar(0) into thisstring
        writeFile thisstring to thisFile
        closeFile thisFile
end
--      ************************************************
--      ************************************************
--      _____
—       SOURCE CODE FOR DEVICE DRIVERS
--      _____
--      ************************************************
--      ************************************************
            /* METERDRV.C */ include <stdio.h>
include <stdlib.h>
#include <conio.h>
#include <string.h>
#include <math.h>
#include <dos.h>
#include <fcntl.h>
#include "windows.h"
```

```c
#include "serial.h"
#include "meterdrv.h"

#define ENQ 0x05
#define STX 0x02
define ETX 0x03 int SendMeterCommand(char far *, char far *, unsigned long, int);
double manual_atof(LPSTR);
int manual_atoi(LPSTR);
int fhandle;
extern unsigned char inputready(int);
/*********************************************************************/
/* Function to send a command to Postage Meter and get response back from */
/* meter.                                                            */
/* Return Value : 0 -> successful                                    */
/*                1 -> failure receiving echo                        */
/*                2 -> communication problem                         */
/*                3 -> no response from meter                        */
/*********************************************************************/
int SendMeterCommand(command_to_send, response_received, resp_time, getReply)
char far *command_to_send;
char far *response_received;
unsigned long resp_time;
int getReply;
{
    unsigned long start_time;
    int index=0, len, ret, resp_counter=0;
    char rec_buf[2];
    char message_from_meter[20];

rec_buf[1] = 0;
    len = lstrlen(command_to_send);
        /* ***** send the command to meter ***** */
    while (index < len )
        /* send string to meter with each echo character checked */
    {
        _lwrite(fhandle, &command_to_send[index], 1);
        if(_lread(fhandle,rec_buf, 1) != 1)
        {
            ret = 2;
            goto leaving;
        }
        index++;
    }
        /* read each echo character */
//    while (inputready(fhandle))
//        _lread(fhandle,rec_buf, 1);

//    start_time = GetTickCount();
//    while (start_time > (GetTickCount() - 15) )  /* 15 ms delay */
//        ;

if (getReply == 2) /* drop gate down */
    {
        outp(PORT_A, 0x81);   // ON meter power + translation cyl.
```

```c
        start_time = GetTickCount();
        while (start_time > (GetTickCount() - 1000) ) /* 1 Sec delay */ outp(PORT_A, 0x85);   // translation cyl. + letter gate + meter power
    } if (getReply >= 1)
    {
      start_time = GetTickCount();
      while (!(inputready(fhandle)) )
      {
        if (start_time < (GetTickCount() - resp_time) )
        {
          ret = 3;
          goto leaving;
        }
      }
      /* ***** receive response from meter ***** */
      response_received[0] = 0;
      for (;;)
      {
        message_from_meter[0] = 0;
        index = 0;
        while (message_from_meter[index] != ETX ) /* receive characters till an ETX */
        {
          if(_lread(fhandle, &message_from_meter[index], 1) == 0)
          {
            ret = 2;
            goto leaving;
          }
          if(_lwrite(fhandle, &message_from_meter[index], 1) != 1)
          {
            ret = 2;
            goto leaving;
          }
          if (message_from_meter[index] == STX)
            index = 0;
          else if (message_from_meter[index] != ETX)
            index++;
        }
        message_from_meter[index] = 0;
        lstrcat(response_received, message_from_meter);
        if( (message_from_meter[0] != 'W') || (
            (message_from_meter[0] == 'W') && (message_from_meter[index-1] == '0')) )
        {
          ret = 0;
          break;
        }
      } /* for loop */
    }
leaving:
    return(ret);
}
/*==================================================================*/
/* Function to print a stamp strip                              */
/* return value: 0 => successfull                               */
```

```c
/*          1 => communication problem            */
/*          2 => failure printing stamp           */
/*==============================================================*/
int __export FAR PASCAL stamp_strip_print(amount)
char FAR *amount;
{
   char cmd_string[24];
   char meter_reply[7];
   char correct_response[7];
   int ret;

wsprintf(cmd_string, "%c%c5%5s%c", ENQ, STX, amount, ETX);
   wsprintf(correct_response, "G%s", amount);

if( SendMeterCommand(cmd_string, meter_reply, 3000, 1))
      return(1);
   if (lstrcmp(meter_reply, correct_response))
      ret = 2;
   else
      ret = 0;
   return(ret);
}
/*==============================================================*/
/* Function to print a stamp strip                */
/* return value: 0 => successfull                 */
/*          1 => communication problem            */
/*          2 => failure printing stamp           */
/*==============================================================*/
int __export FAR PASCAL stamp_on_letter(amount)
char FAR *amount;
{
   char cmd_string[24];
   char meter_reply[7];
   char correct_response[7];
   int ret=0;

wsprintf(cmd_string, "%c%c3%5s%c", ENQ, STX, amount, ETX);
   wsprintf(correct_response, "G%s", amount);

ret = SendMeterCommand(cmd_string, meter_reply, 60000, 2);
   if( ret == 0 )
   {
      if (lstrcmp(meter_reply, correct_response))
         ret = 2;
   }
   outp(PORT_A, 0x80);  // translational cylinder
   return(ret);
}
/*==============================================================*/
/* Function to set date on meter                  */
/* return value: 0 => successfull                 */
/*          1 => communication problem            */
/*==============================================================*/
int __export FAR PASCAL set_meter_date(YearMonthDay)
char FAR *YearMonthDay;
{
```

```c
    int ret;
    char cmd_string[24];
    char meter_reply[5];
    char ret_string[4];

wsprintf(cmd_string, "%c%cV%6s%c", ENQ, STX, YearMonthDay, ETX);

if( SendMeterCommand(cmd_string, meter_reply, 40000, 1))
        return(1);

if (meter_reply[0] == 'V')
    {
        lstrcpyn(ret_string, (LPCSTR)&meter_reply[1], 4);
        ret = manual_atoi(ret_string);
    }
    else
        ret = 1;
    return(ret);
}
/*================================================================*/
/* Function to read ascending register                           */
/* return value: 0 => successfull                                */
/*               1 => no response                                */
/*================================================================*/
int __export FAR PASCAL ReadAscendingRegister(regReading)
char FAR *regReading;
{
    int ret;
    char cmd_string[5];
    char meter_reply[15];
    char ret_string[4];

wsprintf(cmd_string, "%c%cX%c", ENQ, STX, ETX);

if( SendMeterCommand(cmd_string, meter_reply, 2000, 1))
        return(1);
    if (meter_reply[0] == 'X')
    {
        lstrcpyn(ret_string, (LPCSTR)&meter_reply[1], 4);
        lstrcpyn(regReading, (LPCSTR)&meter_reply[4], 11);
        ret = manual_atoi(ret_string);
    }
    else
        ret = 1;
    return(ret);
}
/*================================================================*/
/* Function to read descending register                          */
/* return value: 0 => successfull                                */
/*               1 => no response                                */
/*================================================================*/
int __export FAR PASCAL ReadDescendingRegister(regReading)
char FAR *regReading;
{
    int ret;
    char cmd_string[5];
```

```
   char meter_reply[15];
   char ret_string[4];

wsprintf(cmd_string, "%c%cY%c", ENQ, STX, ETX);

if( SendMeterCommand(cmd_string, meter_reply, 3000, 1))
      return(1);
   if (meter_reply[0] == 'Y')
   {
      lstrcpyn(ret_string, (LPCSTR)&meter_reply[1], 4);
      lstrcpyn(regReading, (LPCSTR)&meter_reply[4], 9);
      ret = manual_atoi(ret_string);
   }
   else
      ret = 1;
   return(ret);
}
/*=====================================================*/
/* Function to do automated TMS on meter               */
/* return value: 0 => successfull                      */
/*               1 => no response                      */
/*=====================================================*/
int __export FAR PASCAL AddMoneyToMeter(amount, desRegister)
char FAR *amount;
char FAR *desRegister;
{
   int ret;
   char cmd_string[24];
   char meter_reply[55];
   char ret_string[4];
   unsigned long start_time;

/* set 0 postage value for letters and then reset postage value */
      /* temporary fix for error # 52 during TMS                      */
      wsprintf(cmd_string, "%c%c200000%c", ENQ, STX, ETX);

if( SendMeterCommand(cmd_string, meter_reply, 3000, 0))
         return(1);

start_time = GetTickCount();
      while (start_time > (GetTickCount() - 1000) ) /* 1 s delay */
         ;

wsprintf(cmd_string, "%c%c0%c", ENQ, STX, ETX);
      if( SendMeterCommand(cmd_string, meter_reply, 2000, 0))
         return(1);

start_time = GetTickCount();
      while (start_time > (GetTickCount() - 1000) ) /* 1 s delay */
         ;

wsprintf(cmd_string, "%c%cW00000000%8s%c", ENQ, STX, amount, ETX);

if( SendMeterCommand(cmd_string, meter_reply, 99000, 1))
         return(1);
      if (meter_reply[0] == 'W')
```

```c
    {
      lstrcpyn(ret_string, (LPCSTR)&meter_reply[1], 4);
      lstrcpyn(desRegister, (LPCSTR)&meter_reply[4], 9);
      ret = manual_atoi(ret_string);
    }
    else
      ret = 1;
    return(ret);
}
/**********************************************************************/
/* manual_atof work the same as the C function atof.                  */
/**********************************************************************/
double manual_atof(LPSTR Float_String)
{
  int i=0, len, done=0;
  double ret_val=0.0, dec_val=1.0, neg=1.0;

len = lstrlen(Float_String);

while (Float_String[i]==' ' && i<len)
    i++;

if (i>=len)
    return ret_val;

if (Float_String[i]=='-') {
    neg=-1.0;
    i++;
  } while (Float_String[i]!='.' && i<len) { if (Float_String[i] < '0' || Float_String[i]>'9')
      return neg*ret_val;

ret_val = 10.0*ret_val+(double)(Float_String[i]-'0');
    i++;
  } if (i>=len)
    return neg*ret_val;

i++;   // Skip the decimal point while (i<len) { if (Float_String[i] < '0' || Float_String[i]>'9')
      return neg*ret_val;

dec_val = dec_val/10.0;
    ret_val = ret_val+((double)(Float_String[i]-'0'))*dec_val;
    i++;
  } return neg*ret_val;
}
```

```c
/***********************************************************/
int manual_atoi(LPSTR Int_String)
{
   return (int) manual_atof(Int_String);
}
/***********************************************************/
/* FUNCTION: WEP(int)                                      */
/* PURPOSE : Performs cleanup tasks when the DLL is unloaded. WEP() is */
/*           called automatically by Windows when the DLL is unloaded (no */
/*           remaining tasks still have the DLL loaded). It is strongly */
/*           recommended that a DLL have a WEP() function, even if it does */
/*           nothing but returns success (1), as in this example.       */
/***********************************************************/
int __export FAR PASCAL WEP (bSystemExit)
int  bSystemExit;
{
   _lclose(fhandle);
   return(1);
}
/***********************************************************/
/* FUNCTION: LibMain(HANDLE, WORD, WORD, LPSTR)            */
/* PURPOSE : Is called by LibEntry. LibEntry is called by Windows when */
/*           the DLL is loaded. The LibEntry routine is provided in  */
/*           the LIBENTRY.OBJ in the SDK Link Libraries disk. (The   */
/*           source LIBENTRY.ASM is also provided.)                  */
/*                                                                   */
/*           LibEntry initializes the DLL's heap, if a HEAPSIZE value is */
/*           specified in the DLL's DEF file. Then LibEntry calls    */
/*           LibMain. The LibMain function below satisfies that call. */
/*                                                                   */
/*           The LibMain function should perform additional initialization */
/*           tasks required by the DLL. In this example, no initialization */
/*           tasks are required. LibMain should return a value of 1 if */
/*           the initialization is successful.                       */
/***********************************************************/
int __export FAR PASCAL LibMain(hModule, wDataSeg, cbHeapSize, lpszCmdLine)
HANDLE hModule;
WORD   wDataSeg;
WORD   cbHeapSize;
LPSTR  lpszCmdLine;
{
   fhandle = _lopen("@REMPRT4", OF_READWRITE)
   return 1;
}
/***********************************************************/

/* BILLDRV.C */
#include <stdio.h>
include <stdlib.h>
#include <conio.h>
#include <string.h>
#include <math.h>
#include <dos.h>
#include <fcntl.h>
#include "windows.h"
```

```c
#include "doslo.h"
#include "billdrv.h"

unsigned char get_check_sum(char far *);
int sendBAMessage(char far*);
int receiveBAMessage(char far*);
unsigned int readDataBytes(unsigned int, char far *);

int fhandle;
unsigned int * fileStatus;
unsigned char ackNumber;

/****************************************************************/
/* READDATABYTES                                                */
/* If the input is ready, read data from the handle             */
/* Return : 0 -> input buffer empty                             */
/*          numBytes -> successful                              */
/****************************************************************/
unsigned int readDataBytes(numBytes, inpBuffer)
unsigned int numBytes;
char far *inpBuffer;
{
   unsigned long start_time;

start_time = GetTickCount();
   while (start_time > (GetTickCount() - 250)) /* 250 mSec time out */
   {
     if (inputready(fhandle))
        return(readf(fhandle, numBytes, inpBuffer, fileStatus));
   }
   return(0);
}
/****************************************************************/
/* GET_CHECK_SUM                                                */
/* Checksum is calculaated in all bytes between the STX and the ETX */
/* (excludingthe STX and the ETX). The calculation is performed by xor'ing */
/* the bytes.                                                   */
/****************************************************************/
unsigned char get_check_sum(buff)
char far *buff;
{
   unsigned char chksum;

chksum = 0;
   buff++; //skip STX
   chksum ^= *buff++;   // length byte can be same as ETX also
   while((*buff) != ETX)
     chksum ^= *buff++;
   return(chksum);
}
/****************************************************************/
/* Function to send a command to Bill Acceptor                  */
/****************************************************************/
int sendBAMessage(command_to_send)
char far *command_to_send;
{
```

```c
    unsigned char len, msgTypeAndAckNum, checkSum;
    char cmd_string[128],chkString[2];
    char flush_buf[2];

len = (unsigned char)(_fstrlen(command_to_send) + 5);
    msgTypeAndAckNum = 0x10 + ackNumber;
    wsprintf(cmd_string, "%c%c%c%s%c", STX, len, msgTypeAndAckNum, command_to_send, ETX);
    checkSum = get_check_sum(&cmd_string[0]);
    wsprintf(chkString, "%c", checkSum);
    _fstrncat(cmd_string,chkString,1);

while (inputready(fhandle))
        readf(fhandle, 1, flush_buf, fileStatus);  // flush the buffer if(writef(fhandle, len, cmd_string, fileStatus) != len)
        return(ICA_SEND_FAILED);
    else
        return(SEND_GOOD_MSG);
}
/*******************************************************************/
/* Function to receive a message from Bill Acceptor                */
/*******************************************************************/
int receiveBAMessage(messageReceived)
char far *messageReceived;
{
    int index=0, len;
    unsigned char chksum,inpByte=0, msgType;

if(readDataBytes(1, &inpByte) != 1)
        return(ICA_RECEIVE_FAILED);
    if (inpByte == ENQ)  // ENQ received from bill acceptor
        return(RCV_ENQ_RCVD);
    if(inpByte != STX)
        return(RCV_BAD_STX);

// eceive a regular message from bill acceptor if(readDataBytes(1, &chksum) != 1) // get length byte
        return(ICA_RECEIVE_FAILED);

len = (int)(chksum - 5); //extract length byte;
    if (len != RCV_DATA_LENGTH)
        return(RCV_BAD_LEN);

if(readDataBytes(1, &msgType) != 1)  // get length byte
        return(ICA_RECEIVE_FAILED);
    chksum = chksum ^ msgType;

if(readDataBytes(len, messageReceived) != (unsigned int)len)  // get the messaage
        return(ICA_RECEIVE_FAILED);
    for (index=0; index<len; index++)
        chksum = chksum ^ messageReceived[index];

if(readDataBytes(1, &inpByte) != 1)  // get and check ETX
```

```
        return(ICA_RECEIVE_FAILED);
    if (inpByte != ETX)
        return(RCV_BAD_ETX);

if(readDataBytes(1, &inpByte) != 1)  // get checksum byte
        return(ICA_RECEIVE_FAILED);
                // verify received checksum
    if (inpByte != chksum)  // bad checksum
        return(RCV_BAD_CHECKSUM);

if ((msgType & 0x0F) != ackNumber)  // wrong ACK number
        return(RCV_BAD_ACK_NUM);
    ackNumber ^= 1;  // toggle ACK number because a good response received
    if ((msgType & 0xF0) != 0x20)  // wrong message type
        return(RCV_BAD_MSG_TYPE);
    return(RCV_GOOD_MSG);
}
/*==========================================================*/
/* Function to check the bill acceptor state change         */
/* return value: 0 => no state change                       */
/*               1 => ENQ received                          */
/*==========================================================*/
int __export far pascal BAStateChanged(void)
{
    char rec_buf[3];

rec_buf[1] = 0;

if(readDataBytes(1, rec_buf) != 1)
        return(ICA_RECEIVE_FAILED);
    if (rec_buf[0] = ENQ)  // ENQ received from bill acceptor
        return(RCV_ENQ_RCVD);
    else if(rec_buf[0] == STX)
        return(RCV_UNEXP_DATA);
    else
        return(RCV_BAD_STX);
}
/*==========================================================*/
/* Function to enable the bill acceptor                     */
/* return value: 0 => successfull                           */
/*               1 => no response                           */
/*==========================================================*/
int __export far pascal BAAcceptEnable(B Status)
char far *BAStatus;
{
    char BAcommandString[50];
    unsigned long start_time;
    int retValue;

start_time = GetTickCount();
    wsprintf(BAcommandString, "%c%c%c", (ONE_DOLLAR+TWO_DOLLAR+FIVE_DOLLAR+
        TEN_DOLLAR+TWENTY_DOLLAR),              // Byt-0
        (SPECIAL_INT_BIT+SECURITY_BIT+BIDIRECTION_BIT+ESCROW_ENABLE),  //
Byte-1
        (NOPUSH_BIT));                          // Byte-2
    for (;;)
```

```c
   {
      retValue = sendBAMessage(BAcommandString);
      if (retValue == SEND_GOOD_MSG)
      {
         retValue = receiveBAMessage(BAStatus);
         if (retValue == RCV_GOOD_MSG)
            break;
      }
      if (start_time < (GetTickCount() - 5000) ) /* 5 Sec delay */
         return(retValue);
   }
}
/*==========================================================*/
/* Function to disable the bill acceptor                    */
/* return value: 0 => successfull                           */
/*               1 => no response                           */
/*==========================================================*/
int __export far pascal BAAcceptDisable(BAStatus)
char far *BAStatus;
{
   char BAcommandString[50];
   unsigned long start_time;
   int retValue;

start_time = GetTickCount();
   wsprintf(BAcommandString, "000");                    // Byte-2
   for (;;)
   {
      retValue = sendBAMessage(BAcommandString);
      if (retValue == SEND_GOOD_MSG)
      {
         retValue = receiveBAMessage(BAStatus);
         if (retValue == RCV_GOOD_MSG)
            break;
      }
      if (start_time < (GetTickCount() - 5000) ) /* 5 Sec delay */
         return(retValue);
   }
}
/*==========================================================*/
/* Function to stack a bill in bill acceptor                */
/* return value: 0 => successful                            */
/*               1 => no response                           */
/*==========================================================*/
int __export far pascal BAStackBill(BAStatus)
char far *BAStatus;
{
   char BAcommandString[50];
   unsigned long start_time;
   int retValue;

start_time = GetTickCount();

wsprintf(BAcommandString, "%c%c%c", (ONE_DOLLAR+TWO_DOLLAR+FIVE_DOLLAR+
      TEN_DOLLAR+TWENTY_DOLLAR),           // Byt-0
      (SPECIAL_INT_BIT+SECURITY_BIT+BIDIRECTION_BIT+TAKE_IT_BIT), // Byte-1
```

```c
                        (NOPUSH_BIT));                    // Byte-2
    for (;;)
    {
      retValue = sendBAMessage(BAcommandString);
      if (retValue == SEND_GOOD_MSG)
      {
        retValue = receiveBAMessage(BAStatus);
        if (retValue == RCV_GOOD_MSG)
          break;
      }
      if (start_time < (GetTickCount() - 5000) )  /* 5 Sec delay */
        return(retValue);
    }
}
/*===========================================================================*/
/* Function to check state of bill acceptor         */
/* return value: 0 => idling                        */
/*               1 => accepting                     */
/*               2 => escrowed                      */
/*               3 => stacking                      */
/*               4 => stacked                       */
/*               5 => returning                     */
/*               6 => returned                      */
/*===========================================================================*/
int __export far pascal BACheckState(statusByte)
unsigned char statusByte;
{
  int retValue;

if (statusByte & IDLE_BIT)
    retValue = 0;
  if (statusByte & ACCEPTING_BIT)
    retValue = 1;
  if (statusByte & ESCROWED_BIT)
    retValue = 2;
  if (statusByte & STACKING_BIT)
    retValue = 3;
  if (statusByte & STACKED_BIT)
    retValue = 4;
  if (statusByte & RETURNING_BIT)
    retValue = 5;
  if (statusByte & RETURNED_BIT)
    retValue = 6;
  return(retValue);
}
/*===========================================================================*/
/* Function to check stacker of bill acceptor       */
/* return value: 0 => cheated                       */
/*               1 => bill rejected                 */
/*               2 => bill jammed                   */
/*               3 => stacker full                  */
/*               4 => lockable removal cassette present */
/*               5 => paused                        */
/*===========================================================================*/
int __export far pascal BACheckStacker(statusByte)
unsigned char statusByte;
```

```
{
  int retValue;

if (statusByte & CHEATED_BIT)
    retValue = 0;
  if (statusByte & REJECTED_BIT)
    retValue = 1;
  if (statusByte & JAMMED_BIT)
    retValue = 2;
  if (statusByte & STKR_FULL_BIT)
    retValue = 3;
  if (statusByte & LRC_ATTACH_BIT)
    retValue = 4;
  if (statusByte & PAUSED_BIT)
    retValue = 5;
  return(retValue);
}
/*==========================================================*/
/* Function to check bill value in acceptor                 */
/* return value: 0 => unknown                               */
/*               1 => $1                                    */
/*               2 => $2                                    */
/*               5 => $5                                    */
/*              10 => $10                                   */
/*              20 => $20                                   */
/*              50 => $50                                   */
/*             100 => $100                                  */
/*             101 => power-up                              */
/*             102 => invalid command                       */
/*             103 => failure or acceptor is in a fault mode */
/*==========================================================*/
int __export far pascal BACheckBillValue(statusByte)
unsigned char statusByte;
{
  int retValue=0, denValue;

denValue = (statusByte & RCV_DENOM_MASK)>>3;

if (denValue == DEN_ONE)
    retValue = 1;
  else if (denValue == DEN_TWO)
    retValue = 2;
  else if (denValue == DEN_FIVE)
    retValue = 5;
  else if (denValue == DEN_TEN)
    retValue = 10;
  else if (denValue == DEN_TWENTY)
    retValue = 20;
  else if (denValue == DEN_FIFTY)
    retValue = 50;
  else if (denValue == DEN_HUNDRED)
    retValue = 100;

if (statusByte & POWER_UP_BIT)
    retValue = 101;
  if (statusByte & INVALID_CMD_BIT)
```

```c
        retValue = 102;
    if (statusByte & FAILURE_BIT)
        retValue = 103;

return(retValue);
}
/******************************************************************/
/* FUNCTION: WEP(int)                                             */
/* PURPOSE : Performs cleanup tasks when the DLL is unloaded. WEP() is */
/*           called automatically by Windows when the DLL is unloaded (no */
/*           remaining tasks still have the DLL loaded). It is strongly */
/*           recommended that a DLL have a WEP() function, even if it does */
/*           nothing but returns success (1), as in this example.  */
/******************************************************************/
int far pascal WEP (bSystemExit)
int bSystemExit;
{
    closef(fhandle, fileStatus);
    return(1);
}
/******************************************************************/
/* FUNCTION: LibMain(HANDLE, WORD, WORD, LPSTR)                   */
/* PURPOSE : Is called by LibEntry. LibEntry is called by Windows when */
/*           the DLL is loaded. The LibEntry routine is provided in */
/*           the LIBENTRY.OBJ in the SDK Link Libraries disk. (The */
/*           source LIBENTRY.ASM is also provided.)               */
/*                                                                */
/*           LibEntry initializes the DLL's heap, if a HEAPSIZE value is */
/*           specified in the DLL's DEF file. Then LibEntry calls */
/*           LibMain. The LibMain function below satisfies that call. */
/*                                                                */
/*           The LibMain function should perform additional initialization */
/*           tasks required by the DLL. In this example, no initialization */
/*           tasks are required. LibMain should return a value of 1 if */
/*           the initialization is successful.                    */
/******************************************************************/
int far pascal LibMain(hModule, wDataSeg, cbHeapSize, lpszCmdLine)
HANDLE  hModule;
WORD    wDataSeg;
WORD    cbHeapSize;
LPSTR   lpszCmdLine;
{
    unsigned int deviceMode fhandle = openf(O_RDWR | O_BINARY, "@REMPRT3", fileStatus);
        /* *** send the command to meter *** */
    deviceMode = getdeviceinfo(fhandle, fileStatus);
    setdeviceinfo(fhandle, (deviceMode | 0x20), fileStatus);
    ackNumber = 0;
    return 1;
}
/******************************************************************/

/*    ZIPFUNCT.C    */
```

```
#include <stdio.h>
include <stdlib.h>
#include <conio.h>
#include <string.h>
#include <math.h>
#include <dos.h>
#include <fcntl.h>
#include "windows.h"
#include "serial.h"
#include "zipfunct.h"

#define PO_PO     0  /* PO to PO Mon-Fri             */
#define PO_PO_SS  1  /* PO to PO Sat/Sun.            */
#define PO_AD_AM  2  /* PO to Add morning delivery   */
#define PO_AD_PM  3  /* PO to Add afternoon delivery */
define PO_AD_SS  4  /* PO to Add Sat/Sun            */ void motor_c(int, int);
unsigned char read_scalereg(unsigned char);
void write_scalereg(unsigned char, unsigned char);
void manual_fcvt(double Float_Value, int Digits, int Precision,
         LPSTR Float_String);
double manual_atof(LPSTR Float_String);
int manual_atoi(LPSTR Int_String);
extern unsigned char outputready(int);
unsigned char get_weight(unsigned int FAR*, unsigned char);

char Image=0x00;
char Mask_table[8] = { 0x01, 0x02, 0x04, 0x08, 0x10, 0x20, 0x40, 0x80};
int sr,dr;

struct            /* input device table        */
  {
    unsigned int addr;
    char mask;
    char dummy;
  } DI_TABLE[35] = { { 1, 0,  0},
            {646, 0x01, 0},  /* W_3_3BY8 */
            {646, 0x02, 0},  /* W_4_1BY8 */
            {646, 0x04, 0},  /* W_5_1BY2 */
            {646, 0x08, 0},  /* W_6_1BY4 */
            {646, 0x10, 0},  /* CLAMP HOME */
            {646, 0x20, 0},  /* Window Home */
            {646, 0x40, 0},  /* Package forward sensor */
            {643, 0x80, 0},  /* Package Reverse sensor */

{647, 0x01, 0},  /* L_5_1BY2  */
            {647, 0x02, 0},  /* L_6_3BY4  */
            {647, 0x04, 0},  /* L_9_0BY0  */
            {647, 0x08, 0},  /* L_9_1BY2  */
            {647, 0x10, 0},  /* L_10_1BY2 */
            {647, 0x20, 0},  /* Flip plate forward sensor */
            {647, 0x40, 0},  /* Flip plate reverse sensor */
            {647, 0x80, 0},  /* Banner units */

{654, 0x01, 0},  /* Unused */
```

```
              {654, 0x02, 0},
              {654, 0x04, 0},
              {654, 0x08, 0},
              {654, 0x10, 0},
              {654, 0x20, 0},
              {654, 0x40, 0},
              {654, 0x80, 0},

{655, 0x01, 0},
              {655, 0x02, 0},
              {655, 0x04, 0},
              {655, 0x08, 0},
              {655, 0x10, 0},
              {655, 0x20, 0},
              {655, 0x40, 0},
              {655, 0x80, 0} };

/*****************************************************************************/
/*                                                                           */
/* NAME          : WRITE_OUTPUT - Write a digital output                     */
/* AUTHOR        : Celestine Vettical                                        */
/* DATE WRITTEN  : 07-Nov-1990                                               */
/* DATE REVISION :                                                           */
/* PURPOSE       : To provide a procedure to change the state of a given     */
/*                 digital output device.                                    */
/* MODEL         : This procedure uses direct control register accessing     */
/*                 using the library calls inp and outp. The current         */
/*                 state of devices connected to the same port are stored    */
/*                 in a disk file.                                           */
/* VERSION       : 1.1 (Release 1, Version 1)                                */
/* HISTORY       : NUMBER   DATE      RSE      DESCRIPTION                   */
/*                 Original 07-Nov-90 Designer Original Release              */
/*                 Original 15-Jun-92 JP Hylkin Windows DLL Version          */
/*                                    Betac Corp.                           */
/* AGREEMENTS    : Development by: Designer (07-Nov-90)                      */
/*                 Used by: Designer in the sequential ZIPLUS program        */
/* REQUIREMENTS  : To provide a C interface for digital output ports in      */
/*                 the Scientific Solutions card                             */
/* DEPENDENCIES  : Includes serial.h -- a definition file for sequential     */
/*                 procedures for ZIPSTER PLUS                               */
/* PARAMETERS    : NAME      DESCRIPTION              UNITS                  */
/*                 device    The device number        character              */
/*                           (devices defined in                             */
/*                           serial.h like GATE)                             */
/*                 state     The state of device      character              */
/*                           (ON or OFF, RAISE or                            */
/*                           DROP, CLOSE or OPEN)                            */
/*                 reverse   Reverse logic or not     character              */
/* ABSTRACT      : This procedure can be used to change the state of a       */
/*                 digital output device                                     */
/* PERFORMANCE   : Unknown                                                   */
/* RESTRICTIONS  : The Scientific Solutions interface cards should be        */
/*                 set to the base addresses given in "serial.h"             */
/* ERRORS PROPAGATED: None                                                   */
/* ERRORS HANDLED : None                                                     */
/* SAMPLE CALL   : write_output(GATE, RAISE, REVERSE)                        */
```

```
/*                                          */
/********************************************/
/* Copyright (c) 1990                        */
/* Pi Electronics Corp.                      */
/* 9777 W Gulf Bank Rd                       */
/* Houston, Texas  77040-3113                */
/* (713) 896-5800                            */
/* ALL RIGHTS RESERVED                       */
/********************************************/ void __export FAR PASCAL write_output(device, state, reverse)
char device, state, reverse;
{
    char workdo;

workdo = Image & (~Mask_table[device-1]);
    if (reverse)
        state = (~state)&1;
    if (state)
        workdo += Mask_table[device-1];
    Image = workdo;
    outp(PORT_A, workdo);
}

/********************************************/
/*                                                                */
/* NAME           : READ_INPUT - Read a digital input    */
/* AUTHOR         : Celestine Vettical                   */
/* DATE WRITTEN   : 08-Nov-1990                          */
/* DATE REVISION  :                                      */
/* PURPOSE        To provide a procedure to read the state of a given */
/*                digital input device.                  */
/* MODEL          : This procedure uses direct control register accessing */
/*                using the library calls inp and outp. The current */
/*                state of devices connected to the same port are read */
/*                simultaneously and the given device state is extracted*/
/* VERSION        : 1.1 (Release 1, Version 1)           */
/* HISTORY        : NUMBER   DATE     RSE      DESCRIPTION  */
/*                Original  08-Nov-90 Designer  Original Release */
/* AGREEMENTS     : Development by: Designer (08-Nov-90) */
/*                Used by: Designer in the sequential ZIPLUS program */
/* REQUIREMENTS   : To provide a C interface for digital input ports in */
/*                the Scientific Solutions card.         */
/* DEPENDENCIES   : Includes serial.h -- a definition file for sequential */
/*                    procedures for ZIPSTER PLUS        */
/* PARAMETERS     : NAME       DESCRIPTION          UNITS  */
/*                device      The device number    character */
/*                            (devices defined in            */
/*                            serial.h like CLAMP_FLAG)       */
/* ABSTRACT       : This procedure can be used to read the state of a */
/*                digital input device                   */
/* PERFORMANCE    : Unknown                              */
/* RESTRICTIONS   : The Scientific Solutions interface cards should be */
/*                set to the base addresses given in "serial.h" */
/* ERRORS PROPAGATED: None                               */
/* ERRORS HANDLED   : None                               */
```

```c
/* SAMPLE CALL   : current_state = read_input(CLAMP_FLAG)     */
/*                                                            */
/**************************************************************/
/* Copyright (c) 1990                                         */
/* Pi Electronics Corp.                                       */
/* 9777 W Gulf Bank Rd                                        */
/* Houston, Texas  77040-3113                                 */
/* (713) 896-5800                                             */
/* ALL RIGHTS RESERVED                                        */
/**************************************************************/
int __export FAR PASCAL read_input(device)
char device;
{
   char reading;

reading = inp(DI_TABLE[device].addr) & DI_TABLE[device].mask;
   if (reading)
      return(ON);
   else
      return(OFF);
}
/**************************************************************/
/* Check_Letter : A function to check whether the letter is inserted  */
/* properly.                                                  */
/* Return Value:  0  -> correct                               */
/*                1  -> move to left                          */
/*                2  -> move to front                         */
/*                3  -> not inserted                          */
/**************************************************************/
int __export FAR PASCAL check_letter(void)
{
   int left_opto, front_opto;

left_opto = read_input(LTR_READY);
/* front_opto = read_input(L_5_1BY); */
   front_opto = OFF;
   if ( (left_opto == OFF) && (front_opto == OFF) )
      return(0);
   else if ( (left_opto == ON) && (front_opto == OFF) )
      return(1);
   else if ( (left_opto == OFF) && (front_opto == ON) )
      return(2);
   else if ( (left_opto == ON) && (front_opto == ON) )
      return(3);
}

/**************************************************************/
/*                                                            */
/* NAME         : MOVE_MOTOR  - Move a stepper motor          */
/* AUTHOR       : Celestine Vettical                          */
/* DATE WRITTEN : 03-Nov-1990                                 */
/* DATE REVISION :                                            */
/* PURPOSE      : To provide a procedure to move a given stepper */
/*                motor in the specified direction with the specified */
/*                parameters for the given number of steps.   */
/* MODEL        : This procedure uses direct control register accessing */
```

```
/*              using the library calls inp and outp.          */
/* VERSION        : 1.1  (Release 1, Version 1)                */
/* HISTORY        : NUMBER   DATE      RSE      DESCRIPTION    */
/*                  Original 03-Nov-90  Designer  Original Release  */
/* AGREEMENTS     : Development by: Designer (03-Nov-90)       */
/*                  Used by: Designer in the sequential ZIPLUS program  */
/* REQUIREMENTS   : To provide a C interface for stepper motor controller  */
/*                  card from Scientific Solutions.            */
/* DEPENDENCIES   : Includes serial.h -- a definition file for sequential  */
/*                  procedures for ZIPSTER PLUS                */
/* PARAMETERS     : NAME        DESCRIPTION           UNITS    */
/*                  motor_num   The motor number      integer  */
/*                  numstep     Number of steps to move integer */
/*                  j_rate      Jump rate             integer  */
/*                  m_rate      Motor rate            integer  */
/*                  slop        The slope             integer  */
/*                  divisor     The slope divisor     integer  */
/*                  direction   The direction of motion character */
/* ABSTRACT       : This procedure can be used to move a motor */
/* PERFORMANCE    : Unknown                                    */
/* RESTRICTIONS   : The Scientific Solutions interface cards should be  */
/*                  set to the base addresses given in "serial.h"  */
/* ERRORS PROPAGATED: None                                     */
/* ERRORS HANDLED : None                                       */
/* SAMPLE CALL    : move_motor(CLAMP, 500, 1, 10, 10, 1, CLOCKWISE)  */
/*                                                             */
/************************************************************/
/* Copyright (c) 1990                                          */
/* Pi Electronics Corp.                                        */
/* 9777 W Gulf Bank Rd                                         */
/* Houston, Texas  77040 3113                                  */
/* (713) 136-5800                                              */
/* ALL RIGHTS RESERVED                                         */
/************************************************************/
void motor_c(param_code par_val)
    int param_code;
    it par_val;
{
    int k;
    char command;       /* stepper motor command code   */
    char char_c;        /* character count              */
    union
    {
        int word;
        struct
        {
            char lsb;
            char msb;
        } lsms;
    } arg;

switch (param_code)
    {
        case 'G': command = 0x47;       /* GO   */
            char_c = 0;
```

```c
            break;
    case 'J': command = 0x46;           /* JUMPRATE */
            char_c = 1;
            break;
    case 'R': command = 0x52;           /* RATE    */
            char_c = 1;
            break;
    case 'S': command = 0x53;           /* SLOPE   */
            char_c = 1;
            break;
    case 'D': command = 0x5A;           /* DIVISOR */
            char_c = 1;
            break;
    case 'N': command = 0x4E;           /* N STEP  */
            char_c = 2;
            break;
    case '+': command = 0x2B;           /* C.WISE  */
            char_c = 0;
            break;
    case '-': command = 0x2D;           /* C.C.WISE */
            char_c = 0;
            break;
}
arg.word = par_val;

outp(sr, 158);          /* Make Sure Bit #7 Is High      */
                        /* I/O & Handshaking w controller */
for (k=1; k <= (char_c + 1); k++)
{
    while (inp(sr) < 128)   /* Wait For Bit #7 HIGH      */
    { ; } switch (k)
    {
        case 1: outp(dr, command);
            break;
        case 2: outp(dr, char_c);
            break;
        case 3: outp(dr, arg.lsms.lsb);
            break;
        case 4: outp(dr, arg.lsms.msb);
            break;
    } outp(sr,30);         /* Drive I/O REQ LOW           */ while (inp(sr) >= 128)  /* Wait For Bit #7 LOW       */
    { ; } outp(sr, 158);       /* Drive I/O REQ HIGH          */
}
}
/*************************************************************/
void __export FAR PASCAL move_sm(motor_num, numstep, j_rate, m_rate, slop,
divisor,direction)
int motor_num;           /* 1 : clamp              */
```

```c
                    /* 2 : package door      */
unsigned int numstep;     /* number of steps to move */
int j_rate, m_rate, slop, divisor;
char direction;         /* 1 : clockwise         */
                        /* 0 : counter clockwise */

{
    int param_code;
    int par_val;

outp((SS_2_BASE_ADDR - 1), 0x30);
    switch (motor_num)
    {
        case 1:
            sr = SS_1_BASE_ADDR +0;
            dr = SS_1_BASE_ADDR +2;
            break;
        case 2:
            sr = SS_1_BASE_ADDR +1;
            dr = SS_1_BASE_ADDR +2;
            break;
        case 3:
            sr = SS_2_BASE_ADDR +0;
            dr = SS_2_BASE_ADDR +2;
            break;
        case 4:
            sr = SS_2_BASE_ADDR +1;
            dr = SS_2_BASE_ADDR +2;
            break;
    } if ( direction == 0)
        param_code = '+';
    else
        param_code = '-';
    par_val = 0;
    motor_c(param_code, par_val);

param_code = 'J';
    par_val = j_rate;
    motor_c(param_code, par_val);

param_code = 'S';
    par_val = slop;
    motor_c(param_code, par_val);

param_code = 'R';
    par_val = m_rate;
    motor_c(param_code, par_val);

param_code = 'D';
    par_val = divisor;
    motor_c(param_code, par_val);

param_code = 'N';
    par_val = numstep;
```

```c
   motor_c(param_code, par_val);

param_code = 'G';
   par_val    = 0;
   motor_c(param_code, par_val);

outp( (SS_2_BASE_ADDR - 1), 0);

}

/****************************************************************/
/*                                                              */
/* NAME          : RESET_MOTOR  - Reset a stepper motor         */
/* AUTHOR        : Celestine Vettical                           */
/* DATE WRITTEN  : 11-Nov-1990                                  */
/* DATE REVISION :                                              */
/* PURPOSE       : To provide a procedure to reset a given stepper motor */
/* MODEL         : This procedure uses direct control register accessing */
/*                 using the library calls inp and outp. If the motor is */
/*                 already at the home, move away and then reset */
/* VERSION       : 1.1 (Release 1, Version 1)                   */
/* HISTORY       : NUMBER   DATE      RSE        DESCRIPTION    */
/*                 Original 11-Nov-90 Designer   Original Release */
/* AGREEMENTS    : Development by: Designer (11-Nov-90)         */
/*                 Used by: Designer in the sequential ZIPLUS program */
/* REQUIREMENTS  : To provide a C interface for stepper motor controller */
/*                 card from Scientific Solutions.              */
/* DEPENDENCIES  : Includes serial.h -- a definition file for sequential */
/*                 procedures for ZIPSTER PLUS                  */
/* PARAMETERS    : NAME           DESCRIPTION         UNITS     */
/*                 motor_num      The motor number    integer   */
/* ABSTRACT      : This procedure can be used to reset a motor  */
/* PERFORMANCE   : Unknown                                      */
/* RESTRICTIONS  : The Scientific Solutions interface cards should be */
/*                 set to the base addresses given in "serial.h" */
/* ERRORS PROPAGATED: None                                      */
/* ERRORS HANDLED : None                                        */
/* SAMPLE CALL   : reset_motor(DOOR)                            */
/*                                                              */
/****************************************************************/
/* Copyright (c) 1990                                           */
/* Pi Electronics Corp.                                         */
/* 9777 W Gulf Bank Rd                                          */
/* Houston, Texas  77040-3113                                   */
/* (713) 896-5800                                               */
/* ALL RIGHTS RESERVED                                          */
/****************************************************************/ void __export FAR PASCAL reset_motor(motor_num)
int motor_num;
{
   char input_flag;
   int addr;
   int delay;

switch (motor_num)
```

```c
{
    case 1:
        addr = SS_1_BASE_ADDR +0;
        input_flag = L_5_1BY2;
        if (read_input(input_flag) ) /* home opto not blocked */
        {
            move_sm(motor_num, 15000, 1, 20, 1, 1, 0);
            while ( ( read_input(input_flag)) ) /* until blocked */
            {
                for(delay=0;  delay < 1000; delay++) {;}
            }
        }
        break;
    case 2:
        addr = SS_1_BASE_ADDR +1;
        input_flag = DOOR_FLAG;
        if (!read_input(input_flag) ) /* home opto not blocked */
        {
            move_sm(motor_num, 3000, 1, 5, 10, 1, 1);
            while ( !( read_input(input_flag)) ) /* until blocked */
            {
                for(delay=0;  delay < 1000; delay++) {;}
            }
        }
        break;
    case 3:
        addr = SS_1_BASE_ADDR +0;
        input_flag = L_6_3BY4;
        if (read_input(input_flag) ) /* home opto not blocked */
        {
            move_sm(1, 15000, 1, 20, 1, 1, 1);
            while ( ( read_input(input_flag)) ) /* until blocked */
            {
                for(delay=0;  delay < 1000; delay++) {;}
            }
        }
        break;
}
outp(addr, 0x8d);
}
/**************************************************************/
/*                                                            */
/* NAME        : GET_WEIGHT - Get the current weight          */
/* AUTHOR      : Celestine Vertical                           */
/* DATE WRITTEN : 05-Nov-1990                                 */
/* DATE REVISION :                                            */
/* PURPOSE     : To provide a procedure to get the current weight on a */
/*               given scale in counts.                       */
/* MODEL       : This procedure uses direct control register accessing */
/*               using the library calls inp and outp to get the count */
/* VERSION     : 1.1 (Release 1, Version 1)                   */
/* HISTORY     : NUMBER   DATE        DESCRIPTION             */
/*               Original 05-Nov-90  Designer Original Release */
/* AGREEMENTS  : Development by: Designer (05-Nov-90)         */
/*               Used by: Designer in the sequential ZIPLUS program */
/* REQUIREMENTS : To provide a C interface for the scale board. */
```

```c
/* DEPENDENCIES : Includes serial.h - a definition file for sequential */
/*               procedures for ZIPSTER PLUS                           */
/* PARAMETERS  : NAME      DESCRIPTION                UNITS            */
/*               scale     The scale select control   integer          */
/*                         register address(SCALEA or                  */
/*                         SCALEB defined in serial.h)                 */
/* ABSTRACT    : This procedure can be used to get the current weight  */
/*               in counts.                                            */
/* PERFORMANCE : Unknown                                               */
/* RESTRICTIONS : The A to D scale board should be set to the base     */
/*                addresses given in "serial.h"                        */
/* ERRORS PROPAGATED: status = Valid if zero, else scale is unstable   */
/* ERRORS HANDLED : None                                               */
/* SAMPLE CALL : get_weight(SCALEA)                                    */
/*                                                                     */
/***********************************************************************/
/* Copyright (c) 1990                                                  */
/* Pi Electronics Corp.                                                */
/* 9777 W Gulf Bank Rd                                                 */
/* Houston, Texas   77040-3113                                         */
/* (713) 896-5800                                                      */
/* ALL RIGHTS RESERVED                                                 */
/***********************************************************************/

/***********************************************************************/
/* read_scalereg(reg_num):  Read Scale Board Data                      */
/*                                                                     */
/* Function to read a register from the scale. Passed argument s the   */
/* register number to be input.                                        */
/*                                                                     */
/* Return:    value input from scale board, char.                      */
/***********************************************************************/
unsigned char read_scalereg(reg_num)
unsigned char reg_num;
{
   while (inp(REG_STATUS) & DEV_BUSY);    /* be sure it isnt busy  */
   outp(REG_COMMAND, reg_num);            /* select the register   */
   while (inp(REG_STATUS) & DEV_BUSY);    /* wait for not busy     */
   return(inp(REG_CONTROL));              /* return control reg value*/

/***********************************************************************/
* write_scalereg(reg_num,regdata):  Write Scale Board Data             */
/*                                                                     */
/* Function to write a register from the scale. Passed argument is the */
/* register number to be written and the data to write to it.          */
/*                                                                     */
/* Return:    nothing.                                                 */
/***********************************************************************/
void write_scalereg(reg_num,regdata)
unsigned char reg_num,regdata;
{
   while (inp(REG_STATUS) & DEV_BUSY);    /* be sure it isnt busy  */
   outp(REG_COMMAND, reg_num);            /* select the register   */
   while (inp(REG_STATUS) & DEV_BUSY);    /* wait for not busy     */
   outp(REG_CONTROL,regdata);             /* update the control reg */
   return;
```

```c
}
/**********************************************************************/
void __export FAR PASCAL init_scale(void)
{

/* initialize the scale board operating parameters    */
    write_scalereg(SEL_CHA_SCAN_RATE,CHA_SCAN_RATE);   /* update scan rate    */
    write_scalereg(SEL_CHA_DEAD_BAND,CHA_DEADBAND);    /* update the deadband */
    write_scalereg(SEL_CHA_SMOOTH,CHA_SMOOTH_COEF);    /* update smooth coeff. */
    write_scalereg(SEL_CHB_SCAN_RATE,CHB_SCAN_RATE);   /* update scan rate    */
    write_scalereg(SEL_CHB_DEAD_BAND,CHB_DEADBAND);    /* update the deadband */
    write_scalereg(SEL_CHB_SMOOTH,CHB_SMOOTH_COEF);    /* update smooth coeff. */

/* Read weight calibration constants */
    A_Cal_factor = (unsigned int)(read_scalereg(SEL_CHA_MSB_CAL) << 8) +
            read_scalereg(SEL_CHA_LSB_CAL);
    B_Cal_factor = (unsigned int)(read_scalereg(SEL_CHB_MSB_CAL) << 8) +
            read_scalereg(SEL_CHB_LSB_CAL);
    A_Null_weight = (unsigned int)(read_scalereg(SEL_CHA_MSB_NUL) << 8) +
            read_scalereg(SEL_CHA_LSB_NUL);
    B_Null_weight = (unsigned int)(read_scalereg(SEL_CHB_MSB_NUL) << 8) +
            read_scalereg(SEL_CHB_LSB_NUL);

/**** avoid zero divide when scale is not calibrated!!!   */
    if (A_Cal_factor == 0) A_Cal_factor = 1;
    if (B_Cal_factor == 0) B_Cal_factor = 1;
}
/**********************************************************************/
/* Function to read a stable weight in counts from the given scale   */
/* Return value: 0 -> successful                                     */
/*               1 -> unsuccessful (not stable)                      */
/**********************************************************************/
unsigned char get_weight(weight, scale_num)
unsigned int FAR *weight;
unsigned char scale_num;
{
    unsigned long start_time;
    unsigned char stable, scale;

while (inp(REG_STATUS) & DEV_BUSY);   /* be sure the scale isnt busy  */ if (scale_num == 1) /* letter scale */
    {
        scale  = SCALEA;
        stable = CHA_STABLE;
        outp(REG_COMMAND,SCALEA);
    }
    else
    {
        scale  = SCALEB;
        stable = CHB_STABLE;
        outp(REG_COMMAND,SCALEB);
    } start_time = GetTickCount();
    while (inp(REG_STATUS) & DEV_BUSY);
```

```c
    while ( !(inp(REG_STATUS) & stable) && (start_time > GetTickCount() - 1000) )
      ;  /* Read status and wait until stable reading and not busy */

*weight = inpw(REG_DATA);

if (inp(REG_STATUS) & stable)
    {          /* delay 1/4 second to see that stable remains */
      start_time = GetTickCount();
      while ( (inp(REG_STATUS) & stable) && (start_time > GetTickCount() - 250) );
    } if (inp(REG_STATUS) & stable)
      return(0);
    else
      return(1);
}
/*************************************************************/
/* ZERO_SCALE : Function to zero the scales                  */
/*   Return Value :  0 -> successfull                        */
/*                   1 -> no stable reading                  */
/*                   2 -> letter scale not empty             */
/*************************************************************/
unsigned char __export FAR PASCAL zero_scale(scale, changeZero)
unsigned char scale;
unsigned char changeZero;
{
    int loop_count=0, broke_loop_count=1;
    unsigned int cur_tare, null_wgt;

if (scale == 1)   /* letter scale */
      null_wgt = A_Null_weight;
    else
      null_wgt = B_Null_weight;

for(;;)
    {
      loop_count = 0;
      while (get_weight(&cur_tare, scale) != 0)
      {
        if (loop_count ++ == 200) /* no stable reading after 200 reads */
          return(1);
      }
      if (get_weight(&cur_tare, scale) == 0)  /* 2 successive stable reading */
      {
        if (abs(cur_tare - null_wgt) < 40)
          break;
        if (scale == 1)
        {
          if (changeZero == 1)
            null_wgt = cur_tare;
          else
            return(2);
        }
        else
          null_wgt = cur_tare;
```

```c
        }
    }
    if (scale == 1)
    {
        A_Null_weight = cur_tare;
        write_scalereg(SEL_CHA_MSB_NUL,(unsigned char)(A_Null_weight >> 8) );
        write_scalereg(SEL_CHA_LSB_NUL,(unsigned char)A_Null_weight);
    }
    else
    {
/*      get_fine_weight(&cur_tare, scale, 5);*/
        B_Null_weight = cur_tare;
        write_scalereg(SEL_CHB_MSB_NUL,(unsigned char)(B_Null_weight >> 8) );
        write_scalereg(SEL_CHB_LSB_NUL,(unsigned char)B_Null_weight);
    }
    return(0);
}
/***********************************************************************/
/* Function to read a stable weight in counts from the given scale      */
/* Return value:  0 -> stable weight counts                             */
/*               -1 -> unsuccessful (not stable)                        */
/*               +ve -> stable real weight ( when display = 1)          */
/***********************************************************************/
double __export FAR PASCAL find_weight(scal_num, calculated_weight, display)
unsigned char scal_num;
char FAR *calculated_weight;
unsigned char display;
{
    unsigned int wt_cnt;
    double wt_lb, wt_oz;
    char wt_str[10], oz_str[10];
    double oz_part, lb_part;
    unsigned int cal_factor, null_wgt;

if (get_weight(&wt_cnt, scal_num) == 0) /* stable reading */
    {
        if (display == 0) /* no need to find display weight */
            return(0);
        else /* calculate real weight */
        {
            if (scal_num == 1) /* letter scale */
            {
                cal_factor = A_Cal_factor;
                null_wgt = A_Null_weight;
            }
            else
            {
                cal_factor = B_Cal_factor;
                null_wgt = B_Null_weight;
            }
            wt_lb = wt_cnt - null_wgt;
            if (wt_lb > 60000)
                wt_lb = 0;          /* below null reading, set to zero */
            else
```

```c
wt_lb = wt_lb/cal_factor;
wt_oz = wt_lb*16;

/* Rate Classifier Mode Display */
if (wt_oz <= 16.0)   /* less than 1 lb. incl. */
    wt_oz = wt_oz - 0.03;   /* subtract the maintenance tolerance */
else if (wt_oz <= 64.0)   /* less than 4 lb. incl. */
    wt_oz = wt_oz - 0.12;   /* subtract the maintenance tolerance */
else if (wt_oz <= 112.0)   /* less than 7 lb. incl. */
    wt_oz = wt_oz - 0.2;   /* subtract the maintenance tolerance */
else                      /* less than 25lb.          */
    wt_oz = wt_oz - 0.4;   /* subtract the maintenance tolerance */ if (wt_oz < 0)   /* avoid negative display */
    wt_oz = 0.0;

/*---------------------------------------*/
/* I am using manual_fcvt instead of the  */
/* wsprintf function for floating point numbers. */
/*---------------------------------------*/

//   wsprintf(wt_str, "%6.2f", wt_oz);

manual_fcvt(wt_oz, 6, 2, (LPSTR) wt_str);

if (wt_oz <= 32.0)   /* less than or equal to 2 lb. */
    {
      if( ((wt_str[5]-'0') <5) && ((wt_str[5]-'0') !=0 ) )
      {
        wt_str[5] = '5';
        wt_oz = manual_atof(wt_str);
      }
      else if( (wt_str[5]-'0') >5 )
      {
        wt_str[5] = '0';
        wt_str[4] = wt_str[4] +1;
        if( (wt_str[4]-'0') > 9)
        {
          wt_str[4] = '0';
          wt_oz = manual_atof(wt_str) + 1.0;
        }
        else
          wt_oz = manual_atof(wt_str);
      }
    }
    else if (wt_oz <= 112.0)      /* less than 7 lb. */
    {
      if( (wt_str[5]-'0') >0 )
      {
        wt_str[5] = '0';
        wt_str[4] = wt_str[4] +1;
        if( (wt_str[4]-'0') > 9)
        {
          wt_str[4] = '0';
          wt_oz = manual_atof(wt_str) + 1.0;
        }
```

```
                else
                    wt_oz = manual_atof(wt_str);
            }
            else
                wt_oz = manual_atof(wt_str);
        }
        else /* over 7 lb. */
        {
            if( (wt_str[5]-'0') >0 )
            {
                wt_str[5] = '0';
                wt_str[4] = wt_str[4] +1;
                if( (wt_str[4]-'0') > 9)
                {
                    wt_str[4] = '0';
                    wt_oz = manual_atof(wt_str) + 1.0;
//                  wsprintf(wt_str, "%6.2f", wt_oz);
                    manual_fcvt(wt_oz, 6, 2, (LPSTR) wt_str);
                }
            }
            if( (wt_str[4]-'0') >0 )
            {
                wt_str[4] = wt_str[4] + ((wt_str[4]-'0')%2);
                if( (wt_str[4]-'0') > 9 )
                {
                    wt_str[4] = '0';
                    wt_oz = manual_atof(wt_str) + 1.0;
                }
                else
                    wt_oz = manual_atof(wt_str);
            }
            else
                wt_oz = manual_atof(wt_str);
        } if ( wt_oz <= 0.05)
            wt_oz = 0.0;

wt_lb = wt_oz/16.0;

//  oz_part = modf(wt_lb, &lb_part);

/*--------------------------------------*/
    /* A manual way of performing the modf function. */
    /*--------------------------------------*/
    lb_part = (double) ((int)wt_lb);
    oz_part = wt_lb-lb_part;    // NOTE: Don't need this statement
                                //       because of next statement oz_part = (wt_lb - lb_part)*16 ;

//  wsprintf(calculated_weight, "%2d lb %5.2f oz", (int)lb_part, oz_part);
    manual_fcvt(oz_part, 5, 2, (LPSTR) oz_str);
    wsprintf(calculated_weight, "%2d lb %s oz", (int)lb_part, (LPSTR) oz_str);
    if (scal_num == 1) /* letter scale */
        return(wt_oz);
```

```
          else
             return(wt_lb);
        }
     }
     else
        return(-1);
}
/***********************************************************************/
/*---------------------------------------------------*/
/*                                          */
/* manual_fcvt is a float conversion procedure.        */
/* The parameters are:                       */
/*                                          */
/*   Float_Value - the value to convert to a string.  */
/*                                          */
/*   Digits      - the total number of characters in  */
/*                 the string, including the decimal  */
/*                 point and sign.                    */
/*                                          */
/*   Precision   - the number of digits after the     */
/*                 decimal point to represent.        */
/*                                          */
/*   Float_String - the result string. It must be     */
/*                  memory set asside by the calling  */
/*                  program.                         */
/*                                          */
/* There is one known limitation: the number of digits */
/* of resolution (including the digits before the      */
/* decimal point) must not exceed 38. The subscript    */
/* of the local char array digits_str can be modified  */
/* as needed for this situation.                       */
/*                                          */
/*---------------------------------------------------*/ void manual_fcvt(double Float_Value, int Digits, int Precision,
           LPSTR Float_String)
{
  char digits_str[40];
  long digits, precision_multiplier=1L, int_part, float_part;
  int i;

for (i=0;i<Precision;i++)
     precision_multiplier *= 10L;

if (Float_Value*(double)precision_multiplier<0.0)
     digits = (long) (Float_Value*(double)precision_multiplier - 0.5);
  else
     digits = (long) (Float_Value*(double)precision_multiplier + 0.5);

if (digits<0L) {
     lstrcpy(Float_String, "-");
     digits = -digits;
  }
  else
     lstrcpy(Float_String, "");
```

```
int_part = digits/precision_multiplier;
float_part = digits-int_part*precision_multiplier;

wsprintf(digits_str, "%d", int_part);
lstrcat(Float_String, digits_str);

lstrcat(Float_String, ".");

wsprintf(digits_str, "%d", float_part);
lstrcat(Float_String, digits_str);

if (lstrlen(Float_String)<Digits) {
  lstrcpy(digits_str, " ");
  for (i=1;i<Digits-lstrlen(Float_String);i++)
    lstrcat(digits_str, " ");
  lstrcat(digits_str, Float_String);
  lstrcpy(Float_String, digits_str);
}
}
/****************************************************************/
/*--------------------------------------------------*/
/*                                                  */
/* manual_atof work the same as the C function atof. */
/*                                                  */
/*--------------------------------------------------*/ double manual_atof(LPSTR Float_String)
{
  int i=0, len, done=0;
  double ret_val=0.0, dec_val=1.0, neg=1.0;

len = lstrlen(Float_String);

while (Float_String[i]==' ' && i< en)
    i++;

if (i>=len)
    return ret_val;

if (Float_String[i]=='-') {
    neg=-1.0;
    i++;
  } while (Float_String[i]!='.' && i<len) { if (Float_String[i] < '0' || Float_String[i]>'9')
      return neg*ret_val;

ret_val = 10.0*ret_val+(double)(Float_String[i]-'0');
    i++;
  } if (i>=len)
    return neg*ret_val;
```

```c
    i++;   // Skip the decimal point while (i<len) { if (Float_String[i] < '0' || Float_String[i]>'9')
      return neg*ret_val;

dec_val = dec_val/10.0;
    ret_val = ret_val+((double)(Float_String[i]-'0'))*dec_val;
    i++;
  } return neg*ret_val;
}
/****************************************************************/
/* PRT_READY : Check whether the receipt printer is ready       */
/* Return value: 1 -> ready                                     */
/*               0 -> not ready                                 */
/****************************************************************/
unsigned char __export FAR PASCAL prt_ready()
{
  int r_prn;
  unsigned char ret_value;

r_prn = _lopen("@REMPRT1", OF_READ);
  ret_value = outputready(r_prn);
  _lclose(r_prn);
  return(ret_value);
}
/****************************************************************/
/* PRINTRECEIPTLINE : Check whether the receipt printer is ready */
/* Return value: 1 -> ready                                     */
/*               0 -> not ready                                 */
/*               2 -> communication failure                     */
/****************************************************************/
unsigned char __export FAR PASCAL printReceiptLine(lineString, length)
char FAR *lineString;
int length;
{
  int r_prn;
  unsigned char ret_value;

/*  r_prn = _lopen("@REMPRT1", OF_READWRITE);*/
  r_prn = _lopen("bobtest.prn", OF_READWRITE);
  ret_value = outputready(r_prn);
  if (ret_value = 1)
  {
    if (length == 0)
      length = lstrlen(lineString);
    if(_lwrite(r_prn, (LPSTR)lineString, length) != length)
      ret_value = 2;
  }
  _lclose(r_prn);
  return(ret_value);
}
/****************************************************************/
```

```c
/* CHECK_SUM                                                  */
/* function figure out check sum of string in buff parameter, */
/* sums each byte and makes it a printable character and returns. */
/********************************************************************/
char __export FAR PASCAL check_sum(buff)
char FAR *buff;
{
   char total;
   total=0;
   while(*buff) != '.')
     total = total + *buff++;
   total=total + '.';
   total = (total & 0x3f) + 0x20;
   return(total);
}
/*==============================================================*
/
/* Function to get the cutoff time for overnight delivery.       */
/* Return values : 0     -> off net (no guarantee)               */
/*                 100   -> 2nd day                              */
/*                 otherwise -> cutoff time in HHMMSS format     */
/*==============================================================*
/
long __export FAR PASCAL exp_net(zipcode, service_type)
long zipcode;
int service_type;
{
   int fp;
   int cutoff_flag;
   int cutoff_num;
   long cutoff_time;
   int mask;

mask = 07 << (service_type*3);

fp = _lopen ("EXPZIP_A.DAT", OF_READ);
   _llseek(fp, (zipcode*2), 0);
   _lread(fp, (void _huge *)&cutoff_flag, 2);
   _lclose(fp);
   cutoff_num = (cutoff_flag & mask) >> (service_type*3);
   if (cutoff_num != 0)
   {
      fp = _lopen ("EXPTM_A.DAT", OF_READ);
      _llseek(fp, (long)((service_type*7 + (cutoff_num-1))*4), 0);
      _lread(fp, (void _huge *)&cutoff_time, 4);
      _lclose(fp);
   }
   else
      cutoff_time =0;
   return(cutoff_time);
}
/********************************************************************/
/* FUNCTION: WEP(int)                                         */
/* PURPOSE : Performs cleanup tasks when the DLL is unloaded. WEP() is */
/*           called automatically by Windows when the DLL is unloaded (no */
/*           remaining tasks still have the DLL loaded). It is strongly */
```

```
/*      recommended that a DLL have a WEP() function, even if it does */
/*      nothing but returns success (1), as in this example.          */
/***************************************************************/
int __export FAR PASCAL WEP (bSystemExit)
int  bSystemExit;
{
   return(1);
}
/***************************************************************/
/* FUNCTION: LibMain(HANDLE, WORD, WORD, LPSTR)                 */
/* PURPOSE : Is called by LibEntry. LibEntry is called by Windows when */
/*           the DLL is loaded. The LibEntry routine is provided in    */
/*           the LIBENTRY.OBJ in the SDK Link Libraries disk. (The     */
/*           source LIBENTRY.ASM is also provided.)                    */
/*                                                                     */
/*           LibEntry initializes the DLL's heap, if a HEAPSIZE value is */
/*           specified in the DLL's DEF file. Then LibEntry calls      */
/*           LibMain. The LibMain function below satisfies that call.  */
/*                                                                     */
/*           The LibMain function should perform additional initialization */
/*           tasks required by the DLL. In this example, no initialization */
/*           tasks are required. LibMain should return a value of 1 if */
/*           the initialization is successful.                         */
/***************************************************************/
int __export FAR PASCAL LibMain(hModule, wDataSeg, cbHeapSize, lpszCmdLine)
HANDLE hModule;
WORD   wDataSeg;
WORD   cbHeapSize;
LPSTR  lpszCmdLine;
{
   return 1;
}
/***************************************************************/
```

*Appendix B*

```
  outp(addr, 0x8d);
}
/*********************************************************/
/*                                                       */
/* NAME        : GET_WEIGHT - Get the current weight     */
/* AUTHOR      : Celestine Vettical                      */
/* DATE WRITTEN : 05-Nov-1990                            */
/* DATE REVISION :                                       */
/* PURPOSE     : To provide a procedure to get the current weight on a */
/*               given scale in counts.                  */
/* MODEL       : This procedure uses direct control register accessing */
/*               using the library calls inp and outp to get the count */
/* VERSION     : 1.1 (Release 1, Version 1)              */
/* HISTORY     : NUMBER   DATE        DESCRIPTION         */
/*               Original 05-Nov-90  Designer Original Release */
/* AGREEMENTS  : Development by: Designer (05-Nov-90)    */
/*               Used by: Designer in the sequential ZIPLUS program */
/* REQUIREMENTS : To provide a C interface for the scale board. */
```

```
/* DEPENDENCIES  : Includes serial.h -- a definition file for sequential  */
/*                 procedures for ZIPSTER PLUS                            */
/* PARAMETERS    : NAME       DESCRIPTION              UNITS              */
/*                 scale      The scale select control  integer           */
/*                            register address(SCALEA or                  */
/*                            SCALEB defined in serial.h)                 */
/* ABSTRACT      : This procedure can be used to get the current weight   */
/*                 in counts.                                             */
/* PERFORMANCE   : Unknown                                                */
/* RESTRICTIONS  : The A to D scale board should be set to the base       */
/*                 addresses given in "serial.h"                          */
/* ERRORS PROPAGATED: status = Valid if zero, else scale is unstable      */
/* ERRORS HANDLED : None                                                  */
/* SAMPLE CALL   : get_weight(SCALEA)                                     */
/*                                                                        */
/**************************************************************************/
/* Copyright (c) 1990                                                     */
/* Pi Electronics Corp.                                                   */
/* 9777 W Gulf Bank Rd                                                    */
/* Houston, Texas  77040-3113                                             */
/* (713) 896-5800                                                         */
/* ALL RIGHTS RESERVED                                                    */
/**************************************************************************/

/**************************************************************************/
/* read_scalereg(reg_num):   Read Scale Board Data                        */
/*                                                                        */
/* Function to read a register from the scale. Passed argument is the     */
/* register number to be input.                                           */
/*                                                                        */
/* Return:    value input from scale board, char.                         */
/**************************************************************************/
unsigned char read_scalereg(reg_num)
unsigned char reg_num
{
    while (inp(REG_STATUS) & DEV_BUSY);     /* be sure it isnt busy  */
    outp(REG_COMMAND, reg_num);             /* select the register   */
    while (inp(REG_STATUS) & DEV_BUSY);     /* wait for not busy     */
    return(inp(REG_CONTROL));               /* return control reg value*/
}
/**************************************************************************/
/* write_scalereg(reg_num,regdata);   Write Scale Board Data              */
/*                                                                        */
/* Function to write a register from the scale. Passed argument is the    */
/* register number to be written and the data to write to it.             */
/*                                                                        */
/* Return:    nothing.                                                    */
/**************************************************************************/
void write_scalereg(reg_num,regdata)
unsigned char reg_num,regdata;
{
    while (inp(REG_STATUS) & DEV_BUSY);     /* be sure it isnt busy  */
    outp(REG_COMMAND, reg_num);             /* select the register   */
    while (inp(REG_STATUS) & DEV_BUSY);     /* wait for not busy     */
    outp(REG_CONTROL,regdata);              /* update the control reg */
    return;
```

```c
}
/*********************************************************/
void __export FAR PASCAL init_scale(void)
{

/* initialize the scale board operating parameters    */
    write_scalereg(SEL_CHA_SCAN_RATE,CHA_SCAN_RATE);  /* update scan rate    */
    write_scalereg(SEL_CHA_DEAD_BAND,CHA_DEADBAND);   /* update the deadband */
    write_scalereg(SEL_CHA_SMOOTH,CHA_SMOOTH_COEF);   /* update smooth coeff. */
    write_scalereg(SEL_CHB_SCAN_RATE,CHB_SCAN_RATE);  /* update scan rate    */
    write_scalereg(SEL_CHB_DEAD_BAND,CHB_DEADBAND);   /* update the deadband */
    write_scalereg(SEL_CHB_SMOOTH,CHB_SMOOTH_COEF);   /* update smooth coeff. */

/* Read weight calibration constants */
    A_Cal_factor = (unsigned int)(read_scalereg(SEL_CHA_MSB_CAL) << 8) +
            read_scalereg(SEL_CHA_LSB_CAL);
    B_Cal_factor = (unsigned int)(read_scalereg(SEL_CHB_MSB_CAL) << 8) +
            read_scalereg(SEL_CHB_LSB_CAL);
    A_Null_weight = (unsigned int)(read_scalereg(SEL_CHA_MSB_NUL) << 8) +
            read_scalereg(SEL_CHA_LSB_NUL);
    B_Null_weight = (unsigned int)(read_scalereg(SEL_CHB_MSB_NUL) << 8) +
            read_scalereg(SEL_CHB_LSB_NUL);

/**** avoid zero divide when scale is not calibrated!!!   */
    if (A_Cal_factor == 0) A_Cal_factor = 1;
    if (B_Cal_factor == 0) B_Cal_factor = 1;
}
/*********************************************************/
/* Function to read a stable weight in counts from the given scale    */
/* Return value: 0 -> successful                */
/*               1 -> unsuccessful (not stable)                */
/*********************************************************/
unsigned char get_weight(weight, scale_num)
unsigned int FAR *weight;
unsigned char scale_num;
{
    unsigned long start_time;
    unsigned char stable, scale;

while (inp(REG_STATUS) & DEV_BUSY);   /* be sure the scale isnt busy */ if (scale_num == 1) /* letter scale */
    {
        scale = SCALEA;
        stable = CHA_STABLE;
        outp(REG_COMMAND,SCALEA);
    }
    else
    {
        scale = SCALEB;
        stable = CHB_STABLE;
        outp(REG_COMMAND,SCALEB);
    } start_time = GetTickCount();
    while (inp(REG_STATUS) & DEV_BUSY);
```

```c
    while ( !(inp(REG_STATUS) & stable) && (start_time > GetTickCount() - 1000) )
       ;   /* Read status and wait until stable reading and not busy */

*weight = inpw(REG_DATA);

if (inp(REG_STATUS) & stable)
    {          /* delay 1/4 second to see that stable remains */
       start_time = GetTickCount();
       while ( (inp(REG_STATUS) & stable) && (start_time > GetTickCount() - 250) );
    } if (inp(REG_STATUS) & stable)
       return(0);
    else
       return(1);
}
/*****************************************************************/
/* ZERO_SCALE : Function to zero the scales                      */
/* Return Value :  0 -> successfull                              */
/*                 1 -> no stable reading                        */
/*                 2 -> letter scale not empty                   */
/*****************************************************************/
unsigned char __export FAR PASCAL zero_scale(scale, changeZero)
unsigned char scale;
unsigned char changeZero;
{
    int loop_count=0, broke_loop_count=1;
    unsigned int cur_tare, null_wgt;

if (scale == 1)   /* letter scale */
       null_wgt = A_Null_weight;
    else
       null_wgt = B_Null_weight;

for(;;)
    {
       loop_count = 0;
       while (get_weight(&cur_tare, scale) != 0)
       {
          if (loop_count ++ == 200)  /* no stable reading after 200 reads */
             return(1);
       }
       if (get_weight(&cur_tare, scale) == 0)  /* 2 succesive stable reading */
       {
          if (abs(cur_tare - null_wgt) < 40)
             break;
          if (scale == 1)
          {
             if (changeZero == 1)
                null_wgt = cur_tare;
             else
                return(2);
          }
          else
             null_wgt = cur_tare;
```

```c
    }
  }
  if (scale == 1)
  {
    A_Null_weight = cur_tare;
    write_scalereg(SEL_CHA_MSB_NUL,(unsigned char)(A_Null_weight >> 8) );
    write_scalereg(SEL_CHA_LSB_NUL,(unsigned char)A_Null_weight);
  }
  else
  {
/*     get_fine_weight(&cur_tare, scale, 5);*/
    B_Null_weight = cur_tare;
    write_scalereg(SEL_CHB_MSB_NUL,(unsigned char)(B_Null_weight >> 8) );
    write_scalereg(SEL_CHB_LSB_NUL,(unsigned char)B_Null_weight);
  }
  return(0);
}
/*****************************************************************/
/* Function to read a stable weight in counts from the given scale  */
/* Return value:  0 -> stable weight counts                         */
/*               -1 -> unsuccessful (not stable)                    */
/*              +ve -> stable real weight ( when display = 1)       */
/*****************************************************************/
double __export FAR PASCAL find_weight(scal_num, calculated_weight, display)
unsigned char scal_num;
char FAR *calculated_weight;
unsigned char display;
{
  unsigned int wt_cnt;
  double wt_lb, wt_oz;
  char wt_str[10], oz_str[1.];
  double oz_part, lb_part;
  unsigned int cal_factor, null_wgt;

if (get_weight(&wt_cnt, scal_num) == 0)  /* stable reading */
  {
    if (display == 0)  /* no need to find display weight */
      return(0);
    else /* calculate real weight */
    {
      if (scal_num == 1) /* etter scale */
      {
        cal_factor = A_Cal_factor;
        null_wgt = A_Null_weight;
      }
      else
      {
        cal_factor = B_Cal_factor;
        null_wgt = B_Null_weight;
      }
      wt_lb = wt_cnt - null_wgt;
      if (wt_lb > 60000)
        wt_lb = 0;           /* below null reading, set to zero */
      else
```

```
    wt_lb = wt_lb/cal_factor;
    wt_oz = wt_lb*16;

/* Rate Classifier Mode Display */
    if (wt_oz <= 16.0)   /* less than 1 lb. incl. */
        wt_oz = wt_oz - 0.03;   /* subtract the maintenance tolerance */
    else if (wt_oz <= 64.0)   /* less than 4 lb. incl. */
        wt_oz = wt_oz - 0.12;   /* subtract the maintenance tolerance */
    else if (wt_oz <= 112.0)   /* less than 7 lb. incl. */
        wt_oz = wt_oz - 0.2;   /* subtract the maintenance tolerance */
    else                    /* less than 25lb.              */
        wt_oz = wt_oz - 0.4;   /* subtract the maintenance tolerance */ if (wt_oz < 0)   /* avoid negative display */
        wt_oz = 0.0;

/*-------------------------------------------*/
/* I am using manual_fcvt instead of the     */
/* wsprintf function for floating point numbers. */
/*-------------------------------------------*/

//  wsprintf(wt_str, "%6.2f", wt_oz);

manual_fcvt(wt_oz, 6, 2, (LPSTR) wt_str);

if (wt_oz <= 32.0)   /* less than or equal to 2 lb. */
    {
        if( ( wt_str[5]-'0') <5) && ((wt_str[5]-'0') !=0) )
        {
            wt_str[5] = '5';
            wt_oz = manual_atof(wt_str);
        }
        else if( (wt_str[5]-'0') >5 )
        {
            wt_str[5] = '0';
            wt_str[4] = wt_str[4] +1;
            if( (wt_str[4]-'0') > 9)
            {
                wt_str[4] = '0';
                wt_oz = manual_atof(wt_str) + 1.0;
            }
            els:
                wt_oz = manual_atof(wt_str);
        }
    }
    else if (wt_oz <= 112.0)       /* less than 7 lb.   */ if( (wt_str[5]-'0') >0 )
        {
            wt_str[5] = '0';
            wt_str[4] = wt_str[4] +1;
            if( (wt_str[4]-'0') > 9)
            {
                wt_str[4] = '0';
                wt_oz = manual_atof(wt_str) + 1.0;
            }
```

```
            else
              wt_oz = manual_atof(wt_str);
          }
          else
            wt_oz = manual_atof(wt_str);
        }
        else /* over 7 lb. */
        {
          if( (wt_str[5]-'0') >0 )
          {
            wt_str[5] = '0';
            wt_str[4] = wt_str[4] +1;
            if( (wt_str[4]-'0') > 9)
            {
              wt_str[4] = '0';
              wt_oz = manual_atof(wt_str) + 1.0;
//            wsprintf(wt_str, "%6.2f", wt_oz);
              manual_fcvt(wt_oz, 6, 2, (LPSTR) wt_str);
            }
          }
          if( (wt_str[4]-'0') >0 )
          {
            wt_str[4] = wt_str[4] + ((wt_str[4]-'0')%2);
            if( (wt_str[4]-'0') > 9 )
            {
              wt_str[4] = '0';
              wt_oz = manual_atof(wt_str) + 1.0;
            }
            else
              wt_oz = manual_atof(wt_str);
          }
          else
            wt_oz = manual_atof(wt_str);
        } if ( wt_oz <= 0.05)
          wt_oz = 0.0;

wt_lb = wt_oz/16.0;

//      oz_part = n odf(wt_lb, &lb_part);

/*-------------------------------------*/
        /* A manual way of performing the modf function. */
        /*-------------------------------------*/
        lb_part = (double) ((int)wt_lb);
        oz_part = wt_lb-lb_part;   // NOTE: Don't need this statement
                                   //       because of next statement oz_part = (wt_lb - lb_part)*16 ;

//      wsprintf(calculated_weight, "%2d lb %5.2f oz", (int)lb_part, oz_part);
        manual_fcvt(oz_part, 5, 2, (LPSTR) oz_str);
        wsprintf(calculated_weight, "%2d lb %s oz", (int)lb_part, (LPSTR) oz_str);
        if (scal_num == 1) /* letter scale */
          return(wt_oz);
```

```
            else
                return(wt_lb);
        }
    }
    else
        return(-1);
}
/****************************************************************/
/*--------------------------------------------------------------*/
/*                                                              */
/* manual_fcvt is a float conversion procedure.                 */
/* The parameters are:                                          */
/*                                                              */
/*   Float_Value  - the value to convert to a string.           */
/*                                                              */
/*   Digits       - the total number of characters in           */
/*                  the string, including the decimal           */
/*                  point and sign.                             */
/*                                                              */
/*   Precision    - the number of digits after the              */
/*                  decimal point to represent.                 */
/*                                                              */
/*   Float_String - the result string. It must be               */
/*                  memory set asside by the calling            */
/*                  program.                                    */
/*                                                              */
/* There is one known limitation: the number of digits          */
/* of resolution including the digits before the                */
/* decimal point must not exceed 38. The subscript              */
/* of the local char array digits_str can be modified           */
/* as needed for this situation.                                */
/*                                                              */
/*--------------------------------------------------------------*/ old manual_fcvt(double Float_Value, int Digits, int Precision,
        LPS R Float_String)
{
    char digits_str[40];
    long digits, precision_multiplier=1L, int_part, float_part;
    int i;

for (i=0;i<Precision;i++)
        precision_multiplier *= 10L;

if (Float_Value*(double)precision_multiplier<0.0)
        digits = (long) (Float_Value*(double)precision_multiplier  0.5);
    else
        digits = (long) (Float_Value*(double)precision_multiplier + 0.5);

if (digits<0L) {
        lstrcpy(Float_String, "-");
        digits = -digits;
    }
    else
        lstrcpy(Float_String, "");
```

```
int_part = digits/precision_multiplier;
float_part = digits-int_part*precision_multiplier;

wsprintf(digits_str, "%d", int_part);
lstrcat(Float_String, digits_str);

lstrcat(Float_String, ".");

wsprintf(digits_str, "%d", float_part);
lstrcat(Float_String, digits_str);

if (lstrlen(Float_String)<Digits) {
  lstrcpy(digits_str, " ");
  for (i=1;i<Digits-lstrlen(Float_String);i++)
    lstrcat(digits_str, " ");
  lstrcat(digits_str, Float_String);
  lstrcpy(Float_String, digits_str);
  }
}
/*********************************************************************/
/*-----------------------------------------------------------------*/
/*                                                                 */
/*  manual_atof work the same as the C function atof.           */
/*                                                                 */
/*-----------------------------------------------------------------*/ double manual_atof(LPSTR Float_String)
{
  int i=0, len, done=0;
  double ret_val=0.0, dec_val=1.0, neg=1.0;

len = lstrlen(Float_String);

while (Float_String[i]==' ' && i<len)
    i++;

if (i>=len)
    return ret_val;

if (Float_String[i]=='-') {
    neg=-1.0;
    i++;
  } while (Float_String[i]!='.' && i<len) { if (Float_String[i] < '0' || Float_String[i]>'9')
      return neg*ret_val;

ret_val = 10.0*ret_val+(double)(Float_String[i]-'0');
    i++;
  } if (i>=len)
    return neg*ret_val;
```

```
i++;   // Skip the decimal point while (i<len) { if (Float_String[i] < '0' || Float_String[i]>'9')
    return neg*ret_val;

dec_val = dec_val/10.0;
  ret_val = ret_val+((double)(Float_String[i]-'0'))*dec_val;
  i++;
} return neg*ret_val;
}
/***************************************************************/
```

We claim:

1. An automated mailing system for processing and storing letters for subsequent shipment by a carrier comprising:

(a) an outer housing having a back side and a front side;

(b) a computer contained within said outer housing;

(c) a communication means contained on the outside of said outer housing and coupled to said computer for communicating instructions to said user on how to operate said system to process a letter for mailing;

(d) a user input receiving means positioned on the outside of said outer housing and coupled to said computer and said communicating means for receiving input from said user to operate said system to process said letter for mailing;

(e) a payment means coupled to said computer for receiving and verifying payment for processing, storing, and shipping and letters;

(f) a mail service selection data entry means coupled to said computer for receiving data from a user relating to a type of mail service desired by said user;

(g) a shipping designation data entry means coupled to said computer for receiving data from a user relating to the shipping designation of the letter;

(h) a postage stamp printing means contained within said outer housing and coupled to said computer for printing a postage stamp onto said letter upon receipt and verification of payment by said payment means and approval by said user;

(i) a weighing means contained within said automatic transport means and coupled to said computer for weighing said letter prior to transport of said letter to said postage printing means, said weighing means further including a detecting means for detecting minute vibrations, and wherein said detecting means is in communication with said computer to prevent said weighing means from weighing said letter until no vibrations are detected;

(j) a determining means including said computer for determining the required postage for shipping said letter, said determining means being coupled to said shipping designation data entry means, said mailing service selection data entry means, and said weighing means;

(k) a transport means contained within said outer housing and coupled to said computer for transporting a letter to said postage printing means after said letter has been weighed and upon receipt and verification of payment by said payment means and approval by said user; and (l) a storage area contained within said outer housing for storing said letters.

2. The system of claim 1, wherein said transport means is an automatic-feed mechanism.

3. The system of claim 1, wherein said communicating means is a video display means for displaying said information to said user.

4. The system of claim 3, wherein said display means and said user input receiving means in combination are a touch-screen activated monitor system.

5. An automalted mailing system for processing and storing items for subsequent shipment by a carrier comprising:

(a) an outer housing having a back side and a front side;

(b) a computer contained within said outer housing;

(c) a communication means contained on the outside of said outer housing and coupled to said computer for communicating instructions to said user on how to operate said system to process an item for mailing;

(d) a user input receiving means positioned on the outside of said outer housing and coupled to said computer and said communicating means for receiving input from said user to operate said system to process said item for mailing;

(e) a payment means coupled to said computer for receiving and verifying payment for processing, storing, and shipping said item;

(f) a mail service selection data entry means coupled to said computer for receiving data from a user relation to a type of mail service desired by said user;

(g) a shipping designation data entry means coupled to said computer for receiving data from said user relating to the shipping designation of the item;

(h) a weighing means coupled to said computer for weighing said item;

(i) a determining means including said computer for determining the required postage for shipping said item, said determining means being coupled to said shipping designation data entry means, said mailing service selection data entry means, and said weighing means;

(j) a postage stamp printing means coupled to said computer and determining means for printing a strip comprising a postage stamp for subsequent affixiation onto said item;

(k) a storage area contained within said outer housing; and (l) a secured item acceptance area contained within said outer housing for accepting said item for subsequent transport into said storage area and further comprising an outer door positioned on said front of said outer housing and coupled to said computer, a platform for holding said item, an inner back door movably attached to said platform, a depositing means for depositing said item into said storage area upon receipt and verification of payment by said payment means, approval by said user, and verification of said weight upon re-weighing of said item prior to storage, wherein said weighing means is mounted below said platform.

6. The system of claim 5, wherein said communicating means is a video display means for displaying said information to said user.

7. The system of claim 5, wherein said display means and said user input receiving means in combination are a touch-screen activated monitor system.

8. The system of claim 5 wherein said depositing means further comprises a closing means including said computer for closing said outer door after said item has been weighed and approved by said user, an opening means including said computer for opening said inner door when said outer door is closed and after said item has been re-weighed and verified and a tilting means coupled with said opening means and said computer for tilting said platform towards said back side of said outer housing to slidably deposit said item through said opened inner door into said storage area.

9. The system of claim 5 wherein said weighing means further includes a detecting means for detecting minute vibrations, and wherein said detecting means is in communication with said computer to prevent said weighing means from weighing said item until no vibrations are detected.

10. The system of claim 5, wherein said postage meter stamp printing and dispensing means is a rotatable postage meter capable of printing postage stamps directly onto letters and capable of printing and dispensing postage stamps directly to a user through said outer housing.

11. The system of claim 5, further including a means for positioning said meter into a proper orientation for printing and dispensing said postage stamps.

12. The system of claim 10, further including an automatic feed mechanism contained within said outer housing and coupled to said computer for transporting an item to said rotatable postage meter, wherein said item is a letter.

13. An automated mailing system for processing and storing items for subsequent shipment by a carrier comprising:
  (a) an outer housing having a back side and front side;
  (b) a computer contained within said outer housing;
  (c) a communication means contained on the outside of said outer housing and coupled to said computer for communicating instructions to said user on how to operate said system to process an item for mailing;
  (d) a user input receiving means positioned on the outside of said outer housing and coupled to said computer and said communicating means for receiving input from said user to operate said system to process said item for mailing;
  (e) a payment means coupled to said computer for receiving and verifying payment for processing, storing, and shipping said item;
  (f) a mail service selection data entry means coupled to said computer for receiving data from a user relating to a type of mail service desired by said user;
  (g) a shipping designation data entry means coupled to said computer for receiving data from a user relating to the shipping designation of the item;
  (h) a weighing means coupled to said computer for weighing said item;
  (i) a determining means including said computer for determining the required postage for shipping said item, said determining means being coupled to said shipping designation data entry means, said mailing service selection data entry means, and said weighing means;
  (j) a rotatable postage meter coupled to said determining means, said postage meter further including a means for rotating said meter to a first position to dispense a postage meter strip directly to a user through said outer housing and a means for rotating said meter to a second position to print a stamp directly onto letters upon receipt and verification of payment by said payment means and approval by said user;
  (k) a means for accepting said item for subsequent storage; and
  (l) a storage area for receiving and storing said items upon final processing of said item, including affixation of said postage strip onto said item.

14. The system of claim 13, wherein said weighing means further includes a detecting means for detecting minute vibrations, and wherein said detecting means is in communication with said computer to prevent said weighing means from weighing said item until no vibrations are detected.

15. The system of claim 13, wherein said communicating means is a video display means for displaying said information to said user.

16. The system of claim 13, wherein said display means and said user input receiving means in combination are a touch-screen activated monitor system.

17. The system of claim 13, further including a secured item acceptance area contained within said outer housing and further comprising an outer door positioned on said front side of said outer housing and coupled to said computer, a platform for holding said item, an inner back door movably attached to said platform, a weighing means mounted below said platform, and a depositing means for depositing said item into said storage area.

18. The system of claim 17, wherein said depositing means further comprises a closing means including said computer for closing said outer door after said item has been weighed and approved by said user, an opening means including said computer for opening said inner door when said outer door is closed and after said item has been re-weighed and verified, and a tilting means coupled with said opening means and said computer for tilting said platform towards said back side of said outer housing to slidably deposit said item through said opened inner door into said storage area.

19. A method for processing letters for subsequent shipment by a carrier, comprising the steps of:
  (a) providing instructions to a user for initiating a mail processing transaction;
  (b) receiving input from said user relating to user identification information;
  (c) providing mail service selection instructions to said user wherein said mail services are selected from the group consisting of letter services and package service;
  (d) receiving mail service selection input from said user, wherein said mail service is a letter service;
  (e) relaying said service selection input to a postage printing means for printing a postage stamp to move said postage printing means into a proper position;
  (f) receiving said letter from said user onto a weighing means;
  (g) monitoring said weighing means for the detection vibrations upon said weighing means;
  (h) weighing said letter once no vibrations are detected to obtain a weight amount and relaying said weight amount to a database comprising a rate table to determine a charge amount for processing said letter;
  (i) providing said charge amount for processing said letter to said user for approval by said user;
  (j) receiving verification input from said user approving said charge amount;
  (k) relaying said verification input to activate a postage printing means and to open an outer door to allow insertion of said letter into said postage printing means;
  (l) transporting said letter to said postage printing means;
  (m) relaying said user identification information to an external credit/debit authorization center for verification of said user's credit balance;
  (n) deducting said charge amount from said credit balance; and
  (o) activating said postage stamp printing means to stamp said letter.

20. A method for processing packages for shipment comprising the steps of:
  (a) providing instructions to a user for initiating a mail processing transaction;
  (b) receiving input from said user relating to user identification information;
  (c) providing mail service selection instructions to said user wherein said mail services are selected from the group consisting of letter services and package services;

(d) receiving mail service selection input from said user, wherein said mail service is a package service;

(e) relaying input to a postage printing means for printing a postage stamp to move said postage printing means into a proper position;

(f) receiving a package from said user onto a weighing means, wherein said weighing means is contained within a secured item acceptance area including an outer security door and an inner door;

(g) monitoring said weighing means for the detection of vibrations upon said weighing means;

(h) weighing said package to obtain a first weight amount once no vibrations are detected, and relaying said first weight amount to a database comprising a rate table to determine a charge amount for processing said package;

(i) receiving a input from said user, wherein said input is a destination zip code;

(k) providing said charge amount for processing said package to said user for approval by said user;

(l) relaying input to said secured item acceptance area to activate said outer security door to close to prevent user access to said package;

(m) relaying said user identification information to an external credit/debit authorization center for verification said user's balance;

(n) re-weighing said package contained within said secured item acceptance area to obtain a second weight amount to determine whether said first weight amount and said second weight amount are equivalent;

(o) deducting said charge amount from said credit balance upon verification of said credit balance; and (p) activating said postage stamp printing means to dispense a postage meter strip for affixation onto said package.

21. The method of claim 20, wherein if said second weight amount is different from said first weight amount, further including the step of cancelling said transaction by relaying input to said secured item acceptance area to activate said closed outer security door to open to allow said user to remove said package.

22. An automated mailing system for storing mail items utilizing a tracking bar code for subsequent shipment by a carrier comprising:

(a) an outer housing;

(b) a computer contained within said outer housing;

(c) a communication means contained on the outside of said outer housing and coupled to said computer for communicating instructions to said user on how to operate said system;

(d) a user input receiving means positioned on the outside of said outer housing and coupled to said computer and said communicating means for receiving input from said user to operate said system;

(e) a payment means coupled to said computer for receiving and verifying payment prior to storing and shipping said item;

(f) a tracking bar code verification means coupled to said computer to verifying that an item has been assigned a tracking bar code and said tracking bar code is printed on the item; and (g) a means coupled to said tracking bar code verification means for accepting and depositing said item into a storage area upon positive verification of the presence of said tracking bar code upon said item land upon receipt and verification of payment by said payment means.

23. The system of claim 22, wherein said means for accepting and depositing said item includes an intermediate holding area comprising an outer door, and inner door, and a means for opening said inner door upon positive verification of said tracking bar code by said tracking bar code verification means.

24. The system of claim 22, wherein said tracking bar code verification means further includes an instructing means coupled to said communication means for instructing said user to turn said mail item over or to enter a tracking bar code, wherein said mail item is a letter.

25. The system of claim 22, further including a data entry means mounted on said outer housing for entering a tracking bar code number and a tracking bar code dispensing means for printing and dispensing a tracking bar code for subsequent affixation to said mail item by said user.

26. An automated mailing system for processing and storing items for subsequent shipment by a carrier comprising:

(a) an outer housing;

(b) a computer contained within said outer housing;

(c) a communication means contained on the outside of said outer housing and coupled to said computer for communication instructions to said user on how to operate said system to process an item for mailing;

(d) a user input receiving means positioned on the outside of said outer housing land coupled to said computer and said communicating means for receiving input from said user to operate said system to process said item for mailing;

(e) a payment means coupled to said computer for receiving and verifying payment for processing, storing, and shipping said item;

(f) a data entry means mounted on said outer housing for entering data for generating a tracking bar code, including a means for generating said tracking bar code;

(g) tracking bar code verification means coupled to said computer for verifying that and item has been assigned said tracking bar code;

(h) a weighing means for weighing said item;

(i) a storage area contained within said outer housing;

(j) a determining means including said computer for determining the required postage for shipping said item, said determining means being coupled to said shipping designation data entry means and said weighing means; and (k) a secured item acceptance area contained within said outer housing and further comprising an outer door positioned on said front side of said outer housing and coupled to said computer, a platform for holding said item, an inner back door movably attached to said platform, said weighing means mounted below said platform, and a depositing means for depositing said item into said storage area upon receipt and verification of payment by said payment means, approval by said user, and verification of weight upon re-weighing of said item prior to storage.

27. The system of claim 26, wherein said depositing means further comprises a closing means including said computer for closing said outer door after said item has been weighed and approved by said user; an opening means, including said computer for opening said inner door when said outer door is closed and after said item has been re-weighed and verified, and a tilting means coupled with said opening means and said computer for tilting said platform towards said back side of said outer housing to deposit said item through said opened inner door into said storage area.

28. The system of claim 26, wherein said weighing means further includes a detecting means for detecting minute vibrations, and wherein said detecting means is in communication with said computer to prevent said weighing means from weighing said item until no vibrations are detected.

* * * * *